(12) United States Patent
Laska et al.

(10) Patent No.: US 9,420,331 B2
(45) Date of Patent: Aug. 16, 2016

(54) METHOD AND SYSTEM FOR CATEGORIZING DETECTED MOTION EVENTS

(71) Applicant: GOOGLE INC., Mountain View, CA (US)

(72) Inventors: Jason N. Laska, San Francisco, CA (US); Greg R. Nelson, San Bruno, CA (US); Greg Duffy, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/510,042

(22) Filed: Oct. 8, 2014

(65) Prior Publication Data

US 2016/0093338 A1 Mar. 31, 2016

Related U.S. Application Data

(60) Provisional application No. 62/057,991, filed on Sep. 30, 2014, provisional application No. 62/021,620, filed on Jul. 7, 2014.

(51) Int. Cl.
*H04N 21/431* (2011.01)
*H04N 21/4335* (2011.01)
(Continued)

(52) U.S. Cl.
CPC .......... *H04N 21/4312* (2013.01); *G06F 3/0481* (2013.01); *G06F 3/0482* (2013.01);
(Continued)

(58) Field of Classification Search
CPC .. G06T 7/0071; G06T 7/2006; G06K 9/0035; G06K 9/00624; G06K 2009/00738
See application file for complete search history.

(56) References Cited

U.S. PATENT DOCUMENTS 4,737,847 A 4/1988 Araki et al.
5,396,284 A 3/1995 Freeman
(Continued)

FOREIGN PATENT DOCUMENTS

| EP | 1024666 A2 * | 8/2000 | ............... H04N 7/18 |
| JP | EP 1024666 A2 * | 8/2000 | ............. H04N 5/765 |
| WO | WO 2009138037 A1 | 11/2009 | |

OTHER PUBLICATIONS

YouTube, "Sky News Live" (screenshot of website illustrating live stream video with timeline having preview thumbnail of past images within the stream), https://www.youtube.com/watch?v=y60wDzZt8yg (accessed Mar. 23, 2016).*
(Continued)

*Primary Examiner* — David N Werner
(74) *Attorney, Agent, or Firm* — Morgan, Lewis & Bockius LLP

(57) ABSTRACT

A computing system device with processor(s) and memory displays a video monitoring user interface on the display, the video monitoring user interface including a video feed from a camera located remotely from the client device in a first region of the video monitoring user interface and an event timeline in a second region of the video monitoring user interface, and the event timeline includes indicators corresponding to motion events previously detected by the camera. The computing system obtains an indication of a detected motion event and associates the detected motion event with a respective category. The computing system displays an indicator for the detected motion event on the event timeline with a display characteristic corresponding to the respective category.

30 Claims, 66 Drawing Sheets

(51) Int. Cl.
*H04N 21/433* (2011.01)
*G06K 9/00* (2006.01)
*H04L 29/06* (2006.01)
*H04W 12/02* (2009.01)
*H04W 12/06* (2009.01)
*G06T 7/20* (2006.01)
*H04N 7/18* (2006.01)
*G06F 3/0481* (2013.01)
*G06F 3/0484* (2013.01)
*G11B 27/00* (2006.01)
*G11B 27/028* (2006.01)
*H04L 29/08* (2006.01)
*G06F 3/0482* (2013.01)
*G11B 27/031* (2006.01)
*G11B 27/30* (2006.01)
*G11B 27/34* (2006.01)
*G06K 9/32* (2006.01)
*H04N 5/14* (2006.01)
*H04N 21/239* (2011.01)
*G11B 27/10* (2006.01)
*H04N 5/93* (2006.01)
*H04N 9/87* (2006.01)
*H04W 4/00* (2009.01)
*H04W 12/08* (2009.01)
*H04N 21/422* (2011.01)

(52) U.S. Cl.
CPC ........ *G06F3/04842* (2013.01); *G06F 3/04847* (2013.01); *G06K 9/00711* (2013.01); *G06K 9/00718* (2013.01); *G06K 9/00765* (2013.01); *G06K 9/00771* (2013.01); *G06K 9/3241* (2013.01); *G06T 7/20* (2013.01); *G11B 27/005* (2013.01); *G11B 27/028* (2013.01); *G11B 27/031* (2013.01); *G11B 27/105* (2013.01); *G11B 27/30* (2013.01); *G11B 27/34* (2013.01); *H04L 63/0428* (2013.01); *H04L 67/10* (2013.01); *H04N 5/144* (2013.01); *H04N 5/93* (2013.01); *H04N 7/18* (2013.01); *H04N 7/183* (2013.01); *H04N 9/87* (2013.01); *H04N 21/239* (2013.01); *H04N 21/431* (2013.01); *H04N 21/4334* (2013.01); *H04N 21/4335* (2013.01); *H04W 4/008* (2013.01); *H04W 12/02* (2013.01); *H04W 12/06* (2013.01); *H04W 12/08* (2013.01); *G06K 2009/00738* (2013.01); *G06T 2207/10016* (2013.01); *H04L 2463/062* (2013.01); *H04N 21/42204* (2013.01)

(56) References Cited

U.S. PATENT DOCUMENTS

| | | | |
|---|---|---|---|
| 5,627,586 A | 5/1997 | Yamasaki | |
| 5,854,902 A * | 12/1998 | Wilson et al. | 709/247 |
| 5,956,424 A | 9/1999 | Wootton et al. | |
| 5,969,755 A | 10/1999 | Courtney | |
| 6,028,626 A | 2/2000 | Aviv | |
| 6,107,918 A | 8/2000 | Klein et al. | |
| 6,236,395 B1 | 5/2001 | Sezan et al. | |
| 6,366,296 B1 | 4/2002 | Boreczky et al. | |
| 6,400,378 B1 | 6/2002 | Snook | |
| 6,424,370 B1 | 7/2002 | Courtney | |
| 6,476,858 B1 | 11/2002 | Ramirez Diaz et al. | |
| 6,496,598 B1 | 12/2002 | Harman | |
| 6,571,050 B1 | 5/2003 | Park | |
| 6,600,784 B1 | 7/2003 | Divakaran et al. | |
| 6,647,200 B1 | 11/2003 | Tanaka | |
| 6,665,423 B1 | 12/2003 | Mehrotra et al. | |
| 6,697,103 B1 * | 2/2004 | Fernandez et al. | 348/143 |
| 6,741,977 B1 | 5/2004 | Nagaya et al. | |
| 6,816,184 B1 | 11/2004 | Brill et al. | |
| 6,970,183 B1 | 11/2005 | Monroe | |
| 7,016,415 B2 | 3/2006 | Alvarez | |
| 7,023,469 B1 | 4/2006 | Olson | |
| 7,142,600 B1 | 11/2006 | Schonfeld et al. | |
| 7,421,455 B2 * | 9/2008 | Hua | G06F 17/30849 |
| 7,421,727 B2 * | 9/2008 | Oya et al. | 725/105 |
| 7,433,493 B1 | 10/2008 | Miyoshi et al. | |
| 7,440,613 B2 | 10/2008 | Xu | |
| 7,629,995 B2 | 12/2009 | Salivar et al. | |
| 7,760,908 B2 | 7/2010 | Curtner et al. | |
| 7,813,525 B2 | 10/2010 | Aggarwal | |
| 7,920,626 B2 | 4/2011 | Fernandez et al. | |
| 7,924,323 B2 | 4/2011 | Walker et al. | |
| 8,130,839 B2 | 3/2012 | Kawashima et al. | |
| 8,200,669 B1 * | 6/2012 | Iampietro | G06F 17/30784 707/737 |
| 8,284,258 B1 | 10/2012 | Cetin et al. | |
| 8,295,597 B1 | 10/2012 | Sharma et al. | |
| 8,300,890 B1 | 10/2012 | Gaikwad et al. | |
| 8,305,447 B1 | 11/2012 | Wong | |
| 8,401,232 B2 | 3/2013 | Fan | |
| 8,494,234 B1 | 7/2013 | Bozinovic et al. | |
| 8,525,665 B1 | 9/2013 | Trundle et al. | |
| 8,613,070 B1 | 12/2013 | Borzycki et al. | |
| 8,688,483 B2 | 4/2014 | Watts | |
| 8,780,201 B1 | 7/2014 | Scalisi et al. | |
| 8,854,457 B2 | 10/2014 | De Vleeschouwer et al. | |
| 8,902,085 B1 | 12/2014 | Ray et al. | |
| 8,941,736 B1 | 1/2015 | Scalisi | |
| 8,958,602 B1 | 2/2015 | Lane et al. | |
| 8,982,141 B2 | 3/2015 | Freyhult | |
| 9,014,429 B2 | 4/2015 | Badawy et al. | |
| 9,025,836 B2 | 5/2015 | Ptucha | |
| 9,064,393 B2 | 6/2015 | He | |
| 9,158,974 B1 | 10/2015 | Laska et al. | |
| 9,213,903 B1 | 12/2015 | Laska et al. | |
| 2001/0010541 A1 | 8/2001 | Fernandez et al. | |
| 2001/0019631 A1 | 9/2001 | Ohsawa et al. | |
| 2001/0043721 A1 | 11/2001 | Kravets et al. | |
| 2002/0030740 A1 * | 3/2002 | Arazi et al. | 348/143 |
| 2002/0054068 A1 | 5/2002 | Ellis et al. | |
| 2002/0054211 A1 | 5/2002 | Edelson et al. | |
| 2002/0089549 A1 | 7/2002 | Munro et al. | |
| 2002/0125435 A1 | 9/2002 | Cofer et al. | |
| 2002/0168084 A1 | 11/2002 | Trajkovic et al. | |
| 2003/0025599 A1 | 2/2003 | Monroe | |
| 2003/0035592 A1 | 2/2003 | Cornog et al. | |
| 2003/0053658 A1 | 3/2003 | Pavlidis | |
| 2003/0058339 A1 | 3/2003 | Trajkovic et al. | |
| 2003/0095183 A1 | 5/2003 | Roberts et al. | |
| 2003/0103647 A1 | 6/2003 | Rui et al. | |
| 2003/0133503 A1 | 7/2003 | Paniconi et al. | |
| 2003/0135525 A1 | 7/2003 | Huntington et al. | |
| 2003/0218696 A1 | 11/2003 | Bagga et al. | |
| 2004/0060063 A1 | 3/2004 | Russ et al. | |
| 2004/0145658 A1 | 7/2004 | Lev-Ran et al. | |
| 2004/0196369 A1 * | 10/2004 | Fukasawa et al. | 348/155 |
| 2005/0005308 A1 | 1/2005 | Logan et al. | |
| 2005/0018879 A1 | 1/2005 | Ito et al. | |
| 2005/0078868 A1 | 4/2005 | Chen et al. | |
| 2005/0104958 A1 | 5/2005 | Egnal et al. | |
| 2005/0146605 A1 | 7/2005 | Lipton et al. | |
| 2005/0157949 A1 | 7/2005 | Aiso et al. | |
| 2005/0162515 A1 | 7/2005 | Venetianer et al. | |
| 2005/0195331 A1 * | 9/2005 | Sugano | G06F 17/30799 348/571 |
| 2006/0007051 A1 | 1/2006 | Bear et al. | |
| 2006/0028548 A1 | 2/2006 | Salivar et al. | |
| 2006/0029363 A1 | 2/2006 | Iggulden et al. | |
| 2006/0045185 A1 * | 3/2006 | Kiryati et al. | 375/240.16 |
| 2006/0045354 A1 | 3/2006 | Hanna et al. | |
| 2006/0053342 A1 | 3/2006 | Bazakos et al. | |
| 2006/0067585 A1 | 3/2006 | Pace | |
| 2006/0109341 A1 | 5/2006 | Evans | |
| 2006/0148528 A1 | 7/2006 | Jung et al. | |
| 2006/0164561 A1 | 7/2006 | Lacy et al. | |
| 2006/0171453 A1 * | 8/2006 | Rohlfing | G08B 13/19632 375/240.01 |

(56) References Cited

U.S. PATENT DOCUMENTS

| | | | |
|---|---|---|---|
| 2006/0227862 A1 | 10/2006 | Campbell et al. | |
| 2006/0227997 A1 | 10/2006 | Au et al. | |
| 2006/0233448 A1 | 10/2006 | Pace et al. | |
| 2006/0243798 A1* | 11/2006 | Kundu et al. | 235/383 |
| 2006/0285596 A1 | 12/2006 | Kondo | |
| 2006/0291694 A1 | 12/2006 | Venetianer et al. | |
| 2007/0033632 A1* | 2/2007 | Baynger | G11B 27/034 725/135 |
| 2007/0035622 A1 | 2/2007 | Hanna et al. | |
| 2007/0058040 A1 | 3/2007 | Zhang et al. | |
| 2007/0086669 A1 | 4/2007 | Berger et al. | |
| 2007/0101269 A1 | 5/2007 | Hua et al. | |
| 2007/0223874 A1 | 9/2007 | Hentschel | |
| 2007/0255742 A1 | 11/2007 | Perez et al. | |
| 2007/0268369 A1 | 11/2007 | Amano et al. | |
| 2008/0044085 A1* | 2/2008 | Yamamoto | 382/190 |
| 2008/0181453 A1 | 7/2008 | Xu | |
| 2008/0184245 A1* | 7/2008 | St-Jean | 718/103 |
| 2008/0225952 A1 | 9/2008 | Wang et al. | |
| 2008/0240579 A1 | 10/2008 | Enomoto | |
| 2008/0247601 A1 | 10/2008 | Ito et al. | |
| 2009/0006368 A1 | 1/2009 | Mei et al. | |
| 2009/0016599 A1 | 1/2009 | Eaton et al. | |
| 2009/0059031 A1 | 3/2009 | Miyakoshi | |
| 2009/0060352 A1 | 3/2009 | Distante et al. | |
| 2009/0080853 A1 | 3/2009 | Chen | |
| 2009/0083787 A1 | 3/2009 | Morris | |
| 2009/0102924 A1 | 4/2009 | Masten, Jr. | |
| 2009/0103622 A1 | 4/2009 | Tripathi et al. | |
| 2009/0128632 A1 | 5/2009 | Goto et al. | |
| 2009/0154806 A1 | 6/2009 | Chang et al. | |
| 2009/0158308 A1 | 6/2009 | Weitzenfeld et al. | |
| 2009/0208181 A1 | 8/2009 | Cottrell | |
| 2009/0213937 A1 | 8/2009 | Kawase et al. | |
| 2009/0244309 A1 | 10/2009 | Maison et al. | |
| 2009/0249247 A1 | 10/2009 | Tseng et al. | |
| 2009/0273711 A1 | 11/2009 | Chapdelaine et al. | |
| 2009/0278934 A1 | 11/2009 | Ecker et al. | |
| 2009/0292549 A1* | 11/2009 | Ma et al. | 705/1 |
| 2010/0013943 A1 | 1/2010 | Thorn | |
| 2010/0023865 A1 | 1/2010 | Fulker et al. | |
| 2010/0026802 A1 | 2/2010 | Titus et al. | |
| 2010/0060715 A1 | 3/2010 | Laasik et al. | |
| 2010/0098165 A1 | 4/2010 | Farfade et al. | |
| 2010/0114623 A1 | 5/2010 | Bobbitt et al. | |
| 2010/0128927 A1 | 5/2010 | Ikenoue | |
| 2010/0141763 A1 | 6/2010 | Itoh et al. | |
| 2010/0166260 A1 | 7/2010 | Huang et al. | |
| 2010/0192212 A1 | 7/2010 | Raleigh | |
| 2010/0201815 A1 | 8/2010 | Anderson et al. | |
| 2010/0205203 A1* | 8/2010 | Anderson et al. | 707/769 |
| 2010/0288468 A1 | 11/2010 | Patel et al. | |
| 2011/0035054 A1 | 2/2011 | Gal et al. | |
| 2011/0050901 A1 | 3/2011 | Oya | |
| 2011/0058708 A1 | 3/2011 | Ikenoue | |
| 2011/0069175 A1 | 3/2011 | Mistretta et al. | |
| 2011/0107364 A1 | 5/2011 | Lajoie et al. | |
| 2011/0173235 A1 | 7/2011 | Aman et al. | |
| 2011/0176043 A1 | 7/2011 | Baker et al. | |
| 2011/0211563 A1 | 9/2011 | Herrala et al. | |
| 2011/0231428 A1 | 9/2011 | Kuramura | |
| 2011/0235998 A1 | 9/2011 | Pond et al. | |
| 2011/0254950 A1 | 10/2011 | Bibby et al. | |
| 2011/0276881 A1 | 11/2011 | Keng et al. | |
| 2011/0300933 A1 | 12/2011 | Chien et al. | |
| 2012/0005628 A1* | 1/2012 | Isozu | G06F 3/04842 715/838 |
| 2012/0011567 A1 | 1/2012 | Cronk et al. | |
| 2012/0019728 A1 | 1/2012 | Moore | |
| 2012/0045090 A1 | 2/2012 | Bobbitt et al. | |
| 2012/0120238 A1 | 5/2012 | Adar et al. | |
| 2012/0121187 A1 | 5/2012 | Lee et al. | |
| 2012/0173577 A1 | 7/2012 | Millar et al. | |
| 2012/0198319 A1 | 8/2012 | Agnoli et al. | |
| 2012/0216296 A1 | 8/2012 | Kidron | |
| 2013/0016122 A1 | 1/2013 | Bhatt | |
| 2013/0076908 A1 | 3/2013 | Bratton et al. | |
| 2013/0083198 A1 | 4/2013 | Maslan | |
| 2013/0086665 A1 | 4/2013 | Filippi et al. | |
| 2013/0176430 A1 | 7/2013 | Zhu et al. | |
| 2013/0182905 A1 | 7/2013 | Myers et al. | |
| 2013/0202210 A1 | 8/2013 | Ryoo et al. | |
| 2013/0243322 A1 | 9/2013 | Noh et al. | |
| 2013/0266292 A1 | 10/2013 | Sandrew et al. | |
| 2013/0268357 A1 | 10/2013 | Heath | |
| 2013/0276140 A1 | 10/2013 | Coffing et al. | |
| 2013/0279810 A1 | 10/2013 | Li et al. | |
| 2013/0279884 A1 | 10/2013 | Gifford | |
| 2013/0340050 A1 | 12/2013 | Harrison | |
| 2013/0342689 A1 | 12/2013 | Sanjay et al. | |
| 2014/0007222 A1 | 1/2014 | Qureshi et al. | |
| 2014/0043534 A1 | 2/2014 | Nakaoka | |
| 2014/0050406 A1 | 2/2014 | Buehler et al. | |
| 2014/0053200 A1* | 2/2014 | de Paz | H04N 5/44 725/44 |
| 2014/0055610 A1 | 2/2014 | Ko et al. | |
| 2014/0068705 A1 | 3/2014 | Chambers et al. | |
| 2014/0068789 A1 | 3/2014 | Watts et al. | |
| 2014/0098992 A1* | 4/2014 | Yagi et al. | 382/103 |
| 2014/0105564 A1 | 4/2014 | Johar | |
| 2014/0129942 A1 | 5/2014 | Rathod | |
| 2014/0137188 A1 | 5/2014 | Bartholomay et al. | |
| 2014/0157370 A1 | 6/2014 | Plattner et al. | |
| 2014/0173692 A1 | 6/2014 | Srinivasan et al. | |
| 2014/0189808 A1 | 7/2014 | Mahaffey et al. | |
| 2014/0201761 A1* | 7/2014 | Dalal | H04L 47/193 718/108 |
| 2014/0245411 A1 | 8/2014 | Meng et al. | |
| 2014/0245461 A1 | 8/2014 | O'Neill et al. | |
| 2014/0254863 A1 | 9/2014 | Marks et al. | |
| 2014/0282877 A1 | 9/2014 | Mahaffey et al. | |
| 2014/0289376 A1 | 9/2014 | Chan et al. | |
| 2014/0333775 A1* | 11/2014 | Naikal et al. | 348/159 |
| 2014/0339374 A1 | 11/2014 | Mian et al. | |
| 2015/0022432 A1 | 1/2015 | Stewart | |
| 2015/0042570 A1 | 2/2015 | Lombardi | |
| 2015/0052029 A1 | 2/2015 | Wu et al. | |
| 2015/0054949 A1 | 2/2015 | Scalisi | |

OTHER PUBLICATIONS

Shim, A Study of Surveillance System of Objects Abnormal Behaviour by Blob Composition Analysis, 8 Int'l J. of Security & Its Applications, Mar. 2014, pp. 333-340.

FI8921W email notification and motion alarm, Jun. 4, 2013, pp. 1-4, http://foscam.us/forum/fi8921w-email-notification-and-motion-alarm-t5874.html.

ISPY, Motion Detection Setting up Motion Detection, Dec. 11, 2011, pp. 1-3, https://www.ispyconnect.com/userguide-motion-detection.aspx.

Revis, How to Setup Motion Detection of your D-Link Camera, Apr. 9, 2014, pp. 1-8, http://blog.dlink.com/how-to-set-up-motion-detection-on-your-d-link-camera.

Birk, Deterministic Load-Balancing Schemes for Disk-Based Video-on-Demand Storage Servers, 14 IEEE Symposium on Mass Storage Systems, Sep. 1995, pp. 17-25.

Castellanos, Event Detection in Video Using Motion Analysis, 1st ACM Int'l Workshop on Analysis & Retrieval of Tracked Events & Motion in Imagery Streams, Oct. 2010, pp. 57-62.

Delbruck, Frame-free dynamic digital vision, 2008 Int'l Symp. On Secure-Life Electronics, Advanced Electronics for Quality Life & Socy, Mar. 2008, pp. 21-26.

Ellis, Model-based vision for automatic alarm interpretation, IEEE 1990 Int'l Camahan Conf. on Security Tech, Oct. 1990, pp. 62-67.

Google Inc., International Search Report and Written Opinion, PCT/US2015/039425, Sep. 28, 2015, 12 pgs.

Medioni, Event detection and analysis from video streams, 23 IEEE Transactions on Pattern Analysis & Machine Intelligence, Aug. 2001, pp. 873-889.

Schraml, A spatio-termporal clustering method using real-time motion analysis on event-based 3D vision, 2010 IEEE Comp. Socy Conf. on Comp. Vision & Pattern Recognition Workshops, Jun. 2010, pp. 57-63.

(56) References Cited

OTHER PUBLICATIONS

Yoon, Event Detection from MPEG Video in the Compressed Domain, 15th Int'l Conf. on Pattern Recognition, Sep. 2000, pp. 819-822.

Gresham, Review: iZon wi-fi Video monitor and its companion iOS app, 2012, p. 1-8, www.idownloadblog.com/2012/11/21/stem-izon-review.

Halliquist, How do I set up Activity Alerts, 2013, p. 1-3, http://support.dropcam.com/entries/27880086-How-do-i-set-up-Activity-Alerts.

IZON App Guide, 2014, p. 1-30, www.isoncam.com/wp-content/uploads/2014/06/IZON-App-Guide.pdf.

Logitech, Logitech Alert Video Security System: Getting to Know, 2010, p. 1-9, www.logitech.com/assets/32688/good-to-know.pdf.

L. Li, W. Whuang, I.Y.H. Gu, & Q. Tian, "Statistical Modeling of Complex Backgrounds for Foreground Object Detection", 13 IEEE Transactions on Image Processing 1459-1472 (Nov. 2004).

M. Camplani, T. Mantecon, & L. Salgado, "Accurate Depth-Color Scene Modeling for 3D Contents Generation with Low Cost Depth Cameras", 19 IEEE Int'l Conf. on Image Processing 1741-1744 (Oct. 2012).

* cited by examiner

Motion Mask (based on one frame)
(a)

Event Mask (based pm a frame sequence)
(b)

1200

```
┌─────────────────────────────────────────────────────────────────┐
│  Display a video monitoring user interface on the display       │
│  including a camera feed from a camera located remotely from    │──1202
│  the client device in a first region of the video monitoring    │
│  user interface and an event timeline in a second region of     │
│  the video monitoring user interface, where the event timeline  │
│  includes a plurality of event indicators for a plurality of    │
│  motion events previously detected by the camera                │
│  ┌ ─ ─ ─ ─ ─ ─ ─ ─ ─ ─ ─ ─ ─ ─ ─ ─ ─ ─ ─ ─ ─ ─ ─ ─ ─ ─ ┐      │
│  │ At least one of the height or width of a respective  │      │
│  │ event indicator among the plurality of event         │──1204│
│  │ indicators on the event timeline corresponds to the  │      │
│  │ temporal length of a motion event corresponding to   │      │
│  │ the respective event indicator                       │      │
│  └ ─ ─ ─ ─ ─ ─ ─ ─ ─ ─ ─ ─ ─ ─ ─ ─ ─ ─ ─ ─ ─ ─ ─ ─ ─ ─ ┘      │
│  ┌ ─ ─ ─ ─ ─ ─ ─ ─ ─ ─ ─ ─ ─ ─ ─ ─ ─ ─ ─ ─ ─ ─ ─ ─ ─ ─ ┐      │
│  │ The video monitoring user interface further includes │      │
│  │ a third region with a list of one or more categories,│──1206│
│  │ and where the list of one or more categories at      │      │
│  │ least includes an entry corresponding to the first   │      │
│  │ category after associating the first category with   │      │
│  │ the first set of similar motion events               │      │
│  │  ┌ ─ ─ ─ ─ ─ ─ ─ ─ ─ ─ ─ ─ ─ ─ ─ ─ ─ ─ ─ ─ ─ ┐      │      │
│  │  │ The entry corresponds to the first category │──1208│      │
│  │  │ includes a text box for entering a label    │      │      │
│  │  │ for the first category                      │      │      │
│  │  └ ─ ─ ─ ─ ─ ─ ─ ─ ─ ─ ─ ─ ─ ─ ─ ─ ─ ─ ─ ─ ─ ┘      │      │
│  │  ┌ ─ ─ ─ ─ ─ ─ ─ ─ ─ ─ ─ ─ ─ ─ ─ ─ ─ ─ ─ ─ ─ ┐      │      │
│  │  │ The entry corresponds to the first category │──1210│      │
│  │  │ includes a first affordance for disabling   │      │      │
│  │  │ and enabling display of the first set of    │      │      │
│  │  │ pre-existing event indicators on the        │      │      │
│  │  │ event timeline                              │      │      │
│  │  └ ─ ─ ─ ─ ─ ─ ─ ─ ─ ─ ─ ─ ─ ─ ─ ─ ─ ─ ─ ─ ─ ┘      │      │
│  │  ┌ ─ ─ ─ ─ ─ ─ ─ ─ ─ ─ ─ ─ ─ ─ ─ ─ ─ ─ ─ ─ ─ ┐      │      │
│  │  │ The entry corresponds to the first category │──1212│      │
│  │  │ includes a second affordance for disabling  │      │      │
│  │  │ and enabling notifications corresponding    │      │      │
│  │  │ to subsequent motion events of the first    │      │      │
│  │  │ category                                    │      │      │
│  │  └ ─ ─ ─ ─ ─ ─ ─ ─ ─ ─ ─ ─ ─ ─ ─ ─ ─ ─ ─ ─ ─ ┘      │      │
│  └ ─ ─ ─ ─ ─ ─ ─ ─ ─ ─ ─ ─ ─ ─ ─ ─ ─ ─ ─ ─ ─ ─ ─ ─ ─ ─ ┘      │
│  ┌ ─ ─ ─ ─ ─ ─ ─ ─ ─ ─ ─ ─ ─ ─ ─ ─ ─ ─ ─ ─ ─ ─ ─ ─ ─ ─ ┐      │
│  │ The second region includes one or more timeline      │──1214│
│  │ length affordances for adjusting a resolution of     │      │
│  │ the event timeline                                   │      │
│  └ ─ ─ ─ ─ ─ ─ ─ ─ ─ ─ ─ ─ ─ ─ ─ ─ ─ ─ ─ ─ ─ ─ ─ ─ ─ ─ ┘      │
└─────────────────────────────────────────────────────────────────┘
                              │
                              ▼
```

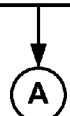

Figure 12A

METHOD AND SYSTEM FOR CATEGORIZING DETECTED MOTION EVENTS

PRIORITY CLAIM AND RELATED APPLICATIONS

This application claims priority to U.S. Provisional Patent Application No. 62/021,620, filed Jul. 7, 2014, entitled "Activity Recognition and Video Filtering." This application also claims priority to U.S. Provisional Patent Application No. 62/057,991, filed Sep. 30, 2014, entitled "Method and System for Video Monitoring," which is hereby incorporated by reference in its entirety.

This application is related to U.S. Design patent application Ser. No. 29/504,605, filed Oct. 7, 2014, entitled "Video Monitoring User Interface with Event Timeline and Display of Multiple Preview Windows At User-Selected Event Marks," which is hereby incorporated by reference in its entirety.

TECHNICAL FIELD

The disclosed implementations relates generally to video monitoring, including, but not limited, to monitoring and reviewing motion events in a video stream.

BACKGROUND

Video surveillance produces a large amount of continuous video data over the course of hours, days, and even months. Such video data includes many long and uneventful portions that are of no significance or interest to a reviewer. In some existing video surveillance systems, motion detection is used to trigger alerts or video recording. However, using motion detection as the only means for selecting video segments for user review may still produce too many video segments that are of no interest to the reviewer. For example, some detected motions are generated by normal activities that routinely occur at the monitored location, and it is tedious and time consuming to manually scan through all of the normal activities recorded on video to identify a small number of activities that warrant special attention. In addition, when the sensitivity of the motion detection is set too high for the location being monitored, trivial movements (e.g., movements of tree leaves, shifting of the sunlight, etc.) can account for a large amount of video being recorded and/or reviewed. On the other hand, when the sensitivity of the motion detection is set too low for the location being monitored, the surveillance system may fail to record and present video data on some important and useful events.

It is a challenge to identify meaningful segments of the video stream and to present them to the reviewer in an efficient, intuitive, and convenient manner. Human-friendly techniques for discovering and presenting motion events of interest both in real-time or at a later time are in great need.

SUMMARY

Accordingly, there is a need for video processing with more efficient and intuitive motion event identification, categorization, and presentation. Such methods optionally complement or replace conventional methods for monitoring and reviewing motion events in a video stream.

In some implementations, a method of displaying indicators for motion events on an event timeline is performed at an electronic device (e.g., an electronic device 166, FIG. 1; or a client device 504, FIGS. 5 and 7) with one or more processors, memory, and a display. The method includes displaying a video monitoring user interface on the display including a camera feed from a camera located remotely from the client device in a first region of the video monitoring user interface and an event timeline in a second region of the video monitoring user interface, where the event timeline includes a plurality of event indicators for a plurality of motion events previously detected by the camera. The method includes associating a newly created first category with a set of similar motion events from among the plurality of motion events previously detected by the camera. In response to associating the first category with the first set of similar motion events, the method includes changing at least one display characteristic for a first set of pre-existing event indicators from among the plurality of event indicators on the event timeline that correspond to the first category, where the first set of pre-existing event indicators correspond to the set of similar motion events.

In some implementations, a method of editing event categories is performed at an electronic device (e.g., the electronic device 166, FIG. 1; or the client device 504, FIGS. 5 and 7) with one or more processors, memory, and a display. The method includes displaying a video monitoring user interface on the display with a plurality of user interface elements associated one or more recognized activities. The method includes detecting a user input selecting a respective user interface element from the plurality of user interface elements in the video monitoring user interface, the respective user interface element being associated with a respective event category of the one or more recognized event categories. In response to detecting the user input, the method includes displaying an editing user interface for the respective event category on the display with a plurality of animated representations in a first region of the editing user interface, where the plurality of animated representations correspond to a plurality of previously captured motion events assigned to the respective event category.

In some implementations, a method of categorizing a detected motion event is performed at a computing system (e.g., the client device 504, FIGS. 5 and 7; the video server system 508, FIGS. 5-6; or a combination thereof) with one or more processors and memory. The method includes displaying a video monitoring user interface on the display including a video feed from a camera located remotely from the client device in a first region of the video monitoring user interface and an event timeline in a second region of the video monitoring user interface, where the event timeline includes one or more event indicators corresponding to one or more motion events previously detected by the camera. The method includes detecting a motion event and determining one or more characteristics for the motion event. In accordance with a determination that the one or more determined characteristics for the motion event satisfy one or more criteria for a respective event category, the method includes: assigning the motion event to the respective category; and displaying an indicator for the detected motion event on the event timeline with a display characteristic corresponding to the respective category.

In some implementations, a method of generating a smart time-lapse video clip is performed at an electronic device (e.g., the electronic device 166, FIG. 1; or the client device 504, FIGS. 5 and 7) with one or more processors, memory, and a display. The method includes displaying a video monitoring user interface on the display including a video feed from a camera located remotely from the client device in a first region of the video monitoring user interface and an event timeline in a second region of the video monitoring user interface, where the event timeline includes a plurality of event indicators for a plurality of motion events previously detected by the camera. The method includes detecting a first user input selecting a portion of the event timeline, where the selected portion of the event timeline includes a subset of the plurality of event indicators on the event timeline. In response to the first user input, the method includes causing generation of a time-lapse video clip of the selected portion of the event timeline. The method includes displaying the time-lapse video clip of the selected portion of the event timeline, where motion events corresponding to the subset of the plurality of event indicators are played at a slower speed than the remainder of the selected portion of the event timeline.

In some implementations, a method of performing client-side zooming of a remote video feed is performed at an electronic device (e.g., the electronic device 166, FIG. 1; or the client device 504, FIGS. 5 and 7) with one or more processors, memory, and a display. The method includes receiving a first video feed from a camera located remotely from the client device with a first field of view and displaying, on the display, the first video feed in a video monitoring user interface. The method includes detecting a first user input to zoom in on a respective portion of the first video feed and, in response to detecting the first user input, performing a software zoom function on the respective portion of the first video feed to display the respective portion of the first video feed in a first resolution. The method includes determining a current zoom magnification of the software zoom function and coordinates of the respective portion of the first video feed and sending a command to the camera to perform a hardware zoom function on the respective portion according to the current zoom magnification and the coordinates of the respective portion of the first video feed. The method includes receiving a second video feed from the camera with a second field of view different from the first field of view, where the second field of view corresponds to the respective portion and displaying, on the display, the second video feed in the video monitoring user interface, where the second video feed is displayed in a second resolution that is higher than the first resolution.

In accordance with some implementations, a method of processing a video stream is performed at a computing system having one or more processors and memory (e.g., the camera 118, FIGS. 5 and 8; the video system server 508, FIGS. 5-6; a combination thereof). The method includes processing the video stream to detect a start of a first motion event candidate in the video stream, In response to detecting the start of the first motion event candidate in the video stream, the method includes initiating event recognition processing on a first video segment associated with the start of the first motion event candidate, where initiating the event recognition processing further includes: determining a motion track of a first object identified in the first video segment; generating a representative motion vector for the first motion event candidate based on the respective motion track of the first object; and sending the representative motion vector for the first motion event candidate to an event categorizer, where the event categorizer assigns a respective motion event category to the first motion event candidate based on the representative motion vector of the first motion event candidate.

In accordance with some implementations, a method of categorizing a motion event candidate is performed at a server (e.g., the video server system 508, FIGS. 5-6) having one or more processors and memory. The method includes obtaining a respective motion vector for each of a series of motion event candidates in real-time as said each motion event candidate is detected in a live video stream. In response to receiving the respective motion vector for each of the series of motion event candidates, the method includes determining a spatial relationship between the respective motion vector of said each motion event candidate to one or more existing clusters established based on a plurality of previously processed motion vectors. In accordance with a determination that the respective motion vector of a first motion event candidate of the series of motion event candidates falls within a respective range of at least a first existing cluster of the one or more existing clusters, the method includes assigning the first motion event candidate to at least a first event category associated with the first existing cluster.

In accordance with some implementations, a method of facilitating review of a video recording is performed at a server (e.g., the video server system 508, FIGS. 5-6) having one or more processors and memory. The method includes identifying a plurality of motion events from a video recording, wherein each of the motion events corresponds to a respective video segment along a timeline of the video recording and identifies at least one object in motion within a scene depicted in the video recording. The method includes: storing a respective event mask for each of the plurality of motion events identified in the video recording, the respective event mask including an aggregate of motion pixels associated with the at least one object in motion over multiple frames of the motion event; and receiving a definition of a zone of interest within the scene depicted in the video recording. In response to receiving the definition of the zone of interest, the method includes: determining, for each of the plurality of motion events, whether the respective event mask of the motion event overlaps with the zone of interest by at least a predetermined overlap factor; and identifying one or more events of interest from the plurality of motion events, where the respective event mask of each of the identified events of interest is determined to overlap with the zone of interest by at least the predetermined overlap factor.

In accordance with some implementations, a method of monitoring selected zones in a scene depicted in a video stream is performed at a server (e.g., the video server system 508, FIGS. 5-6) having one or more processors and memory. The method includes receiving a definition of a zone of interest within the scene depicted in the video steam. In response to receiving the definition of the zone of interest, the method includes: determining, for each motion event detected in the video stream, whether a respective event mask of the motion event overlaps with the zone of interest by at least a predetermined overlap factor; and identifying the motion event as an event of interest associated with the zone of interest in accordance with a determination that the respective event mask of the motion event overlaps with the zone of interest by at least the predetermined overlap factor.

In some implementations, a computing system (e.g., the video server system 508, FIGS. 5-6; the client device 504, FIGS. 5 and 7; or a combination thereof) includes one or more processors and memory storing one or more programs for execution by the one or more processors, and the one or more programs include instructions for performing, or controlling performance of, the operations of any of the methods described herein. In some implementations, a non-transitory computer readable storage medium stores one or more programs, where the one or more programs include instructions, which, when executed by a computing system (e.g., the video server system 508, FIGS. 5-6; the client device 504, FIGS. 5 and 7; or a combination thereof) with one or more processors, cause the computing device to perform, or control performance of, the operations of any of the methods described herein. In some implementations, a computing system (e.g., the video server system 508, FIGS. 5-6; the client device 504, FIGS. 5 and 7; or a combination thereof) includes means for performing, or controlling performance of, the operations of any of the methods described herein.

Thus, computing systems are provided with more efficient methods for monitoring and facilitating review of motion events in a video stream, thereby increasing the effectiveness, efficiency, and user satisfaction with such systems. Such methods may complement or replace conventional methods for motion event monitoring and presentation.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 12A-12B illustrate a flowchart diagram of a method of displaying indicators for motion events on an event timeline in accordance with some implementations.

Like reference numerals refer to corresponding parts throughout the several views of the drawings.

DESCRIPTION OF IMPLEMENTATIONS

Figure 1:
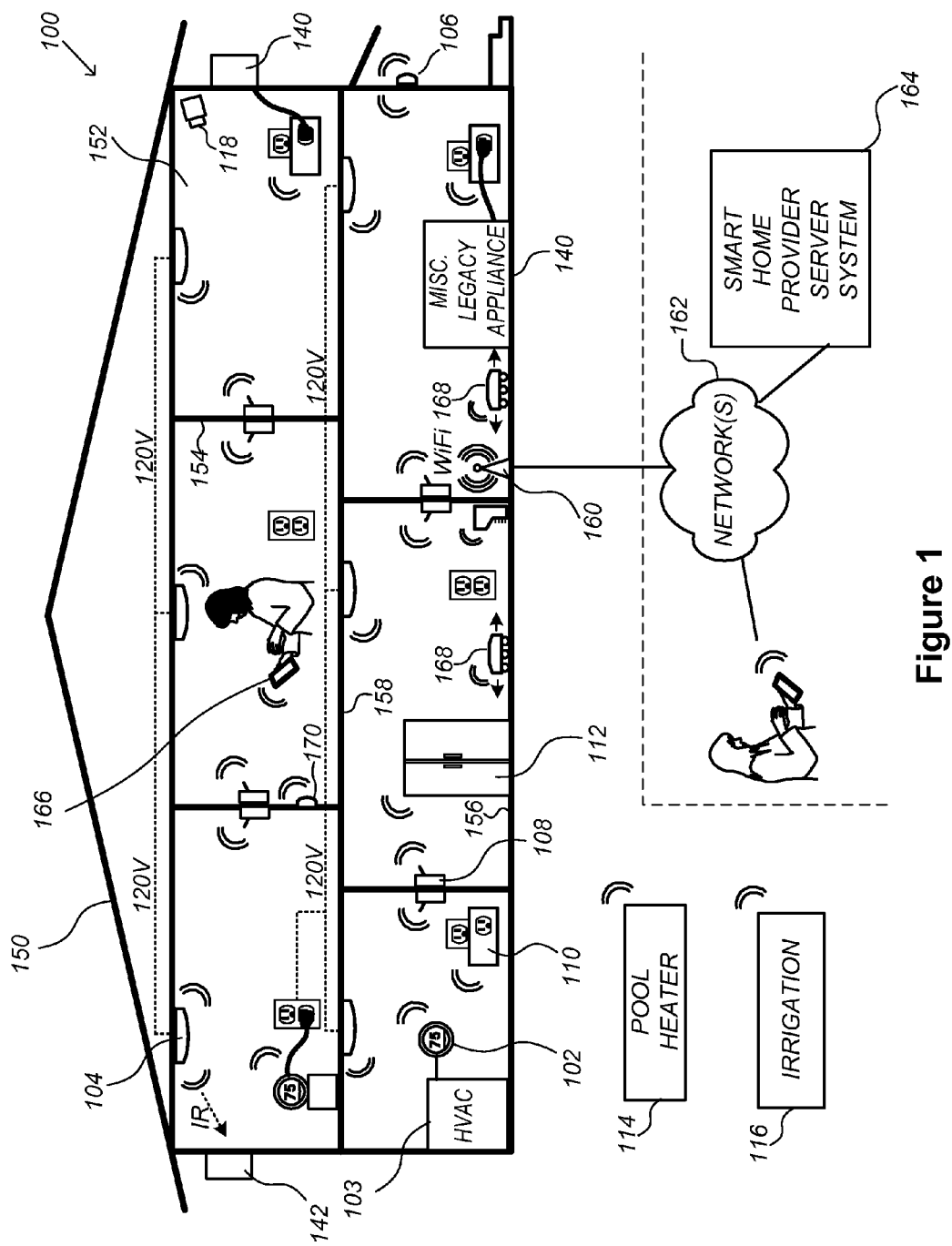
FIG. 1 is a representative smart home environment in accordance with some implementations.

This disclosure provides example user interfaces and data processing systems and methods for video monitoring.

Video-based surveillance and security monitoring of a premises generates a continuous video feed that may last hours, days, and even months. Although motion-based recording triggers can help trim down the amount of video data that is actually recorded, there are a number of drawbacks associated with video recording triggers based on simple motion detection in the live video feed. For example, when motion detection is used as a trigger for recording a video segment, the threshold of motion detection must be set appropriately for the scene of the video; otherwise, the recorded video may include many video segments containing trivial movements (e.g., lighting change, leaves moving in the wind, shifting of shadows due to changes in sunlight exposure, etc.) that are of no significance to a reviewer. On the other hand, if the motion detection threshold is set too high, video data on important movements that are too small to trigger the recording may be irreversibly lost. Furthermore, at a location with many routine movements (e.g., cars passing through in front of a window) or constant movements (e.g., a scene with a running fountain, a river, etc.), recording triggers based on motion detection are rendered ineffective, because motion detection can no longer accurately select out portions of the live video feed that are of special significance. As a result, a human reviewer has to sift through a large amount of recorded video data to identify a small number of motion events after rejecting a large number of routine movements, trivial movements, and movements that are of no interest for a present purpose.

Due to at least the challenges described above, it is desirable to have a method that maintains a continuous recording of a live video feed such that irreversible loss of video data is avoided and, at the same time, augments simple motion detection with false positive suppression and motion event categorization. The false positive suppression techniques help to downgrade motion events associated with trivial movements and constant movements. The motion event categorization techniques help to create category-based filters for selecting only the types of motion events that are of interest for a present purpose. As a result, the reviewing burden on the reviewer may be reduced. In addition, as the present purpose of the reviewer changes in the future, the reviewer can simply choose to review other types of motion events by selecting the appropriate motion categories as event filters.

In addition, in some implementations, event categories can also be used as filters for real-time notifications and alerts. For example, when a new motion event is detected in a live video feed, the new motion event is immediately categorized, and if the event category of the newly detected mention event is a category of interest selected by a reviewer, a real-time notification or alert can be sent to the reviewer regarding the newly detected motion event. In addition, if the new event is detected in the live video feed as the reviewer is viewing a timeline of the video feed, the event indicator and the notification of the new event will have an appearance or display characteristic associated with the event category.

Furthermore, as the types of motion events occurring at different locations and settings can vary greatly, and there are potentially an infinite number of event categories for all motion events collected at the video server system (e.g., the video server system 508). Therefore, it may be undesirable to have a set of fixed event categories from the outset to categorize motion events detected in all video feeds from all camera locations for all users. As disclosed herein, in some implementations, the motion event categories for the video stream from each camera are gradually established through machine learning, and are thus tailored to the particular setting and use of the video camera.

In addition, in some implementations, as new event categories are gradually discovered based on clustering of past motion events, the event indicators for the past events in a newly discovered event category are refreshed to reflect the newly discovered event category. In some implementations, a clustering algorithm with automatic phase out of old, inactive, and/or sparse categories is used to categorize motion events. As a camera changes location, event categories that are no longer active are gradually retired without manual input to keep the motion event categorization model current. In some implementations, user input editing the assignment of past motion events into respective event categories is also taken into account for future event category assignment and new category creation.

Furthermore, for example, within the scene of a video feed, multiple objects may be moving simultaneously. In some implementations, the motion track associated with each moving object corresponds to a respective motion event candidate, such that the movement of the different objects in the same scene may be assigned to different motion event categories.

In general, motion events may occur in different regions of a scene at different times. Out of all the motion events detected within a scene of a video stream over time, a reviewer may only be interested in motion events that occurred within or entered a particular zone of interest in the scene. In addition, the zones of interest may not be known to the reviewer and/or the video server system until long after one or more motion events of interest have occurred within the zones of interest. For example, a parent may not be interested in activities centered around a cookie jar until after some cookies have mysteriously gone missing. Furthermore, the zones of interest in the scene of a video feed can vary for a reviewer over time depending on a present purpose of the reviewer. For example, the parent may be interested in seeing all activities that occurred around the cookie jar one day when some cookies have gone missing, and the parent may be interested in seeing all activities that occurred around a mailbox the next day when some expected mail has gone missing. Accordingly, in some implementations, the techniques disclosed herein allow a reviewer to define and create one or more zones of interest within a static scene of a video feed, and then use the created zones of interest to retroactively identify all past motion events (or all motion events within a particular past time window) that have touched or entered the zones of interest. The identified motion events are optionally presented to the user in a timeline or in a list. In some implementations, real-time alerts for any new motion events that touch or enter the zones of interest are sent to the reviewer. The ability to quickly identify and retrieve past motion events that are associated with a newly created zone of interest addresses the drawbacks of conventional zone monitoring techniques where the zones of interest need to be defined first based on a certain degree of guessing and anticipation that may later prove to be inadequate or wrong, and where only future events (as opposed to both past and future events) within the zones of interest can be identified.

Furthermore, when detecting new motion events that have touched or entered some zone(s) of interest, the event detection is based on the motion information collected from the entire scene, rather than just within the zone(s) of interest. In particular, aspects of motion detection, motion object definition, motion track identification, false positive suppression, and event categorization are all based on image information collected from the entire scene, rather than just within each zone of interest. As a result, context around the zones of interest is taken into account when monitoring events within the zones of interest. Thus, the accuracy of event detection and categorization may be improved as compared to conventional zone monitoring techniques that perform all calculations with image data collected only within the zones of interest.

Other aspects of event monitoring and review for video data are disclosed, including system architecture, data processing pipeline, event categorization, user interfaces for editing and reviewing past events (e.g., event timeline, retroactive coloring of event indicators, event filters based on event categories and zones of interest, and smart time-lapse video summary), notifying new events (e.g., real-time event pop-ups), creating zones of interest, and controlling camera's operation (e.g., changing video feed focus and resolution), and the like. Advantages of these and other aspects will be discussed in more detail later in the present disclosure or will be apparent to persons skilled in the art in light of the disclosure provided herein.

Figure 9A:
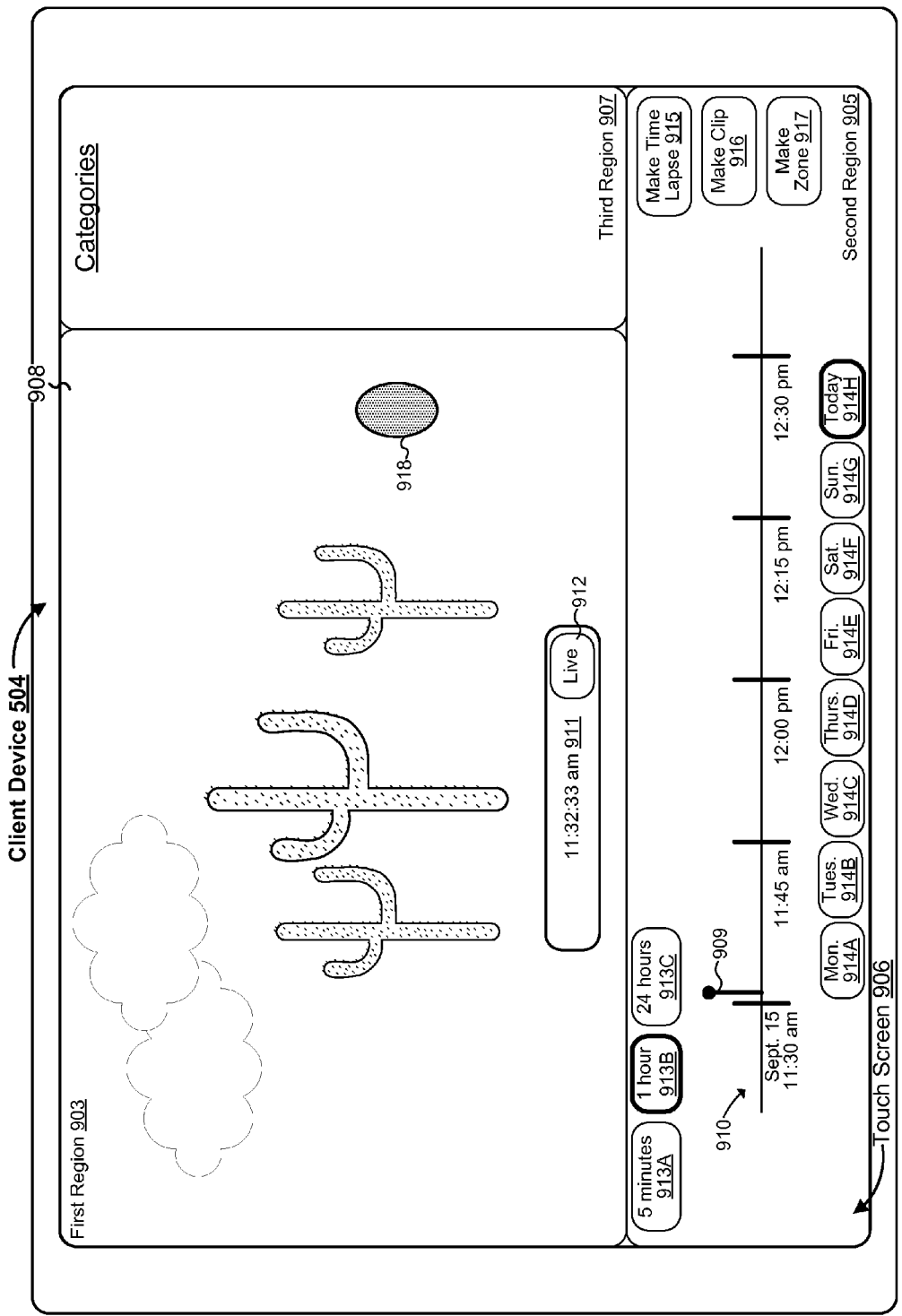
FIGS. 9A-9BB illustrate example user interfaces on a client device for monitoring and reviewing motion events in accordance with some implementations.
Figure 9B:
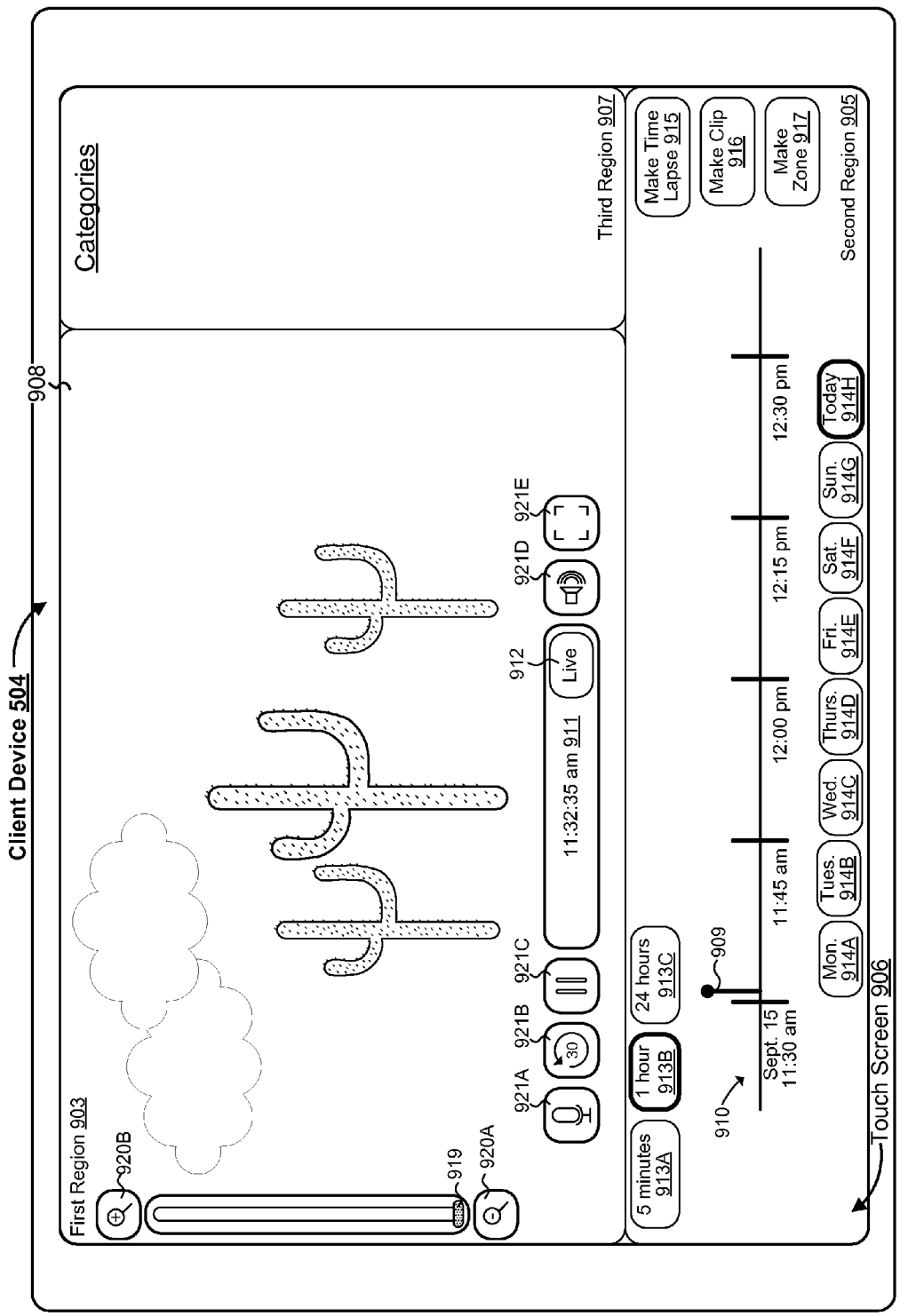
Figure 10:
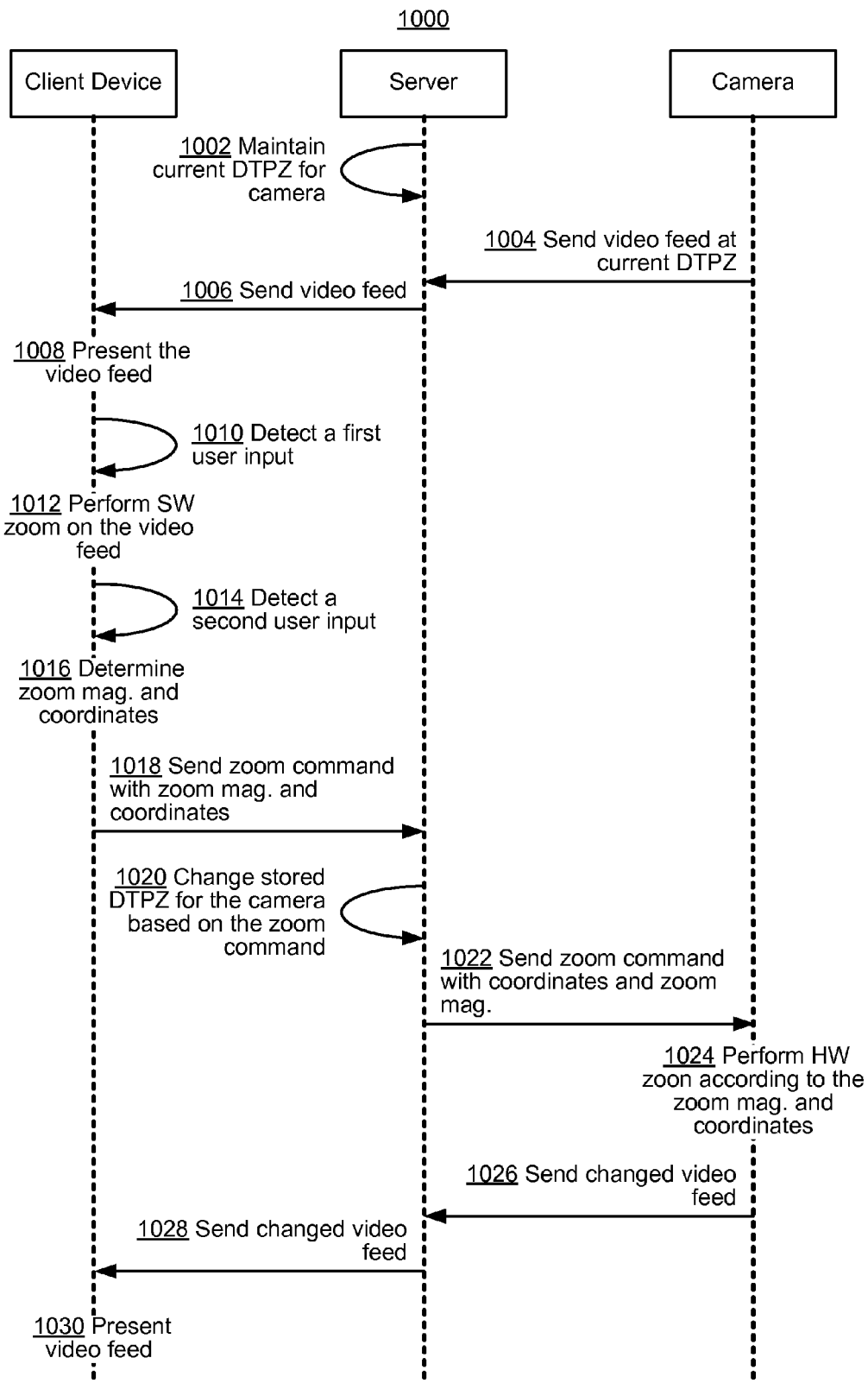
FIG. 10 illustrates a flow diagram of a process for performing client-side zooming of a remote video feed in accordance with some implementations.
Figure 12B:
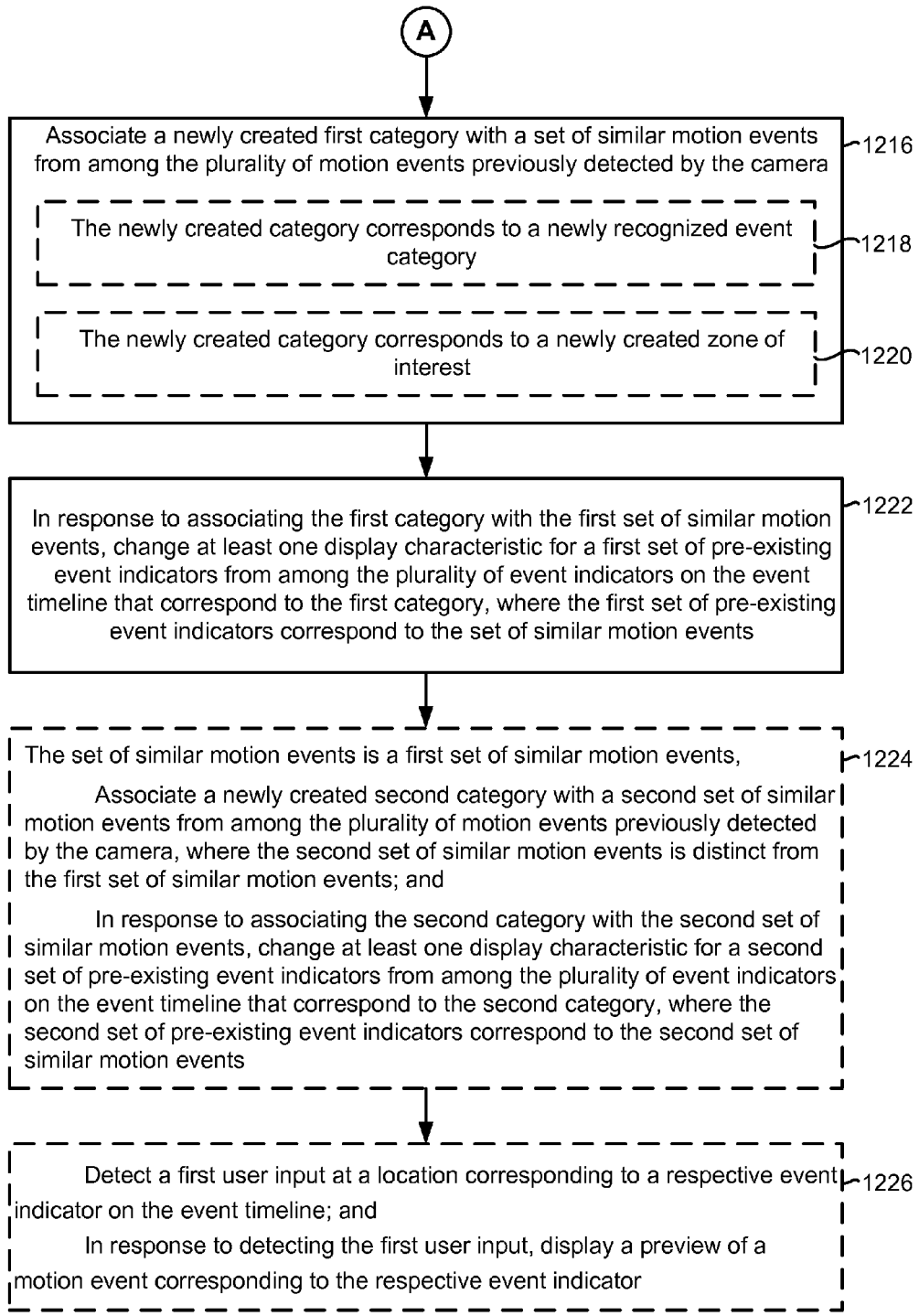
Figure 13A:
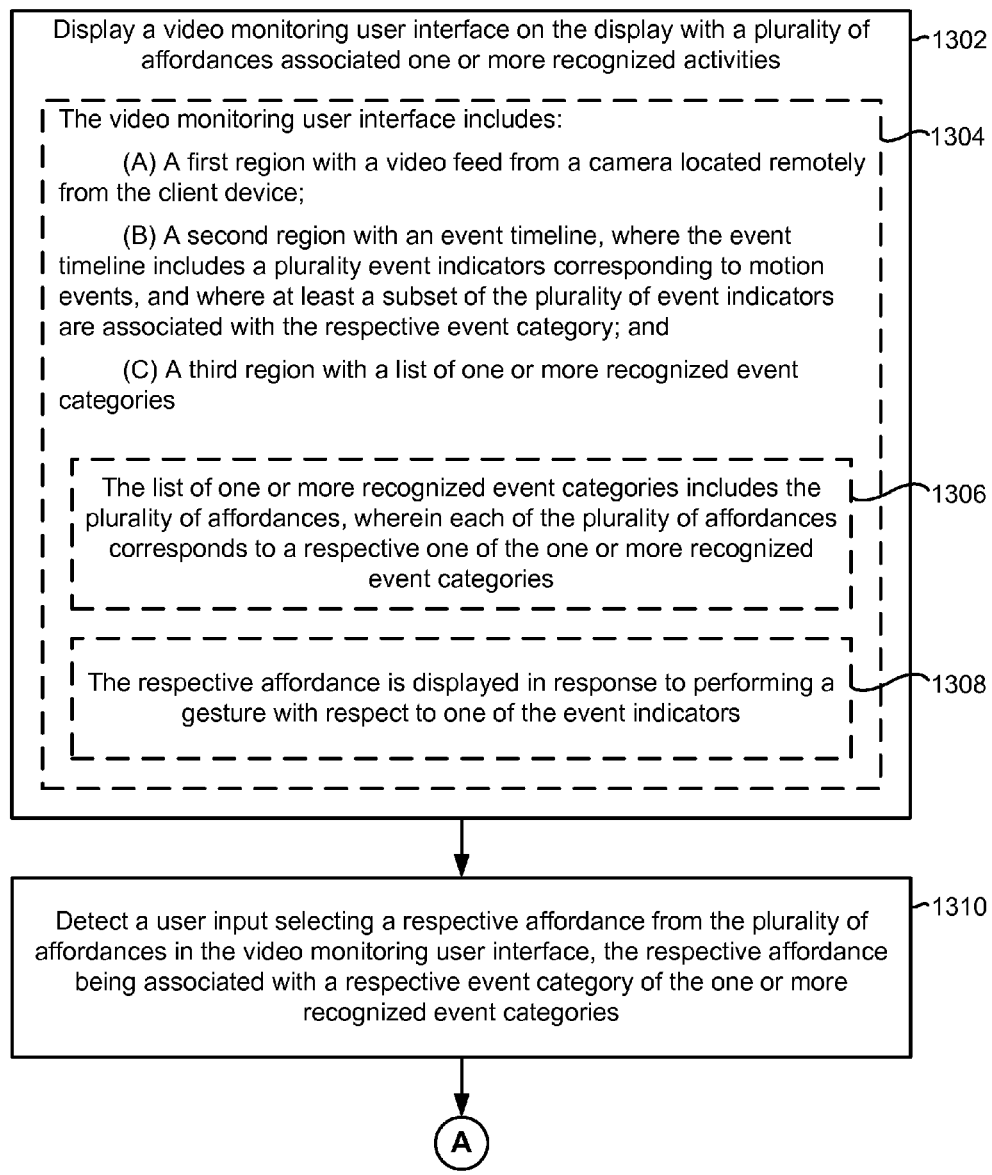
FIGS. 13A-13B illustrate a flowchart diagram of a method of editing event categories in accordance with some implementations.
Figure 13B:
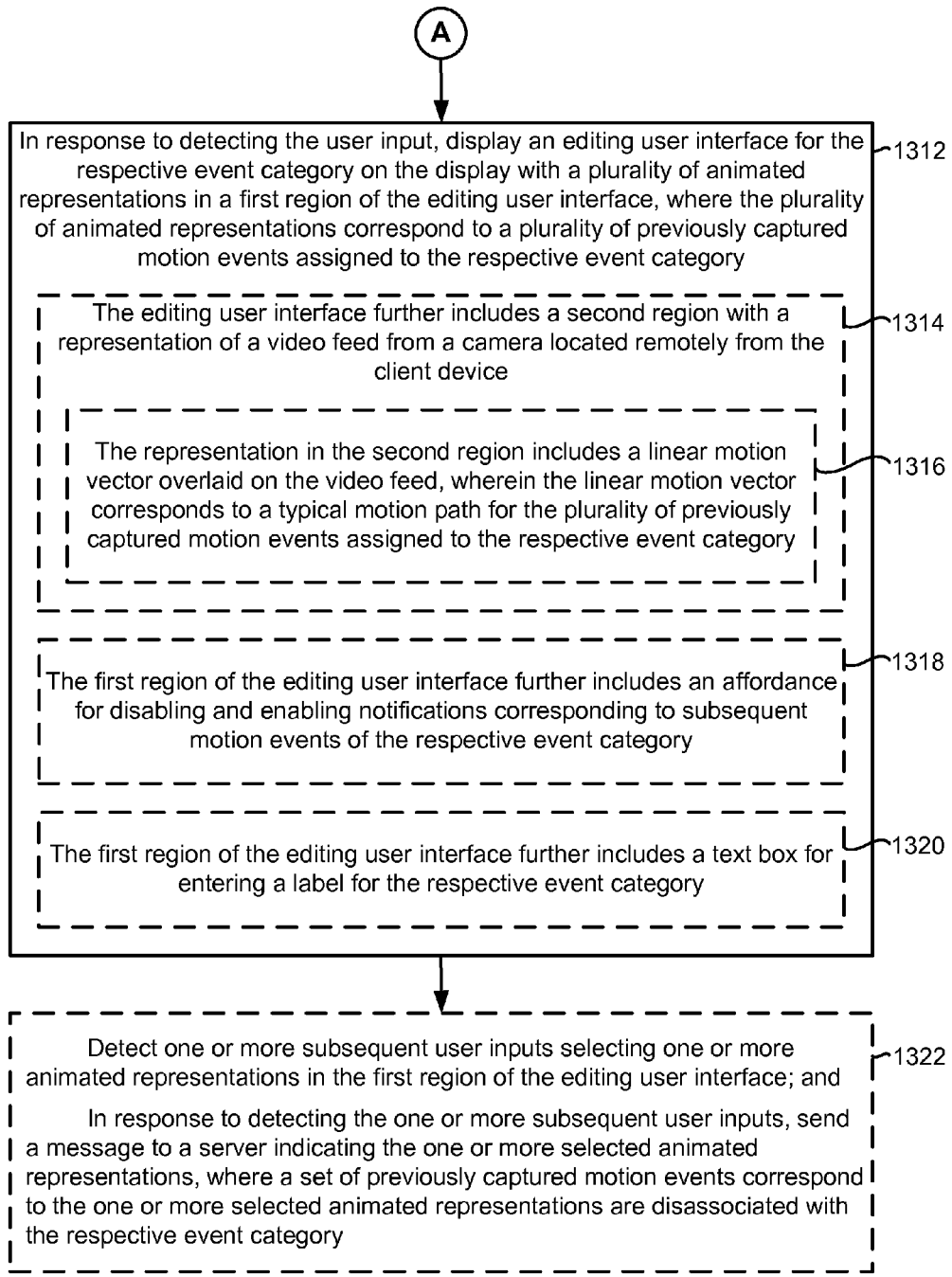
Figure 14A:
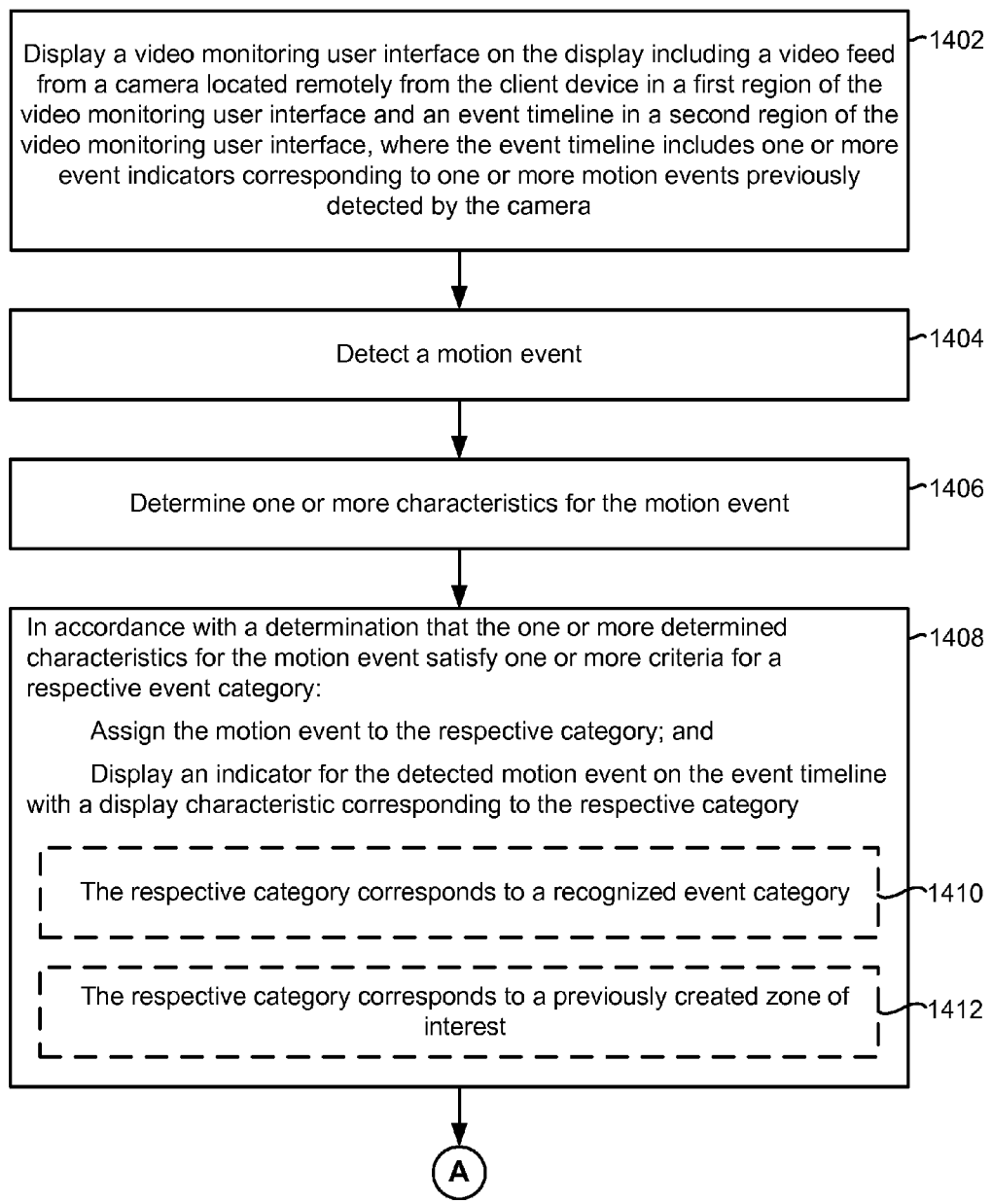
FIGS. 14A-14B illustrate a flowchart diagram of a method of automatically categorizing a detected motion event in accordance with some implementations.
Figure 14B:
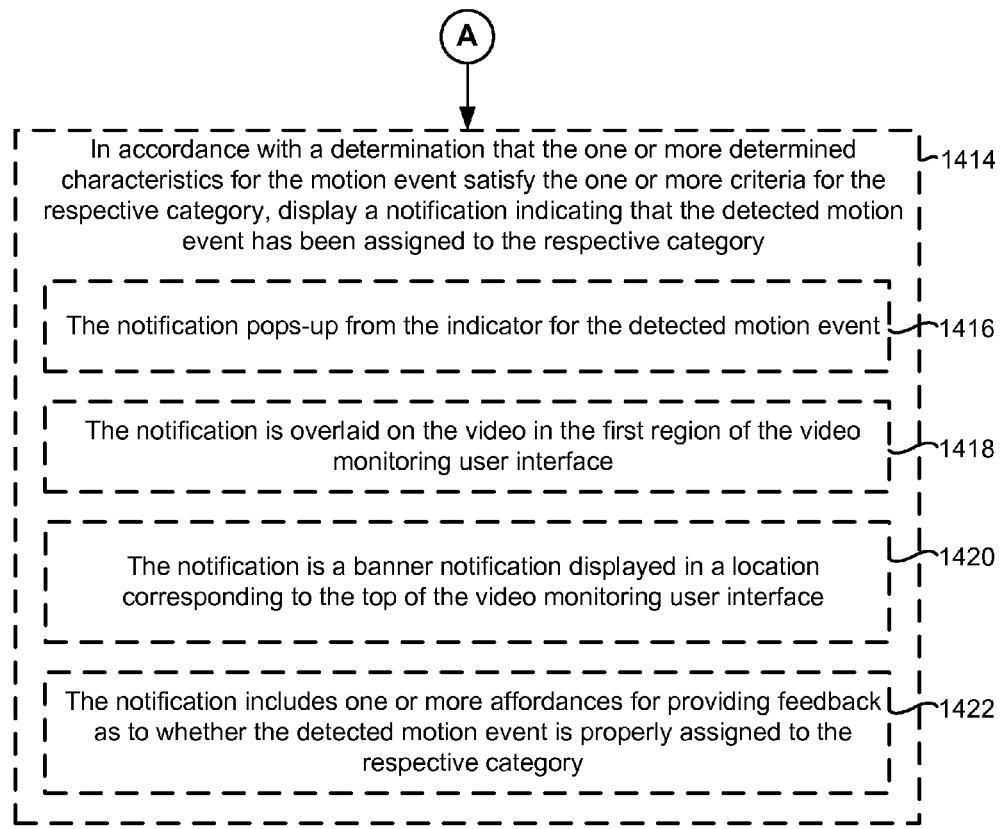
Figure 15A:
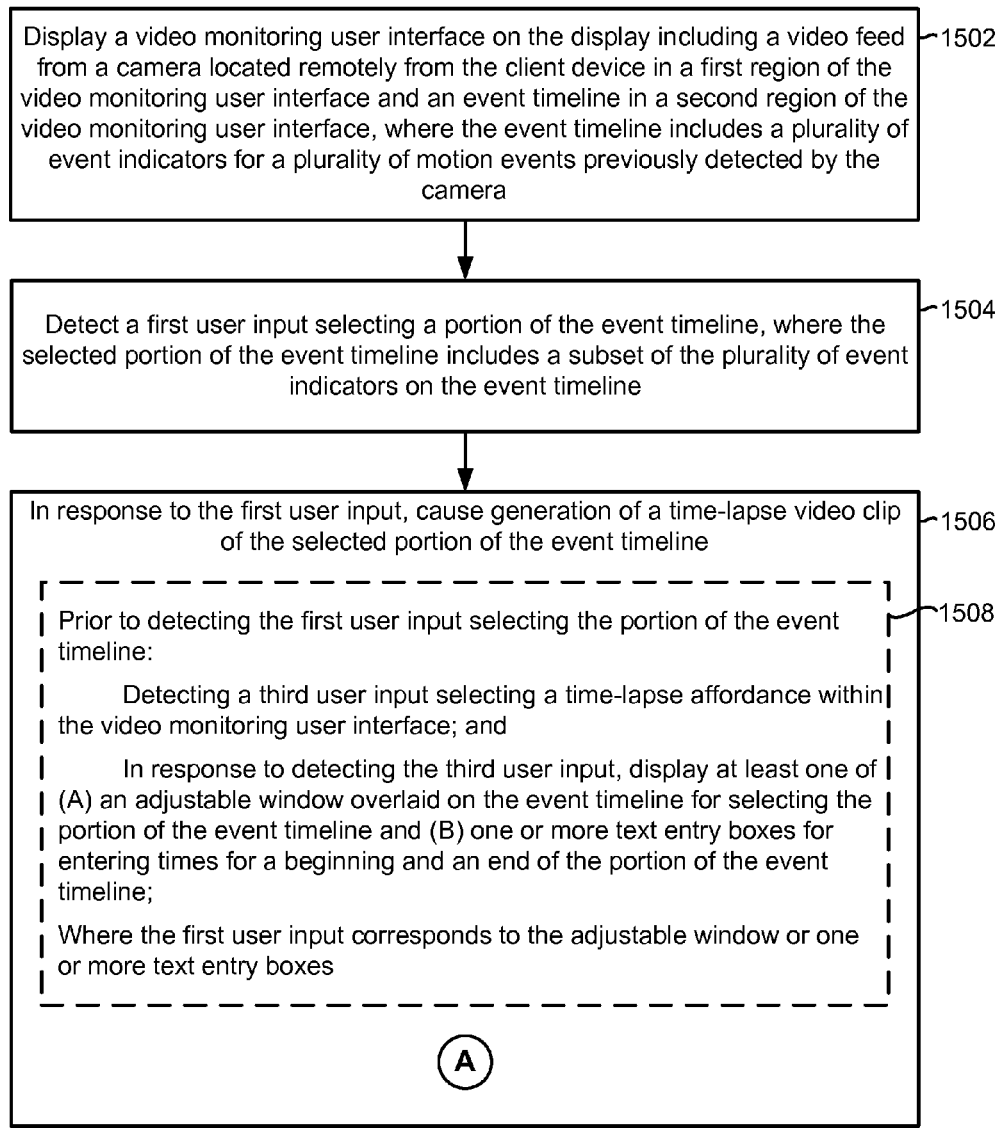
FIGS. 15A-15C illustrate a flowchart diagram of a method of generating a smart time-lapse video clip in accordance with some implementations.
Figure 15B:
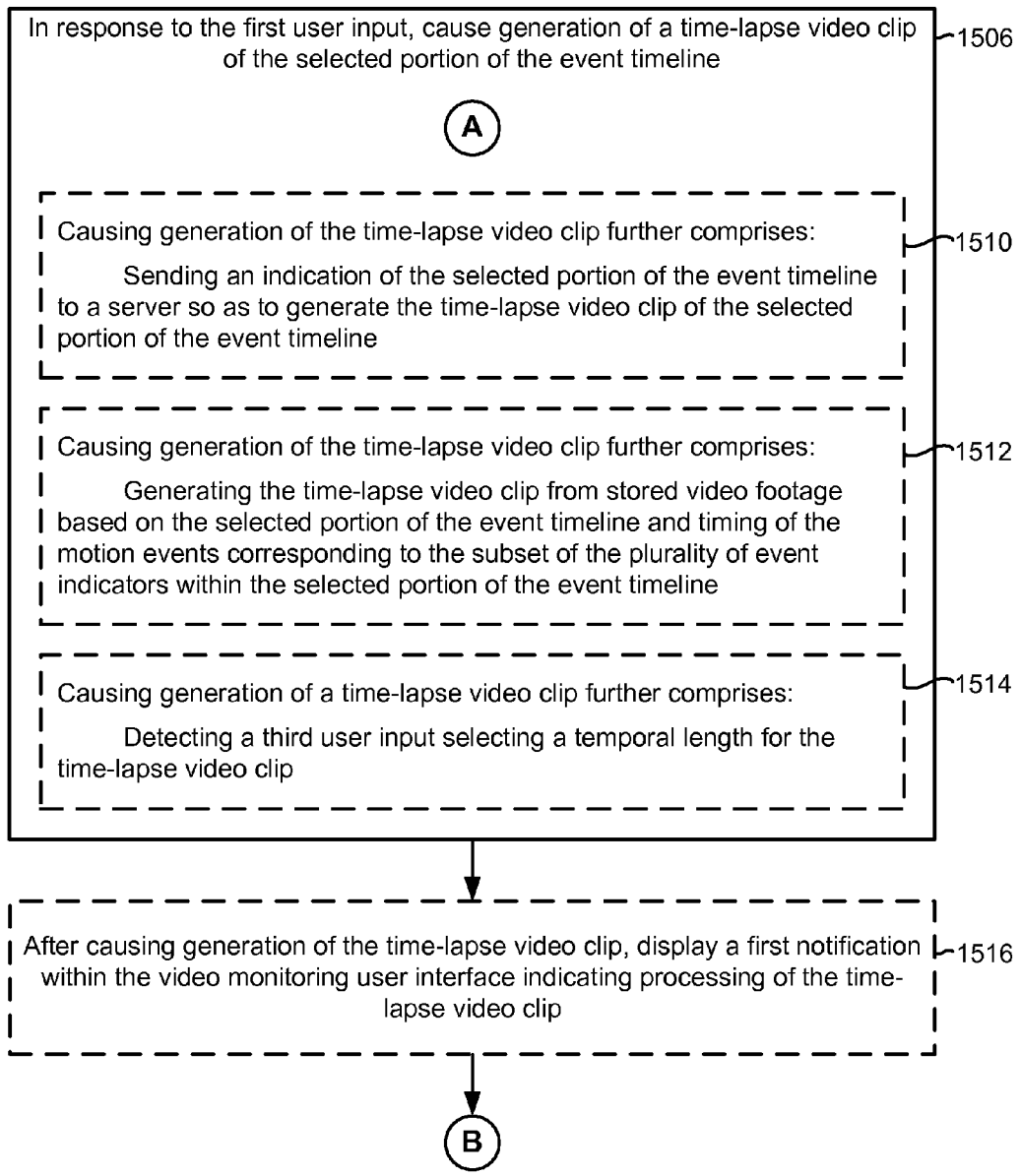
Figure 15C:
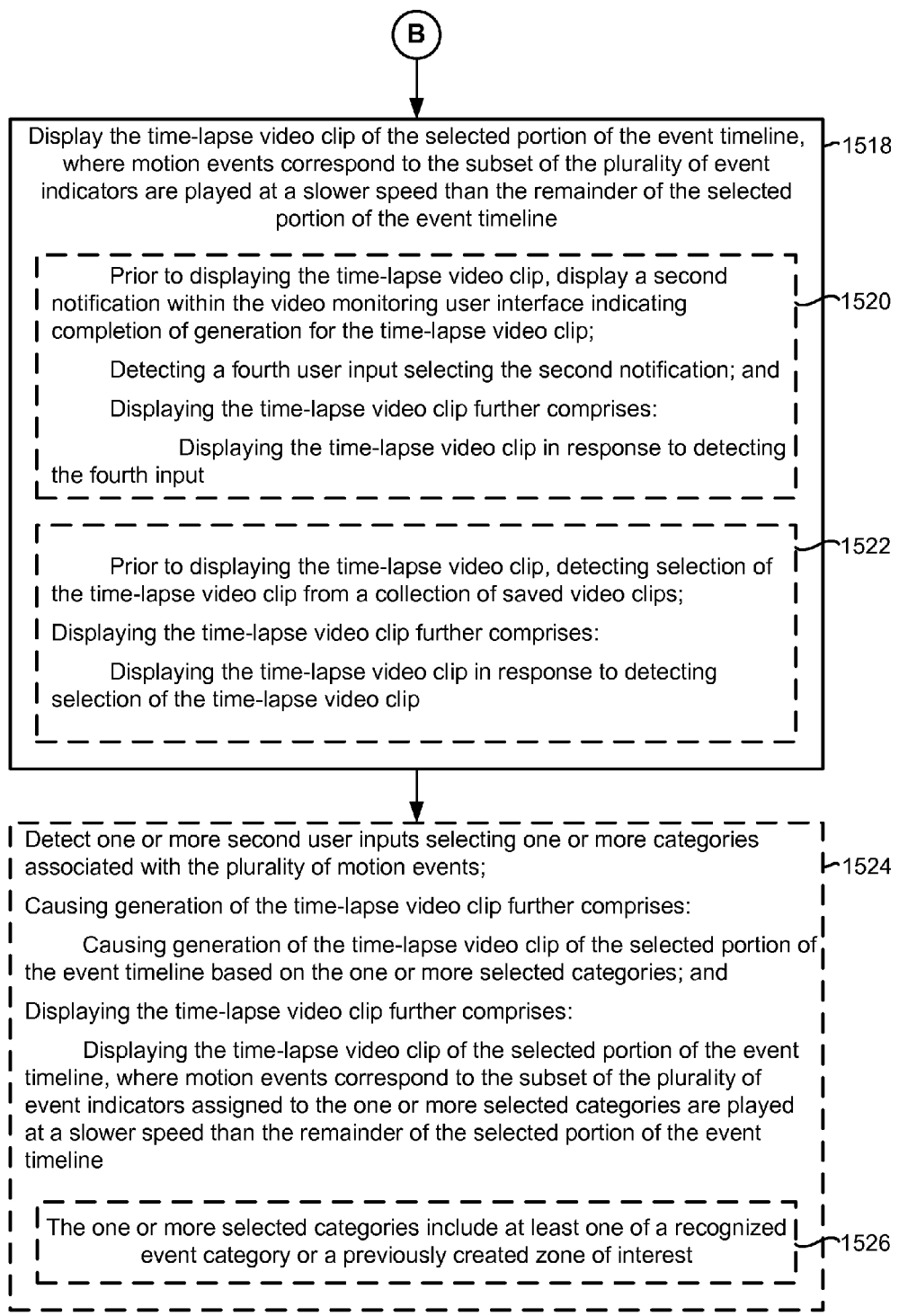
Figure 16A:
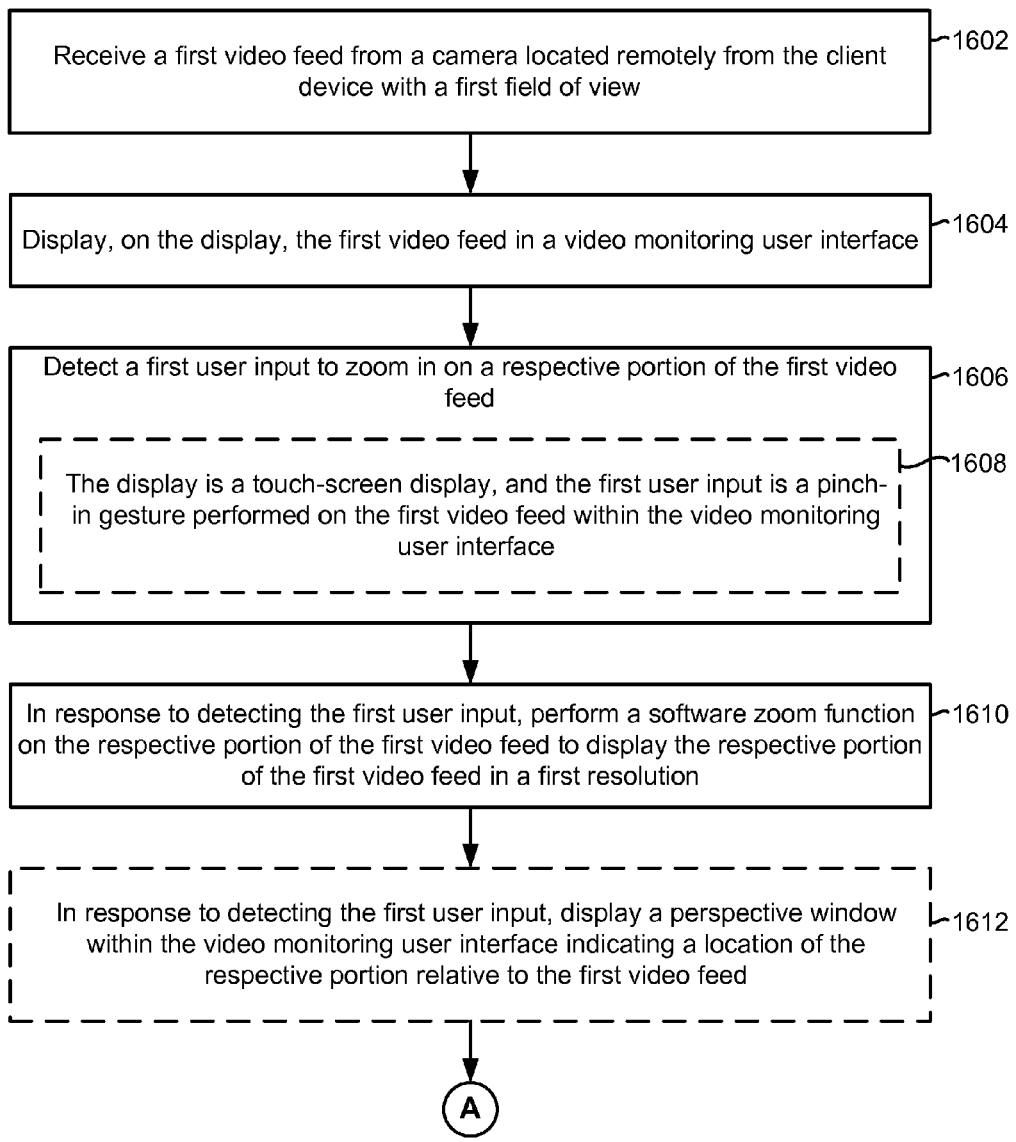
FIGS. 16A-16B illustrate a flowchart diagram of a method of performing client-side zooming of a remote video feed in accordance with some implementations.
Figure 16B:
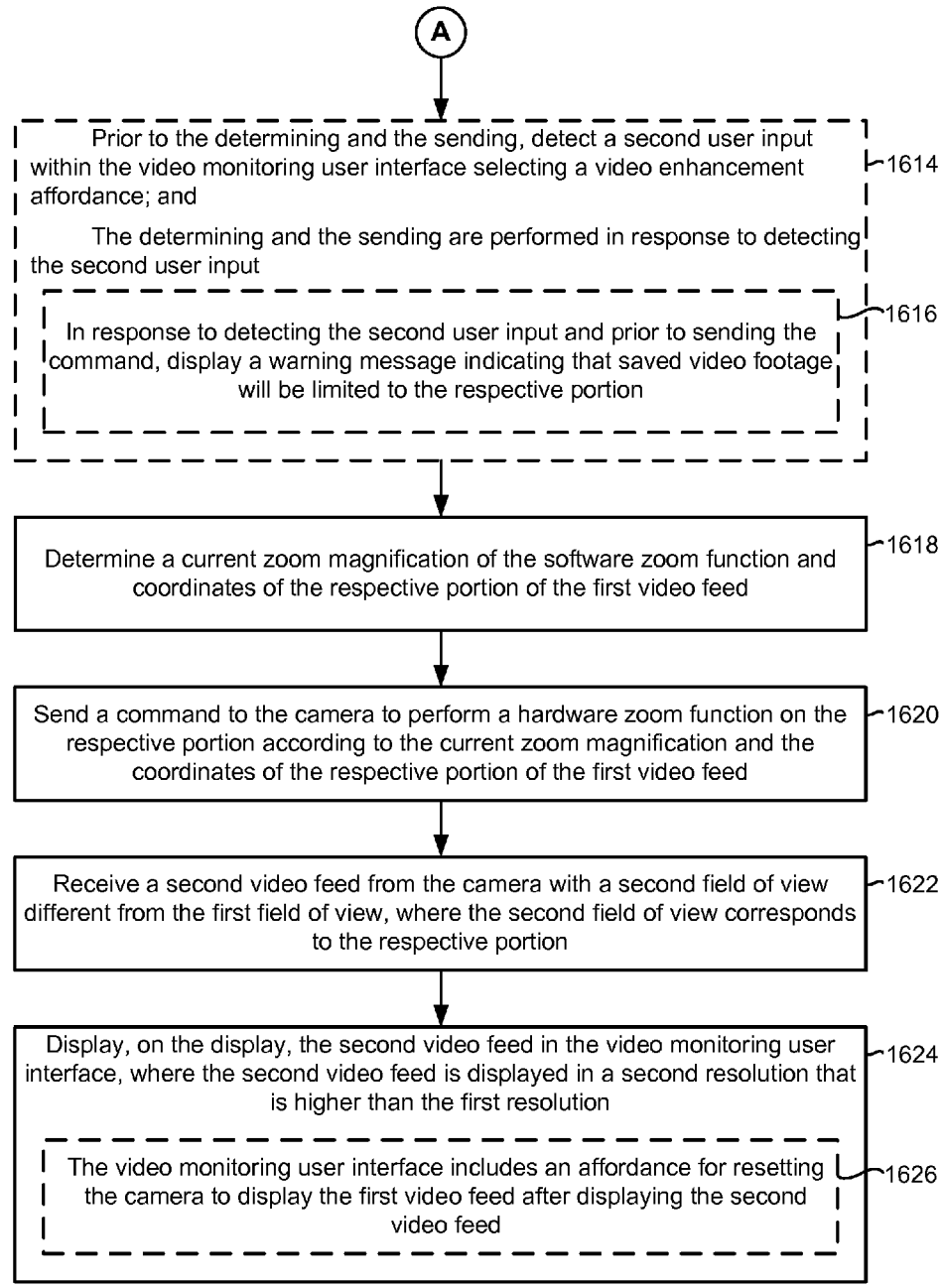

Below, FIGS. 1-4 provide an overview of exemplary smart home device networks and capabilities. FIGS. 5-8 provide a description of the systems and devices participating in the video monitoring. FIGS. 9A-9BB illustrate exemplary user interfaces for reviewing motion events (e.g., user interfaces including event timelines, event notifications, and event categories), editing event categories (e.g., user interface for editing motion events assigned to a particular category), and setting video monitoring preferences (e.g., user interfaces for creating and selecting zones of interest, setting zone monitoring triggers, selecting event filters, changing camera operation state, etc.). FIG. 10 illustrates the interaction between devices to alter a camera operation state (e.g., zoom and data transmission). FIGS. 11A-11E illustrate data processing techniques supporting the video monitoring and event review capabilities described herein. FIGS. 12A-12B illustrate a flowchart diagram of a method of displaying indicators for motion events on an event timeline in accordance with some implementations. FIGS. 13A-13B illustrate a flowchart diagram of a method of editing event categories in accordance with some implementations. FIGS. 14A-14B illustrate a flowchart diagram of a method of automatically categorizing a detected motion event in accordance with some implementations. FIGS. 15A-15C illustrate a flowchart diagram of a method of generating a smart time-lapse video clip in accordance with some implementations. FIGS. 16A-16B illustrate a flowchart diagram of a method of performing client-side zooming of a remote video feed in accordance with some implementations. FIGS. 17A-20B illustrate flowchart diagrams of methods for video monitoring and event review described herein. The user interfaces in FIGS. 9A-9BB are used to illustrate the processes and/or methods in FIGS. 10, 12A-12B, 13A-13B, 14A-14B, 15A-15C, and 16A-16B, and provide frontend examples and context for the backend processes and/or methods in FIGS. 11A-11E, 17A-17D, 18A-18D, 19A-19C, and 20A-20B.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both user interfaces, but they are not the same user interface.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

FIG. 1 is a representative smart home environment in accordance with some implementations. Smart home environment 100 includes a structure 150, which is optionally a house, office building, garage, or mobile home. It will be appreciated that devices may also be integrated into a smart home environment 100 that does not include an entire structure 150, such as an apartment, condominium, or office space. Further, the smart home environment may control and/or be coupled to devices outside of the actual structure 150. Indeed, several devices in the smart home environment need not be physically within the structure 150. For example, a device controlling a pool heater 114 or irrigation system 116 may be located outside of structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the smart home environment 100 includes a plurality of devices, including intelligent, multi-sensing, network-connected devices, that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), and one or more intelligent, multi-sensing, network-connected entryway interface devices 106 (hereinafter referred to as "smart doorbells 106"). In some implementations, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, and/or carbon monoxide). The smart doorbell 106 may detect a person's approach to or departure from a location (e.g., an outer door), control doorbell functionality, announce a person's approach or departure via audio or visual means, and/or control settings on a security system (e.g., to activate or deactivate the security system when occupants go and come).

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device (e.g., a smartphone) 166. A webpage or application may be configured to receive communications from the user and control the device based on the communications and/or to present information about the device's operation to the user. For example, the user may view a current set point temperature for a device and adjust it using a computer. The user may be in the structure during this remote communication or outside the structure.

As discussed above, users may control the smart thermostat and other smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering the devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, the devices 102, 104, 106, 108, 110, 112, 114, 116, and/or 118 (collectively referred to as "the smart devices") are capable of data communications and information sharing with other smart devices, a central server or cloud-computing system, and/or other devices that are network-connected. The required data communications may be carried out using any of a variety of custom or standard wireless protocols (IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (CAT6 Ethernet, HomePlug, etc.), or any other suitable communication protocol, including communication protocols not yet developed as of the filing date of this document.

In some implementations, the smart devices serve as wireless or wired repeaters. For example, a first one of the smart devices communicates with a second one of the smart devices via a wireless router. The smart devices may further communicate with each other via a connection to one or more networks 162 such as the Internet. Through the one or more networks 162, the smart devices may communicate with a smart home provider server system 164 (also called a central server system and/or a cloud-computing system herein). In some implementations, the smart home provider server system 164 may include multiple server systems each dedicated to data processing associated with a respective subset of the smart devices (e.g., a video server system may be dedicated to data processing associated with camera(s) 118). The smart home provider server system 164 may be associated with a manufacturer, support entity, or service provider associated with the smart device. In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

Figure 2:
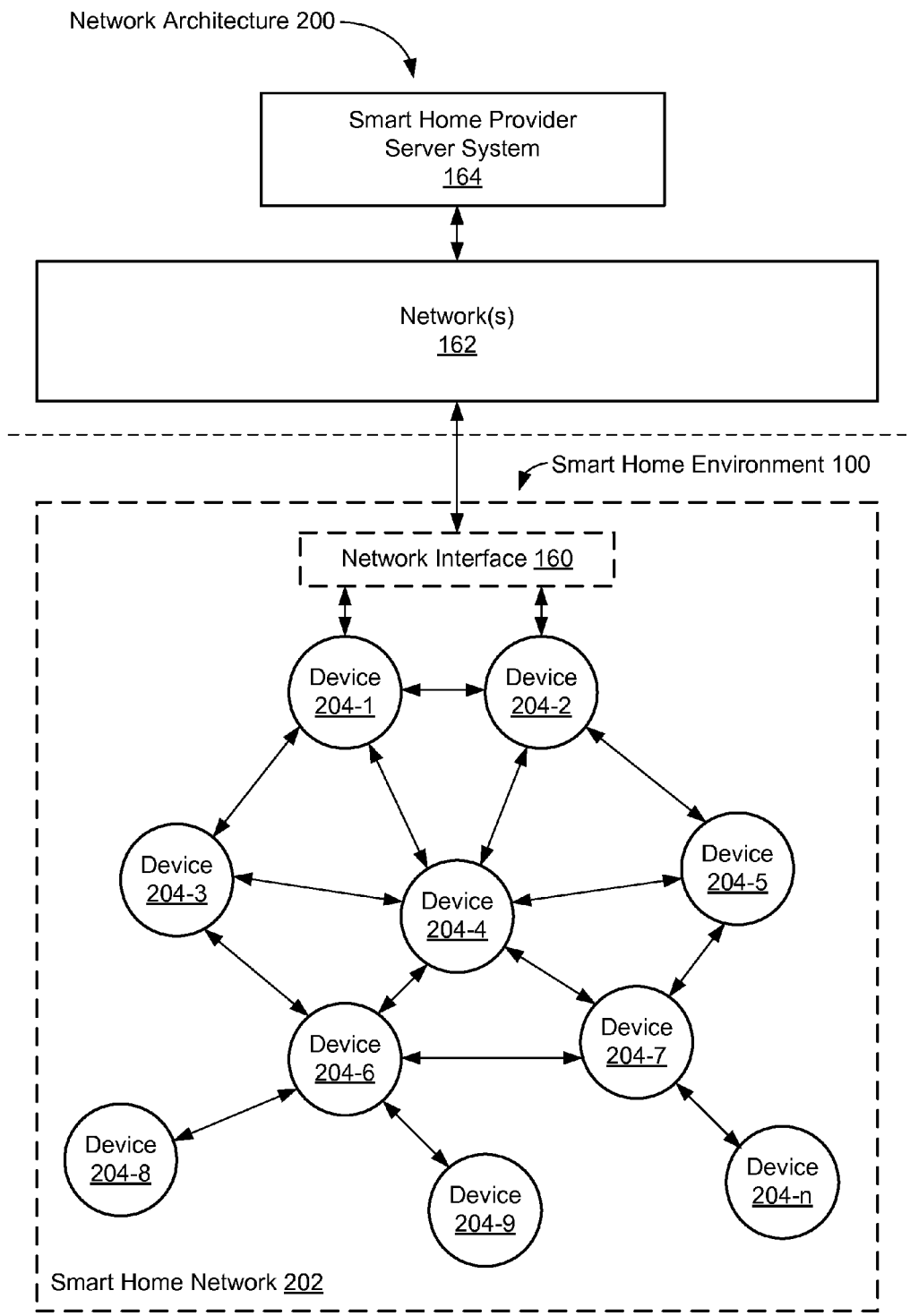
FIG. 2 is a block diagram illustrating a representative network architecture that includes a smart home network in accordance with some implementations.

FIG. 2 is a block diagram illustrating a representative network architecture 200 that includes a smart home network 202 in accordance with some implementations. In some implementations, one or more smart devices 204 in the smart home environment 100 (e.g., the devices 102, 104, 106, 108, 110, 112, 114, 116, and/or 118) combine to create a mesh network in the smart home network 202. In some implementations, the one or more smart devices 204 in the smart home network 202 operate as a smart home controller. In some implementations, a smart home controller has more computing power than other smart devices. In some implementations, a smart home controller processes inputs (e.g., from the smart device(s) 204, the electronic device 166, and/or the smart home provider server system 164) and sends commands (e.g., to the smart device(s) 204 in the smart home network 202) to control operation of the smart home environment 100. In some implementations, some of the smart device(s) 204 in the mesh network are "spokesman" nodes (e.g., node 204-1) and others are "low-powered" nodes (e.g., node 204-9). Some of the smart device(s) 204 in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the central server or cloud-computing system 164. In some implementations, one or more "spokesman" nodes operate as a smart home controller. On the other hand, the devices that are battery powered are referred to as "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

As described, the spokesman nodes and some of the low-powered nodes are capable of "listening." Accordingly, users, other devices, and/or the central server or cloud-computing system 164 may communicate control commands to the low-powered nodes. For example, a user may use the portable electronic device 166 (e.g., a smartphone) to send commands over the Internet to the central server or cloud-computing system 164, which then relays the commands to one or more spokesman nodes in the smart home network 202. The spokesman nodes drop down to a low-power protocol to communicate the commands to the low-power nodes throughout the smart home network 202, as well as to other spokesman nodes that did not receive the commands directly from the central server or cloud-computing system 164.

In some implementations, a smart nightlight 170 is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart home network 202 as well as over the one or more networks 162 to the central server or cloud-computing system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors, carbon monoxide/dioxide sensors, occupancy/motion sensors, ambient light sensors, temperature sensors, humidity sensors, and the like. Furthermore, the smart hazard detectors 104 may send messages that correspond to each of the respective sensors to the other devices and/or the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore may include more power-consuming components, such as one or more communication chips capable of bidirectional communication in a variety of protocols.

In some implementations, the smart home environment 100 includes service robots 168 that are configured to carry out, in an autonomous manner, any of a variety of household tasks.

Figure 3:
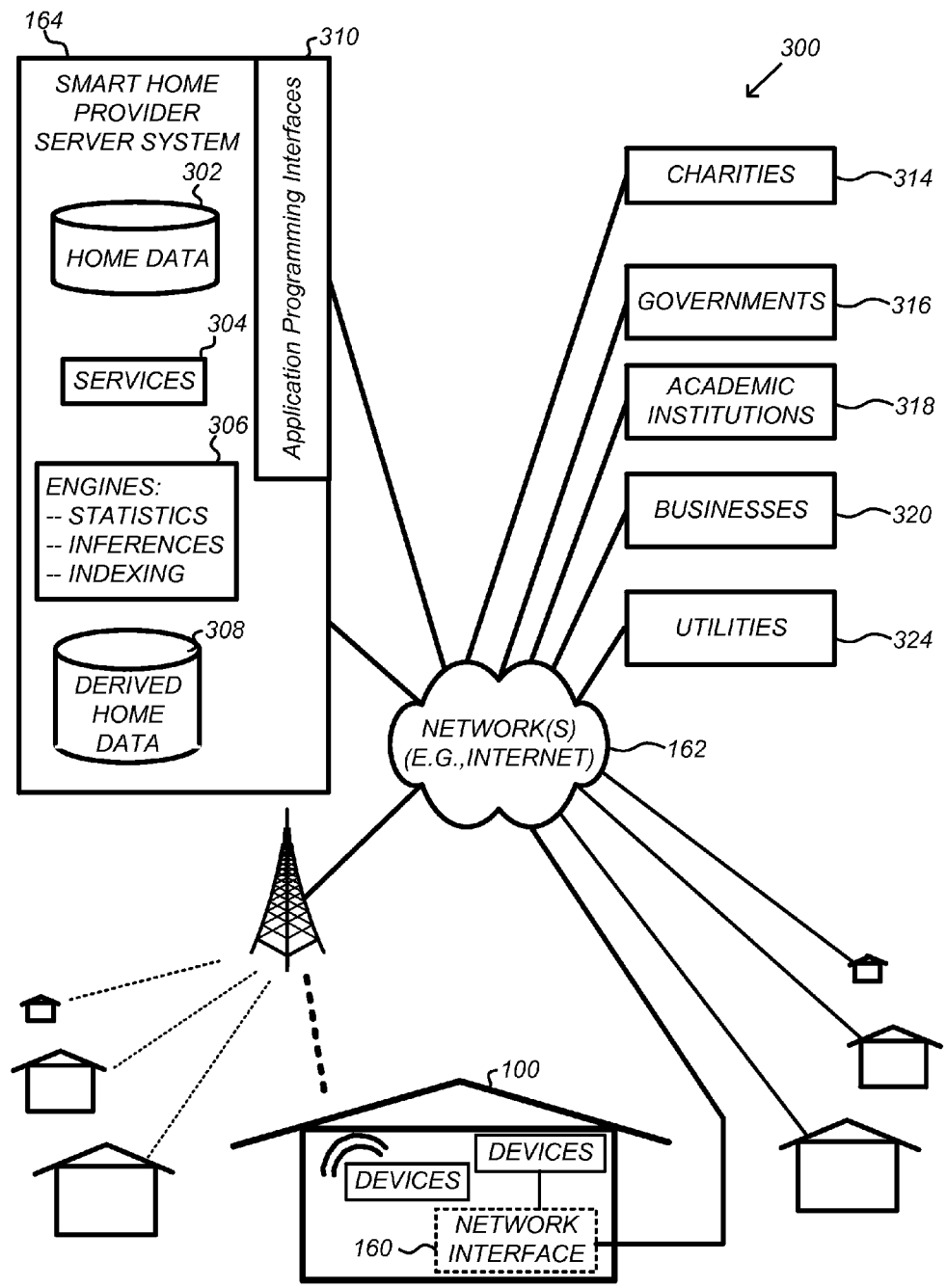
FIG. 3 illustrates a network-level view of an extensible devices and services platform with which the smart home environment of FIG. 1 is integrated, in accordance with some implementations.

FIG. 3 illustrates a network-level view of an extensible devices and services platform 300 with which the smart home environment 100 of FIG. 1 is integrated, in accordance with some implementations. The extensible devices and services platform 300 includes remote servers or cloud computing system 164. Each of the intelligent, network-connected devices 102, 104, 106, 108, 110, 112, 114, 116, and 118 from FIG. 1 (identified simply as "devices" in FIGS. 2-4) may communicate with the remote servers or cloud computing system 164. For example, a connection to the one or more networks 162 may be established either directly (e.g., using 3G/4G connectivity to a wireless carrier), or through a network interface 160 (e.g., a router, switch, gateway, hub, or an intelligent, dedicated whole-home control node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments, where the devices may routinely transmit home data or may transmit home data in specific instances (e.g., when a device queries the home data 302). Example collected home data 302 includes, without limitation, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes. Example services 304 include, without limitation, software updates, customer support, sensor data collection/logging, remote access, remote or distributed control, and/or use suggestions (e.g., based on the collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and the services platform 300 includes a processing engine 306, which may be concentrated at a single server or distributed among several different computing entities without limitation. In some implementations, the processing engine 306 includes engines configured to receive data from the devices of smart home environments (e.g., via the Internet and/or a network interface), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, use statistics, use statistics relative to use of other devices, use patterns, and/or statistics summarizing sensor readings are generated by the processing engine 306 and transmitted. The results or statistics may be provided via the one or more networks 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications, such as web applications or mobile applications, that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
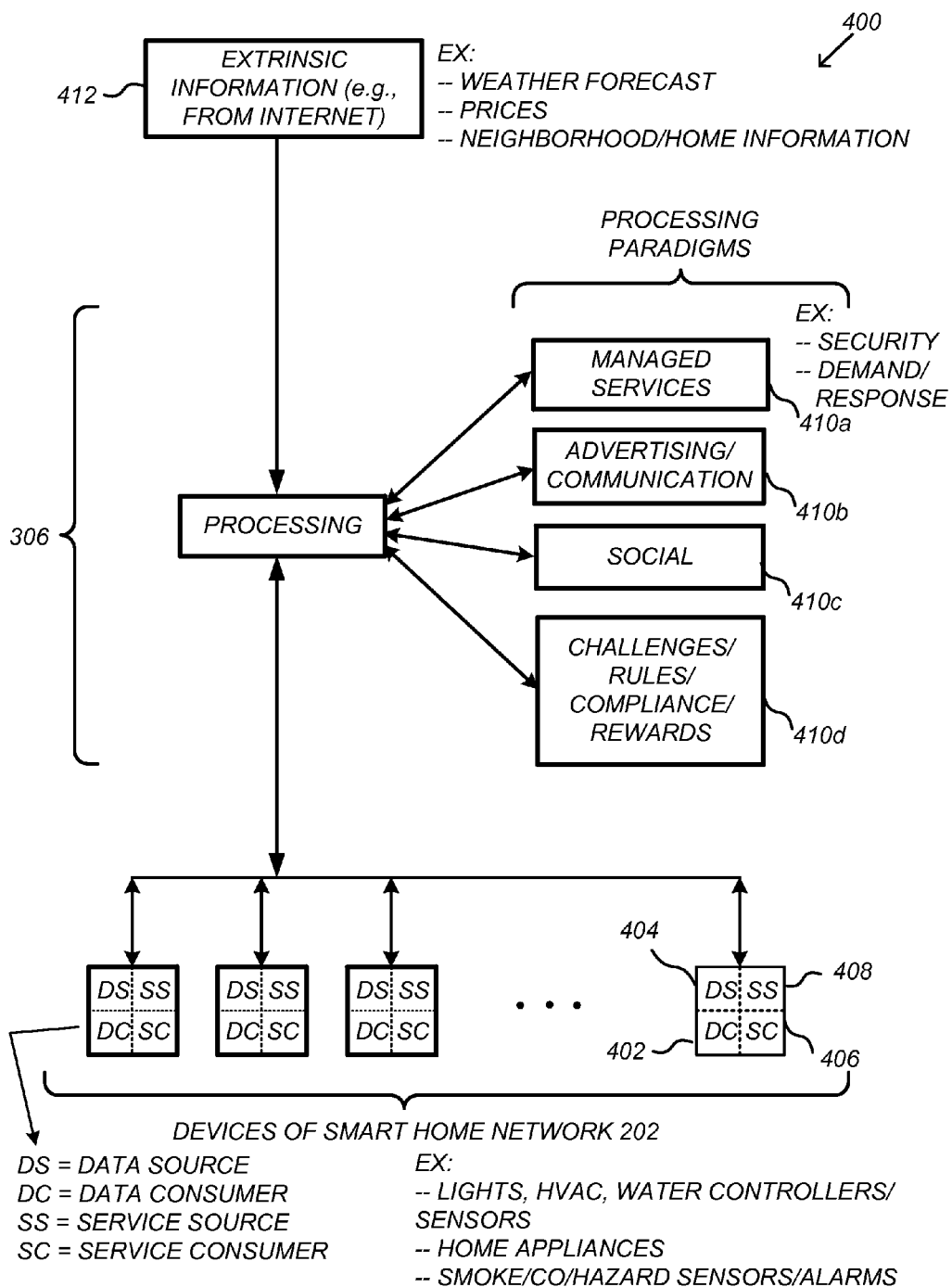
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows the processing engine 306 as including a number of processing paradigms 410. In some implementations, the processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, and/or alerting a user of a current or predicted future event or characteristic. In some implementations, the processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, the processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, the processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, the processing engine 306 integrates or otherwise uses extrinsic information 412 from extrinsic sources to improve the functioning of one or more processing paradigms. The extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
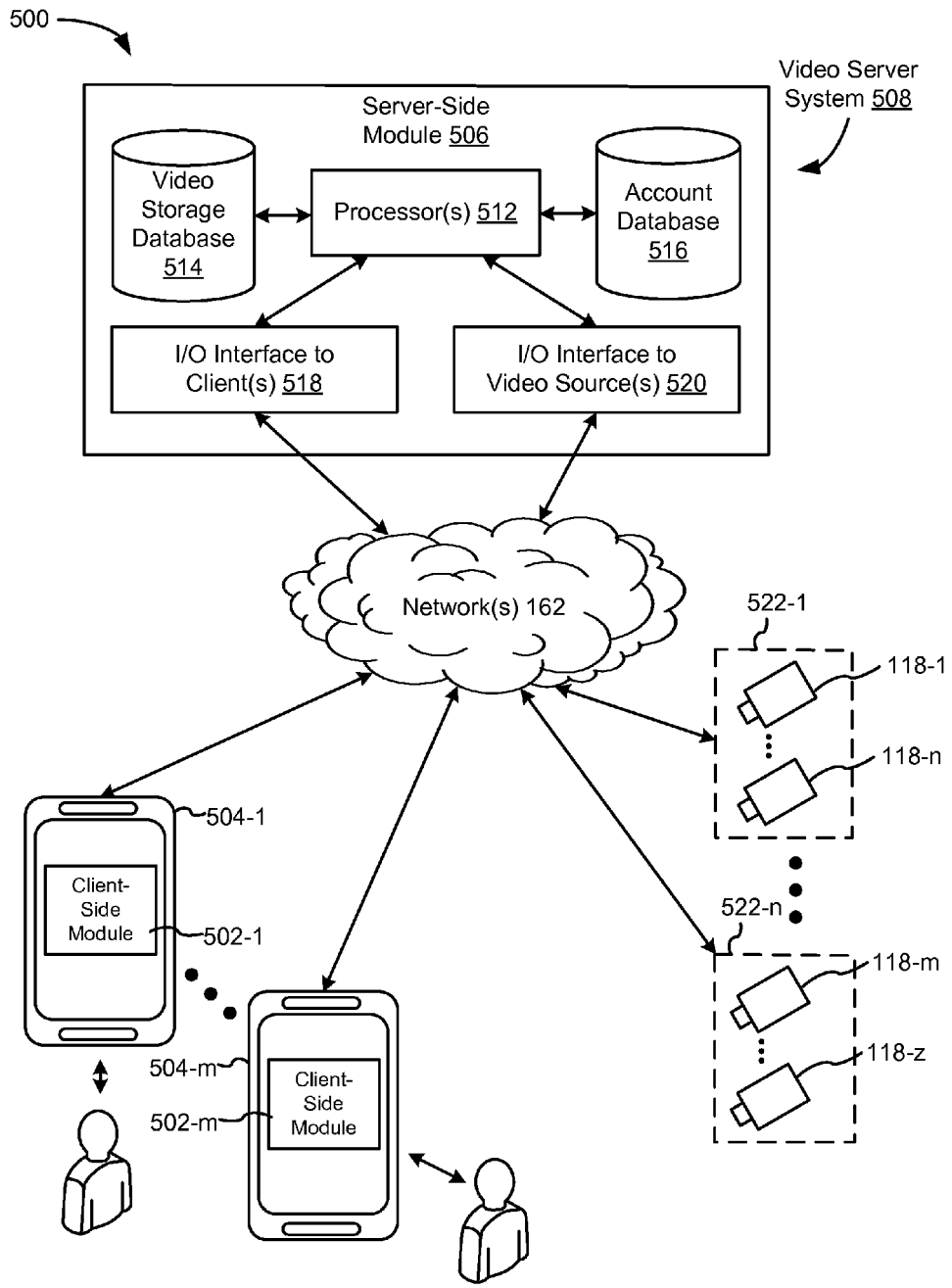
FIG. 5 is a representative operating environment in which a video server system interacts with client devices and video sources in accordance with some implementations.

FIG. 5 illustrates a representative operating environment 500 in which a video server system 508 provides data processing for monitoring and facilitating review of motion events in video streams captured by video cameras 118. As shown in FIG. 5, the video server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the video server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the video server system 508. In some implementations, the video server system 508 is a dedicated video processing server that provides video processing services to video sources and client devices 504 independent of other services provided by the video server system 508.

In some implementations, each of the video sources 522 includes one or more video cameras 118 that capture video and send the captured video to the video server system 508 substantially in real-time. In some implementations, each of the video sources 522 optionally includes a controller device (not shown) that serves as an intermediary between the one or more cameras 118 and the video server system 508. The controller device receives the video data from the one or more cameras 118, optionally, performs some preliminary processing on the video data, and sends the video data to the video server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the video server system 508.

As shown in FIG. 5, in accordance with some implementations, each of the client devices 504 includes a client-side module 502. The client-side module 502 communicates with a server-side module 506 executed on the video server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, an account database 516, an I/O interface to one or more client devices 518, and an I/O interface to one or more video sources 520. The I/O interface to one or more clients 518 facilitates the client-facing input and output processing for the server-side module 506. The account database 516 stores a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the video server system 508 is implemented on one or more standalone data processing apparatuses or a distributed network of computers. In some implementations, the video server system 508 also employs various virtual devices and/or services of third party service providers (e.g., third-party cloud service providers) to provide the underlying computing resources and/or infrastructure resources of the video server system 508. In some implementations, the video server system 508 includes, but is not limited to, a handheld computer, a tablet computer, a laptop computer, a desktop computer, or a combination of any two or more of these data processing devices or other data processing devices.

The server-client environment 500 shown in FIG. 1 includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the video server system 508 can vary in different implementations. For example, in some implementations, client-side module 502 is a thin-client that provides only user-facing input and output processing functions, and delegates all other data processing functionalities to a backend server (e.g., the video server system 508). Similarly, in some implementations, a respective one of the video sources 522 is a simple video capturing device that continuously captures and streams video data to the video server system 508 without no or limited local preliminary processing on the video data. Although many aspects of the present technology are described from the perspective of the video server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the video server system 508, the client device 504, and the video sources 522 cooperatively.

Figure 6:
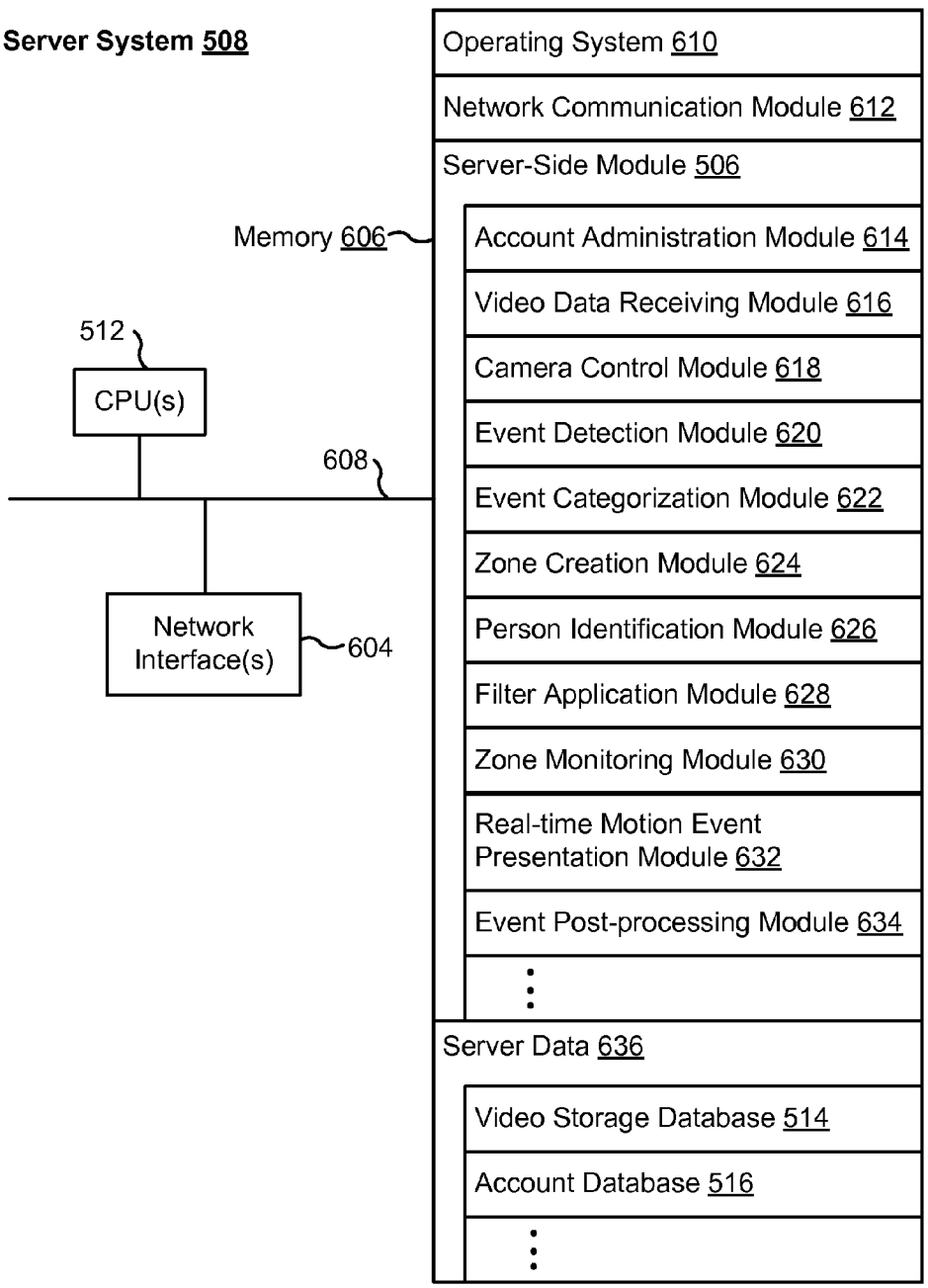
FIG. 6 is a block diagram illustrating a representative video server system in accordance with some implementations.

FIG. 6 is a block diagram illustrating the video server system 508 in accordance with some implementations. The video server system 508, typically, includes one or more processing units (CPUs) 512, one or more network interfaces 604 (e.g., including the I/O interface to one or more clients 518 and the I/O interface to one or more video sources 520), memory 606, and one or more communication buses 608 for interconnecting these components (sometimes called a chipset). The memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 606, optionally, includes one or more storage devices remotely located from the one or more processing units 512. The memory 606, or alternatively the non-volatile memory within the memory 606, includes a non-transitory computer readable storage medium. In some implementations, the memory 606, or the non-transitory computer readable storage medium of the memory 606, stores the following programs, modules, and data structures, or a subset or superset thereof:

Operating system 610 including procedures for handling various basic system services and for performing hardware dependent tasks;

Network communication module 612 for connecting the video server system 508 to other computing devices (e.g., the client devices 504 and the video sources 522 including camera(s) 118) connected to the one or more networks 162 via the one or more network interfaces 604 (wired or wireless);

Server-side module 506, which provides server-side data processing and functionalities for the event monitoring and review, including but not limited to:
  Account administration module 614 for creating reviewer accounts, performing camera registration processing to establish associations between video sources to their respective reviewer accounts, and providing account login-services to the client devices 504;
  Video data receiving module 616 for receiving raw video data from the video sources 522, and preparing the received video data for event processing and long-term storage in the video storage database 514;
  Camera control module 618 for generating and sending server-initiated control commands to modify the operation modes of the video sources, and/or receiving and forwarding user-initiated control commands to modify the operation modes of the video sources 522;
  Event detection module 620 for detecting motion event candidates in video streams from each of the video sources 522, including motion track identification, false positive suppression, and event mask generation and caching;
  Event categorization module 622 for categorizing motion events detected in received video streams;
  Zone creation module 624 for generating zones of interest in accordance with user input;
  Person identification module 626 for identifying characteristics associated with presence of humans in the received video streams;
  Filter application module 628 for selecting event filters (e.g., event categories, zones of interest, a human filter, etc.) and applying the selected event filter to past and new motion events detected in the video streams;
  Zone monitoring module 630 for monitoring motions within selected zones of interest and generating notifications for new motion events detected within the selected zones of interest, where the zone monitoring takes into account changes in surrounding context of the zones and is not confined within the selected zones of interest;
  Real-time motion event presentation module 632 for dynamically changing characteristics of event indicators displayed in user interfaces as new event filters, such as new event categories or new zones of interest, are created, and for providing real-time notifications as new motion events are detected in the video streams; and
  Event post-processing module 634 for providing summary time-lapse for past motion events detected in video streams, and providing event and category editing functions to user for revising past event categorization results; and
server data 636 storing data for use in data processing for motion event monitoring and review, including but not limited to:

Video storage database 514 storing raw video data associated with each of the video sources 522 (each including one or more cameras 118) of each reviewer account, as well as event categorization models (e.g., event clusters, categorization criteria, etc.), event categorization results (e.g., recognized event categories, and assignment of past motion events to the recognized event categories, representative events for each recognized event category, etc.), event masks for past motion events, video segments for each past motion event, preview video (e.g., sprites) of past motion events, and other relevant metadata (e.g., names of event categories, location of the cameras 118, creation time, duration, DTPZ settings of the cameras 118, etc.) associated with the motion events; and Account database 516 for storing account information for reviewer accounts, including login-credentials, associated video sources, relevant user and hardware characteristics (e.g., service tier, camera model, storage capacity, processing capabilities, etc.), user interface settings, monitoring preferences, etc.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 606, optionally, stores a subset of the modules and data structures identified above. Furthermore, the memory 606, optionally, stores additional modules and data structures not described above.

Figure 7:
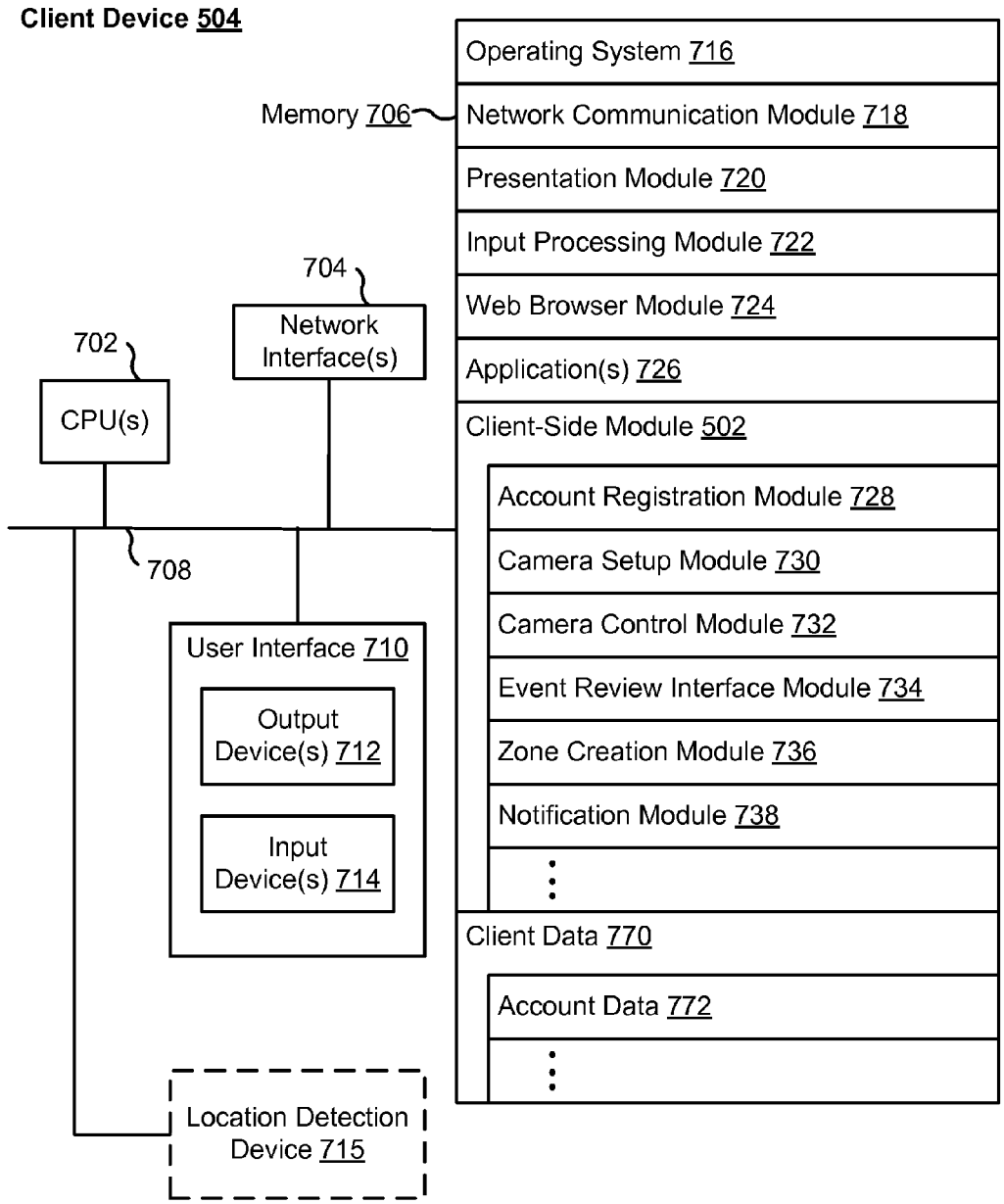
FIG. 7 is a block diagram illustrating a representative client device in accordance with some implementations.

FIG. 7 is a block diagram illustrating a representative client device 504 associated with a reviewer account in accordance with some implementations. The client device 504, typically, includes one or more processing units (CPUs) 702, one or more network interfaces 704, memory 706, and one or more communication buses 708 for interconnecting these components (sometimes called a chipset). The client device 504 also includes a user interface 710. The user interface 710 includes one or more output devices 712 that enable presentation of media content, including one or more speakers and/or one or more visual displays. The user interface 710 also includes one or more input devices 714, including user interface components that facilitate user input such as a keyboard, a mouse, a voice-command input unit or microphone, a touch screen display, a touch-sensitive input pad, a gesture capturing camera, or other input buttons or controls. Furthermore, the client device 504 optionally uses a microphone and voice recognition or a camera and gesture recognition to supplement or replace the keyboard. In some implementations, the client device 504 includes one or more cameras, scanners, or photo sensor units for capturing images. In some implementations, the client device 504 optionally includes a location detection device 715, such as a GPS (global positioning satellite) or other geo-location receiver, for determining the location of the client device 504.

The memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 706, optionally, includes one or more storage devices remotely located from the one or more processing units 702. The memory 706, or alternatively the non-volatile memory within the memory 706, includes a non-transitory computer readable storage medium. In some implementations, the memory 706, or the non-transitory computer readable storage medium of memory 706, stores the following programs, modules, and data structures, or a subset or superset thereof:

Operating system 716 including procedures for handling various basic system services and for performing hardware dependent tasks;

Network communication module 718 for connecting the client device 504 to other computing devices (e.g., the video server system 508 and the video sources 522) connected to the one or more networks 162 via the one or more network interfaces 704 (wired or wireless);

Presentation module 720 for enabling presentation of information (e.g., user interfaces for application(s) 726 or the client-side module 502, widgets, websites and web pages thereof, and/or games, audio and/or video content, text, etc.) at the client device 504 via the one or more output devices 712 (e.g., displays, speakers, etc.) associated with the user interface 710;

Input processing module 722 for detecting one or more user inputs or interactions from one of the one or more input devices 714 and interpreting the detected input or interaction;

Web browser module 724 for navigating, requesting (e.g., via HTTP), and displaying websites and web pages thereof, including a web interface for logging into a reviewer account, controlling the video sources associated with the reviewer account, establishing and selecting event filters, and editing and reviewing motion events detected in the video streams of the video sources;

One or more applications 726 for execution by the client device 504 (e.g., games, social network applications, smart home applications, and/or other web or non-web based applications);

Client-side module 502, which provides client-side data processing and functionalities for monitoring and reviewing motion events detected in the video streams of one or more video sources, including but not limited to:

Account registration module 728 for establishing a reviewer account and registering one or more video sources with the video server system 508;

Camera setup module 730 for setting up one or more video sources within a local area network, and enabling the one or more video sources to access the video server system 508 on the Internet through the local area network;

Camera control module 732 for generating control commands for modifying an operating mode of the one or more video sources in accordance with user input;

Event review interface module 734 for providing user interfaces for reviewing event timelines, editing event categorization results, selecting event filters, presenting real-time filtered motion events based on existing and newly created event filters (e.g., event categories, zones of interest, a human filter, etc.), presenting real-time notifications (e.g., pop-ups) for newly detected motion events, and presenting smart time-lapse of selected motion events;

Zone creation module 736 for providing a user interface for creating zones of interest for each video stream in accordance with user input, and sending the definitions of the zones of interest to the video server system 508; and Notification module 738 for generating real-time notifications for all or selected motion events on the client device 504 outside of the event review user interface; and client data 770 storing data associated with the reviewer account and the video sources 522, including, but is not limited to:

Account data 772 storing information related with the reviewer account, and the video sources, such as cached login credentials, camera characteristics, user interface settings, display preferences, etc.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified above. Furthermore, the memory 706, optionally, stores additional modules and data structures not described above.

In some implementations, at least some of the functions of the video server system 508 are performed by the client device 504, and the corresponding sub-modules of these functions may be located within the client device 504 rather than the video server system 508. In some implementations, at least some of the functions of the client device 504 are performed by the video server system 508, and the corresponding sub-modules of these functions may be located within the video server system 508 rather than the client device 504. The client device 504 and the video server system 508 shown in FIGS. 6-7, respectively, are merely illustrative, and different configurations of the modules for implementing the functions described herein are possible in various implementations.

Figure 8:
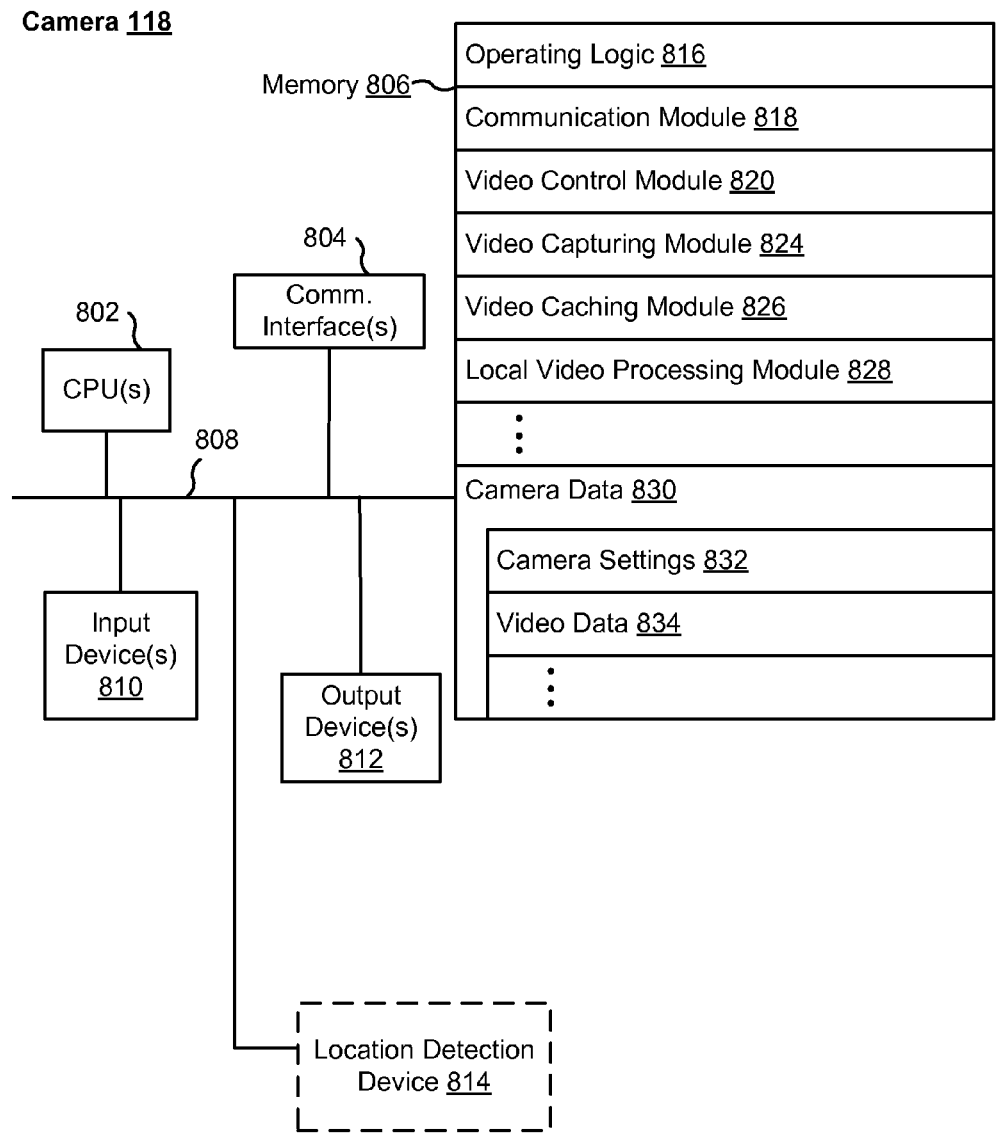
FIG. 8 is a block diagram illustrating a representative video capturing device (e.g., a camera) in accordance with some implementations.

FIG. 8 is a block diagram illustrating a representative camera 118 in accordance with some implementations. In some implementations, the camera 118 includes one or more processing units (e.g., CPUs, ASICs, FPGAs, microprocessors, and the like) 802, one or more communication interfaces 804, memory 806, and one or more communication buses 808 for interconnecting these components (sometimes called a chipset). In some implementations, the camera 118 includes one or more input devices 810 such as one or more buttons for receiving input and one or more microphones. In some implementations, the camera 118 includes one or more output devices 812 such as one or more indicator lights, a sound card, a speaker, a small display for displaying textual information and error codes, etc. In some implementations, the camera 118 optionally includes a location detection device 814, such as a GPS (global positioning satellite) or other geo-location receiver, for determining the location of the camera 118.

The memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 806, or alternatively the non-volatile memory within the memory 806, includes a non-transitory computer readable storage medium. In some implementations, the memory 806, or the non-transitory computer readable storage medium of the memory 806, stores the following programs, modules, and data structures, or a subset or superset thereof:

Operating system 816 including procedures for handling various basic system services and for performing hardware dependent tasks;

Network communication module 818 for connecting the camera 118 to other computing devices (e.g., the video server system 508, the client device 504, network routing devices, one or more controller devices, and networked storage devices) connected to the one or more networks 162 via the one or more communication interfaces 804 (wired or wireless);

Video control module 820 for modifying the operation mode (e.g., zoom level, resolution, frame rate, recording and playback volume, lighting adjustment, AE and IR modes, etc.) of the camera 118, enabling/disabling the audio and/or video recording functions of the camera 118, changing the pan and tilt angles of the camera 118, resetting the camera 118, and/or the like;

Video capturing module 824 for capturing and generating a video stream and sending the video stream to the video server system 508 as a continuous feed or in short bursts;

Video caching module 826 for storing some or all captured video data locally at one or more local storage devices (e.g., memory, flash drives, internal hard disks, portable disks, etc.);

Local video processing module 828 for performing preliminary processing of the captured video data locally at the camera 118, including for example, compressing and encrypting the captured video data for network transmission, preliminary motion event detection, preliminary false positive suppression for motion event detection, preliminary motion vector generation, etc.; and Camera data 830 storing data, including but not limited to:

Camera settings 832, including network settings, camera operation settings, camera storage settings, etc.; and Video data 834, including video segments and motion vectors for detected motion event candidates to be sent to the video server system 508.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 806, optionally, stores a subset of the modules and data structures identified above. Furthermore, memory 806, optionally, stores additional modules and data structures not described above.

User Interfaces for Video Monitoring

Attention is now directed towards implementations of user interfaces and associated processes that may be implemented on a respective client device 504 with one or more speakers enabled to output sound, zero or more microphones enabled to receive sound input, and a touch screen 906 enabled to receive one or more contacts and display information (e.g., media content, webpages and/or user interfaces for an application). FIGS. 9A-9BB illustrate example user interfaces for monitoring and facilitating review of motion events in accordance with some implementations.

Although some of the examples that follow will be given with reference to inputs on touch screen 906 (where the touch sensitive surface and the display are combined), in some implementations, the device detects inputs on a touch-sensitive surface that is separate from the display. In some implementations, the touch sensitive surface has a primary axis that corresponds to a primary axis on the display. In accordance with these implementations, the device detects contacts with the touch-sensitive surface at locations that correspond to respective locations on the display. In this way, user inputs detected by the device on the touch-sensitive surface are used by the device to manipulate the user interface on the display of the device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some implementations, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

FIGS. 9A-9BB show user interface 908 displayed on client device 504 (e.g., a tablet, laptop, mobile phone, or the like); however, one skilled in the art will appreciate that the user interfaces shown in FIGS. 9A-9BB may be implemented on other similar computing devices. The user interfaces in FIGS. 9A-9BB are used to illustrate the processes described herein, including the processes and/or methods described with respect to FIGS. 10, 12A-12B, 13A-13B, 14A-14B, 15A-15C, and 16A-16B.

For example, the client device 504 is the portable electronic device 166 (FIG. 1) such as a laptop, tablet, or mobile phone. Continuing with this example, the user of the client device 504 (sometimes also herein called a "reviewer") executes an application (e.g., the client-side module 502, FIGS. 5 and 7) used to monitor and control the smart home environment 100 and logs into a user account registered with the smart home provider system 164 or a component thereof (e.g., the video server system 508, FIGS. 5-6). In this example, the smart home environment 100 includes the one or more cameras 118, whereby the user of the client device 504 is able to control, review, and monitor video feeds from the one or more cameras 118 with the user interfaces for the application displayed on the client device 504 shown in FIGS. 9A-9BB.

FIG. 9A illustrates the client device 504 displaying a first implementation of a video monitoring user interface (UI) of the application on the touch screen 906. In FIG. 9A, the video monitoring UI includes three distinct regions: a first region 903, a second region 905, and a third region 907. In FIG. 9A, the first region 903 includes a video feed from a respective camera among the one or more camera 118 associated with the smart home environment 100. For example, the respective camera is located on the back porch of the user's domicile or pointed out of a window of the user's domicile. The first region 903 includes the time 911 of the video feed being displayed in the first region 903 and also an indicator 912 indicating that the video feed being displayed in the first region 903 is a live video feed.

In FIG. 9A, the second region 905 includes an event timeline 910 and a current video feed indicator 909 indicating the temporal position of the video feed displayed in the first region 903 (i.e., the point of playback for the video feed displayed in the first region 903). In FIG. 9A, the video feed displayed in the first region 903 is a live video feed from the respective camera. In some implementations, the video feed displayed in the first region 903 may be previously recorded video footage. For example, the user of the client device 504 may drag the indicator 909 to any position on the event timeline 910 causing the client device 504 to display the video feed from that point in time forward in the first region 903. In another example, the user of the client device 504 may perform a substantially horizontal swipe gesture on the event timeline 910 to scrub between points of the recorded video footage causing the indicator 909 to move on the event timeline 910 and also causing the client device 504 to display the video feed from that point in time forward in the first region 903.

The second region 905 also includes affordances 913 for changing the scale of the event timeline 910: 5 minute affordance 913A for changing the scale of the event timeline 910 to 5 minutes, 1 hour affordance 913B for changing the scale of the event timeline 910 to 1 hour, and affordance 24 hours 913C for changing the scale of the event timeline 910 to 24 hours. In FIG. 9A, the scale of the event timeline 910 is 1 hour as evinced by the darkened border surrounding the 1 hour affordance 913B and also the temporal tick marks shown on the event timeline 910. The second region 905 also includes affordances 914 for changing the date associated with the event timeline 910 to any day within the preceding week: Monday affordance 914A, Tuesday affordance 914B, Wednesday affordance 914C, Thursday affordance 914D, Friday affordance 914E, Saturday affordance 914F, Sunday affordance 914G, and Today affordance 914H. In FIG. 9A, the event timeline 910 is associated with the video feed from today as evinced by the darkened border surrounding Today affordance 914H. In some implementations, an affordance is a user interface element that is user selectable or manipulatable on a graphical user interface.

In FIG. 9A, the second region 905 further includes: "Make Time-Lapse" affordance 915, which, when activated (e.g., via a tap gesture), enables the user of the client device 504 to select a portion of the event timeline 910 for generation of a time-lapse video clip (as shown in FIGS. 9N-9Q); "Make Clip" affordance 916, which, when activated (e.g., via a tap gesture), enables the user of the client device 504 to select a motion event or a portion of the event timeline 910 to save as a video clip; and "Make Zone" affordance 917, which, when activated (e.g., via a tap gesture), enables the user of the client device 504 to create a zone of interest on the current field of view of the respective camera (as shown in FIGS. 9K-9M). In some embodiments, the time-lapse video clip and saved non-time-lapse video clips are associated with the user account of the user of the client device 504 and stored by the server video server system 508 (e.g., in the video storage database 516, FIGS. 5-6). In some embodiments, the user of the client device 504 is able to access his/her saved time-lapse video clip and saved non-time-lapse video clips by entering the login credentials for his/her for user account.

In FIG. 9A, the video monitoring UI also includes a third region 907 with a list of categories with recognized event categories and created zones of interest. FIG. 9A also illustrates the client device 504 detecting a contact 918 (e.g., a tap gesture) at a location corresponding to the first region 903 on the touch screen 906.

FIG. 9B illustrates the client device 504 displaying additional video controls in response to detecting the contact 918 in FIG. 9A. In FIG. 9B, the first region 903 of the video monitoring UI includes: an elevator bar with a handle 919 for adjusting the zoom magnification of the video feed displayed in the first region 903, affordance 920A for reducing the zoom magnification of the video feed, and affordance 920B for increasing the zoom magnification of the video feed. In FIG. 9B, the first region 903 of the video monitoring UI also includes: affordance 921A for enabling/disabling the microphone of the respective camera associated with the video feed; affordance 921B for rewinding the video feed by 30 seconds; affordance 921C for pausing the video feed displayed in the first region 903; affordance 921D for adjusting the playback volume of the video feed; and affordance 921E for displaying the video feed in full screen mode.

Figure 9C:
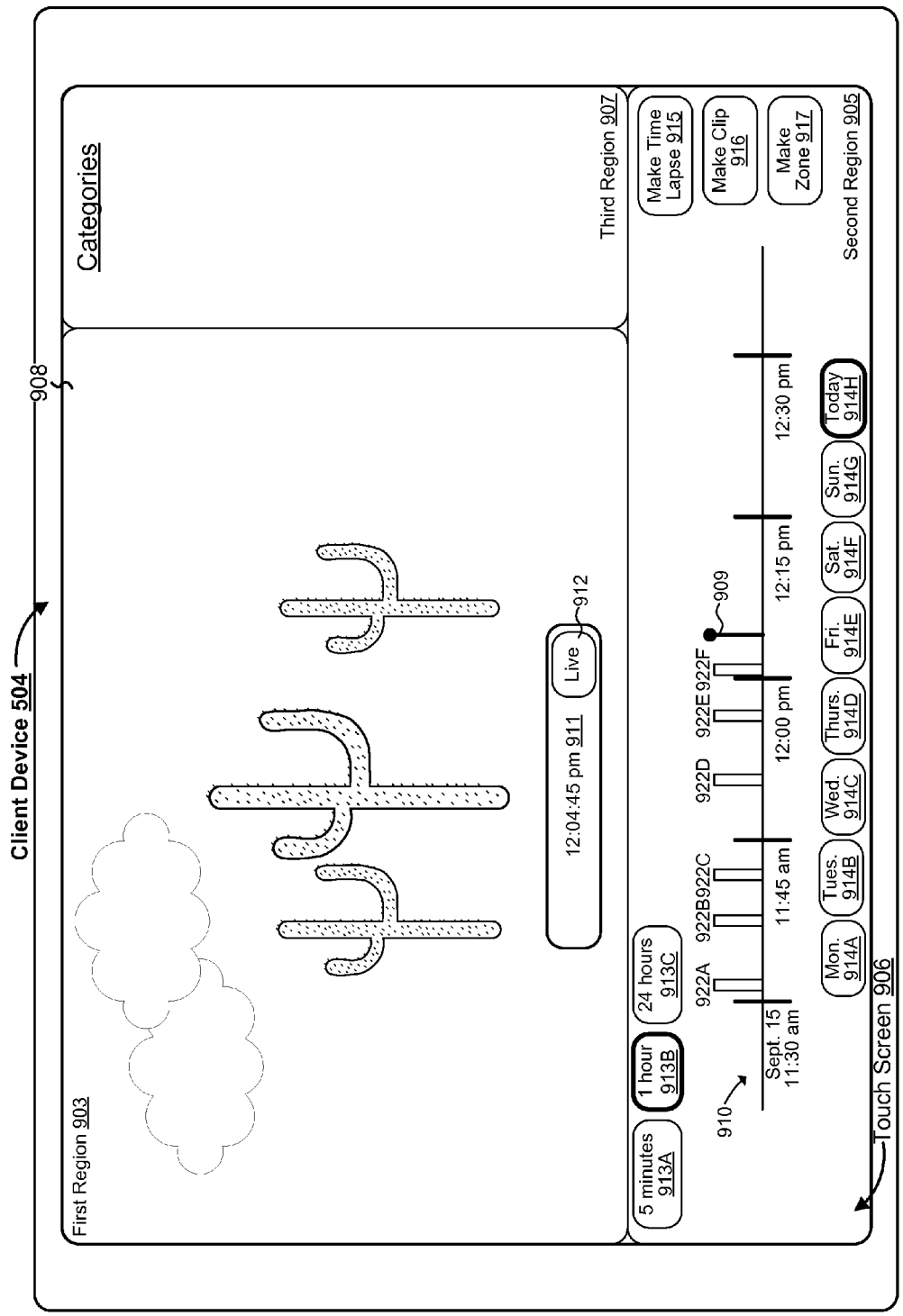

FIG. 9C illustrates the client device 504 displaying the event timeline 910 in the second region 905 with event indicators 922A, 922B, 922C, 922D, 922E, and 922F corresponding to detected motion events. In some implementations, the location of a respective event indicator 922 on the event timeline 910 corresponds to the time at which a motion event correlated with the respective event indicator 922 was detected. The detected motion events correlated with the event indicators 922A, 922B, 922C, 922D, 922E, and 922F are uncategorized motion events as no event categories have been recognized by the video server system 508 and no zones of interest have been created by the user of the client device 504. In some implementations, for example, the list of categories in the third region 907 includes an entry for uncategorized motion events (e.g., the motion events correlated with event indicators 922A, 922B, 922C, 922D, 922E, and 922F) with a filter affordance for enabling/disabling display of event indicators for the uncategorized motion events on the event timeline 910.

Figure 9D:
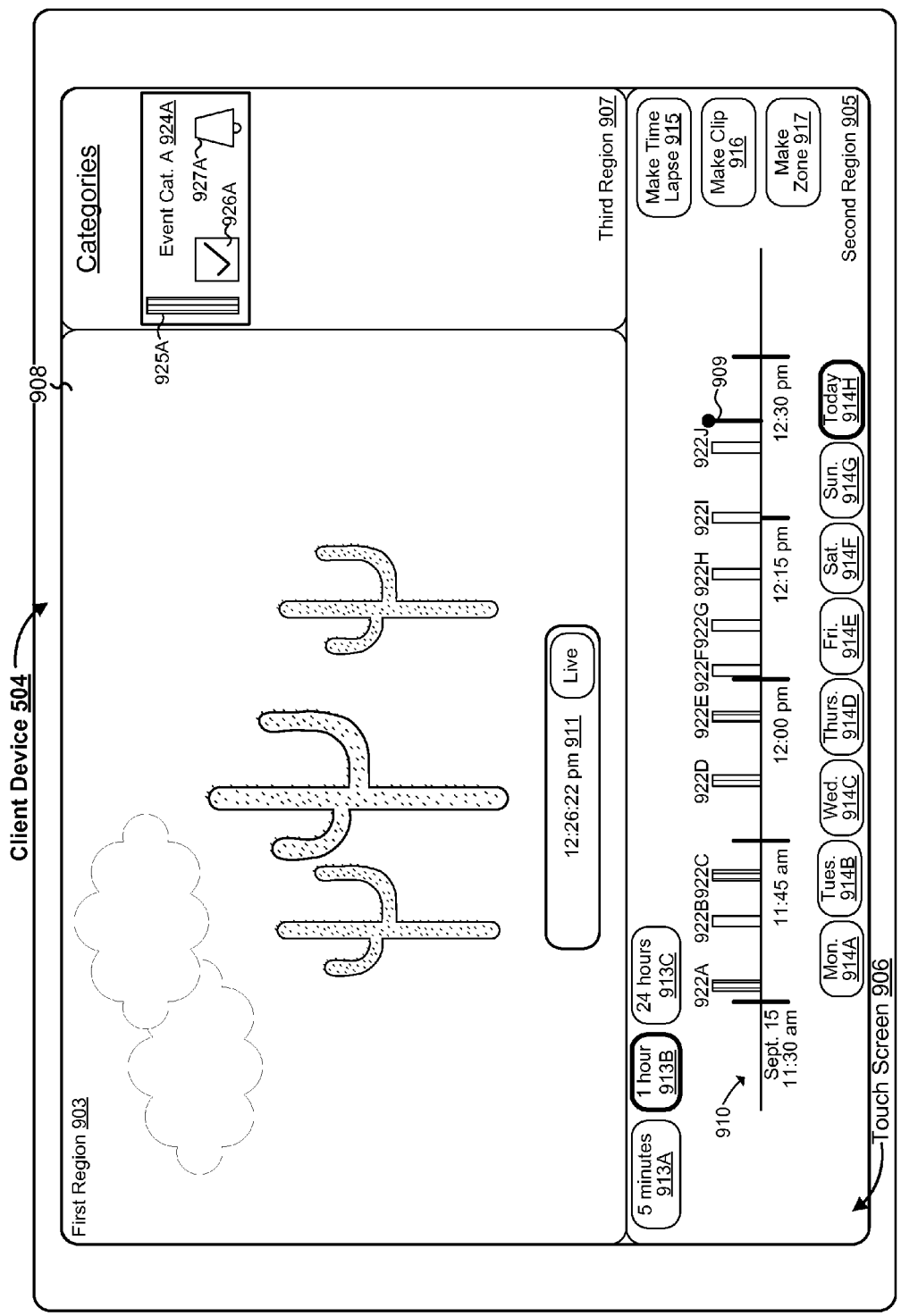

FIG. 9D illustrates the client device 504 displaying the event timeline 910 in the second region 905 with additional event indicators 922G, 922H, 922I, and 922J. In FIG. 9D, the list of categories in the third region 907 includes an entry 924A for newly recognized event category A. The entry 924A for recognized event category A includes: a display characteristic indicator 925A representing the display characteristic for event indicators corresponding to motion events assigned to event category A (e.g., vertical stripes); an indicator filter 926A for enabling/disabling display of event indicators on the event timeline 910 for motion events assigned to event category A; and a notifications indicator 927A for enabling/disabling notifications sent in response to detection of motion events assigned to event category A. In FIG. 9D, display of event indicators for motion events corresponding to event category A is enabled as evinced by the check mark corresponding to indicator filter 926A and notifications are enabled.

In FIG. 9D, motion events correlated with the event indicators 922A, 922C, 922D, and 922E have been retroactively assigned to event category A as shown by the changed display characteristic of the event indicators 922A, 922C, 922D, and 922E (e.g., vertical stripes). In some implementations, the display characteristic is a fill color of the event indicator, a shading pattern of the event indicator, an icon overlaid on the event indicator, or the like. In some implementations, the notifications are messages sent by the video server system 508 (FIGS. 5-6) via email to an email address linked to the user's account or via a SMS or voice call to a phone number linked to the user's account. In some implementations, the notifications are audible tones or vibrations provided by the client device 504.

Figure 9E:
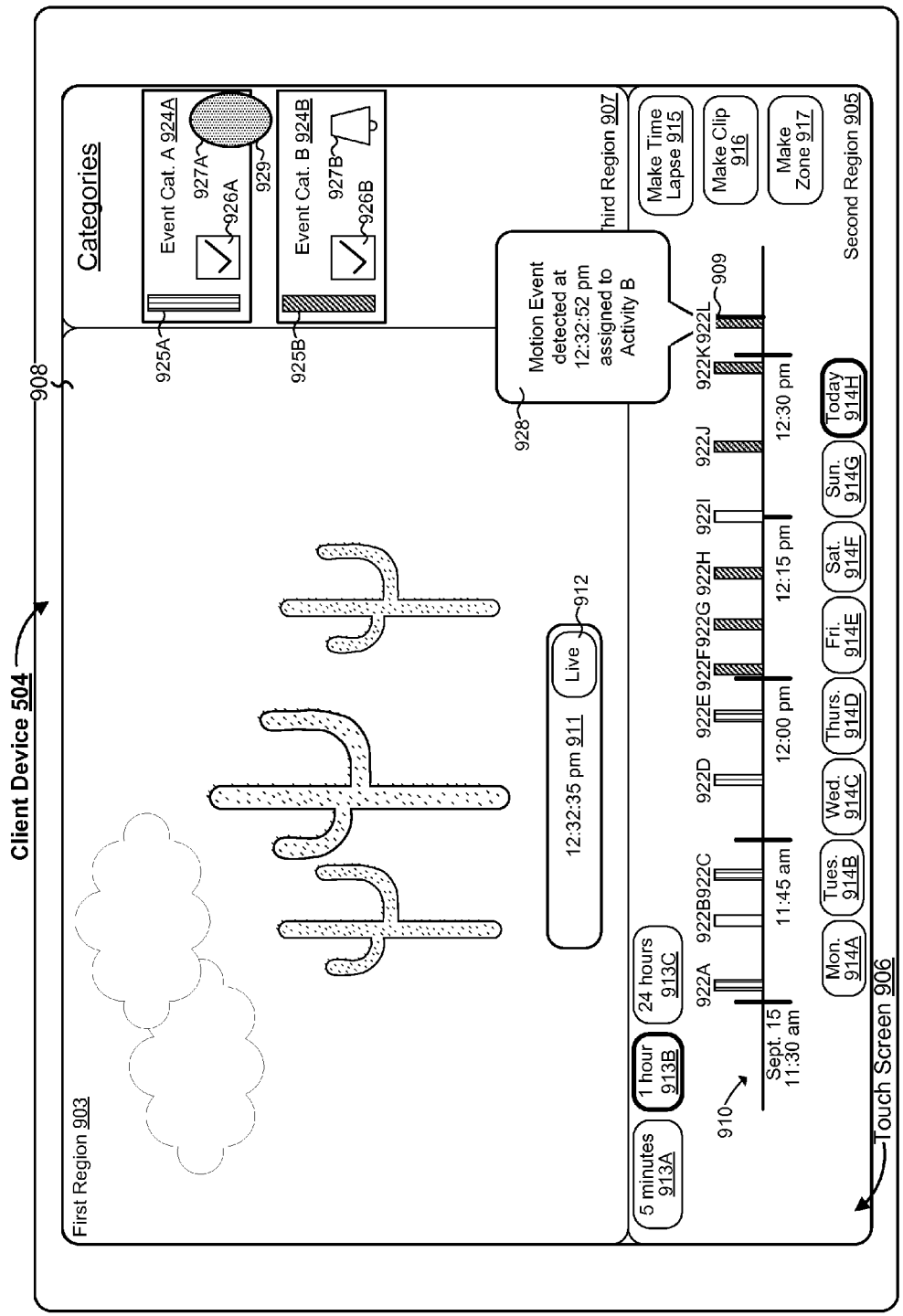

FIG. 9E illustrates the client device 504 displaying an entry 924B for newly recognized event category B in the list of categories in the third region 907. The entry 924B for recognized event category B includes: a display characteristic indicator 925B representing the display characteristic for event indicators corresponding to motion events assigned to event category B (e.g., a diagonal shading pattern); an indicator filter 926B for enabling/disabling display of event indicators on the event timeline 910 for motion events assigned to event category B; and a notifications indicator 927B for enabling/disabling notifications sent in response to detection of motion events assigned to event category B. In FIG. 9E, display of event indicators for motion events corresponding to event category B is enabled as evinced by the check mark corresponding to indicator filter 926B and notifications are enabled. In FIG. 9E, motion events correlated with the event indicators 922F, 922G, 922H, 922J, and 922K have been retroactively assigned to event category B as shown by the changed display characteristic of the event indicators 922F, 922G, 922H, 922J, and 922K (e.g., the diagonal shading pattern).

FIG. 9E also illustrates client device 504 displaying a notification 928 for a newly detected respective motion event corresponding to event indicator 922L. For example, event category B is recognized prior to or concurrent with detecting the respective motion event. For example, as the respective motion event is detected and assigned to event category B, an event indicator 922L is displayed on the event timeline 910 with the display characteristic for event category B (e.g., the diagonal shading pattern). Continuing with this example, after or as the event indicator 922L is displayed on the event timeline 910, the notification 928 pops-up from the event indicator 922L. In FIG. 9E, the notification 928 notifies the user of the client device 504 that the motion event detected at 12:32:52 pm was assigned to event category B. In some implementations, the notification 928 is at least partially overlaid on the video feed displayed in the first region 903. In some implementations, the notification 928 pops-up from the event timeline 910 and is at least partially overlaid on the video feed displayed in the first region 903 (e.g., in the center of the first region 903 or at the top of the first region 903 as a banner notification). FIG. 9E also illustrates the client device 504 detecting a contact 929 (e.g., a tap gesture) at a location corresponding to the notifications indicator 927A on the touch screen 906.

Figure 9F:
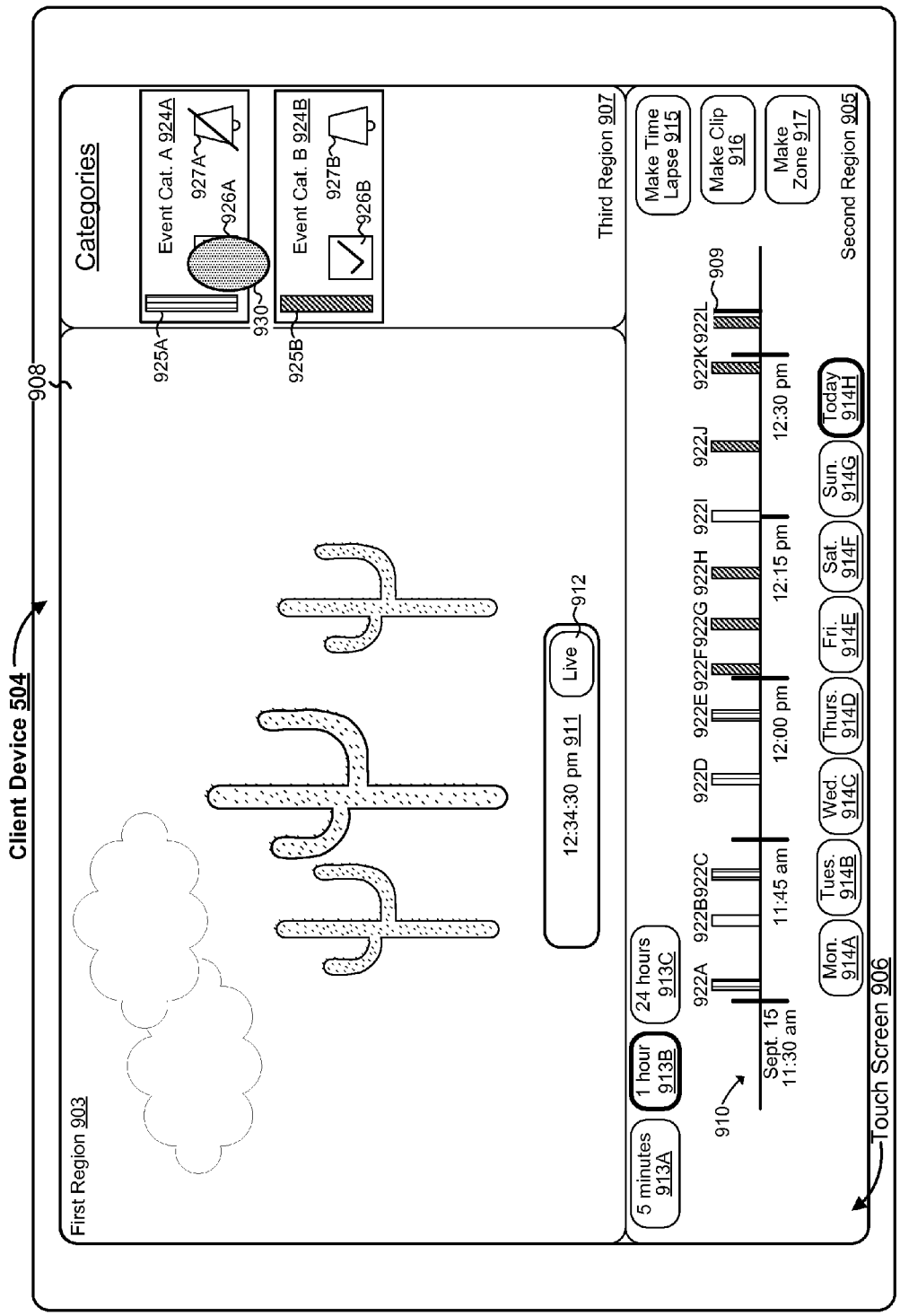

FIG. 9F shows the notifications indicator 927A in the third region 907 as disabled, shown by the line through the notifications indicator 927A, in response to detecting the contact 929 in FIG. 9E. FIG. 9F illustrates the client device 504 detecting a contact 930 (e.g., a tap gesture) at a location corresponding to the indicator filter 926A on the touch screen 906.

Figure 9G:
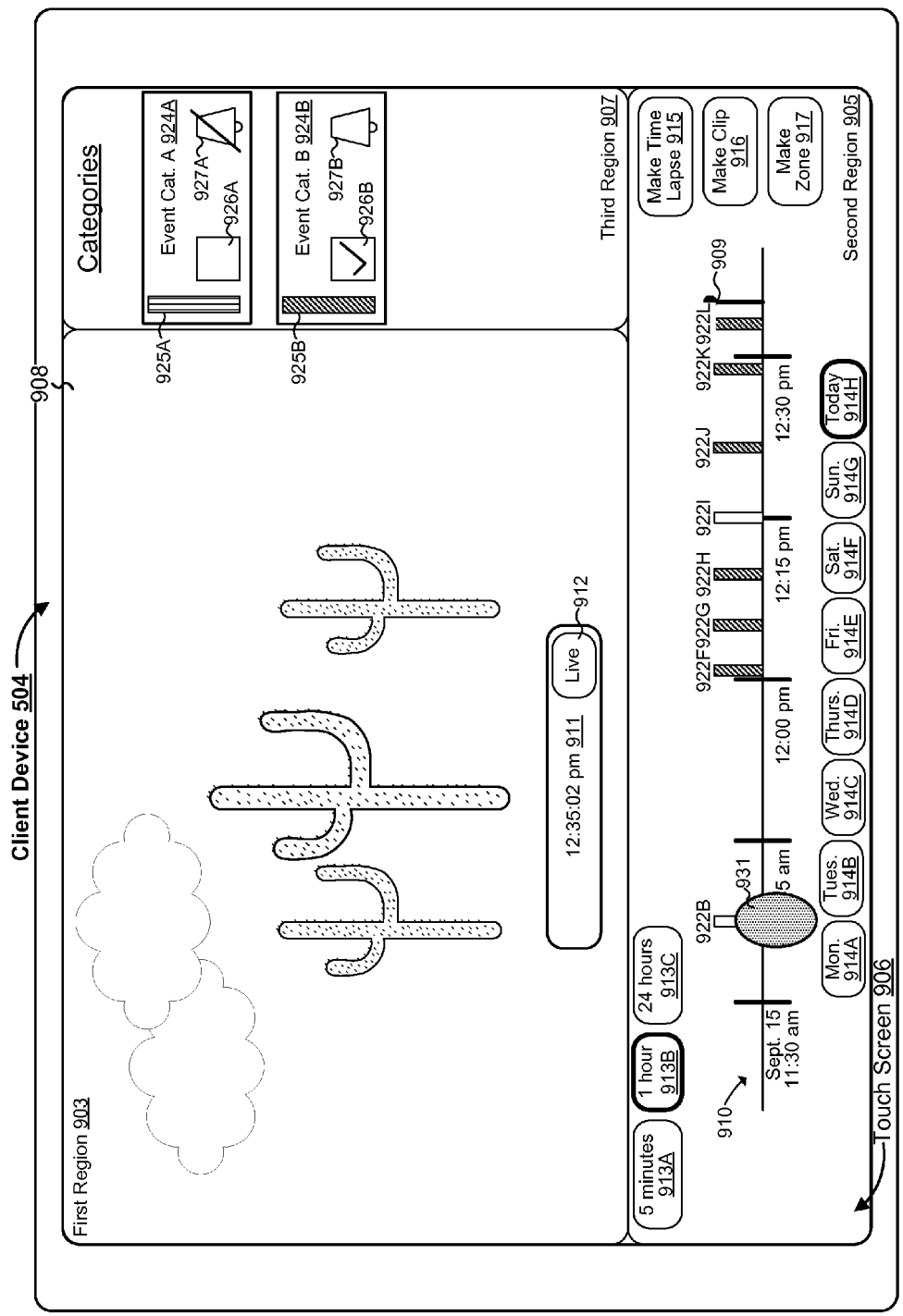

FIG. 9G shows the indicator filter 926A as unchecked in response to detecting the contact 930 in FIG. 9F. Moreover, in FIG. 9G, the client device 504 ceases to display the event indicators 922A, 922C, 922D, and 922E, which correspond to motion events assigned to event category A, on the event timeline 910 in response to detecting the contact 930 in FIG. 9F. FIG. 9G also illustrates the client device 504 detecting a contact 931 (e.g., a tap gesture) at a location corresponding to event indicator 922B on the touch screen 906.

Figure 9H:
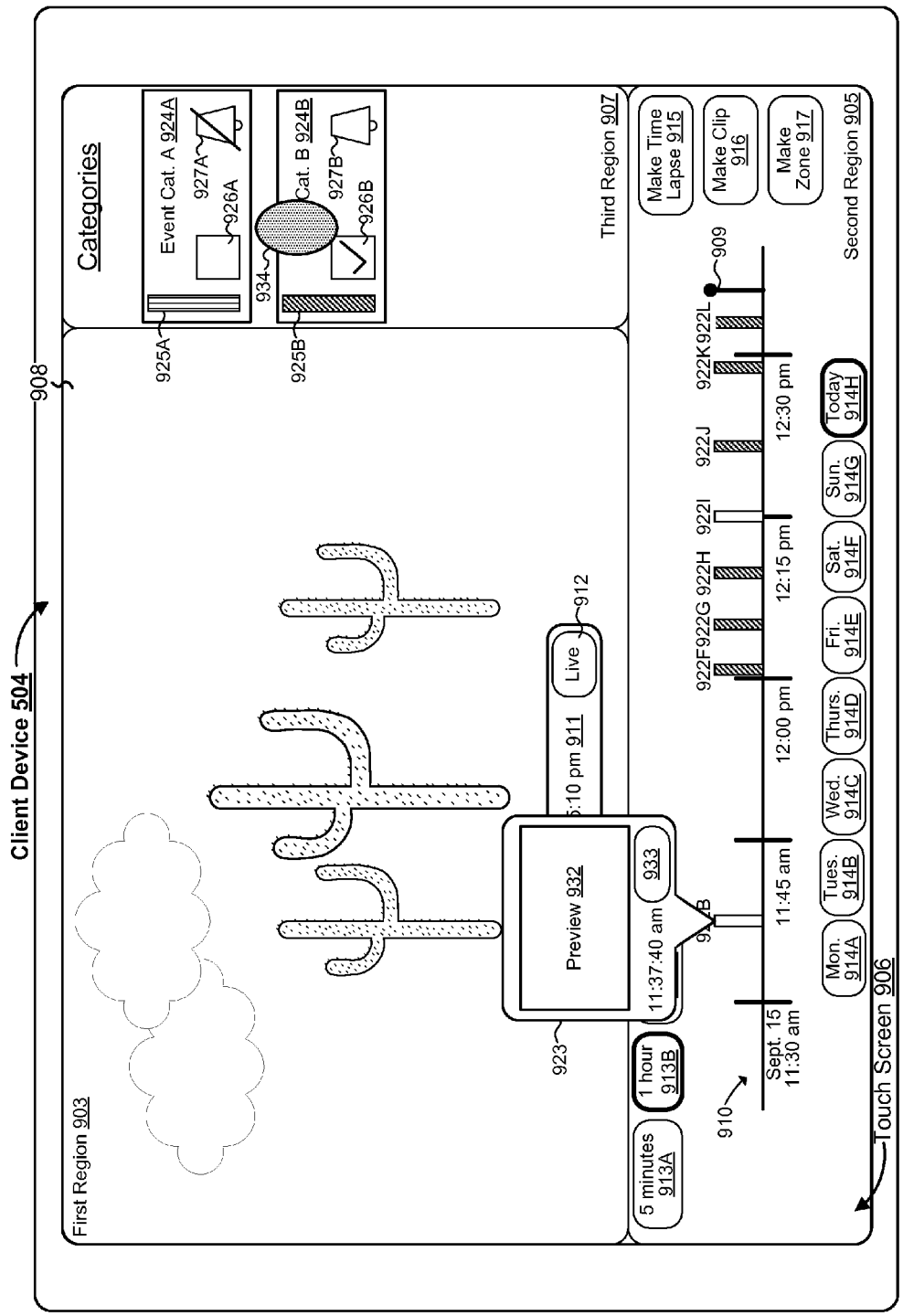

FIG. 9H illustrates the client device 504 displaying a dialog box 923 for a respective motion event correlated with the event indicator 922B in response to detecting selection of the event indicator 922B in FIG. 9G. In some implementations, the dialog box 923 may be displayed in response to sliding or hovering over the event indicator 922B. In FIG. 9H, the dialog box 923 includes the time the respective motion event was detected (e.g., 11:37:40 am) and a preview 932 of the respective motion event (e.g., a static image, a series of images, or a video clip). In FIG. 9H, the dialog box 923 also includes an affordance 933, which, when activated (e.g., with a tap gesture), causes the client device 504 to display an editing user interface (UI) for the event category to which the respective motion event is assigned (if any) and/or the zone or interest which the respective motion event touches or overlaps (if any). FIG. 9H also illustrates the client device 504 detecting a contact 934 (e.g., a tap gesture) at a location corresponding to the entry 924B for event category B on the touch screen 906.

Figure 9I:
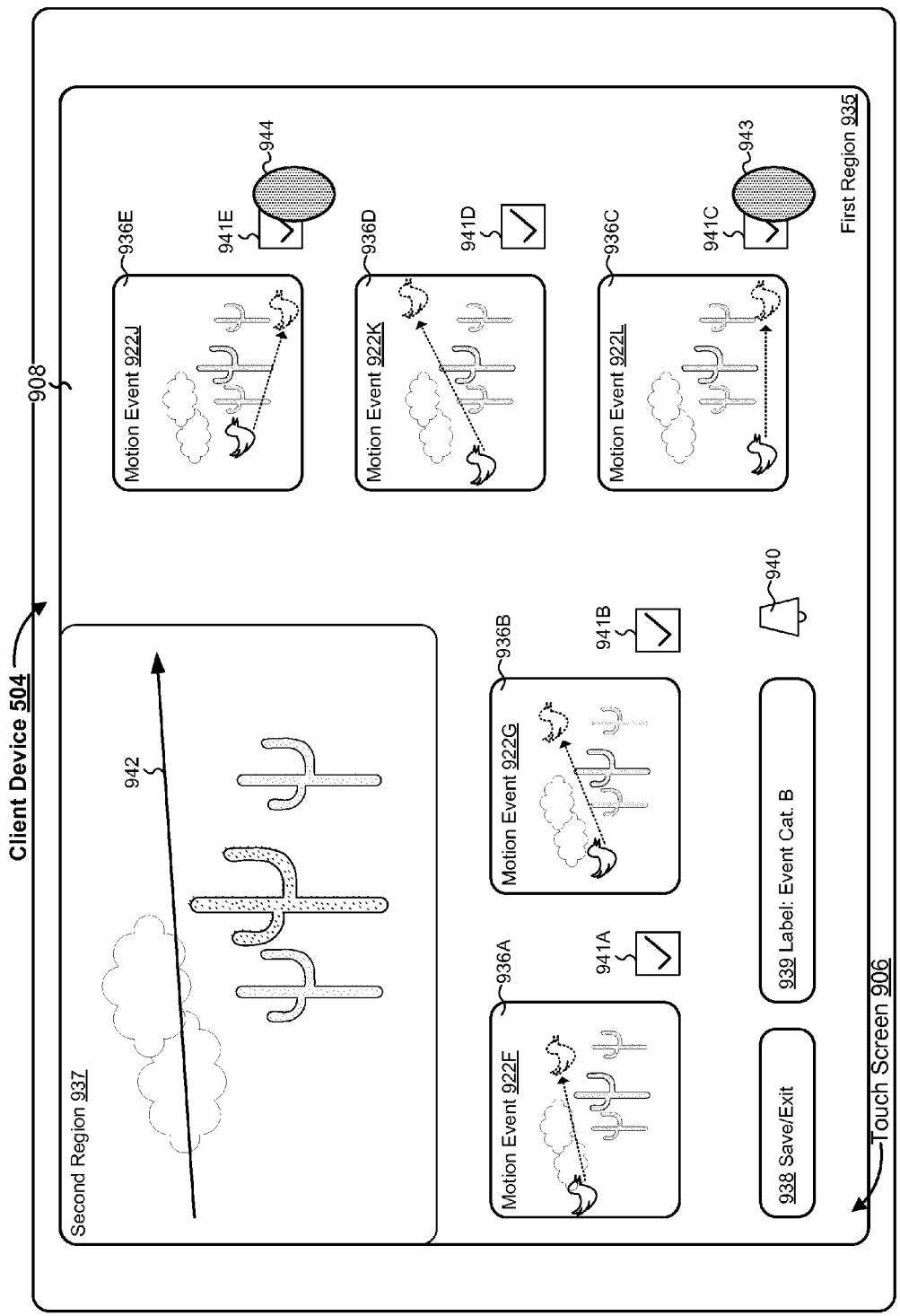

FIG. 9I illustrates the client device 504 displaying an editing user interface (UI) for event category B in response to detecting selection of the entry 924B in FIG. 9H. In FIG. 9I, the editing UI for event category B includes two distinct regions: a first region 935; and a second region 937. The first region 935 includes representations 936 (sometimes also herein called "sprites") of motion events assigned to event category B, where a representation 936A corresponds to the motion event correlated with the event indicator 922F, a representation 936B corresponds to the motion event correlated with the event indicator 922G, a representation 936C corresponds to the motion event correlated with the event indicator 922L, a representation 936D corresponds to the motion event correlated with the event indicator 922K, and a representation 936E corresponds to the motion event correlated with the event indicator 922J. In some implementations, each of the representations 936 is a series of frames or a video clip of a respective motion event assigned to event category B. For example, in FIG. 9I, each of the representations 936 corresponds to a motion event of a bird flying from left to right across the field of view of the respective camera. In FIG. 9I, each of the representations 936 is associated with a checkbox 941. In some implementations, when a respective checkbox 941 is unchecked (e.g., with a tap gesture) the motion event corresponding to the respective checkbox 941 is removed from the event category B and, in some circumstances, the event category B is re-computed based on the removed motion event. For example, the checkboxes 941 enable the user of the client device 504 to remove motion events incorrectly assigned to an event category so that similar motion events are not assigned to the event category in the future.

In FIG. 9I, the first region 935 further includes: a save/exit affordance 938 for saving changes made to event category B or exiting the editing UI for event category B; a label text entry box 939 for renaming the label for the event category from the default name ("event category B") to a custom name; and a notifications indicator 940 for enabling/disabling notifications sent in response to detection of motion events assigned to event category B. In FIG. 9I, the second region 937 includes a representation of the video feed from the respective camera with a linear motion vector 942 representing the typical path of motion for motion events assigned event category B. In some implementations, the representation of the video feed is a static image recently captured from the video feed or the live video feed. FIG. 9I also illustrates the client device 504 detecting a contact 943 (e.g., a tap gesture) at a location corresponding to the checkbox 941C on the touch screen 906 and a contact 944 (e.g., a tap gesture) at a location corresponding to the checkbox 941E on the touch screen 906. For example, the user of the client device 504 intends to remove the motion events corresponding to the representations 936C and 936E as neither shows a bird flying in a west to northeast direction.

Figure 9J:
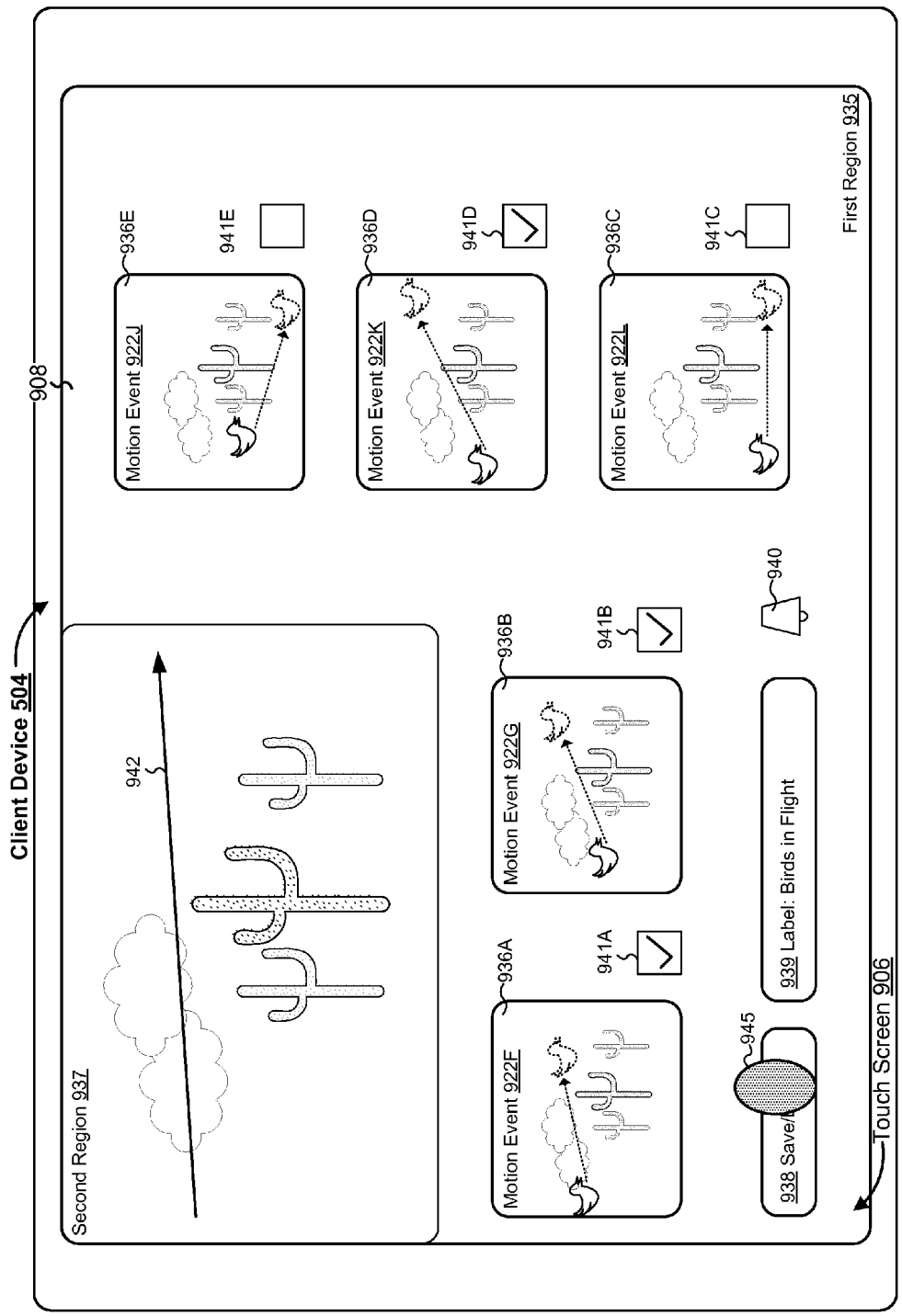
Figure 9K:
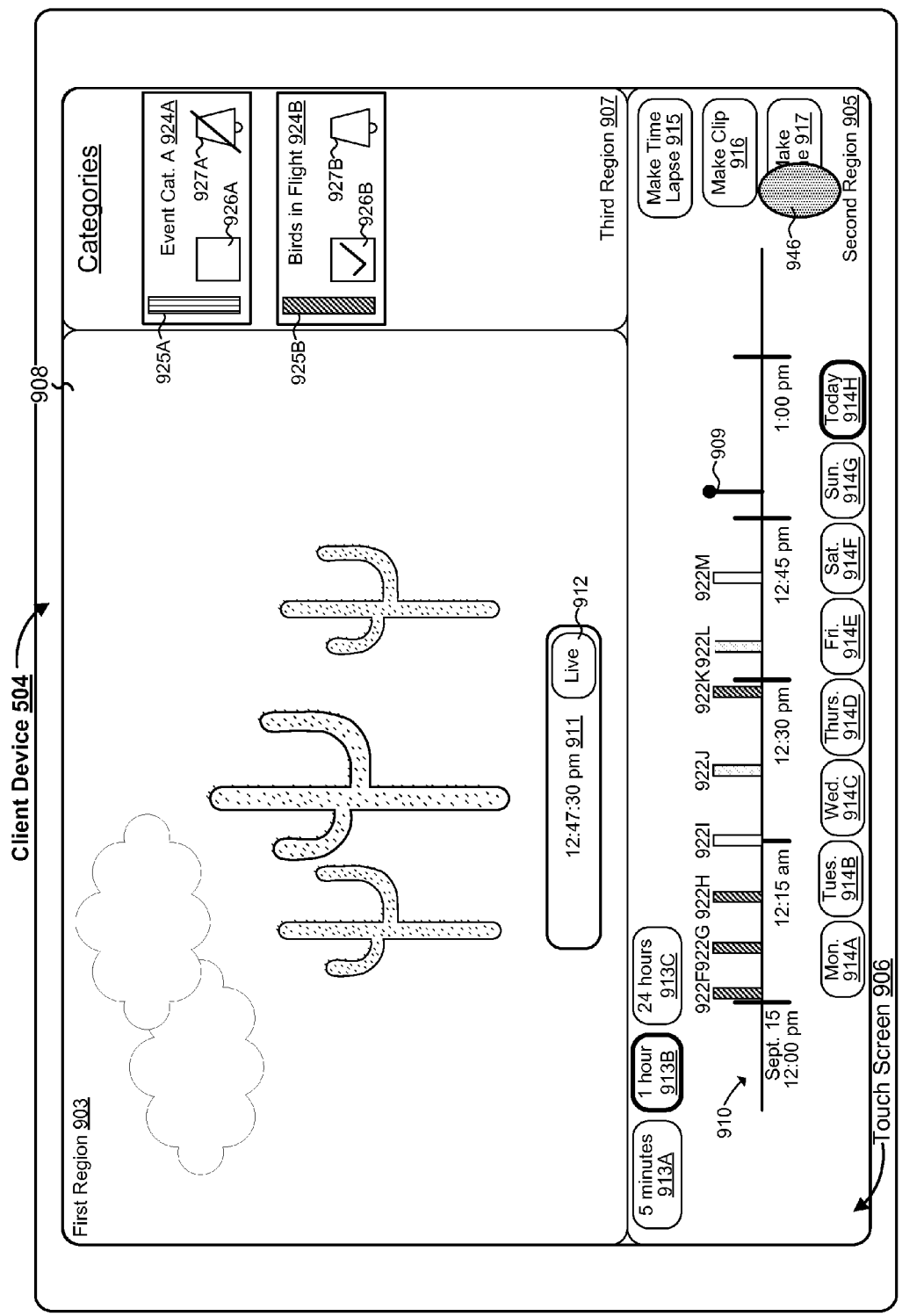
Figure 9L:
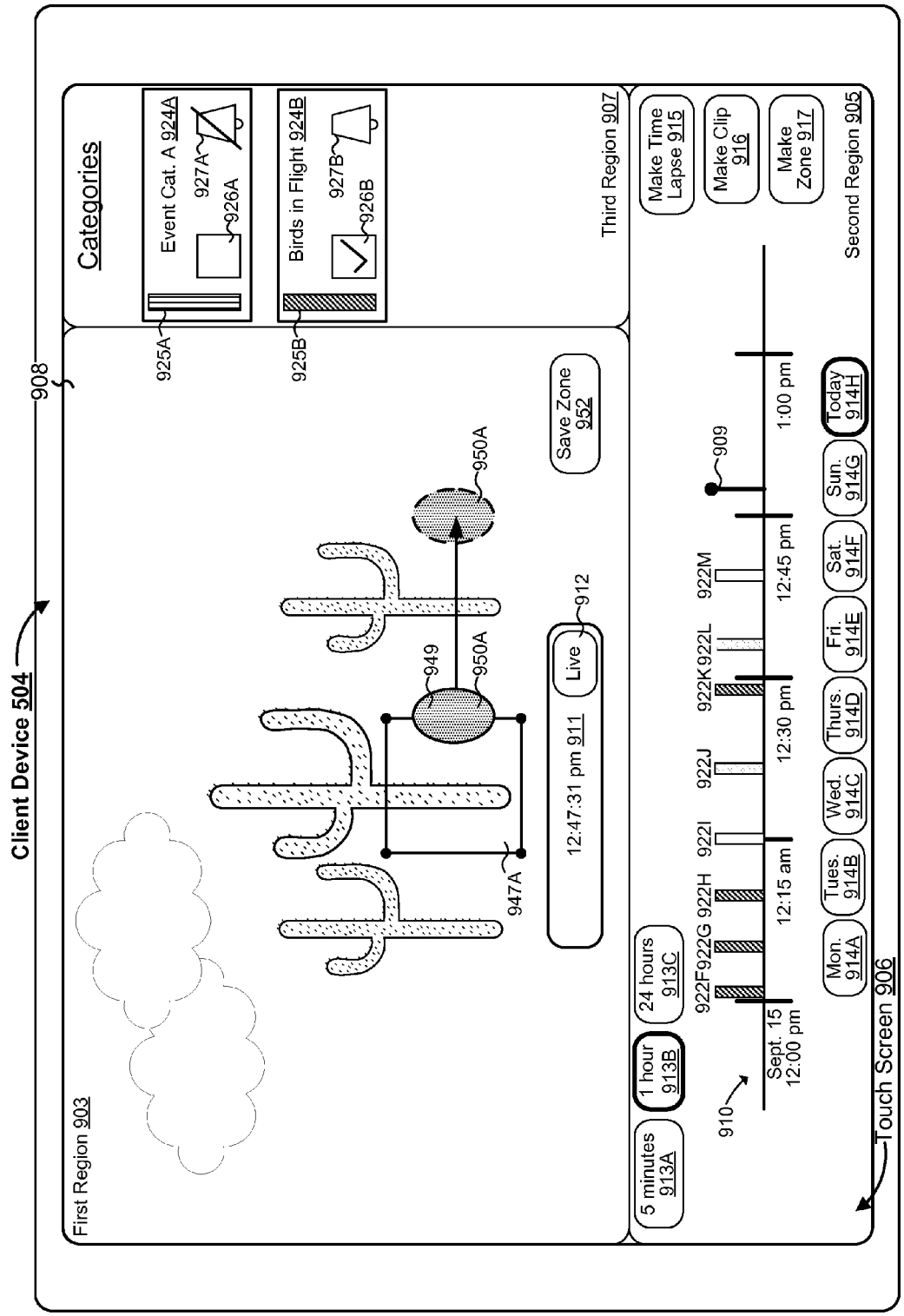
Figure 9M:
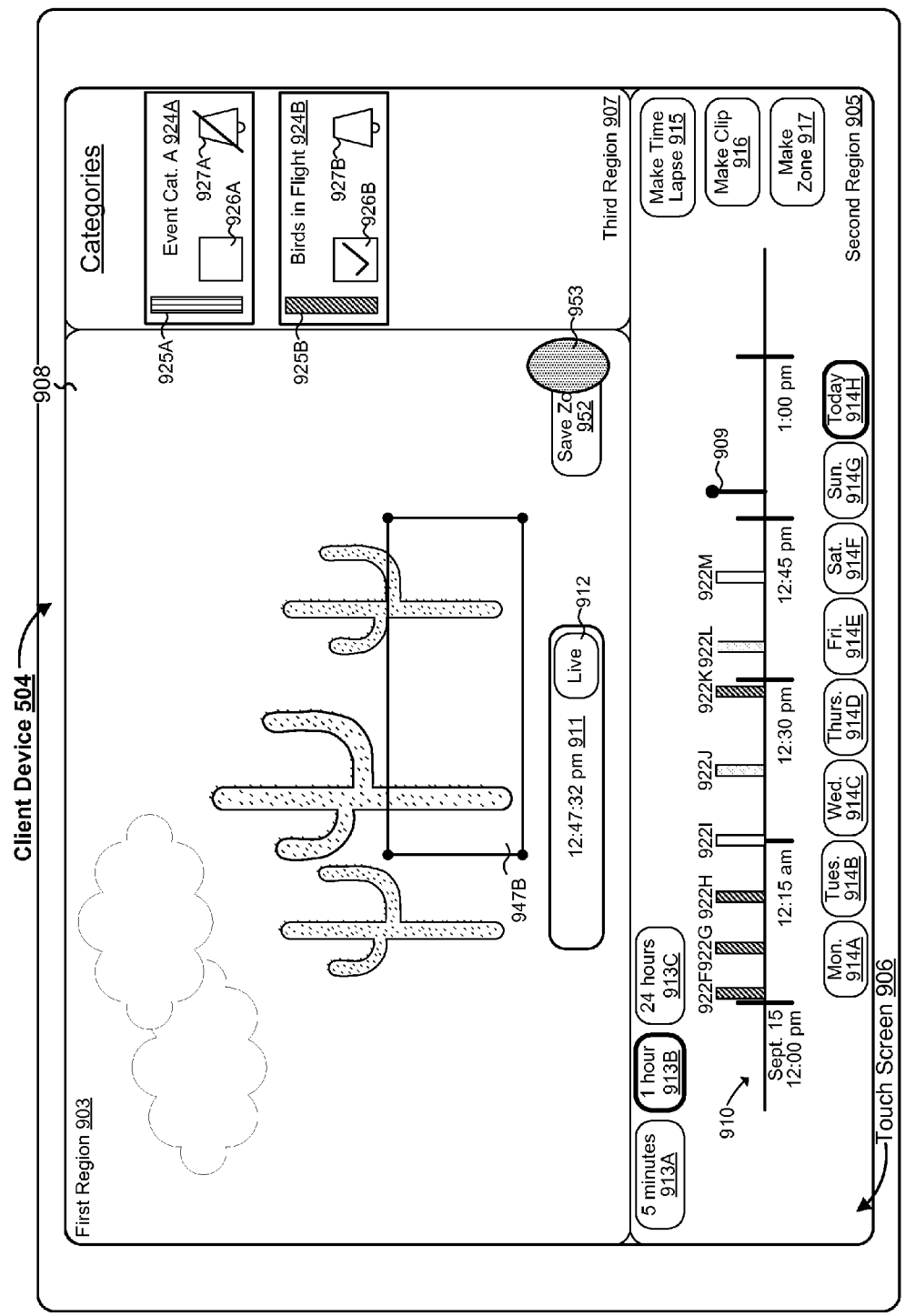

FIG. 9J shows the checkbox 941C corresponding to the motion event correlated with the event indicator 922L and the checkbox 941E corresponding to the motion event correlated with the event indicator 922J as unchecked in response to detecting the contact 943 and the contact 944, respectively, in FIG. 9I. FIG. 9J also shows the label for the event category as "Birds in Flight" in the label text entry box 939 as opposed to "event category B" in FIG. 9I. FIG. 9J illustrates the client device 504 detecting a contact 945 (e.g., a tap gesture) at a location corresponding to the save/exit affordance 938 on the touch screen 906. For example, in response to detecting the contact 945, the client device 504 sends a message to the video server system 508 indicating removal of the motion events corresponding to the representations 936C and 936E from event category B so as to re-compute the algorithm for assigning motion events to event category B (now renamed "Birds in Flight").

FIG. 9K illustrates the client device 504 displaying event indicators 922J and 922L with a changed display characteristic corresponding to uncategorized motion events (i.e., no fill) in response to removal of the representations 936C and 936E, which correspond to the motion events correlated with the event indicators 922J and 922L, from event category B in FIGS. 9I-9J. FIG. 9K also illustrates the client device 504 displaying "Birds in Flight" as the label for the entry 924B in the list of categories in the third region 907 in response to the changed label entered in FIG. 9J. FIG. 9K further illustrates the client device 504 detecting a contact 946 (e.g., a tap gesture) at a location corresponding to "Make Zone" affordance 917 on the touch screen 906.

FIG. 9L illustrates the client device 504 displaying a customizable outline 947A for a zone of interest on the touch screen 906 in response to detecting selection of the "Make Zone" affordance 917 in FIG. 9K. In FIG. 9L, the customizable outline is rectangular, however, one of skill in the art will appreciate that the customizable outline may be polyhedral, circular, any other shape, or a free hand shape drawn on the touch screen 906 by the user of the client device 504. In some implementations, the customizable outline 947A may be adjusted by performing a dragging gesture with any corner or side of the customizable outline 947A. FIG. 9L also illustrates the client device 504 detecting a dragging gesture whereby contact 949 is moved from a first location 950A corresponding to the right side of the customizable outline 947A to a second location 950B. In FIG. 9L, the first region 903 includes "Save Zone" affordance 952, which, when activated (e.g., with a tap gesture), causes creation of the zone of interest corresponding to the customizable outline 947.

FIG. 9M illustrates the client device 504 displaying an expanded customizable outline 947B on the touch screen 906 in response to detecting the dragging gesture in FIG. 9L. FIG. 9M also illustrates the client device 504 detecting a contact 953 (e.g., a tap gesture) at a location corresponding to the "Save Zone" affordance 952 on the touch screen 906. For example, in response to detecting selection of the "Save Zone" affordance 952, the client device 504 causes creation of the zone of interest corresponding to the expanded customizable outline 947B by sending a message to the video server system 508 indicating the coordinates of the expanded customizable outline 947B.

Figure 9N:
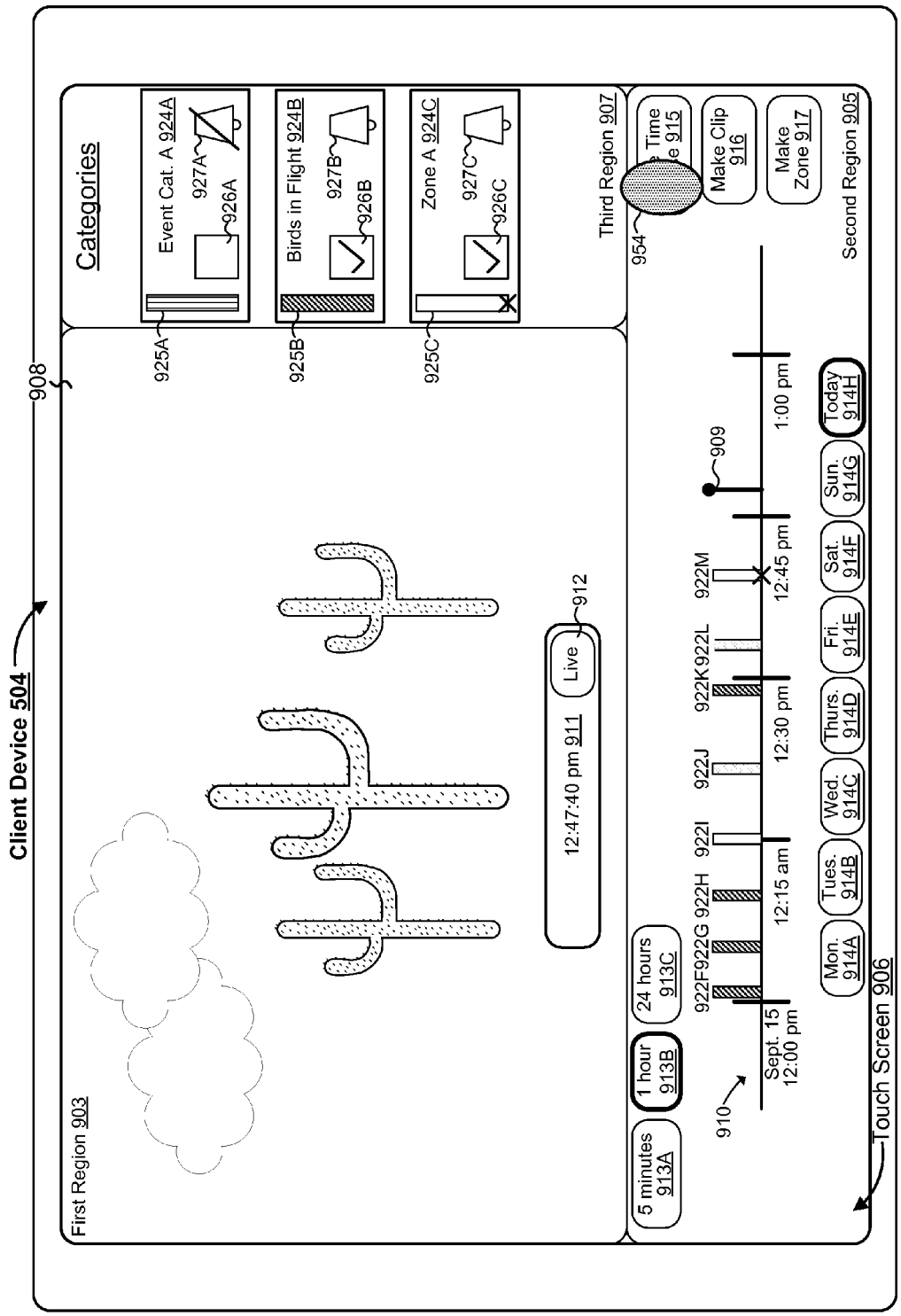

FIG. 9N illustrates the client device 504 displaying an entry 924C for newly created zone A in the list of categories in the third region 907 in response to creating the zone of interest in FIGS. 9L-9M. The entry 924C for newly created zone A includes: a display characteristic indicator 925C representing the display characteristic for event indicators corresponding to motion events that touch or overlap zone A (e.g., an 'X' at the bottom of the event indicator); an indicator filter 926C for enabling/disabling display of event indicators on the event timeline 910 for motion events that touch or overlap zone A; and a notifications indicator 927C for enabling/disabling notifications sent in response to detection of motion events that touch or overlap zone A. In FIG. 9N, display of event indicators for motion events that touch or overlap zone A is enabled as evinced by the check mark corresponding to indicator filter 926C and notifications are enabled. In FIG. 9N, the motion event correlated with the event indicator 922M has been retroactively associated with zone A as shown by the changed display characteristic of the event indicator 922M (e.g., the 'X' at the bottom of the event indicator 922M). FIG. 9N also illustrates the client device 504 detecting a contact 954 (e.g., a tap gesture) at a location corresponding to the "Make Time-Lapse" affordance 915 on the touch screen 906.

Figure 9O:
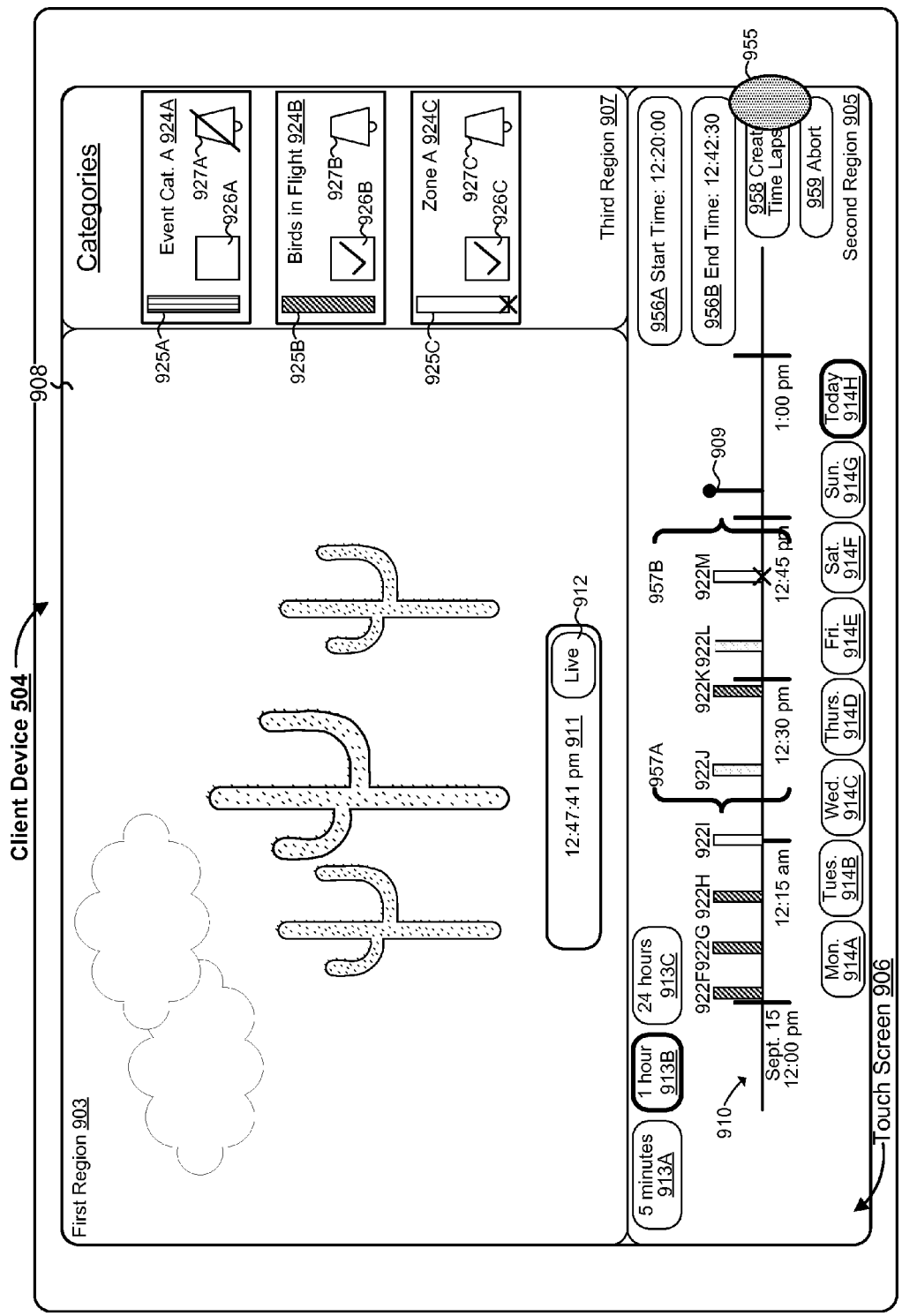

FIG. 9O illustrates the client device 504 displaying controls for generating a time-lapse video clip in response to detecting selection of the "Make Time-Lapse" affordance 915 in FIG. 9N. In FIG. 9O, the second region 905 includes a start time entry box 956A for entering/changing a start time of the time-lapse video clip to be generated and an end time entry box 956B for entering/changing an end time of the time-lapse video clip to be generated. In FIG. 9O, the second region 905 also includes a start time indicator 957A and an end time indicator 957B on the event timeline 910, which indicate the start and end times of the time-lapse video clip to be generated. In some implementations, the locations of the start time indicator 957A and the end time indicator 957B may be moved on the event timeline 910 via pulling/dragging gestures.

In FIG. 9O, the second region 905 further includes a "Create Time-lapse" affordance 958, which, when activated (e.g., with a tap gesture) causes generation of the time-lapse video clip based on the selected portion of the event timeline 910 corresponding to the start and end times displayed by the start time entry box 956A (e.g., 12:20:00 pm) and the end time entry box 956B (e.g., 12:42:30 pm) and also indicated by the start time indicator 957A and the end time indicator 957B. In some implementations, prior to generation of the time-lapse video clip and after selection of the "Create Time-Lapse" affordance 958, the client device 504 displays a dialog box that enables the user of the client device 504 to select a length of the time-lapse video clip (e.g., 30, 60, 90, etc. seconds). In FIG. 9O, the second region 905 further includes an "Abort" affordance 959, which, when activated (e.g., with a tap gesture) causes the client device 504 to display a previous UI (e.g., the video monitoring UI in FIG. 9N). FIG. 9O further illustrates the client device 504 detecting a contact 955 (e.g., a tap gesture) at a location corresponding to the "Create Time-Lapse" affordance 958 on the touch screen 906.

In some implementations, the time-lapse video clip is generated by the client device 504, the video server system 508, or a combination thereof. In some implementations, motion events within the selected portion of the event timeline 910 are played at a slower speed than the balance of the selected portion of the event timeline 910. In some implementations, motion events within the selected portion of the event timeline 910 that are assigned to enabled event categories and motion events within the selected portion of the event timeline 910 that touch or overlap enabled zones are played at a slower speed than the balance of the selected portion of the event timeline 910 including motion events assigned to disabled event categories and motion events that touch or overlap disabled zones.

Figure 9P:
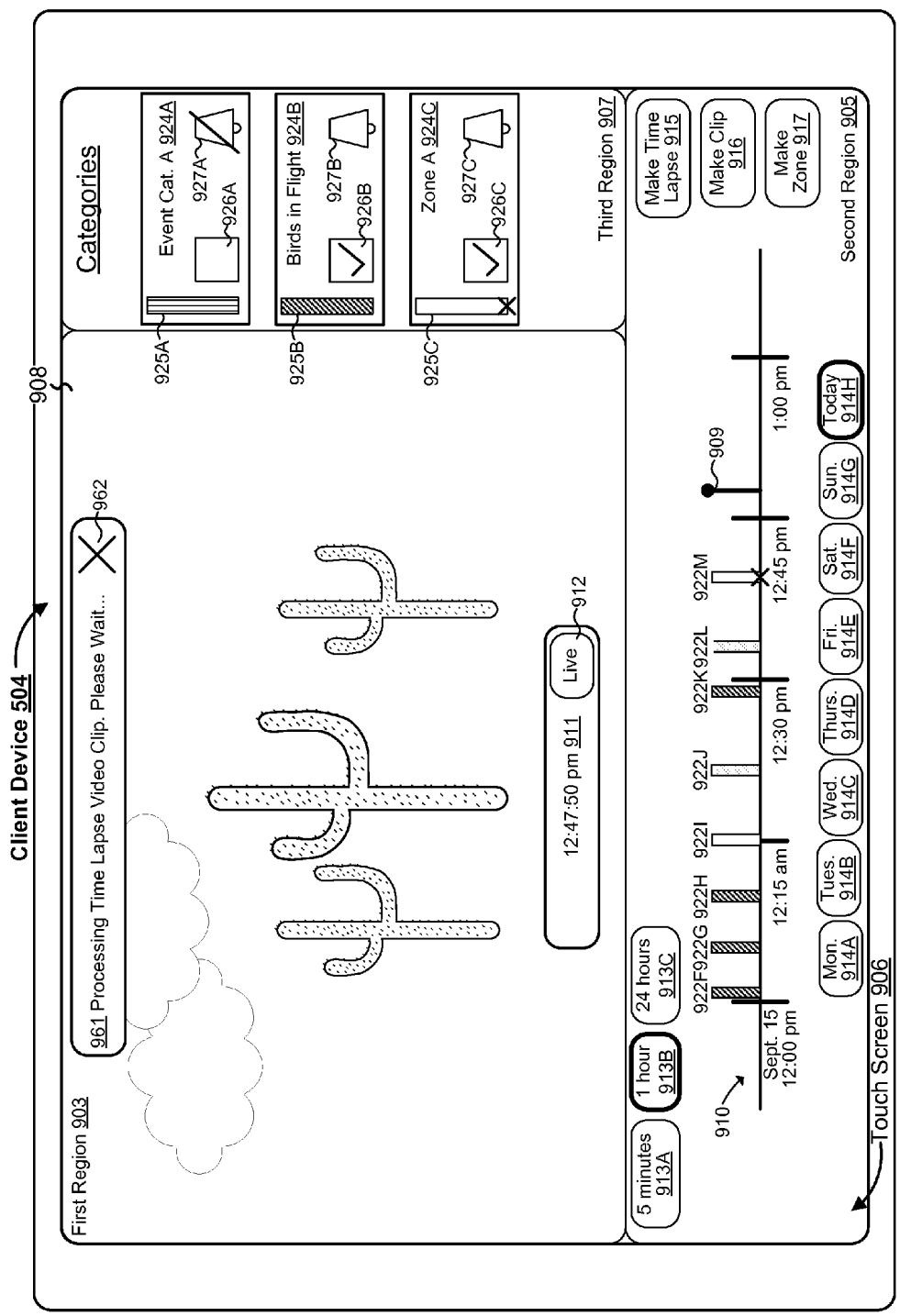
Figure 9Q:
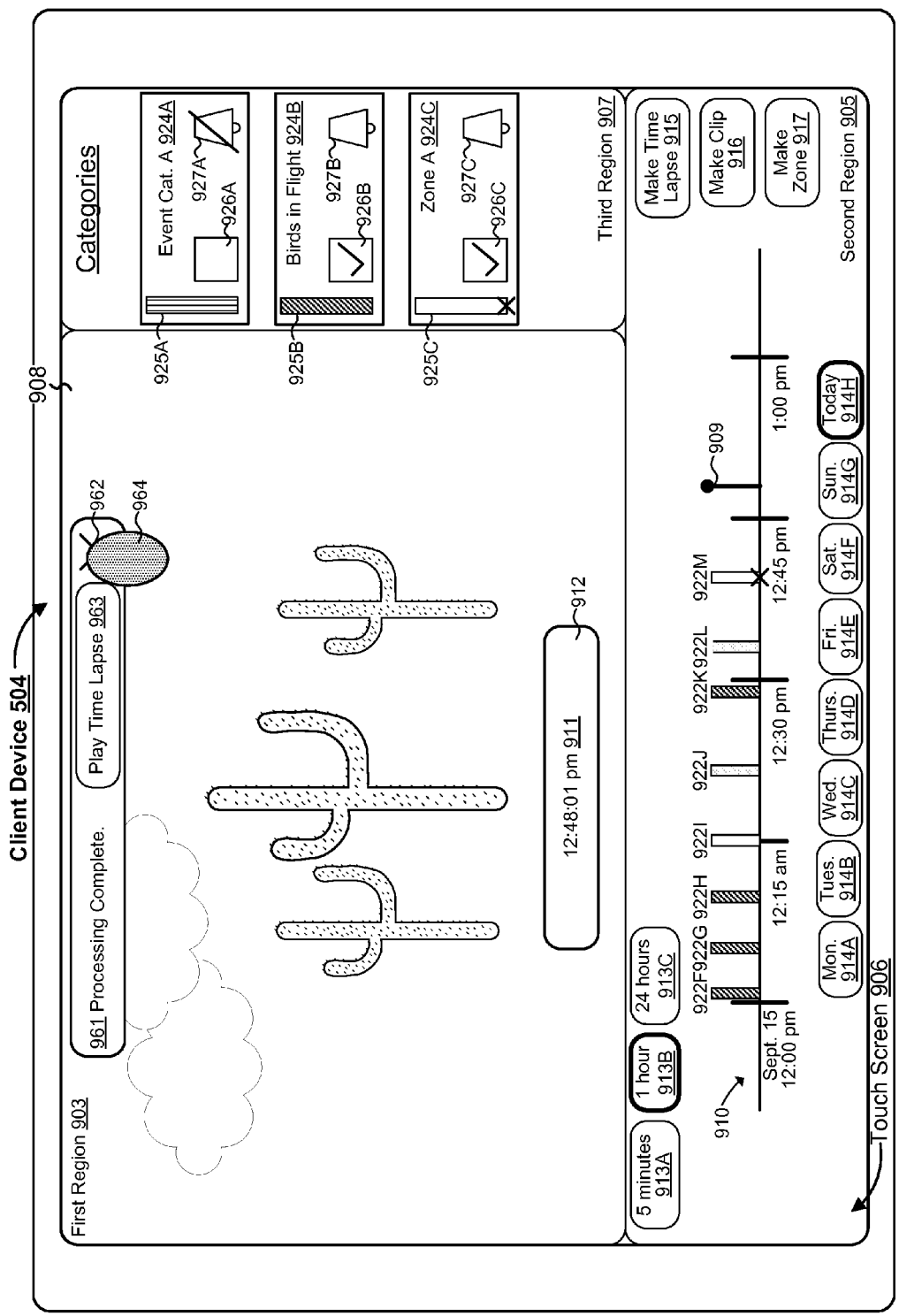

FIG. 9P illustrates the client device 504 displaying a notification 961 overlaid on the first region 903 in response to detecting selection of the "Create Time-Lapse" affordance 958 in FIG. 9O. In FIG. 9P, the notification 961 indicates that the time-lapse video clip is being processed and also includes an exit affordance 962, which, when activated (e.g., with a tap gesture), causes the client device 504 the client device 504 to dismiss the notification 961. At a time subsequent, the notification 961 in FIG. 9Q indicates that processing of the time-lapse video clip is complete and includes a "Play Time-Lapse" affordance 963, which, when activated (e.g., with a tap gesture), causes the client device 504 to play the time-lapse video clip. FIG. 9Q illustrates the client device 504 detecting a contact 964 at a location corresponding to the exit affordance 962 on the touch screen 906.

Figure 9R:
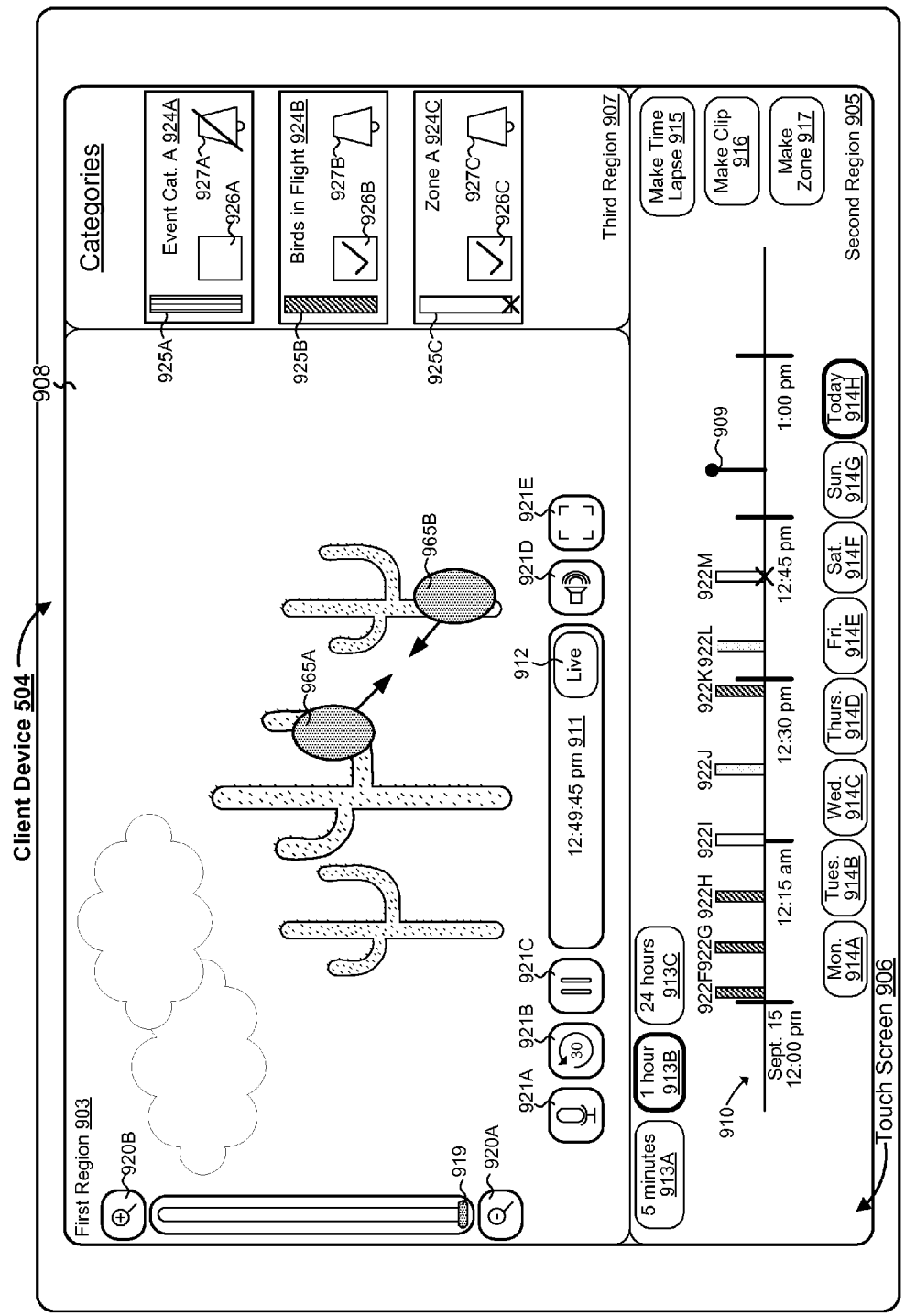

FIG. 9R illustrates the client device 504 ceasing to display the notification 961 in response to detecting selection of the exit affordance 962 in FIG. 9Q. FIG. 9R also illustrates the client device 504 detecting a pinch-in gesture with contacts 965A and 965B relative to a respective portion of the video feed in the first region 903 on the touch screen 906.

Figure 9S:
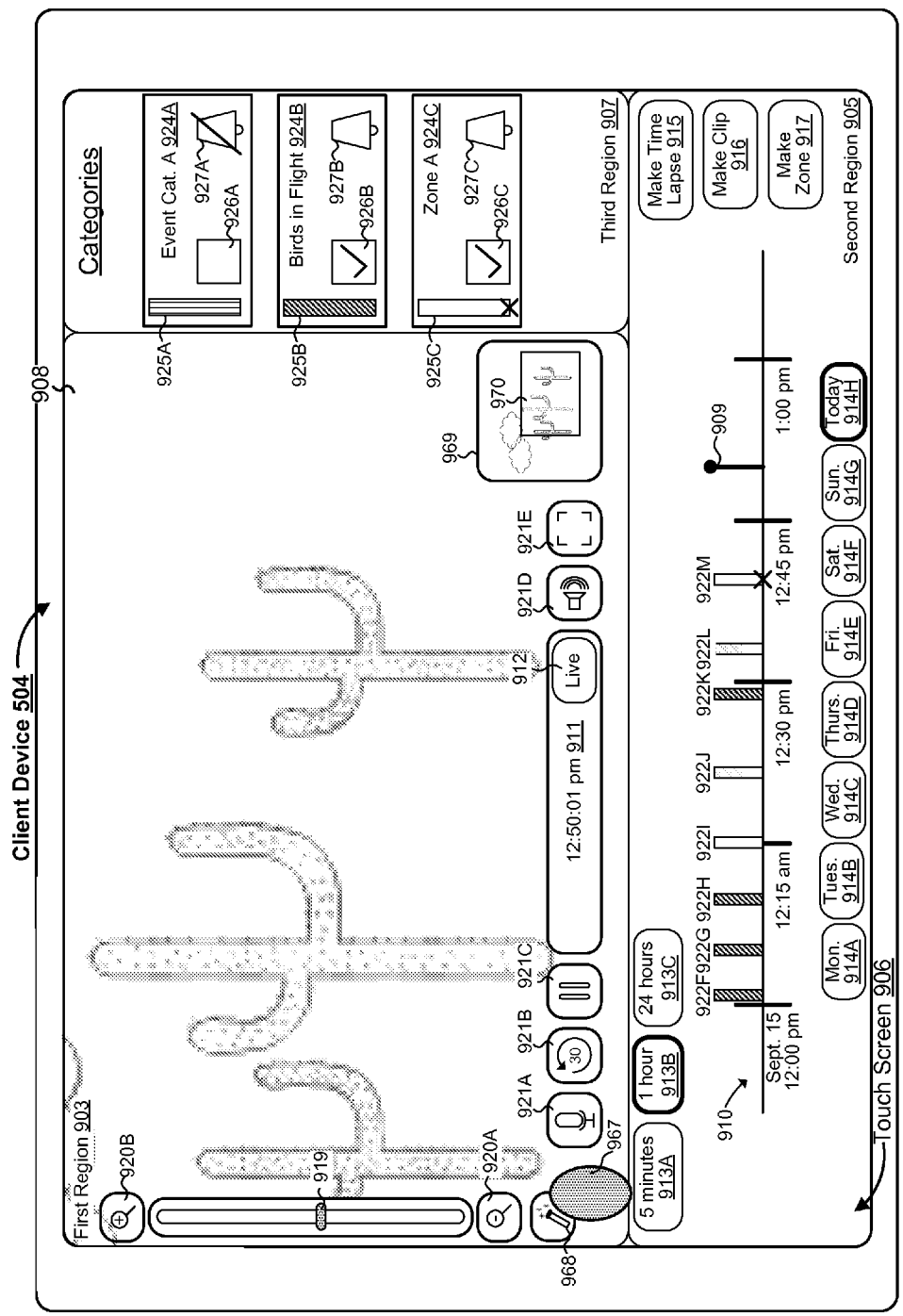

FIG. 9S illustrates the client device 504 displaying a zoomed-in portion of the video feed in response to detecting the pinch-in gesture on the touch screen 906 in FIG. 9R. In some implementations, the zoomed-in portion of the video feed corresponds to a software-based zoom performed locally by the client device 504 on the respective portion of the video feed corresponding to the pinch-in gesture in FIG. 9R. In FIG. 9S, the handle 919 of the elevator bar indicates the current zoom magnification of the video feed and a perspective box 969 indicates the zoomed-in portion 970 relative to the full field of view of the respective camera. In some implementations, the video monitoring UI further indicates the current zoom magnification in text.

In FIG. 9S, the video controls in the first region 903 further include an enhancement affordance 968, which, when activated (e.g., with a tap gesture) causes the client device 504 to send a zoom command to the respective camera. In some implementations, the zoom command causes the respective camera to perform a zoom operation at the zoom magnification corresponding to the distance between contacts 965A and 965B of the pinch-in gesture in FIG. 9R on the respective portion of the video feed corresponding to the pinch-in gesture in FIG. 9R. In some implementations, the zoom command is relayed to the respective camera by the video server system 508. In some implementations, the zoom command is sent directly to the respective camera by the client device 504. FIG. 9S also illustrates the client device 504 detecting a contact 967 at a location corresponding to the enhancement affordance 968 on the touch screen 906.

Figure 9T:
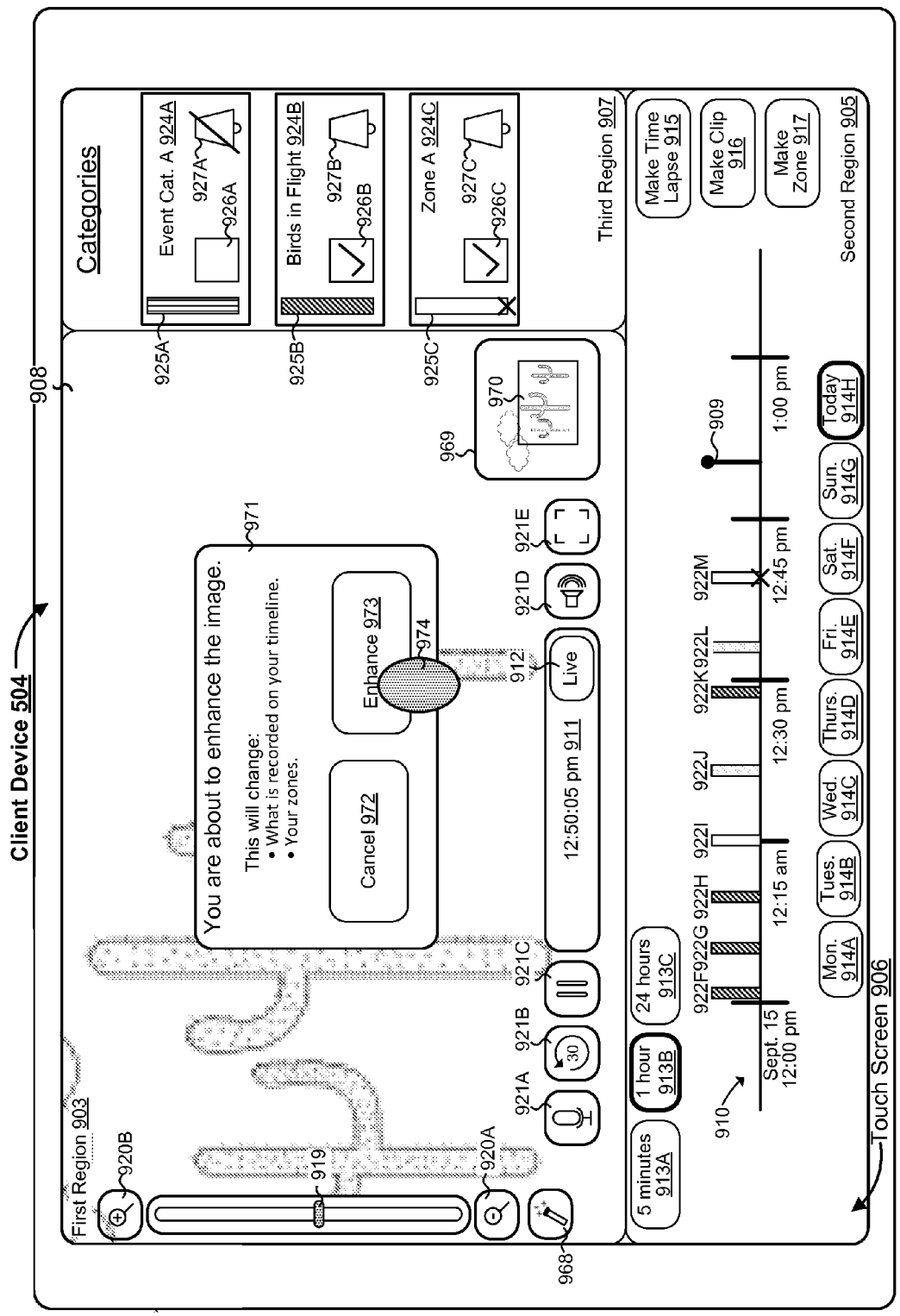

FIG. 9T illustrates the client device 504 displaying a dialog box 971 in response to detecting selection of the enhancement affordance 968 in FIG. 9S. In FIG. 9T, the dialog box 971 warns the user of the client device 504 that enhancement of the video feed will cause changes to the recorded video footage and also causes changes to any previously created zones of interest. In FIG. 9T, the dialog box 971 includes: a cancel affordance 972, which, when activated (e.g., with a tap gesture) causes the client device 504 to cancel of the enhancement operation and consequently cancel sending of the zoom command; and an enhance affordance 973, when activated (e.g., with a tap gesture) causes the client device 504 to send the zoom command to the respective camera. FIG. 9T also illustrates the client device 504 detecting a contact 974 at a location corresponding to the enhance affordance 973 on the touch screen 906.

Figure 9U:
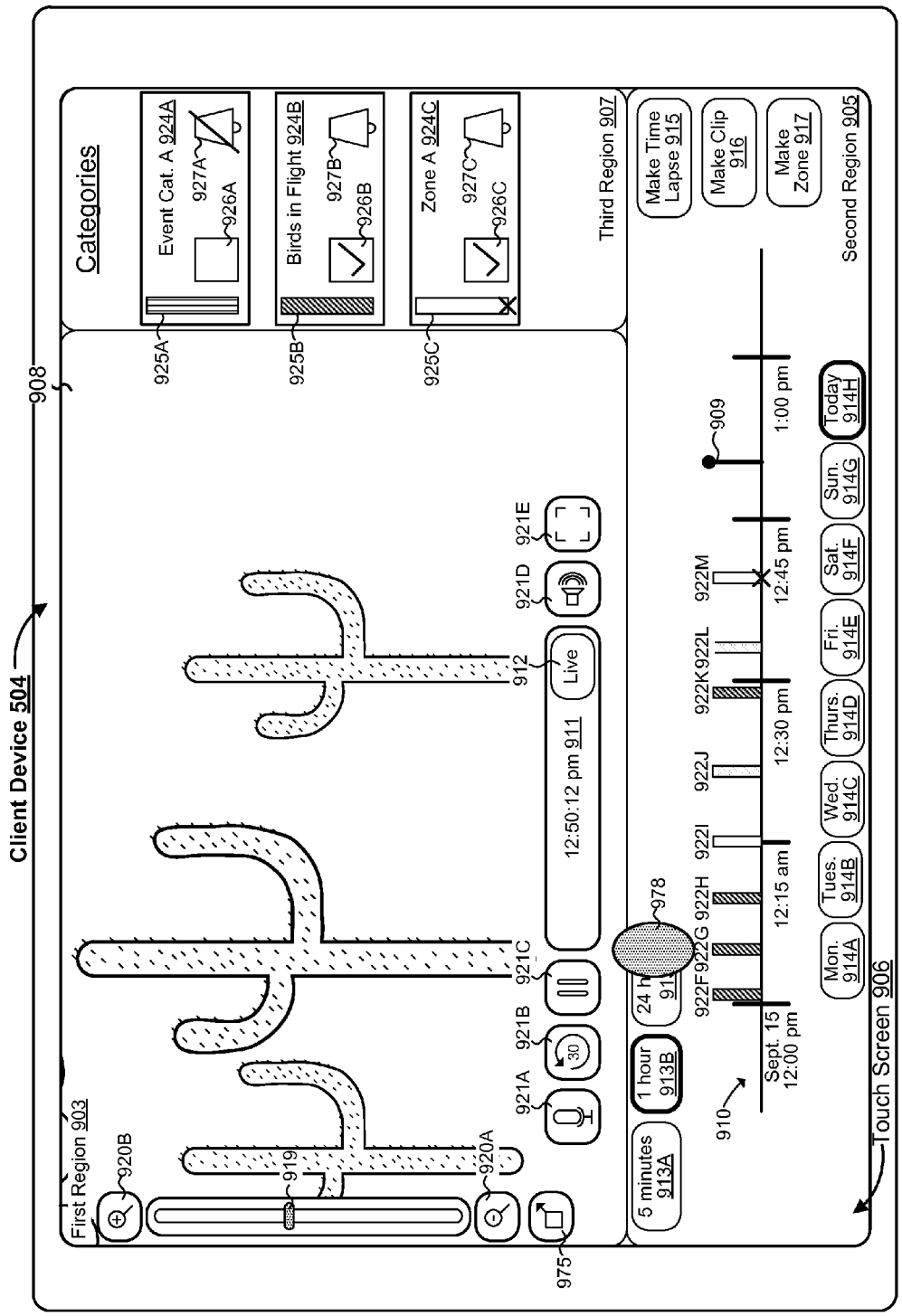

FIG. 9U illustrates the client device 504 displaying the zoomed-in portion of the video feed at a higher resolution as compared to FIG. 9S in response to detecting selection of the enhance affordance 973 in FIG. 9T. In some implementations, in response to sending the zoom command, the client device 504 receives a higher resolution video feed (e.g., 780i, 720p, 1080i, or 1080p) of the zoomed-in portion of the video feed. In FIG. 9U, the video controls in the first region 903 further include a zoom reset affordance 975, which, when activated (e.g., with a tap gesture) causes the client device 504 reset the zoom magnification of the video feed to its original setting (e.g., as in FIG. 9R prior to the pinch-in gesture). FIG. 9U also illustrates the client device 504 detecting a contact 978 at a location corresponding to the 24 hours affordance 913C on the touch screen 906.

Figure 9V:
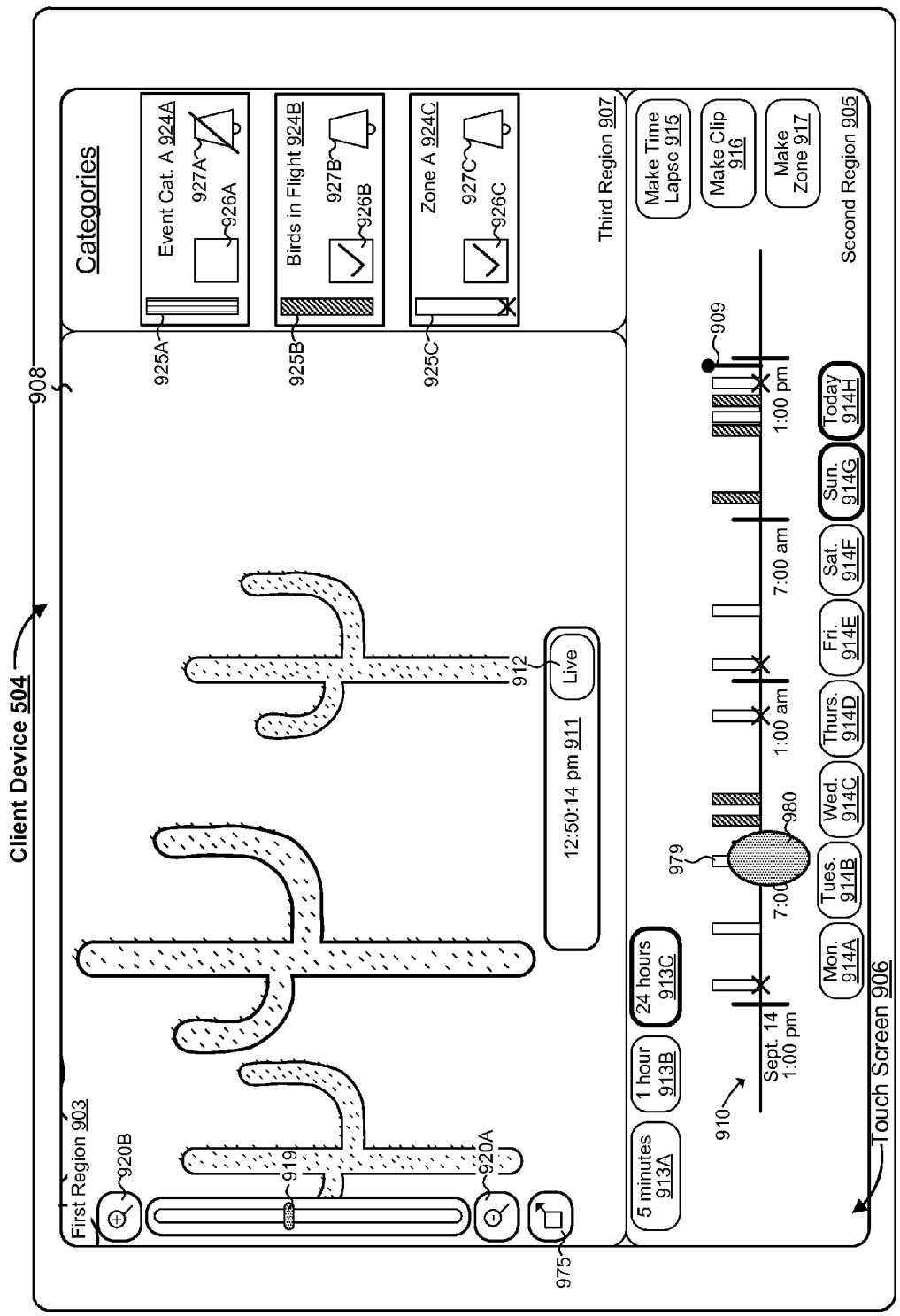

FIG. 9V illustrates the client device 504 displaying the event timeline 910 with a 24 hour scale in response to detecting selection of the 24 hours affordance 913C in FIG. 9U. FIG. 9V also illustrates the client device 504 detecting a contact 980 (e.g., a tap gesture) at a location corresponding to an event indicator 979 on the touch screen 906.

Figure 9W:
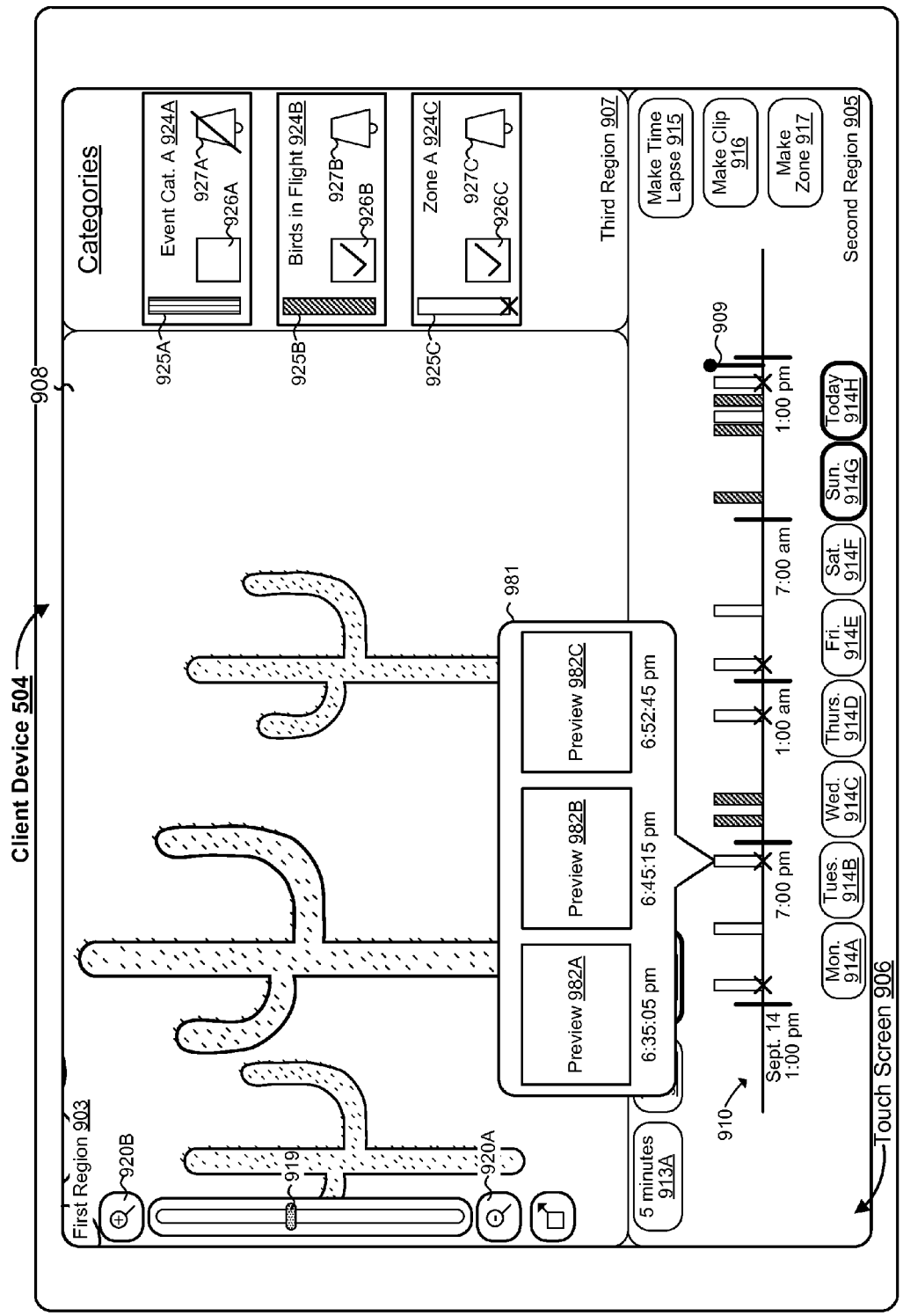

FIG. 9W illustrates the client device 504 displaying a dialog box 981 for respective motion events correlated with the event indicator 979 in response to detecting selection of the event indicator 979 in FIG. 9V. In some implementations, the dialog box 981 may be displayed in response to sliding or hovering over the event indicator 979. In FIG. 9W, the dialog box 981 includes the times at which the respective motion events were detected (e.g., 6:35:05 am, 6:45:15 am, and 6:52:45 am). In FIG. 9W, the dialog box 981 also includes previews 982A, 982B, and 982C of the respective motion events (e.g., a static image, a series of images, or a video clip).

Figure 9X:
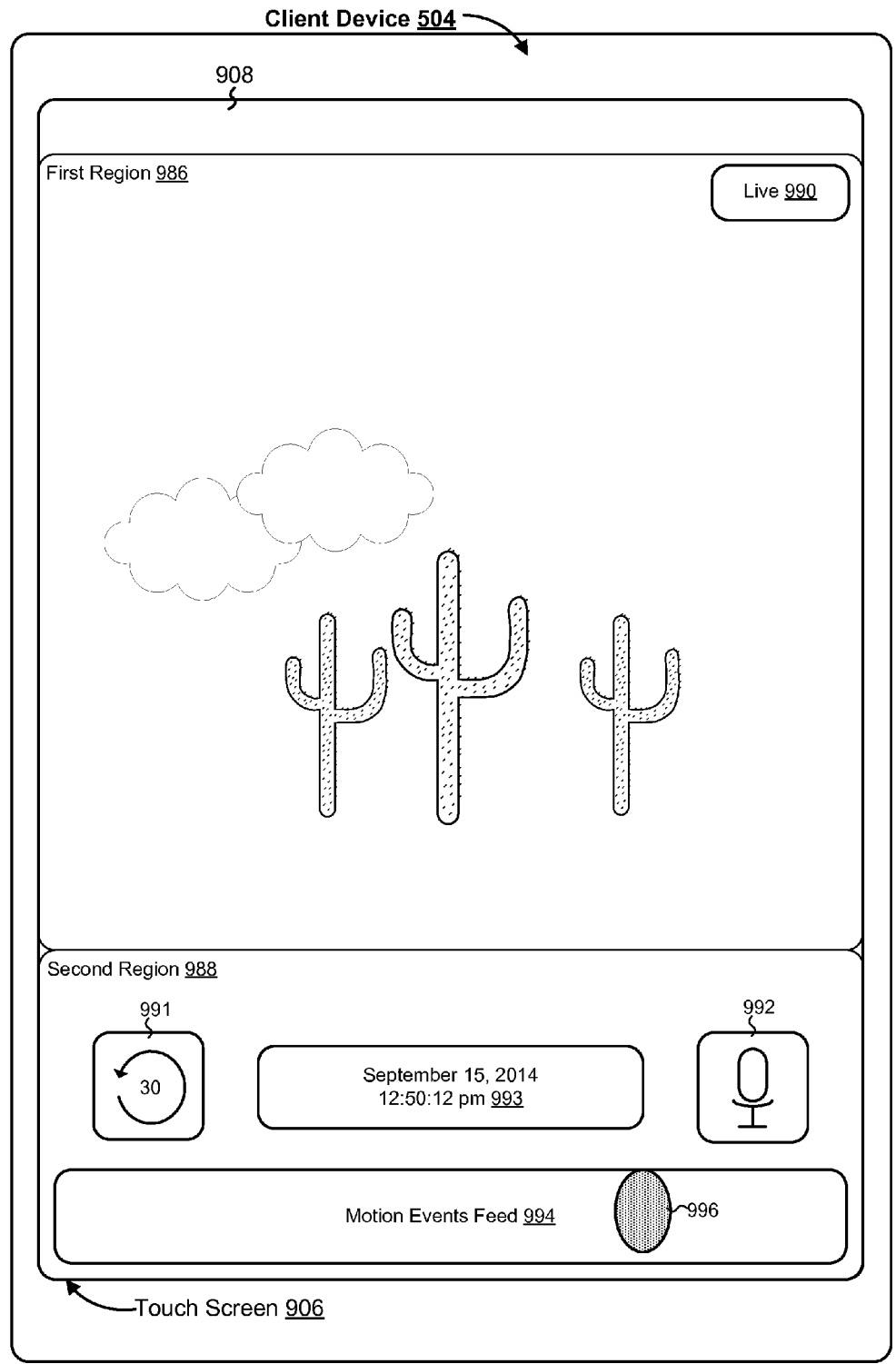

FIG. 9X illustrates the client device 504 displaying a second implementation of a video monitoring user interface (UI) of the application on the touch screen 906. In FIG. 9X, the video monitoring UI includes two distinct regions: a first region 986; and a second region 988. In FIG. 9X, the first region 986 includes a video feed from a respective camera among the one or more camera 118 associated with the smart home environment 100. For example, the respective camera is located on the back porch of the user's domicile or pointed out of a window of the user's domicile. The first region 986 includes an indicator 990 indicating that the video feed being displayed in the first region 986 is a live video feed. In some implementations, if the video feed being displayed in the first region 986 is recorded video footage, the indicator 990 is instead displayed as a "Go Live" affordance, which, when activated (e.g., with a tap gesture), causes the client device to display the live video feed from the respective camera in the first region 986.

In FIG. 9X, the second region 988 includes a text box 993 indicating the time and date of the video feed being displayed in the first region 986. In FIG. 9X, the second region 988 also includes: an affordance 991 for rewinding the video feed displayed in the first region 986 by 30 seconds; and an affordance 992 for enabling/disabling the microphone of the respective camera associated with the video feed displayed in the first region 986. In FIG. 9X, the second region 988 further includes a "Motion Events Feed" affordance 994, which, when activated (e.g., via a tap gesture), causes the client device 504 to display a motion event timeline (e.g., the user interface shown in FIGS. 9Y-9Z). FIG. 9X also illustrates the client device 504 detecting a contact 996 (e.g., a tap gesture) at a location corresponding to the "Motion Events Feed" affordance 994 on the touch screen 906.

Figure 9Y:
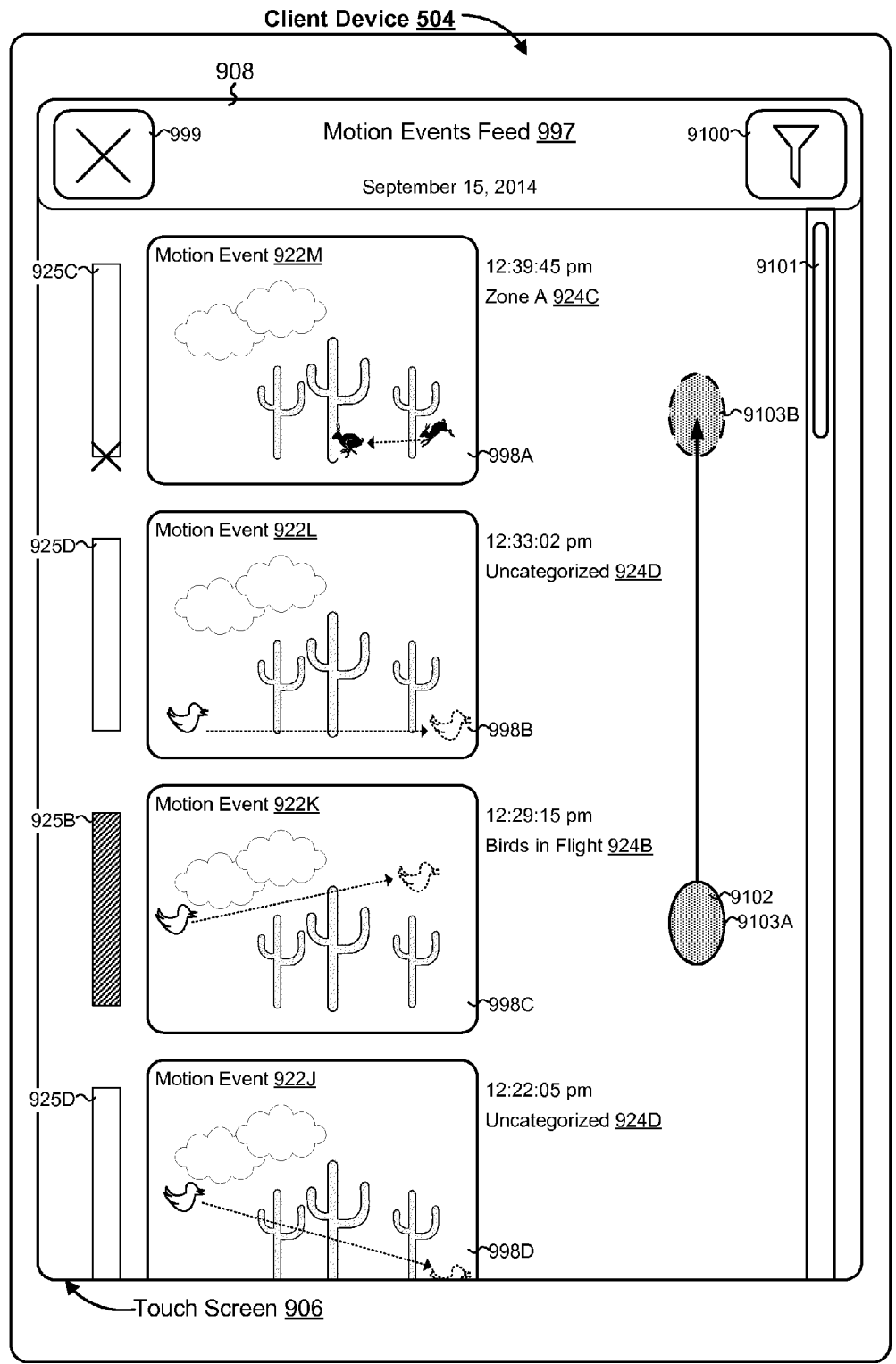

FIG. 9Y illustrates the client device 504 displaying a first portion of a motion events feed 997 in response to detecting selection of the "Motion Events Feed" affordance 994 in FIG. 9X. In FIG. 9Y, the motion events feed 997 includes representations 998 (sometimes also herein called "sprites") of motion events. In FIG. 9Y, each of the representations 998 is associated with a time at which the motion event was detected, and each of the representations 998 is associated with an event category to which it is assigned to the motion event (if any) and/or a zone which it touches or overlaps (if any). In FIG. 9Y, each of the representations 998 is associated with a unique display characteristic indicator 925 representing the display characteristic for the event category to which it is assigned (if any) and/or the zone which it touches or overlaps (if any). For example, the representation 998A corresponds to a respective motion event that was detected at 12:39:45 pm which touches or overlaps zone A. Continuing with this example, the display characteristic indicator 925C indicates that the respective motion event corresponding to the representation 998A touches or overlaps zone A.

In FIG. 9Y, the motion events feed 997 also includes: an exit affordance 999, which, when activated (e.g., via a tap gesture), causes the client device 504 to display a previous user interface (e.g., the video monitoring UI in FIG. 9X); and a filtering affordance 9100, which, when activated (e.g., via a tap gesture), causes the client device 504 to display a filtering pane (e.g., the filtering pane 9105 in FIG. 9AA). In FIG. 9Y, the motion events feed 997 further includes a scroll bar 9101 for viewing the balance of the representations 998 in the motion events feed 997. FIG. 9Y also illustrates client device 504 detecting an upward dragging gesture on the touch screen 906 whereby a contact 9102 is moved from a first location 9103A to a second location 9103B.

Figure 9Z:
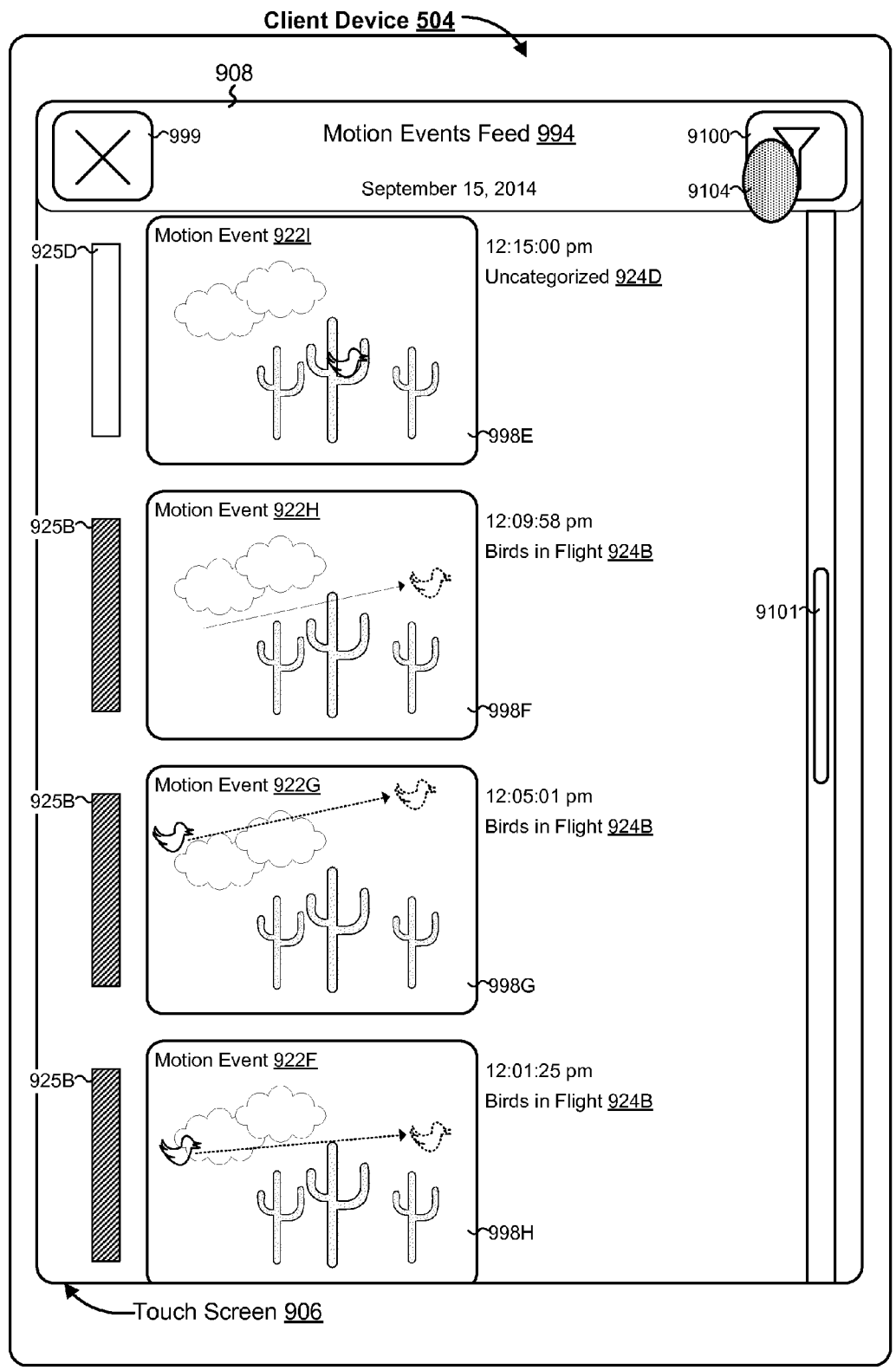
Figure 9A:
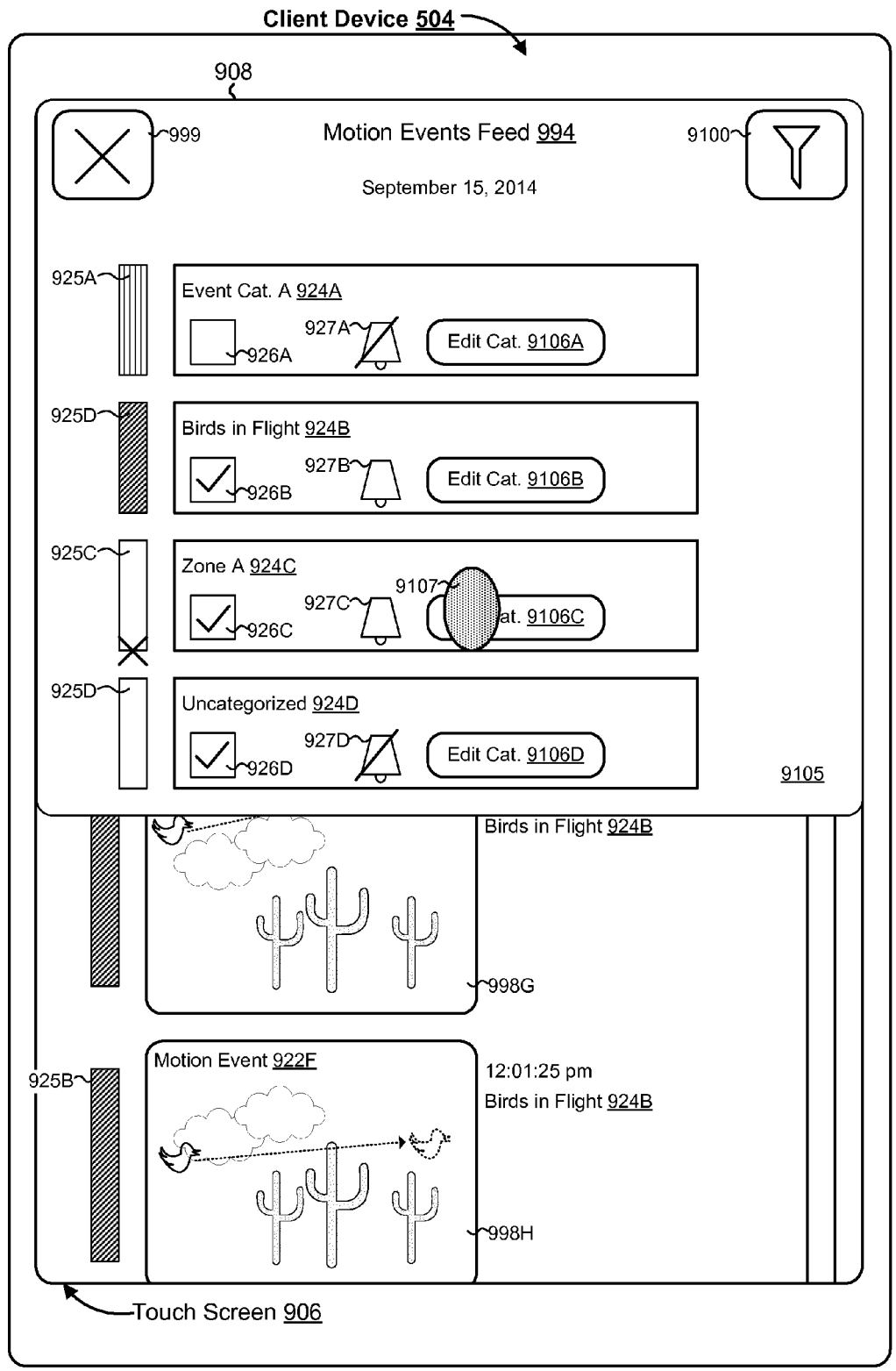
Figure 9B:
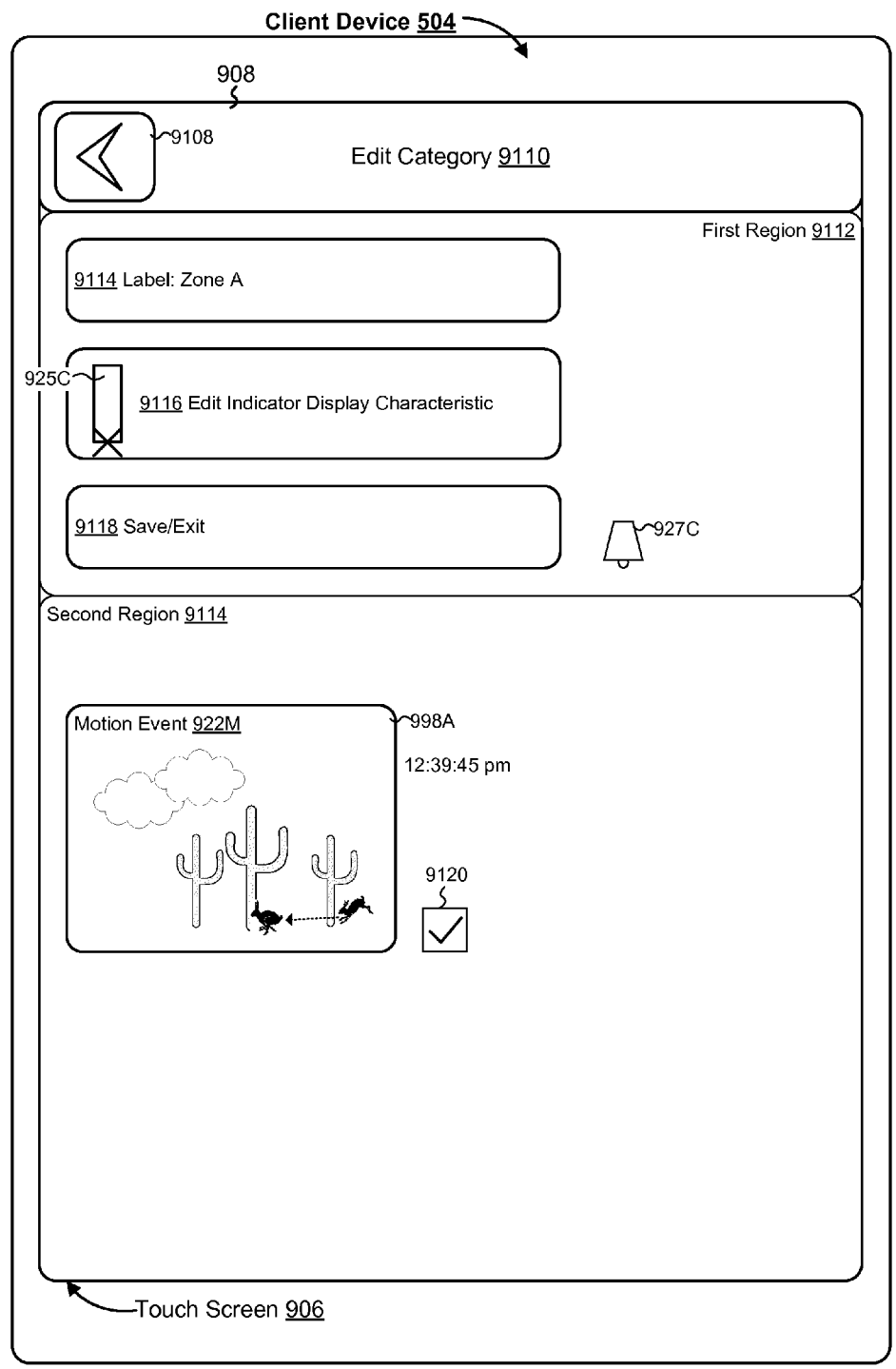

FIG. 9Z illustrates the client device 504 displaying a second portion of the motion events feed 997 in response to detecting the upward dragging gesture in FIG. 9Y. The second portion of the motion events feed 997 in FIG. 9Z shows a second set of representations 998 that are distinct from the first set of representations 998 shown in the first portion of the motion events feed 997 in FIG. 9Y. FIG. 9Z also illustrates the client device 504 detecting a contact 9104 at a location corresponding to the filtering affordance 9100 on the touch screen 906.

FIG. 9AA illustrates the client device 504 displaying a filtering pane 9105 in response to detecting selection of the filtering affordance 9100 in FIG. 9Z. In FIG. 9AA, the filtering pane 9105 includes a list of categories with recognized event categories and previously created zones of interest. The filtering pane 9105 includes an entry 924A for recognized event category A, including: a display characteristic indicator 925A representing the display characteristic for representations corresponding to motion events assigned to event category A (e.g., vertical stripes), an indicator filter 926A for enabling/disabling display of representations 998 in the motion events feed 997 for motion events assigned to event category A; a notifications indicator 927A for enabling/disabling notifications sent in response to detection of motion events assigned to event category A; and an "Edit Category" affordance 9106A for displaying an editing user interface (UI) for event category A. The filtering pane 9105 also includes an entry 924B for recognized event category "Birds in Flight," including: a display characteristic indicator 925B representing the display characteristic for representations corresponding to motion events assigned to "Birds in Flight" (e.g., a diagonal shading pattern); an indicator filter 926B for enabling/disabling display of representations 998 in the motion events feed 997 for motion events assigned to "Birds in Flight"; a notifications indicator 927B for enabling/disabling notifications sent in response to detection of motion events assigned to "Birds in Flight"; and an "Edit Category" affordance 9106B for displaying an editing UI for "Birds in Flight."

In FIG. 9AA, the filtering pane 9105 further includes an entry 924C for zone A, including: a display characteristic indicator 925C representing the display characteristic for representations corresponding to motion events that touch or overlap zone A (e.g., an 'X' at the bottom of the event indicator); an indicator filter 926C for enabling/disabling display of representations 998 in the motion events feed 997 for motion events that touch or overlap zone A; a notifications indicator 927C for enabling/disabling notifications sent in response to detection of motion events that touch or overlap zone A; and an "Edit Category" affordance 9106C for displaying an editing UI for the zone A category. The filtering pane 9105 further includes an entry 924D for uncategorized motion events, including: a display characteristic indicator 925D representing the display characteristic for representations corresponding to uncategorized motion events (e.g., an event indicator without fill or shading); an indicator filter 926D for enabling/disabling display of representations 998 in the motion events feed 997 for uncategorized motion events assigned; a notifications indicator 927D for enabling/disabling notifications sent in response to detection of uncategorized motion events; and an "Edit Category" affordance 9106D for displaying an editing UI for the unrecognized category. FIG. 9AA also illustrates client device 504 detecting a contact 9107 at a location corresponding to the "Edit Category" affordance 9106C on the touch screen 906.

FIG. 9BB illustrates the client device 504 displaying an editing UI for the zone A category in response to detecting selection of the "Edit Category" affordance 9106C in FIG. 9AA. In FIG. 9BB, the editing UI for the zone A category includes two distinct regions: a first region 9112; and a second region 9114. The first region 9114 includes: a label text entry box 9114 for renaming the label for the zone A category from the default name ("zone A") to a custom name; and an "Edit Indicator Display Characteristic" affordance 9116 for editing the default display characteristic 925C for representations corresponding to motion events that touch or overlap zone A (e.g., from the 'X' at the bottom of the event indicator to a fill color or shading pattern). The first region 9114 also includes: a notifications indicator 927C for enabling/disabling notifications sent in response to detection of motion events that touch or overlap zone A; and a save/exit affordance 9118 for saving changes made to the zone A category or exiting the editing UI for the zone A category.

In FIG. 9BB, the second region 9112 includes representations 998 (sometimes also herein called "sprites") of motion events that touch or overlap zone A, where a respective representation 998A corresponds to a motion event that touches or overlaps zone A. In some implementations, the respective representation 998A includes a series of frames or a video clips of the motion event that touches or overlaps zone A. For example, in FIG. 9BB, the respective representation 998A corresponds to a motion event of a jackrabbit running from right to left across the field of view of the respective camera at least partially within zone A. In FIG. 9BB, the respective representation 998A is associated with a checkbox 9120. In some implementations, when the checkbox 9120 is unchecked (e.g., with a tap gesture) the motion event corresponding to the checkbox 9120 is removed the zone A category.

Client-Side Zooming of a Remote Video Feed

FIG. 10 is a flow diagram of a process 1000 for performing client-side zooming of a remote video feed in accordance with some implementations. In some implementations, the process 1000 is performed at least in part by a server with one or more processors and memory, a client device with one or more processors and memory, and a camera with one or more processors and memory. For example, in some implementations, the server is the video server system 508 (FIGS. 5-6) or a component thereof (e.g., server-side module 506, FIGS. 5-6), the client device is the client device 504 (FIGS. 5 and 7) or a component thereof (e.g., the client-side module 502, FIGS. 5 and 7), and the camera is a respective one of one or more camera 118 (FIGS. 5 and 8).

In some implementations, control and access to the smart home environment 100 is implemented in the operating environment 500 (FIG. 5) with a video server system 508 (FIGS. 5-6) and a client-side module 502 (FIGS. 5 and 7) (e.g., an application for monitoring and controlling the smart home environment 100) is executed on one or more client devices 504 (FIGS. 5 and 7). In some implementations, the video server system 508 manages, operates, and controls access to the smart home environment 100. In some implementations, a respective client-side module 502 is associated with a user account registered with the video server system 508 that corresponds to a user of the client device 504.

The server maintains (1002) the current digital tilt-pan-zoom (DTPZ) settings for the camera. In some implementations, the server stores video settings (e.g., tilt, pan, and zoom settings) for each of the one or more cameras 118 associated with the smart home environment 100.

The camera sends (1004) a video feed at the current DTPZ settings to the server. The server sends (1006) the video feed to the client device. In some implementations, the camera directly sends the video feed to the client device.

The client device presents (1008) the video feed on an associated display. FIG. 9A, for example, shows the client device 504 displaying a first implementation of the video monitoring user interface (UI) of the application on the touch screen 906. In FIG. 9A, the video monitoring UI includes three distinct regions: a first region 903, a second region 905, and a third region 907. In FIG. 9A, the first region 903 includes a video feed from a respective camera among the one or more camera 118 associated with the smart home environment 100. For example, the respective camera is located on the back porch of the user's domicile or pointed out of a window of the user's domicile. In FIG. 9A, for example, an indicator 912 indicates that the video feed being displayed in the first region 903 is a live video feed.

The client device detects (1010) a first user input. FIG. 9R, for example, shows the client device 504 detecting a pinch-in gesture with contacts 965A and 965B (i.e., the first user input) relative to a respective portion of the video feed in the first region 903 of the video monitoring UI on the touch screen 906.

In response to detecting the first user input, the client device performs (1012) a local software-based zoom on a portion of the video feed according to the first user input. FIG. 9S, for example, shows the client device 504 displaying a zoomed-in portion of the video feed in response to detecting the pinch-in gesture (i.e., the first user input) on the touch screen 906 in FIG. 9R. In some implementations, the zoomed-in portion of the video feed corresponds to a software-based zoom performed locally by the client device 504 on the respective portion of the video feed corresponding to the pinch-in gesture in FIG. 9R.

The client device detects (1014) a second user input. In FIG. 9S, for example, the video controls in the first region 903 further includes an enhancement affordance 968 in response to detecting the pinch-in gesture (i.e., the first user input) in FIG. 9R. FIG. 9S, for example, shows the client device 504 detecting a contact 967 (i.e., the second user input) at a location corresponding to the enhancement affordance 968 on the touch screen 906.

In response to detecting the second user input, the client device determines (1016) the current zoom magnification and coordinates of the zoomed-in portion of the video feed. In some implementations, the client device 504 or a component thereof (e.g., camera control module 732, FIG. 7) determines the zoom magnification of the local, software zoom function and the coordinates of the respective portion of the video feed in response to detecting the contact 967 (i.e., the second user input) in FIG. 9S.

The client device sends (1018) a zoom command to the server including the current zoom magnification and the coordinates. In some implementations, the client device 504 or a component thereof (e.g., camera control module 732, FIG. 7) causes the command to be sent to the respective camera, where the command includes the current zoom magnification of the software zoom function and coordinates of the respective portion of the first video feed. In some implementations, the command is typically relayed through the video server system 508 or a component thereof (e.g., the camera control module 618, FIG. 6) to the respective camera. In some implementations, however, the client device 504 sends the command directly to the respective camera.

In response to receiving the zoom command, the server changes (1020) the stored DTPZ settings for the camera based on the zoom command. In some implementations, the server changes the stored video settings (e.g., tilt, pan, and zoom settings) for the respective camera according to the zoom command. In response to receiving the zoom command, the server sends (1022) the zoom command to the camera including the zoom magnification and the coordinates.

In response to receiving the zoom command, the camera performs (1024) a hardware-based zoom according to the zoom magnification and the coordinates. The respective camera performs a hardware zoom at the zoom magnification on the coordinates indicated by the zoom command. Thus, the respective camera crops its field of view to the coordinates indicated by the zoom command.

After performing the hardware-based zoom, the camera sends (1026) the changed video feed to the server. The respective camera sends the changed video feed with the field of view corresponding to the coordinates indicated by the zoom command. The server sends (1028) the changed video feed to the client device. In some implementations, the camera directly sends the changed video feed to the client device.

The client device presents (1030) the changed video feed on the associated display. FIG. 9U, for example, shows the client device 504 displaying the changed video feed at a higher resolution as compared to FIG. 9S, where the local, software zoom produced a lower resolution of the respective portion.

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., the methods 1200, 1300, 1400, 1500, and 1600) are also applicable in an analogous manner to the method 1000 described above with respect to FIG. 10.

System Architecture and Data Processing Pipeline

Figure 11A:
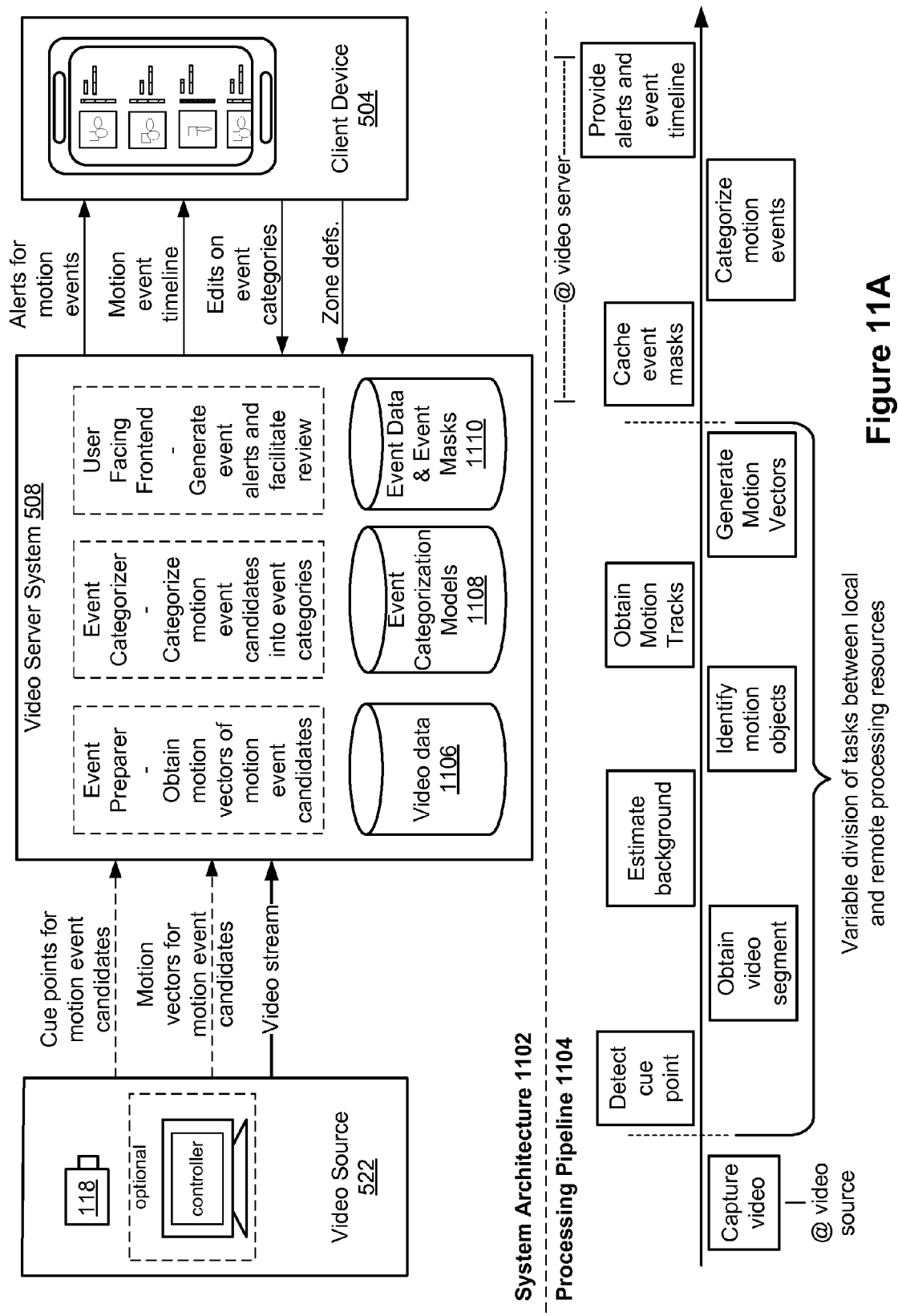
FIG. 11A illustrates example system architecture and processing pipeline for video monitoring in accordance with some implementations.

FIG. 11A illustrates a representative system architecture 1102 and a corresponding data processing pipeline 1104. The data processing pipeline 1104 processes a live video feed received from a video source 522 (e.g., including a camera 118 and an optional controller device) in real-time to identify and categorize motion events in the live video feed, and sends real-time event alerts and a refreshed event timeline to a client device 504 associated with a reviewer account bound to the video source 522.

In some implementations, after video data is captured at the video source 522, the video data is processed to determine if any potential motion event candidates are present in the video stream. A potential motion event candidate detected in the video data is also referred to as a cue point. Thus, the initial detection of motion event candidates is also referred to as cue point detection. A detected cue point triggers performance of a more through event identification process on a video segment corresponding to the cue point. In some implementations, the more through event identification process includes obtaining the video segment corresponding to the detected cue point, background estimation for the video segment, motion object identification in the video segment, obtaining motion tracks for the identified motion object(s), and motion vector generation based on the obtained motion tracks. The event identification process may be performed by the video source 522 and the video server system 508 cooperatively, and the division of the tasks may vary in different implementations, for different equipment capability configurations, and/or for different network and server load situations. After the motion vector for the motion event candidate is obtained, the video server system 508 categorizes the motion event candidate, and presents the result of the event detection and categorization to a reviewer associated with the video source 522.

In some implementations, the video server system 508 includes functional modules for an event preparer, an event categorizer, and a user facing frontend. The event preparer obtains the motion vectors for motion event candidates (e.g., by processing the video segment corresponding to a cue point or by receiving the motion vector from the video source). The event categorizer categorizes the motion event candidates into different event categories. The user facing frontend generates event alerts and facilitates review of the motion events by a reviewer through a review interface on a client device 504. The client facing frontend also receives user edits on the event categories, user preferences for alerts and event filters, and zone definitions for zones of interest. The event categorizer optionally revises event categorization models and results based on the user edits received by the user facing frontend.

In some implementations, the video server system 508 also determines an event mask for each motion event candidate and caches the event mask for later use in event retrieval based on selected zone(s) of interest.

In some implementations, the video server system 508 stores raw or compressed video data (e.g., in a video data database 1106), event categorization model (e.g., in an event categorization model database 1108), and event masks and other event metadata (e.g., in an event data and event mask database 1110) for each of the video sources 522.

The above is an overview of the system architecture 1102 and the data processing pipeline 1104 for event processing in video monitoring. More details of the processing pipeline and processing techniques are provided below.

As shown in the upper portion of FIG. 11A, the system architecture 1102 includes the video source 522. The video source 522 transmits a live video feed to the remote video server system 508 via one or more networks (e.g., the network(s) 162). In some implementations, the transmission of the video data is continuous as the video data is captured by the camera 118. In some implementations, the transmission of video data is irrespective of the content of the video data, and the video data is uploaded from the video source 522 to the video server system 508 for storage irrespective of whether any motion event has been captured in the video data. In some implementations, the video data may be stored at a local storage device of the video source 522 by default, and only video segments corresponding to motion event candidates detected in the video stream are uploaded to the video server system 508 in real-time.

In some implementations, the video source 522 dynamically determines which parts of the video stream are to be uploaded to the video server system 508 in real-time. For example, in some implementations, depending on the current server load and network conditions, the video source 522 optionally prioritizes the uploading of video segments corresponding newly detected motion event candidates ahead of other portions of the video stream that do not contain any motion event candidates. This upload prioritization helps to ensure that important motion events are detected and alerted to the reviewer in real-time, even when the network conditions and server load are less than optimal. In some implementations, the video source 522 implements two parallel upload connections, one for uploading the continuous video stream captured by the camera 118, and the other for uploading video segments corresponding detected motion event candidates. At any given time, the video source 522 determines whether the uploading of the continuous video stream needs to be suspended temporarily to ensure that sufficient bandwidth is given to the uploading of the video segments corresponding to newly detected motion event candidates.

In some implementations, the video stream uploaded for cloud storage is at a lower quality (e.g., lower resolution, lower frame rate, higher compression, etc.) than the video segments uploaded for motion event processing.

As shown in FIG. 11A, the video source 522 includes a camera 118, and an optional controller device. In some implementations, the camera 118 includes sufficient on-board processing power to perform all necessary local video processing tasks (e.g., cue point detection for motion event candidates, video uploading prioritization, network connection management, etc.), and the camera 118 communicates with the video server system 508 directly, without any controller device acting as an intermediary. In some implementations, the camera 118 captures the video data and sends the video data to the controller device for the necessary local video processing tasks. The controller device optionally performs the local processing tasks for more than one camera 118. For example, there may be multiple cameras in one smart home environment (e.g., the smart home environment 100, FIG. 1), and a single controller device receives the video data from each camera and processes the video data to detect motion event candidates in the video stream from each camera. The controller device is responsible for allocating sufficient outgoing network bandwidth to transmitting video segments containing motion event candidates from each camera to the server before using the remaining bandwidth to transmit the video stream from each camera to the video server system 508. In some implementations, the continuous video stream is sent and stored at one server facility while the video segments containing motion event candidates are send to and processed at a different server facility.

Figure 11B:
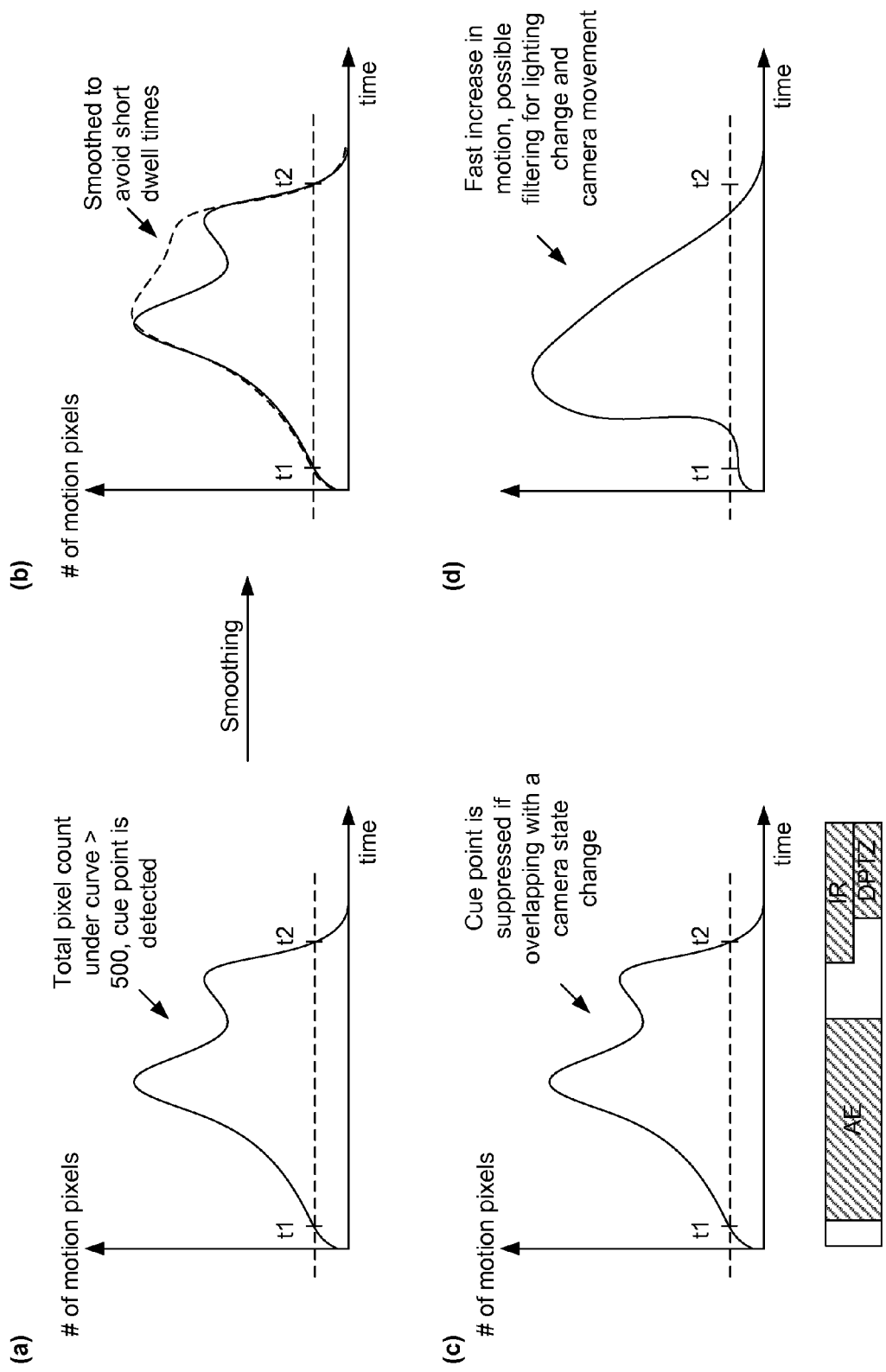
FIG. 11B illustrates techniques for motion event detection and false positive removal in video monitoring in accordance with some implementations.

As shown in FIG. 11A, after video data is captured by the camera 118, the video data is optionally processed locally at the video source 522 in real-time to determine whether there are any cue points in the video data that warrant performance of a more thorough event identification process. Cue point detection is a first layer motion event identification which is intended to be slightly over-inclusive, such that real motion events are a subset of all identified cue points. In some implementations, cue point detection is based on the number of motion pixels in each frame of the video stream. In some implementations, any method of identifying motion pixels in a frame may be used. For example, a Gaussian mixture model is optionally used to determine the number of motion pixels in each frame of the video stream. In some implementations, when the total number of motion pixels in a current image frame exceeds a predetermined threshold, a cue point is detected. In some implementations, a running sum of total motion pixel count is calculated for a predetermined number of consecutive frames as each new frame is processed, and a cue point is detected when the running sum exceeds a predetermined threshold. In some implementations, as shown in FIG. 11B-(a), a profile of total motion pixel count over time is obtained. In some implementations, a cue point is detected when the profile of total motion pixel count for a current frame sequence of a predetermined length (e.g., 30 seconds) meets a predetermined trigger criterion (e.g., total pixel count under the profile>a threshold motion pixel count).

In some implementations, the beginning of a cue point is the time when the total motion pixel count meets a predetermined threshold (e.g., 50 motion pixels). In some implementations, the start of the motion event candidate corresponding to a cue point is the beginning of the cue point (e.g., t1 in FIG. 11B-(a)). In some implementations, the start of the motion event candidate is a predetermined lead time (e.g., 5 seconds) before the beginning of the cue point. In some implementations, the start of a motion event candidate is used to retrieve a video segment corresponding to the motion event candidate for a more thorough event identification process.

In some implementations, the thresholds for detecting cue points are adjusted overtime based on performance feedback. For example, if too many false positives are detected, the threshold for motion pixel count is optionally increased. If too many motion events are missed, the threshold for motion pixel count is optionally decreased.

In some implementations, before the profile of the total motion pixel count for a frame sequence is evaluated for cue point detection, the profile is smoothed to remove short dips in total motion pixel count, as shown in FIG. 11B-(b). In general, once motion has started, momentary stops or slowing downs may occur during the motion, and such momentary stops or slowing downs are reflected as short dips in the profile of total motion pixel count. Removing these short dips from the profile helps to provide a more accurate measure of the extent of motion for cue point detection. Since cue point detection is intended to be slightly over-inclusive, by smoothing out the motion pixel profile, cue points for motion events that contain momentary stops or slowing downs of the moving objects would less likely be missed by the cue point detection.

Figure 11C:
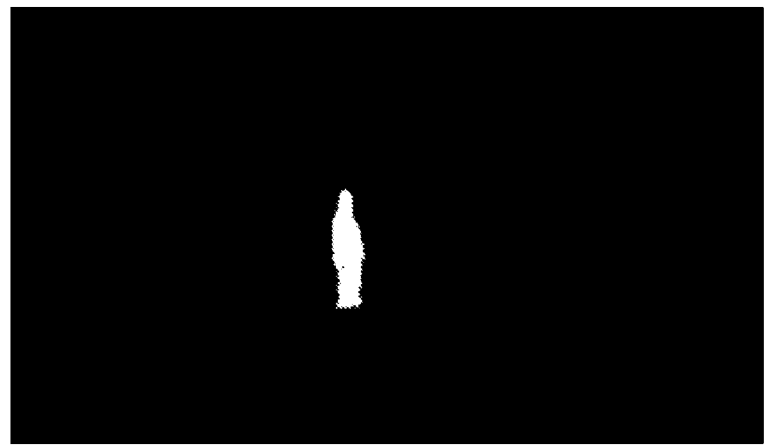
FIG. 11C illustrates an example motion mask and an example event mask generated based on video data in accordance with some implementations.
Figure 11C:
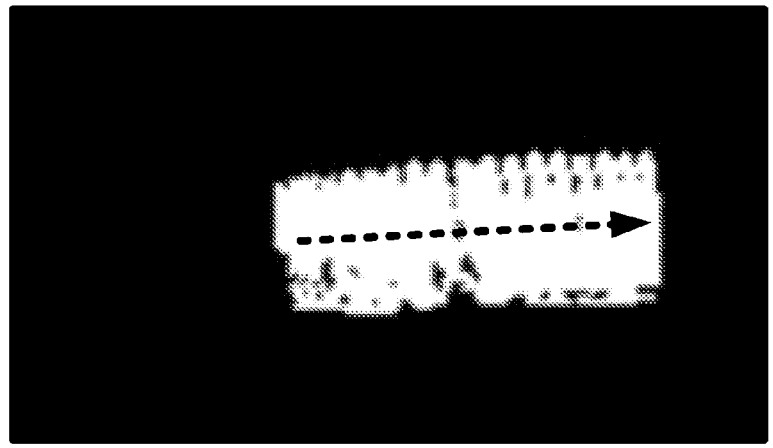

In some implementations, a change in camera state (e.g., IR mode, AE mode, DTPZ settings, etc.) may changes pixel values in the image frames drastically even though no motion has occurred in the scene captured in the video stream. In some implementations, each camera state change is noted in the cue point detection process (as shown in FIG. 11B-(c)), and a detected cue point is optionally suppressed if its occurrence overlaps with one of the predetermined camera state changes. In some implementations, the total motion pixel count in each frame is weighed differently if accompanied with a camera state change. For example, the total motion pixel count is optionally adjusted by a fraction (e.g., 10%) if it is accompanied by a camera state change, such as an IR mode switch. In some implementations, the motion pixel profile is reset after each camera state change.

Figure 11D:
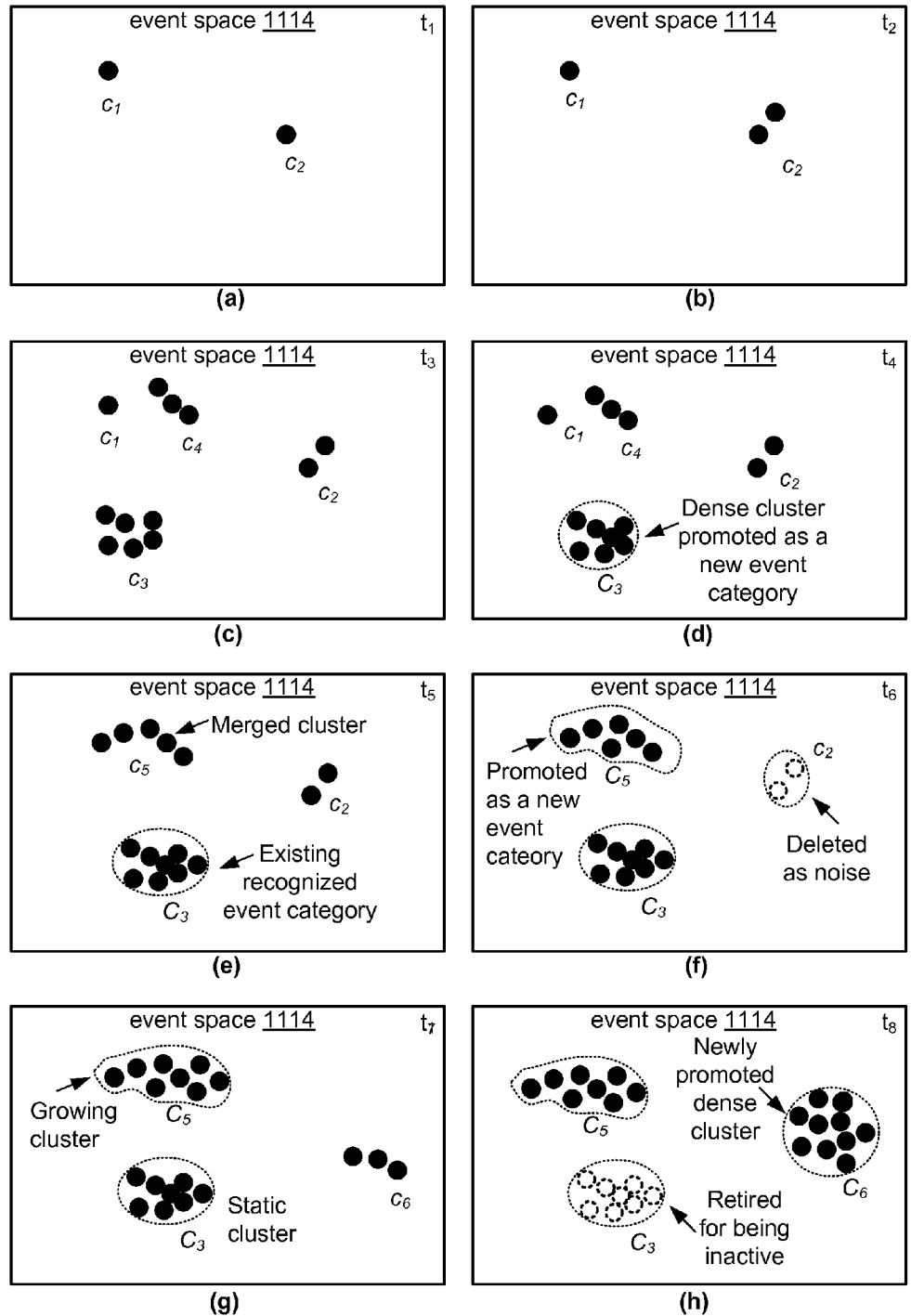
FIG. 11D illustrates a process for learning event categories and categorizing motion events in accordance with some implementations.

Sometimes, a fast initial increase in total motion pixel count may indicate a global scene change or a lighting change, e.g., when the curtain is drawn, or when the camera is pointed in a different direction or moved to a different location by a user. In some implementations, as shown in FIG. 11B-(d), when the initial increase in total motion pixel count in the profile of total motion pixel count exceeds a predetermined rate, a detected cue point is optionally suppressed. In some implementations, the suppressed cue point undergoes an edge case recovery process to determine whether the cue point is in fact not due to lighting change or camera movement, but rather a valid motion event candidate that needs to be recovered and reported for subsequent event processing. In some implementations, the profile of motion pixel count is reset when such fast initial increase in total motion pixel count is detected and a corresponding cue point is suppressed.

In some implementations, the cue point detection generally occurs at the video source 522, and immediately after a cue point is detected in the live video stream, the video source 522 sends an event alert to the video server system 508 to trigger the subsequent event processing. In some implementations, the video source 522 includes a video camera with very limited on-board processing power and no controller device, and the cue point detection described herein is performed by the video server system 508 on the continuous video stream transmitted from the camera to the video server system 508.

In some implementations, after a cue point is detected in the video stream, a video segment corresponding to the cue point is used to identify a motion track of a motion object in the video segment. The identification of motion track is optionally performed locally at the video source 522 or remotely at the video server system 508. In some implementations, the identification of the motion track based on a video segment corresponding to a detected cue point is performed at the video server system 508 by an event preparer module. In some implementations, the event preparer module receives an alert for a cue point detected in the video stream, and retrieves the video segment corresponding to the cue point from cloud storage (e.g., the video data database 1106, FIG. 11A) or from the video source 522. In some implementations, the video segment used to identify the motion track may be of higher quality than the video uploaded for cloud storage, and the video segment is retrieved from the video source 522 separately from the continuous video feed uploaded from the video source 522.

In some implementations, after the event preparer module obtains the video segment corresponding to a cue point, the event preparer module performs background estimation, motion object identification, and motion track determination. Once the motion track(s) of the motion object(s) identified in the video segment are determined, the event preparer module generates a motion vector for each of the motion object detected in the video segment. Each motion vector corresponds to one motion event candidate. In some implementations, false positive suppression is optionally performed to reject some motion event candidates before the motion event candidates are submitted for event categorization.

In some implementations, if the video source 522 has sufficient processing capabilities, the background estimation, motion track determination, and the motion vector generation are optionally performed locally at the video source 522.

In some implementations, the motion vector representing a motion event candidate is a simple two-dimensional linear vector defined by a start coordinate and an end coordinate of a motion object in a scene depicted in the video segment, and the motion event categorization is based on the simple two-dimensional linear motion vector. The advantage of using the simple two-dimensional linear motion vector for event categorization is that the event data is very compact, and fast to compute and transmit over a network. When network bandwidth and/or server load is constrained, simplifying the representative motion vector and off-loading the motion vector generation from the event preparer module of the video server system 508 to the video source 522 can help to realize the real-time event categorization and alert generation for many video sources in parallel.

In some implementations, after motion tracks in a video segment corresponding to a cue point are determined, track lengths for the motion tracks are determined. In some implementations, "short tracks" with track lengths smaller than a predetermined threshold (e.g., 8 frames) are suppressed, as they are likely due to trivial movements, such as leaves shifting in the wind, water shimmering in the pond, etc. In some implementations, pairs of short tracks that are roughly opposite in direction are suppressed as "noisy tracks." In some implementations, after the track suppression, if there are no motion tracks remaining for the video segment, the cue point is determined to be a false positive, and no motion event candidate is sent to the event categorizer for event categorization. If at least one motion track remains after the false positive suppression is performed, a motion vector is generated for each remaining motion track, and corresponds to a respective motion event candidate going into event categorization. In other words, multiple motion event candidates may be generated based on a video segment, where each motion event candidate represents the motion of a respective motion object detected in the video segment. The false positive suppression occurring after the cue point detection and before the motion vector generation is the second layer false positive suppression, which removes false positives based on the characteristics of the motion tracks.

In some implementations, object identification is performed by subtracting the estimated background from each frame of the video segment. A foreground motion mask is then obtained by masking all pixel locations that have no motion pixels. An example of a motion mask is shown in FIG. 11C-(a). The example motion mask shows the motion pixels in one frame of the video segment in white, and the rest of the pixels in black. Once motion objects are identified in each frame, the same motion object across multiple frames of the video segment are correlated through a matching algorithm (e.g., Hungarian matching algorithm), and a motion track for the motion object is determined based on the "movement" of the motion object across the multiple frames of the video segment.

In some implementations, the motion track is used to generate a two-dimensional linear motion vector which only takes into account the beginning and end locations of the motion track (e.g., as shown by the dotted arrow in FIG. 11C-(b)). In some implementations, the motion vector is a non-linear motion vector that traces the entire motion track from the first frame to the last frame of the frame sequence in which the motion object has moved.

In some implementations, the motion masks corresponding to each motion object detected in the video segment are aggregated across all frames of the video segment to create an event mask for the motion event involving the motion object. As shown in FIG. 11C-(b), in the event mask, all pixel locations containing less than a threshold number of motion pixels (e.g., one motion pixel) are masked and shown in black, while all pixel locations containing at least the threshold number of motion pixels are shown in white. The active portion of the event mask (e.g., shown in white) indicates all areas in the scene depicted in the video segment that have been accessed by the motion object during its movement in the scene. In some implementations, the event mask for each motion event is stored at the video server system 508 or a component thereof (e.g., the zone creation module 624, FIG. 6), and used to selectively retrieve motion events that enter or touch a particular zone of interest within the scene depicted in the video stream of a camera. More details on the use of event masks are provided later in the present disclosure with respect to real-time zone monitoring, and retroactive event identification for newly created zones of interest.

In some implementations, a motion mask is created based on an aggregation of motion pixels from a short frame sequence in the video segment. The pixel count at each pixel location in the motion mask is the sum of the motion pixel count at that pixel location from all frames in the short frame sequence. All pixel locations in the motion mask with less than a threshold number of motion pixels (e.g., motion pixel count>4 for 10 consecutive frames) are masked. Thus, the unmasked portions of the motion mask for each such short frame sequence indicates a dominant motion region for the short frame sequence. In some implementations, a motion track is optionally created based on the path taken by the dominant motion regions identified from a series of consecutive short frame sequences.

In some implementations, an event mask is optionally generated by aggregating all motion pixels from all frames of the video segment at each pixel location, and masking all pixel locations that have less than a threshold number of motion pixels. The event mask generated this way is no longer a binary event mask, but is a two-dimensional histogram. The height of the histogram at each pixel location is the sum of the number of frames that contain a motion pixel at that pixel location. This type of non-binary event mask is also referred to as a motion energy map, and illustrates the regions of the video scene that are most active during a motion event. The characteristics of the motion energy maps for different types of motion events are optionally used to differentiate them from one another. Thus, in some implementations, the motion energy map of a motion event candidate is vectorized to generate the representative motion vector for use in event categorization. In some implementations, the motion energy map of a motion event is generated and cached by the video server system and used for real-time zone monitoring, and retro-active event identification for newly created zones of interest.

In some implementations, a live event mask is generated based on the motion masks of frames that have been processed, and is continuously updated until all frames of the motion event have been processed. In some implementations, the live event mask of a motion event in progress is used to determine if the motion event is an event of interest for a particular zone of interest. More details of how a live event mask is used for zone monitoring are provided later in the present disclosure.

In some implementations, after the video server system 508 obtains the representative motion vector for a new motion event candidate (e.g., either by generating the motion vector from the video segment corresponding to a newly detected cue point), or by receiving the motion vector from the video source 522, the video server system 508 proceeds to categorize the motion event candidate based on its representative motion vector.

Motion Event Categorization and Retroactive Activity Recognition

In some implementations, the categorization of motion events (also referred to as "activity recognition") is performed by training a categorization model based on a training data set containing motion vectors corresponding to various known event categories (e.g., person running, person jumping, person walking, dog running, car passing by, door opening, door closing, etc.). The common characteristics of each known event category that distinguish the motion events of the event category from motion events of other event categories are extracted through the training Thus, when a new motion vector corresponding to an unknown event category is received, the event categorizer module examines the new motion vector in light of the common characteristics of each known event category (e.g., based on a Euclidean distance between the new motion vector and a canonical vector representing each known event type), and determines the most likely event category for the new motion vector among the known event categories.

Although motion event categorization based on pre-established motion event categories is an acceptable way to categorize motion events, this categorization technique may only be suitable for use when the variety of motion events handled by the video server system 508 is relatively few in number and already known before any motion event is processed. In some implementations, the video server system 508 serves a large number of clients with cameras used in many different environmental settings, resulting in motion events of many different types. In addition, each reviewer may be interested in different types of motion events, and may not know what types of events they would be interested in before certain real world events have happened (e.g., some object has gone missing in a monitored location). Thus, it is desirable to have an event categorization technique that can handle any number of event categories based on actual camera use, and automatically adjust (e.g., create and retire) event categories through machine learning based on the actual video data that is received over time.

In some implementations, categorization of motion events is through a density-based clustering technique (e.g., DBscan) that forms clusters based on density distributions of motion events (e.g., motion events as represented by their respective motion vectors) in a vector event space. Regions with sufficiently high densities of motion vectors are promoted as recognized event categories, and all motion vectors within each promoted region are deemed to belong to a respective recognized event category associated with that promoted region. In contrast, regions that are not sufficiently dense are not promoted or recognized as event categories. Instead, such non-promoted regions are collectively associated with a category for unrecognized events, and all motion vectors within such non-promoted regions are deemed to be unrecognized motion events at the present time.

In some implementations, each time a new motion vector comes in to be categorized, the event categorizer places the new motion vector into the vector event space according to its value. If the new motion vector is sufficiently close to or falls within an existing dense cluster, the event category associated with the dense cluster is assigned to the new motion vector. If the new motion vector is not sufficiently close to any existing cluster, the new motion vector forms its own cluster of one member, and is assigned to the category of unrecognized events. If the new motion vector is sufficiently close to or falls within an existing sparse cluster, the cluster is updated with the addition of the new motion vector. If the updated cluster is now a dense cluster, the updated cluster is promoted, and all motion vectors (including the new motion vector) in the updated cluster are assigned to a new event category created for the updated cluster. If the updated cluster is still not sufficiently dense, no new category is created, and the new motion vector is assigned to the category of unrecognized events. In some implementations, clusters that have not been updated for at least a threshold expiration period are retired. The retirement of old static clusters helps to remove residual effects of motion events that are no longer valid, for example, due to relocation of the camera that resulted in a scene change.

FIG. 11D illustrates an example process for the event categorizer of the video server system 508 to (1) gradually learn new event categories based on received motion events, (2) assign newly received motion events to recognized event categories or an unrecognized event category, and (3) gradually adapt the recognized event categories to the more recent motion events by retiring old static clusters and associated event categories, if any. The example process is provided in the context of a density-based clustering algorithm (e.g., sequential DBscan). However, a person skilled in the art will recognize that other clustering algorithms that allow growth of clusters based on new vector inputs can also be used in various implementations.

As a background, sequential DBscan allows growth of a cluster based on density reachability and density connectedness. A point q is directly density-reachable from a point p if it is not farther away than a given distance $\epsilon$ (i.e., is part of its $\epsilon$-neighborhood) and if p is surrounded by sufficiently many points M such that one may consider p and q to be part of a cluster. q is called density-reachable from p if there is a sequence $p_1, \ldots p_n$ of points with $p_1 = p$ and $p_n = p$ where each $p_{i+1}$ is directly density-reachable from $p_i$. Since the relation of density-reachable is not symmetric, another notion of density-connectedness is introduced. Two points p and q are density-connected if there is a point o such that both p and q are density-reachable from o. Density-connectedness is symmetric. A cluster is defined by two properties: (1) all points within the cluster are mutually density-connected, and (2) if a point is density-reachable from any point of the cluster, it is part of the cluster as well. The clusters formed based on density connectedness and density reachability can have all shapes and sizes, in other words, motion event candidates from a video source (e.g., as represented by motion vectors in a dataset) can fall into non-linearly separable clusters based on this density-based clustering algorithm, when they cannot be adequately clustered by K-means or Gaussian Mixture EM clustering techniques. In some implementations, the values of $\epsilon$ and M are adjusted by the video server system 508 for each video source or video stream, such that clustering quality can be improved for different camera usage settings.

In some implementations, during the categorization process, four parameters are stored and sequentially updated for each cluster. The four parameters include: (1) cluster creation time, (2) cluster weight, (3) cluster center, and (4) cluster radius. The creation time for a given cluster records the time when the given cluster was created. The cluster weight for a given cluster records a member count for the cluster. In some implementations, a decay rate is associated with the member count parameter, such that the cluster weight decays over time if an insufficient number of new members are added to the cluster during that time. This decaying cluster weight parameter helps to automatically fade out old static clusters that are no longer valid. The cluster center of a given cluster is the weighted average of points in the given cluster. The cluster radius of a given cluster is the weighted spread of points in the given cluster (analogous to a weighted variance of the cluster). It is defined that clusters have a maximum radius of $\epsilon/2$. A cluster is considered to be a dense cluster when it contains at least M/2 points. When a new motion vector comes into the event space, if the new motion vector is density-reachable from any existing member of a given cluster, the new motion vector is included in the existing cluster; and if the new motion vector is not density-reachable from any existing member of any existing cluster in the event space, the new motion vector forms its own cluster. Thus, at least one cluster is updated or created when a new motion vector comes into the event space.

FIG. 11D-(a) shows the early state of the event vector space 1114. At time $t_1$, two motion vectors (e.g., represented as two points) have been received by the event categorizer. Each motion vector forms its own cluster (e.g., $c_1$ and $c_2$, respectively) in the event space 1114. The respective creation time, cluster weight, cluster center, and cluster radius for each of the two clusters are recorded. At this time, no recognized event category exists in the event space, and the motion events represented by the two motion vectors are assigned to the category of unrecognized events. On the frontend, the event indicators of the two events indicate that they are unrecognized events on the event timeline, for example, in the manner shown in FIG. 9C.

After some time, a new motion vector is received and placed in the event space 1114 at time $t_2$. As shown in FIG. 11D-(b), the new motion vector is density-reachable from the existing point in cluster $c_2$ and thus falls within the existing cluster $c_2$. The cluster center, cluster weight, and cluster radius of cluster $c_2$ are updated based on the entry of the new motion vector. The new motion vector is also assigned to the category of unrecognized events. In some implementations, the event indicator of the new motion event is added to the event timeline in real-time, and has the appearance associated with the category for unrecognized events.

FIG. 11D-(c) illustrates that, at time $t_3$, two new clusters $c_3$ and $c_4$ have been established and grown in size (e.g., cluster weight and radius) based on a number of new motion vectors received during the time interval between $t_2$ and $t_3$. In the meantime, neither cluster $c_1$ nor cluster $c_2$ have seen any growth. The cluster weights for clusters $c_1$ and $c_2$ have decayed gradually due to the lack of new members during this period of time. Up to this point, no recognized event category has been established, and all motion events are assigned to the category of unrecognized events. If the motion events are reviewed in a review interface on the client device 504, the event indicators of the motion events have an appearance associated with the category for unrecognized events (e.g., as the event indicators 922 show in FIG. 9C). Each time a new motion event is added to the event space 1114, a corresponding event indicator for the new event is added to the timeline associated with the present video source.

FIG. 11D-(d) illustrates that, at time $t_4$, another new motion vector has been added to the event space 1114, and the new motion vector falls within the existing cluster $c_3$. The cluster center, cluster weight, and cluster radius of cluster $c_3$ are updated based on the addition of the new motion vector, and the updated cluster $c_3$ has become a dense cluster based on a predetermined density requirement (e.g., a cluster is considered dense when it contains at least M/2 points). Once cluster $c_3$ has achieved the dense cluster status (and re-labeled as $C_3$), a new event category is established for cluster $C_3$. When the new event category is established for cluster $C_3$, all the motion vectors currently within cluster $C_3$ are associated with the new event category. In other words, the previously unrecognized events in cluster $C_3$ are now recognized events of the new event category. In some implementations, as soon as the new event category is established, the event categorizer notifies the user facing frontend of the video server system 508 about the new event category. The user facing frontend determines whether a reviewer interface for the video stream corresponding to the event space 1114 is currently displayed on a client device 504. If a reviewer interface is currently displayed, the user facing frontend causes the client device 504 to retroactively modify the display characteristics of the event indicators for the motion events in cluster $C_3$ to reflect the newly established event category in the review interface. For example, as soon as the new event category is established by the event categorizer, the user facing frontend will cause the event indicators for the motion events previously within cluster $c_3$ (and now in cluster $C_3$) to take on a color assigned to the new event category). In addition, the event indicator of the new motion event will also take on the color assigned to the new event category. This is illustrated in the review interface 908 in FIG. 9D by the changing color of the event indicators 922A, 922C, 922D and 922E to reflect the newly established event category (supposing that cluster $C_3$ corresponds to Event Cat. A here).

Figure 11E:
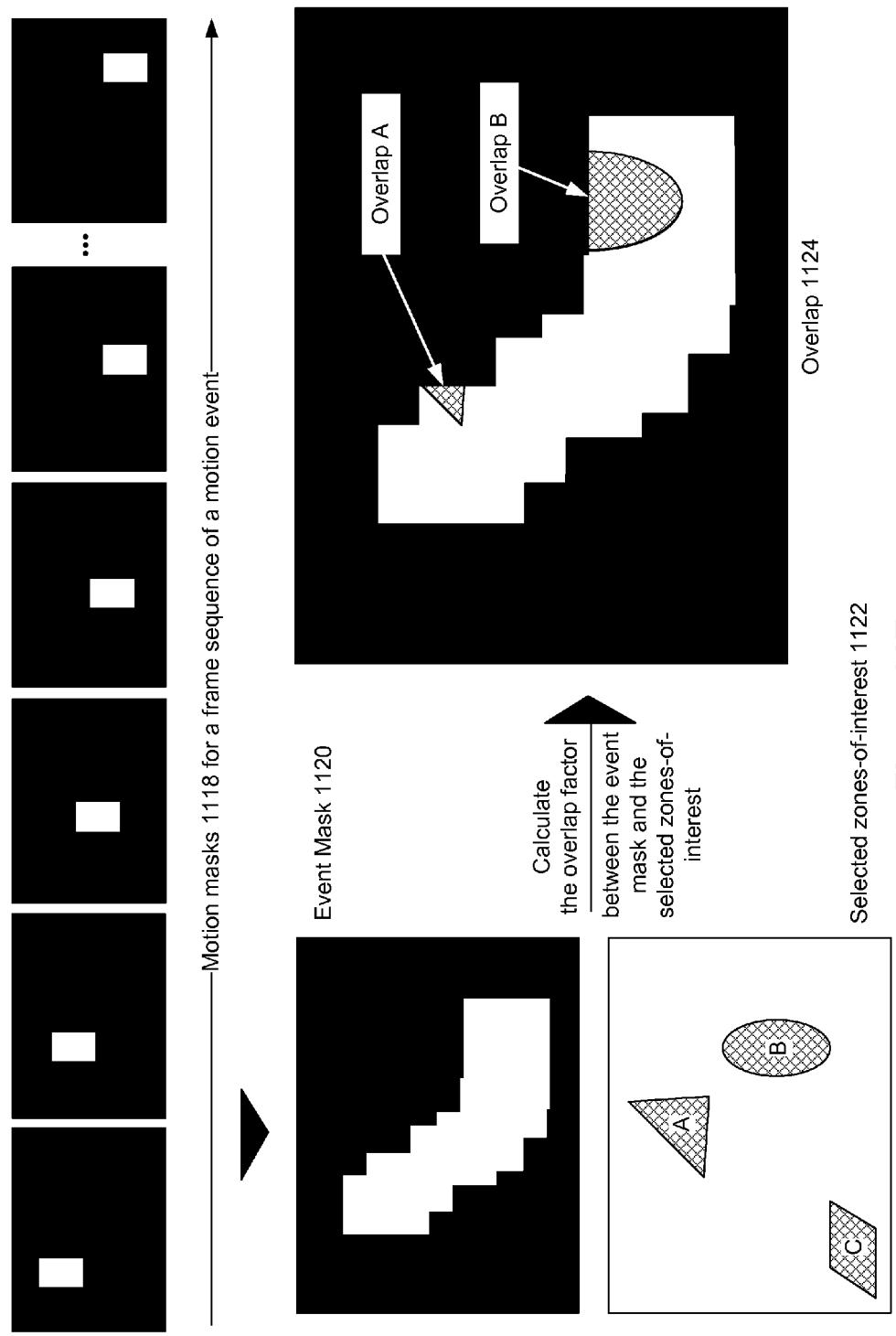
FIG. 11E illustrates a process for identifying an event of interest based on selected zones of interest in accordance with some implementations.

FIG. 11D-(e) illustrates that, at time $t_5$, two new motion vectors have been received in the interval between $t_4$ and $t_5$. One of the two new motion vectors falls within the existing dense cluster $C_3$, and is associated with the recognized event category of cluster $C_3$. Once the motion vector is assigned to cluster $C_3$, the event categorizer notifies the user facing frontend regarding the event categorization result. Consequently, the event indicator of the motion event represented by the newly categorized motion vector is given the appearance associated with the recognized event category of cluster $C_3$. Optionally, a pop-up notification for the newly recognized motion event is presented over the timeline associated with the event space. This real-time recognition of a motion event for an existing event category is illustrated in FIG. 9E, where an event indicator 922L and pop-up notification 928 for a new motion event are shown to be associated with an existing event category "Event Cat. B" (supposing that cluster $C_3$ corresponds to Event Cat. B here). It should be noted that, in FIG. 9E, the presentation of the pop-up 928 and the retroactive coloring of the event indicators for Event Cat. B can also happen at the time that when Event Cat. B becomes a newly recognized category upon the arrival of the new motion event.

FIG. 11D-(e) further illustrates that, at time $t_5$, one of the two new motion vectors is density reachable from both of the existing clusters $c_1$ and $c_5$, and thus qualifies as a member for both clusters. The arrival of this new motion vector halts the gradual decay in cluster weight that cluster $c_1$ that has sustained since time $t_1$. The arrival of the new motion vector also causes the existing clusters $c_1$ and $c_5$ to become density-connected, and as a result, to merge into a larger cluster $c_5$. The cluster center, cluster weight, cluster radius, and optionally the creation time for cluster $c_5$ are updated accordingly. At this time, cluster $c_2$ remains unchanged, and its cluster weight decays further over time.

FIG. 11D-(f) illustrates that, at time $t_6$, the weight of the existing cluster $c_2$ has reached below a threshold weight, and is thus deleted from the event space 1114 as a whole. The pruning of inactive sparse clusters allows the event space to remain fairly noise-free and keeps the clusters easily separable. In some implementations, the motion events represented by the motion vectors in the deleted sparse clusters (e.g., cluster $c_2$) are retroactively removed from the event timeline on the review interface. In some implementations, the motion events represented by the motion vectors in the deleted sparse clusters (e.g., cluster $c_2$) are kept in the timeline and given a new appearance associated with a category for trivial or uncommon events. In some implementations, the motion events represented by the motion vectors in the deleted sparse cluster (e.g., cluster $c_2$) are optionally gathered and presented to the user or an administrator to determine whether they should be removed from the event space and the event timeline.

FIG. 11D-(f) further illustrates that, at time $t_6$, a new motion vector is assigned to the existing cluster $c_5$, which causes the cluster weight, cluster radius, and cluster center of cluster $c_5$ to be updated accordingly. The updated cluster $c_5$ now reaches the threshold for qualifying as a dense cluster, and is thus promoted to a dense cluster status (and relabeled as cluster $C_5$). A new event category is created for cluster $C_5$. All motion vectors in cluster $C_5$ (which were previously in clusters $c_1$ and $c_4$) are removed from the category for unrecognized motion events, and assigned to the newly created event category for cluster $C_5$. The creation of the new category and the retroactive appearance change for the event indicators of the motion events in the new category are reflected in the reviewer interface, and optionally notified to the reviewer.

FIG. 11D-(g) illustrates that, at time $t_7$, cluster $C_5$ continues to grow with some of the subsequently received motion vectors. A new cluster $c_6$ has been created and has grown with some of the subsequently received motion vectors. Cluster $C_3$ has not seen any growth since time $t_5$, and its cluster weight has gradually decayed overtime.

FIG. 11D-(h) shows that, at a later time $t_8$, dense cluster $C_3$ is retired (deleted from the event space 1114) when its cluster weight has fallen below a predetermine cluster retirement threshold. In some implementations, motion events represented by the motion vectors within the retired cluster $C_3$ are removed from the event timeline for the corresponding video source. In some implementations, the motion events represented by the motion vectors as well as the retired event category associated with the retired cluster $C_3$ are stored as obsolete motion events, apart from the other more current motion events. For example, the video data and motion event data for obsolete events are optionally compressed and archived, and require a recall process to reload into the timeline. In some implementations, when an event category is retired, the event categorizer notifies the user facing frontend to remove the event indicators for the motion events in the retired event category from the timeline. In some implementations, when an event category is retired, the motion events in the retired category are assigned to a category for retired events and their event indicators are retroactively given the appearance associated with the category for retired events in the timeline.

FIG. 11D-(h) further illustrates that, at time $t_8$, cluster $c_6$ has grown substantially, and has been promoted as a dense cluster (relabeled as cluster $C_6$) and given its own event category. Thus, on the event review interface, a new event category is provided, and the appearance of the event indicators for motion events in cluster $C_6$ is retroactively changed to reflect the newly recognized event category.

Based on the above process, as motion vectors are collected in the event space overtime, the most common event categories emerge gradually without manual intervention. In some implementations, the creation of a new category causes real-time changes in the review interface provided to a client device 504 associated with the video source. For example, in some implementations, as shown in FIGS. 9A-9E, motion events are first represented as uncategorized motion events, and as each event category is created overtime, the characteristics of event indicators for past motion events in that event category are changed to reflect the newly recognized event category. Subsequent motion events falling within the recognized categories also have event indicators showing their respective event categories. The currently recognized event categories are optionally presented in the review interface for user selection as event filters. The user may choose any subset of the currently known event categories (e.g., each recognized event categories and respective categories for trivial events, rare events, obsolete events, and unrecognized events) to selectively view or receive notifications for motion events within the subset of categories. This is illustrated in FIGS. 9E-9G, where the user has selectively turned off the event indicators for Event Cat. A and turned on the event indicators for Event Cat. B on the timeline 910 by selecting Event Cat. B (via affordance 926B) and deselecting Event Cat. A (via affordance 926A) in the region 907. The real-time event notification is also turned off for Event Cat. A, and turned on for Event Cat. B by selecting Event Cat. B (via affordance 927B) and deselecting Event Cat. A (via affordance 927A) in the third region 907.

In some implementations, a user may review past motion events and their categories on the event timeline. In some implementations, the user is allowed to edit the event category assignments, for example, by removing one or more past motion events from a known event category, as shown in FIGS. 9H-9J. When the user has edited the event category composition of a particular event category by removing one or more past motion events from the event category, the user facing frontend notifies the event categorizer of the edits. In some implementations, the event categorizer removes the motion vectors of the removed motion events from the cluster corresponding to the event category, and re-computes the cluster parameters (e.g., cluster weight, cluster center, and cluster radius). In some implementations, the removal of motion events from a recognized cluster optionally causes other motion events that are similar to the removed motion events to be removed from the recognized cluster as well. In some implementations, manual removal of one or more motion events from a recognized category may cause one or more motion events to be added to event category due to the change in cluster center and cluster radius. In some implementations, the event category models are stored in the event category models database 1108 (FIG. 11A), and is retrieved and updated in accordance with the user edits.

In some implementations, one event category model is established for one camera. In some implementations, a composite model based on the motion events from multiple related cameras (e.g., cameras reported to serve a similar purpose, or have a similar scene, etc.) is created and used to categorize motion events detected in the video stream of each of the multiple related cameras. In such implementations, the timeline for one camera may show event categories discovered based on motion events in the video streams of its related cameras, even though no event for such categories have been seen in the camera's own video stream.

Non-Causal Zone Search and Context-Aware Zone Monitoring

In some implementations, event data and event masks of past motion events are stored in the event data and event mask database 1110 (FIG. 11A). In some implementations, the client device 504 receives user input to select one or more filters to selectively review past motion events, and selectively receive event alerts for future motion events.

In some implementations, the client device 504 passes the user selected filter(s) to the user facing frontend, and the user facing frontend retrieves the events of interest based on the information in the event data and event mask database 1110. In some implementations, the selectable filters include one or more recognized event categories, and optionally any of the categories for unrecognized motion events, rare events, and/or obsolete events. When a recognized event category is selected as a filter, the user facing frontend retrieves all past motion events associated with the selected event category, and present them to the user (e.g., on the timeline, or in an ordered list shown in a review interface). For example, as shown in FIG. 9F-9G, when the user selects one of the two recognized event categories in the review interface, the past motion events associated with the selected event category (e.g., Event Cat. B) are shown on the timeline 910, while the past motion events associated with the unselected event category (e.g., Event Cat. A) are removed from the timeline. In another example, as shown in 9H-9J, when the user selects to edit a particular event category (e.g., Event Cat. B), the past motion events associated with the selected event categories (e.g., Event Cat. B) are presented in the first region 935 of the editing user interface, while motion events in the unselected event categories (e.g., Event Cat. A) are not shown.

In some implementations, in addition to event categories, other types of event filters can also be selected individually or combined with selected event categories. For example, in some implementations, the selectable filters also include a human filter, which can be one or more characteristics associated with events involving a human being. For example, the one or more characteristics that can be used as a human filter include a characteristic shape (e.g., aspect ratio, size, shape, and the like) of the motion object, audio comprising human speech, motion objects having human facial characteristics, etc. In some implementations, the selectable filters also include a filter based on similarity. For example, the user can select one or more example motion events, and be presented one or more other past motion events that are similar to the selected example motion events. In some implementations, the aspect of similarity is optionally specified by the user. For example, the user may select "color content," "number of moving objects in the scene," "shape and/or size of motion object," and/or "length of motion track," etc, as the aspect(s) by which similarity between two motion events are measured. In some implementations, the user may choose to combine two or more filters and be shown the motion events that satisfy all of the filters combined. In some implementations, the user may choose multiple filters that will act separately, and be shown the motion events that satisfy at least one of the selected filters.

In some implementations, the user may be interested in past motion events that have occurred within a zone of interest. The zone of interest can also be used as an event filter to retrieve past events and generate notifications for new events. In some implementations, the user may define one or more zones of interest in a scene depicted in the video stream. For example, in the user interface shown in FIGS. 9L-9N, the user has defined a zone of interest 947 with any number of vertices and edges (e.g., four vertices and four edges) that is overlaid on the scene depicted in the video stream. The zone of interest may enclose an object, for example, a chair, a door, a window, or a shelf, located in the scene. Once a zone of interest is created, it is included as one of the selectable filters for selectively reviewing past motion events that had entered or touched the zone. For example, as shown in FIG. 9N, once the user has created and selected the filter Zone A 924C, a past motion event 922V which has touched Zone A is highlighted on the timeline 910, and includes an indicator (e.g., a cross mark) associated with the filter Zone A. In addition, the user may also choose to receive alerts for future events that enter Zone A, for example, by selecting the alert affordance 927C associated with Zone A.

In some implementations, the video server system 508 (e.g., the user facing frontend of the video server system 508) receives the definitions of zones of interest from the client device 504, and stores the zones of interest in association with the reviewer account currently active on the client device 504. When a zone of interest is selected as a filter for reviewing motion events, the user facing frontend searches the event data database 1110 (FIG. 11A) to retrieve all past events that have motion object(s) within the selected zone of interest. This retrospective search of event of interest can be performed irrespective of whether the zone of interest had existed before the occurrence of the retrieved past event(s). In other words, the user does not need to know where in the scene he/she may be interested in monitoring before hand, and can retroactively query the event database to retrieve past motion events based on a newly created zone of interest. There is no requirement for the scene to be divided into predefined zones first, and past events be tagged with the zones in which they occur when the past events were first processed and stored.

In some implementations, the retrospective zone search based on newly created or selected zones of interest is implemented through a regular database query where the relevant features of each past event (e.g., which regions the motion object had entered during the motion event) are determined on the fly, and compared to the zones of interest. In some implementations, the server optionally defines a few default zones of interest (e.g., eight (2×4) predefined rectangular sectors within the scene), and each past event is optionally tagged with the particular default zones of interest that the motion object has entered. In such implementations, the user can merely select one or more of the default zones of interest to retrieve the past events that touched or entered the selected default zones of interest.

In some implementations, event masks (e.g., the example event mask shown in FIG. 11C) each recording the extent of a motion region accessed by a motion object during a given motion event are stored in the event data and event masks database 1110 (FIG. 11A). The event masks provide a faster and more efficient way of retrieving past motion events that have touched or entered a newly created zone of interest.

In some implementations, the scene of the video stream is divided into a grid, and the event mask of each motion event is recorded as an array of flags that indicates whether motion had occurred within each grid location during the motion event. When the zone of interest includes at least one of the grid location at which motion has occurred during the motion event, the motion event is deemed to be relevant to the zone of interest and is retrieved for presentation. In some implementations, the user facing frontend imposes a minimum threshold on the number of grid locations that have seen motion during the motion event, in order to retrieve motion events that have at least the minimum number of grid locations that included motion. In other words, if the motion region of a motion event barely touched the zone of interest, it may not be retrieved for failing to meet the minimum threshold on grid locations that have seen motion during the motion event.

In some implementations, an overlap factor is determined for the event mask of each past motion event and a selected zone of interest, and if the overlapping factor exceeds a predetermined overlap threshold, the motion event is deemed to be a relevant motion event for the selected zone of interest.

In some implementations, the overlap factor is a simple sum of all overlapping grid locations or pixel locations. In some implementations, more weight is given to the central region of the zone of interest than the peripheral region of the zone of interest during calculation of the overlap factor. In some implementations, the event mask is a motion energy mask that stores the histogram of pixel count at each pixel location within the event mask. In some implementations, the overlap factor is weighted by the pixel count at the pixel locations that the motion energy map overlaps with the zone of interest.

By storing the event mask at the time that the motion event is processed, the retrospective search for motion events that are relevant to a newly created zone of interest can be performed relatively quickly, and makes the user experience for reviewing the events-of-interest more seamless. As shown in FIG. 9N, creation of a new zone of interest, or selecting a zone of interest to retrieve past motion events that are not previously associated with the zone of interest provides many usage possibilities, and greatly expands the utility of stored motion events. In other words, motion event data (e.g., event categories, event masks) can be stored in anticipation of different uses, without requiring such uses to be tagged and stored at the time when the event occurs. Thus, wasteful storage of extra metadata tags may be avoided in some implementations.

In some implementations, the filters can be used for not only past motion events, but also new motion events that have just occurred or are still in progress. For example, when the video data of a detected motion event candidate is processed, a live motion mask is created and updated based on each frame of the motion event as the frame is received by the video server system 508. In other words, after the live event mask is generated, it is updated as each new frame of the motion event is processed. In some implementations, the live event mask is compared to the zone of interest on the fly, and as soon as a sufficient overlap factor is accumulated, an alert is generated, and the motion event is identified as an event of interest for the zone of interest. In some implementations, an alert is presented on the review interface (e.g., as a pop-up) as the motion event is detected and categorized, and the real-time alert optionally is formatted to indicate its associated zone of interest (e.g., similar to the dialog box 928 in FIG. 9E corresponding to a motion event being associated with Event Category B). This provides real-time monitoring of the zone of interest in some implementations.

In some implementations, the event mask of the motion event is generated after the motion event is completed, and the determination of the overlap factor is based on a comparison of the completed event mask and the zone of interest. Since the generation of the event mask is substantially in real-time, real-time monitoring of the zone of interest may also be realized this way in some implementations.

In some implementations, if multiple zones of interest are selected at any given time for a scene, the event mask of a new and/or old motion event is compared to each of the selected zones of interest. For a new motion event, if the overlap factor for any of the selected zones of interest exceeds the overlap threshold, an alert is generated for the new motion event as an event of interest associated with the zone(s) that are triggered. For a previously stored motion event, if the overlap factor for any of the selected zones of interest exceeds the overlap threshold, the stored motion event is retrieved and presented to the user as an event of interest associated with the zone(s) that are triggered.

In some implementations, if a live event mask is used to monitor zones of interest, a motion object in a motion event may enter different zones at different times during the motion event. In some implementations, a single alert (e.g., a pop-up notification over the timeline) is generated at the time that the motion event triggers a zone of interest for the first time, and the alert can be optionally updated to indicate the additional zones that are triggered when the live event mask touches those zones at later times during the motion event. In some implementations, one alert is generated for each zone of interest when the live event mask of the motion event touches the zone of interest.

FIG. 11E illustrates an example process by which respective overlapping factors are calculated for a motion event and several zones of interest. The zones of interest may be defined after the motion event has occurred and the event mask of the motion event has been stored, such as in the scenario of retrospective zone search. Alternatively, the zones of interest may also be defined before the motion event has occurred in the context of zone monitoring. In some implementations, zone monitoring can rely on a live event mask that is being updated as the motion event is in progress. In some implementations, zone monitoring relies on a completed event mask that is formed immediately after the motion event is completed.

As shown in the upper portion of FIG. 11E, motion masks 1118 for a frame sequence of a motion event are generated as the motion event is processed for motion vector generation. Based on the motion masks 1118 of the frames, an event mask 1120 is created. The creation of an event mask based on motion masks has been discussed earlier with respect to FIG. 11C, and is not repeated herein.

Suppose that the motion masks 1118 shown in FIG. 11E are all the motion masks of a past motion event, thus, the event mask 1120 is a complete event mask stored for the motion event. After the event mask has been stored, when a new zone of interest (e.g., Zone B among the selected zones of interest 1122) is created later, the event mask 1120 is compared to Zone B, and an overlap factor between the event mask 1120 and Zone B is determined. In this particular example, Overlap B (within Overlap 1124) is detected between the event mask 1120 and Zone B, and an overlap factor based on Overlap B also exceeds an overlap threshold for qualifying the motion event as an event of interest for Zone B. As a result, the motion event will be selectively retrieved and presented to the reviewer, when the reviewer selects Zone B as a zone of interest for a present review session.

In some implementations, a zone of interest is created and selected for zone monitoring. During the zone monitoring, when a new motion event is processed in real-time, an event mask is created in real-time for the new motion event and the event mask is compared to the selected zone of interest. For example, if Zone B is selected for zone monitoring, when the Overlap B is detected, an alert associated with Zone B is generated and sent to the reviewer in real-time.

In some implementations, when a live event mask is used for zone monitoring, the live event mask is updated with the motion mask of each new frame of a new motion event that has just been processed. The live motion mask is compared to the selected zone(s) of interest 1122 at different times (e.g., every 5 frames) during the motion event to determine the overlap factor for each of the zones of interest. For example, if all of zones A, B, and C are selected for zone monitoring, at several times during the new motion event, the live event mask is compared to the selected zones of interest 1122 to determine their corresponding overlap factors. In this example, eventually, two overlap regions are found: Overlap A is an overlap between the event mask 1120 and Zone A, and Overlap B is an overlap between the event mask 1120 and Zone B. No overlap is found between the event mask 1120 and Zone C. Thus, the motion event is identified as an event of interest for both Zone A and Zone B, but not for Zone C. As a result, alerts will be generated for the motion event for both Zone A and Zone B. In some implementations, if the live event mask is compared to the selected zones as the motion mask of each frame is added to the live event mask, Overlap A will be detected before Overlap B, and the alert for Zone A will be triggered before the alert for Zone B.

It is noted that the motion event is detected and categorized independently of the existence of the zones of interest. In addition, the zone monitoring does not rely on raw image information within the selected zones; instead, the zone monitoring can take into account the raw image information from the entire scene. Specifically, the motion information during the entire motion event, rather than the motion information confined within the selected zone, is abstracted into an event mask, before the event mask is used to determine whether the motion event is an event of interest for the selected zone. In other words, the context of the motion within the selected zones is preserved, and the event category of the motion event can be provided to the user to provide more meaning to the zone monitoring results.

Representative Processes

FIGS. 12A-12B illustrate a flowchart diagram of a method 1200 of displaying indicators for motion events on an event timeline in accordance with some implementations. In some implementations, the method 1200 is performed by an electronic device with one or more processors, memory, and a display. For example, in some implementations, the method 1200 is performed by client device 504 (FIGS. 5 and 7) or a component thereof (e.g., the client-side module 502, FIGS. 5 and 7). In some implementations, the method 1200 is governed by instructions that are stored in a non-transitory computer readable storage medium (e.g., the memory 606, 706, or 806) and the instructions are executed by one or more processors of the electronic device (e.g., the CPUs 512, 702, or 802). Optional operations are indicated by dashed lines (e.g., boxes with dashed-line borders).

In some implementations, control and access to the smart home environment 100 is implemented in the operating environment 500 (FIG. 5) with a video server system 508 (FIGS. 5-6) and a client-side module 502 (FIGS. 5 and 7) (e.g., an application for monitoring and controlling the smart home environment 100) is executed on one or more client devices 504 (FIGS. 5 and 7). In some implementations, the video server system 508 manages, operates, and controls access to the smart home environment 100. In some implementations, a respective client-side module 502 is associated with a user account registered with the video server system 508 that corresponds to a user of the client device 504.

The electronic device displays (1202) a video monitoring user interface on the display including a camera feed from a camera located remotely from the client device in a first region of the video monitoring user interface and an event timeline in a second region of the video monitoring user interface, where the event timeline includes a plurality of event indicators for a plurality of motion events previously detected by the camera. In some implementations, the electronic device (i.e., electronic device 166, FIG. 1, or client device 504, FIGS. 5 and 7) is a mobile phone, tablet, laptop, desktop computer, or the like, which executes a video monitoring application or program corresponding to the video monitoring user interface. In some implementations, the client device 504 or a component thereof (e.g., event review interface module 734, FIG. 7) displays the video monitoring user interface (UI) on the display. FIG. 9C, for example, shows a video monitoring UI displayed by the client device 504 with three distinct regions: a first region 903, a second region 905, and a third region 907. In FIG. 9C, the first region 903 of the video monitoring UI includes a video feed from a respective camera among the one or more camera 118 associated with the smart home environment 100. In some implementations, the video feed is a live feed or playback of the recorded video feed from a previously selected start point. In FIG. 9C, the second region 905 of the video monitoring UI includes an event timeline 910 and a current video feed indicator 909 indicating the temporal position of the video feed displayed in the first region 903 (i.e., the point of playback for the video feed displayed in the first region 903). FIG. 9C, for example, shows event indicators 922A, 922B, 922C, 922D, 922E, and 922F corresponding to detected motion events on the event timeline 910. In some implementations, the video server system 508 or a component thereof (e.g., video data receiving module 616, FIG. 6) receives the video feed from the respective camera, and the video server system 508 or a component thereof (e.g., event detection module 620, FIG. 6) detects the motion events. In some implementations, the client device 504 receives the video feed either relayed through from the video server system 508 or directly from the respective camera and detects the motion events.

In some implementations, at least one of the height or width of a respective event indicator among the plurality of event indicators on the event timeline corresponds to (1204) the temporal length of a motion event corresponding to the respective event indicator. In some implementations, the event indicators can be no taller or wider than a predefined height/width so as not to clutter the event timeline. In FIG. 9C, for example, the height of the indicators 922A, 922B, 922C, 922D, 922E, and 922F indicate the temporal length of the motion events to which they correspond.

In some implementations, the video monitoring user interface further includes (1206) a third region with a list of one or more categories, and where the list of one or more categories at least includes an entry corresponding to the first category after associating the first category with the first set of similar motion events. In some implementations, the first, second, and third regions are each located in distinct areas of the video monitoring interface. In some implementations, the list of categories includes recognized activity categories and created zones of interest. FIG. 9N, for example, shows the third region 907 of the video monitoring UI with a list of categories for recognized event categories and created zones of interest. In FIG. 9N, the list of categories in the third region 907 includes an entry 924A for a first recognized event category labeled as "event category A," an entry 924B for a second recognized event category labeled as "Birds in Flight," and an entry 924C for a previously created zone of interest labeled as "zone A." In some implementations, the list of categories in the third region 907 also includes an entry for uncategorized motion events.

In some implementations, the entry corresponding to the first category includes (1208) a text box for entering a label for the first category. In some implementations, events indicators on the event timeline are colored according to the event category to which they are assigned and also labeled with a text label corresponding to the event category to which they are assigned. For example, in FIG. 9E, the entry 924A for event category A and the entry 924B for event category B in the list of categories in the third region 907 of the video monitoring UI may each further include a text box (not shown) for editing the default labels for the event categories. In this example, the user of the client device 504 may edit the default labels for the event categories (e.g., "event category A" and "event category B") to a customized name (e.g., "Coyotes" and "Birds in Flight") using the corresponding text boxes.

In some implementations, the entry corresponding to the first category includes (1210) a first affordance for disabling and enabling display of the first set of pre-existing event indicators on the event timeline. In some implementations, the user of the client device is able to filter the event timeline on a category basis (e.g., event categories and/or zones of interest) by disabling view of events indicators associated with unwanted categories. FIG. 9E, for example, shows an entry 924A for event category A and an entry 924B for event category B in the list of categories in the third region 907 of the video monitoring UI. In FIG. 9E, the entry 924A includes indicator filter 926A for enabling/disabling display of event indicators on the event timeline 910 for motion events assigned to event category A, and the entry 924B includes indicator filter 926B for enabling/disabling display of event indicators on the event timeline 910 for motion events assigned to event category B. In FIG. 9E, display of event indicators for motion events corresponding to the event category A and the event category B are enabled as evinced by the check marks corresponding to the indicator filter 926A and the indicator filter 926B. FIG. 9F, for example, shows the client device 504 detecting a contact 930 (e.g., a tap gesture) at a location corresponding to the indicator filter 926A on the touch screen 906. FIG. 9G, for example, shows the indicator filter 926A as unchecked in response to detecting the contact 930 in FIG. 9F. Moreover, in FIG. 9G, the client device 504 ceases to display event indicators 922A, 922C, 922D, and 922E, which correspond to motion events assigned to event category A, on the event timeline 910 in response to detecting the contact 930 in FIG. 9F.

In some implementations, the entry corresponding to the first category includes (1212) a second affordance for disabling and enabling notifications corresponding to subsequent motion events of the first category. In some implementations, the user of the client device is able to disable reception of notifications for motion events that fall into certain categories. FIG. 9E, for example, shows an entry 924A for event category A and an entry 924B for event category B in the list of categories in the third region 907 of the video monitoring UI. In FIG. 9E, the entry 924A includes notifications indicator 927A for enabling/disabling notifications sent in response to detection of motion events assigned to event category A, and the entry 924B includes notifications indicator 927B for enabling/disabling notifications sent in response to detection of motion events assigned to event category B. In FIG. 9E, notifications for detection of motion events correlated with event category A and event category B are enabled. FIG. 9E, for example, also shows the client device 504 detecting a contact 929 (e.g., a tap gesture) at a location corresponding to the notifications indicator 927A on the touch screen 906. FIG. 9F, for example, shows the notifications indicator 927A in the third region 907 as disabled, shown by the line through the notifications indicator 927A, in response to detecting the contact 929 in FIG. 9E.

In some implementations, the second region includes (1214) one or more timeline length affordances for adjusting a resolution of the event timeline. In FIG. 9A, for example, the second region 905 includes affordances 913 for changing the scale of event timeline 910: a 5 minute affordance 913A for changing the scale of the event timeline 910 to 5 minutes, a 1 hour affordance 913B for changing the scale of the event timeline 910 to 1 hour, and a 24 hours affordance 913C for changing the scale of the event timeline 910 to 24 hours. In FIG. 9A, the scale of the event timeline 910 is 1 hour as evinced by the darkened border surrounding the 1 hour affordance 913B and also the temporal tick marks shown on the event timeline 910. In some implementations, the displayed portion of the event timeline may be changed by scrolling via left-to-right or right-to-left swipe gestures. In some implementations, the scale of the timeline may be increased (e.g., 1 hour to 24 hours) with a pinch-out gesture to display a greater temporal length or decreased (e.g., 1 hour to 5 minutes) with a pinch-in gesture to display a lesser temporal length.

In some implementations, an adjustment to the resolution of the timeline causes the event timeline to automatically be repopulated with events indicators based on the selected granularity. FIG. 9U, for example, shows the client device 504 detecting a contact 978 at a location corresponding to the 24 hours affordance 913C on the touch screen 906. FIG. 9V, for example, shows the client device 504 displaying the event timeline 910 with a 24 hour scale in response to detecting selection of the 24 hours affordance 913C in FIG. 9U. In FIG. 9V, the 24 hours scale is evinced by the darkened border surrounding the 24 hours affordance 913C and also the temporal tick marks shown on the event timeline 910. For example, a first set of event indicators are displayed on the event timeline 910 in FIG. 9U in the 1 hour scale. Continuing with this example, in response to detecting selection of the 24 hours affordance 913C in FIG. 9U, a second set of event indicators (at least partially distinct from the first set of event indicators) are displayed on the event timeline 910 in FIG. 9V in the 24 hours scale.

The electronic device associates (1216) a newly created first category with a set of similar motion events (e.g., previously uncategorized events) from among the plurality of motion events previously detected by the camera. In some implementations, the newly created category is a recognized event category or a newly created zone of interest. In some implementations, the client device 504 (FIGS. 5 and 7), the video server system 508 (FIGS. 5-6) or a component thereof (e.g., event categorization module 622, FIG. 6), or a combination thereof determines a first event category and identifies the set of similar motion events with motion characteristics matching the first event category. In some implementations, the set of similar motion events match a predetermined event template or a learned event type corresponding to the first event category. In some implementations, the client device 504 (FIGS. 5 and 7), the video server system 508 (FIGS. 5-6) or a component thereof (e.g., zone monitoring module 630, FIG. 6), or a combination thereof identifies the set of similar motion events that occurred at least in part within a newly created zone of interest. For example, the set of similar motion events touch or overlap the newly created zone of interest.

In some implementations, the video server system 508 provides an indication of the set of similar motion events assigned to the newly created first category, and, in response, the client device 504 associates the set of similar motion events with the newly created first category (i.e., by performing operation 1222 or associating the set of similar motion events with the created first category in a local database). In some implementations, the video server system 508 provides event characteristics for the set of similar motion events assigned to the newly created first category, and, in response, the client device 504 associates the set of similar motion events with the newly created first category (i.e., by performing operation 1222 or associating the set of similar motion events with the created first category in a local database).

In some implementations, the newly created category corresponds to (1218) a newly recognized event category. In FIG. 9D, for example, the list of categories in the third region 907 of the video monitoring UI includes an entry 924A for newly recognized event category A. In FIG. 9D, motion events correlated with event indicators 922A, 922C, 922D, and 922E have been retroactively assigned to event category A as shown by the changed display characteristic of event indicators 922A, 922C, 922D, and 922E (e.g., vertical stripes). For example, the motion events correlated with the event indicators 922A, 922C, 922D, and 922E were previously uncategorized in FIG. 9C as shown by the unfilled display characteristic for the event indicators 922A, 922C, 922D, and 922E.

In some implementations, the newly created category corresponds to (1220) a newly created zone of interest. FIG. 9N, for example, shows the client device 504 displaying an entry 924C for newly created zone A in the list of categories in the third region 907 in response to creating the zone of interest in FIGS. 9L-9M. In FIG. 9N, the motion event correlated with event indicator 922M has been retroactively associated with zone A as shown by the changed display characteristic of the event indicator 922M (e.g., the 'X' at the bottom of the event indicator 922M). For example, the motion event correlated with the event indicator 922M was previously uncategorized in FIG. 9M as shown by the unfilled display characteristic for the event indicator 922M.

In response to associating the first category with the first set of similar motion events, the electronic device changes (1222) at least one display characteristic for a first set of pre-existing event indicators from among the plurality of event indicators on the event timeline that correspond to the first category, where the first set of pre-existing event indicators correspond to the set of similar motion events. For example, pre-existing uncategorized events indicators on the event timeline that correspond to events that fall into the first event category are retroactively colored a specific color or displayed in a specific shading pattern that corresponds to the first event category. In some implementations, the display characteristic is a fill color of the event indicator, a shading pattern of the event indicator, an icon/symbol overlaid on the event indicator, or the like. In FIG. 9D, for example, the event indicators 922A, 922C, 922D, and 922E include vertical stripes as compared to no fill in FIG. 9C. In FIG. 9N, for example, the event indicator 922M includes an 'X' symbol overlaid on its bottom region as compared to no fill or symbol(s) in FIG. 9M.

In some implementations, the set of similar motion events is (1224) a first set of similar motion events, and the electronic device: associates a newly created second category with a second set of similar motion events from among the plurality of motion events previously detected by the camera, where the second set of similar motion events is distinct from the first set of similar motion events; and, in response to associating the second category with the second set of similar motion events, changes at least one display characteristic for a second set of pre-existing event indicators from among the plurality of event indicators on the event timeline that correspond to the second category, where the second set of pre-existing event indicators correspond to the second set of similar motion events. The second set of similar motion events and the second set of pre-existing event indicators are distinct from the first set of similar motion events and the first set of pre-existing event indicators. In FIG. 9E, for example, the list of categories in the third region 907 of the video monitoring UI includes an entry 924B for newly recognized event category B. In FIG. 9E, motion events correlated with event indicators 922F, 922G, 922H, 922J, and 922K have been retroactively assigned to event category B as shown by the changed display characteristic of event indicators 922F, 922G, 922H, 922J, and 922K (e.g., a diagonal shading pattern). For example, the motion events correlated with the event indicators 922F, 922G, 922H, 922J, and 922K were previously uncategorized in FIGS. 9C-9D as shown by the unfilled display characteristic for the event indicators 922F, 922G, 922H, 922J, and 922K.

In some implementations, the electronic device detects (1226) a first user input at a location corresponding to a respective event indicator on the event timeline and, in response to detecting the first user input, displays preview of a motion event corresponding to the respective event indicator. For example, the user of the client device 504 hovers over the respective events indicator with a mouse cursor or taps the respective events indicator with his/her finger to display a pop-up preview pane with a short video clip (e.g., approximately three seconds) of the motion event that corresponds to the respective events indicator. FIG. 9G, for example, shows the client device 504 detecting a contact 931 (e.g., a tap gesture) at a location corresponding to event indicator 922B on the touch screen 906. FIG. 9H, for example, shows the client device 504 displaying a dialog box 923 for a respective motion event correlated with the event indicator 922B in response to detecting selection of the event indicator 922B in FIG. 9G. In some implementations, the dialog box 923 may be displayed in response to sliding or hovering over the event indicator 922B. In FIG. 9H, the dialog box 923 includes the time the respective motion event was detected (e.g., 11:37:40 am) and a preview 932 of the respective motion event (e.g., a static image, a series of images, or a video clip).

In some implementations, if the event timeline is set to a temporal length of 24 hours and multiple motion events occurred within a short time period (e.g., 60, 300, 600, etc. seconds), the respective events indicator may be associated with the multiple motion events and the pop-up preview pane may concurrently display video clips of the multiple motion event that corresponds to the respective events indicator. FIG. 9V, for example, shows the client device 504 displaying the event timeline 910 with a 24 hour scale in response to detecting selection of the 24 hours affordance 913C in FIG. 9U. FIG. 9V, for example, also shows the client device 504 detecting a contact 980 (e.g., a tap gesture) at a location corresponding to an event indicator 979 on the touch screen 906. FIG. 9W, for example, shows the client device 504 displaying a dialog box 981 for respective motion events correlated with the event indicator 979 in response to detecting selection of the event indicator 979 in FIG. 9V. In some implementations, the dialog box 981 may be displayed in response to sliding or hovering over the event indicator 979. In FIG. 9W, the dialog box 981 includes the times at which the respective motion events were detected (e.g., 6:35:05 am, 6:45:15 am, and 6:52:45 am). In FIG. 9W, the dialog box 981 also includes previews 982A, 982B, and 982C of the respective motion events (e.g., a static image, a series of images, or a video clip).

It should be understood that the particular order in which the operations in FIGS. 12A-12B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., the process 1000, and the methods 1300, 1400, 1500, and 1600) are also applicable in an analogous manner to the method 1200 described above with respect to FIGS. 12A-12B.

FIGS. 13A-13B illustrate a flowchart diagram of a method of editing event categories in accordance with some implementations. In some implementations, the method 1300 is performed by an electronic device with one or more processors, memory, and a display. For example, in some implementations, the method 1300 is performed by client device 504 (FIGS. 5 and 7) or a component thereof (e.g., the client-side module 502, FIGS. 5 and 7). In some implementations, the method 1300 is governed by instructions that are stored in a non-transitory computer readable storage medium (e.g., the memory 606, 706, or 806) and the instructions are executed by one or more processors of the electronic device (e.g., the CPUs 512, 702, or 802). Optional operations are indicated by dashed lines (e.g., boxes with dashed-line borders).

In some implementations, control and access to the smart home environment 100 is implemented in the operating environment 500 (FIG. 5) with a video server system 508 (FIGS. 5-6) and a client-side module 502 (FIGS. 5 and 7) (e.g., an application for monitoring and controlling the smart home environment 100) is executed on one or more client devices 504 (FIGS. 5 and 7). In some implementations, the video server system 508 manages, operates, and controls access to the smart home environment 100. In some implementations, a respective client-side module 502 is associated with a user account registered with the video server system 508 that corresponds to a user of the client device 504.

The electronic device displays (1302) a video monitoring user interface on the display with a plurality of affordances associated one or more recognized activities. In some implementations, the electronic device (i.e., electronic device 166, FIG. 1, or client device 504, FIGS. 5 and 7) is a mobile phone, tablet, laptop, desktop computer, or the like, which executes a video monitoring application or program corresponding to the video monitoring user interface. In some implementations, the client device 504 or a component thereof (e.g., event review interface module 734, FIG. 7) displays the video monitoring user interface (UI) on the display.

In some implementations, the video monitoring user interface includes (1304): (A) a first region with a video feed from a camera located remotely from the client device; (B) a second region with an event timeline, where the event timeline includes a plurality event indicators corresponding to motion events, and where at least a subset of the plurality of event indicators are associated with the respective event category; and (C) a third region with a list of one or more recognized event categories. FIG. 9N, for example, shows a video monitoring UI displayed by the client device 504 with three distinct regions: a first region 903, a second region 905, and a third region 907. In FIG. 9N, the first region 903 of the video monitoring UI includes a video feed from a respective camera among the one or more camera 118 associated with the smart home environment 100. In some implementations, the video feed is a live feed or playback of the recorded video feed from a previously selected start point. In FIG. 9N, the second region 905 of the video monitoring UI includes an event timeline 910 and a current video feed indicator 909 indicating the temporal position of the video feed displayed in the first region 903 (i.e., the point of playback for the video feed displayed in the first region 903). FIG. 9N, for example, shows event indicators 922F, 922G, 922H, 922I, 922J, 922K, 922L, and 922M corresponding to detected motion events on the event timeline 910. In some implementations, the video server system 508 (FIGS. 5-6) receives the video feed from the respective camera and detects the motion events. In some implementations, the client device 504 (FIGS. 5 and 7) receives the video feed either relayed through from the video server system 508 or directly from the respective camera and detects the motion events. In FIG. 9N, the third region 907 of the video monitoring UI includes a list of categories for recognized event categories and created zones of interest.

In some implementations, the list of one or more recognized event categories includes (1306) the plurality of affordances, where each of the plurality of affordances correspond to a respective one of the one or more recognized event categories. In FIG. 9N, the list of categories in the third region 907 includes an entry 924A for a first recognized event category labeled as "event category A," an entry 924B for a second recognized event category labeled as "Birds in Flight," and an entry 924C for a created zone of interest labeled as "zone A."

In some implementations, the respective affordance is displayed (1308) in response to performing a gesture with respect to one of the event indicators. For example, the user hovers over one of the event indicators on the event timeline to display a pop-up box including a video clip of the motion event corresponding to the event indicators and an affordance for accessing the editing user interface corresponding to the respective event category. FIG. 9G, for example, shows the client device 504 detecting a contact 931 (e.g., a tap gesture) at a location corresponding to the event indicator 922B on the touch screen 906. FIG. 9H, for example, shows the client device 504 displaying a dialog box 923 for a respective motion event correlated with the event indicator 922B in response to detecting selection of the event indicator 922B in FIG. 9G. In some implementations, the dialog box 923 may be displayed in response to sliding or hovering over the event indicator 922B. In FIG. 9H, the dialog box 923 includes an affordance 933, which, when activated (e.g., with a tap gesture), causes the client device 504 to display an editing UI for the event category to which the respective motion event is assigned (if any).

The electronic device detects (1310) a user input selecting a respective affordance from the plurality of affordances in the video monitoring user interface, the respective affordance being associated with a respective event category of the one or more recognized event categories. FIG. 9H, for example, shows the client device 504 detecting a contact 934 (e.g., a tap gesture) at a location corresponding to the entry 924B for event category B on the touch screen 906.

In response to detecting the user input, the electronic device displays (1312) an editing user interface for the respective event category on the display with a plurality of animated representations in a first region of the editing user interface, where the plurality of animated representations correspond to a plurality of previously captured motion events assigned to the respective event category. In some implementations, an animated representation (i.e., sprites) includes approximately ten frames from a corresponding motion event. For example, the ten frames are the best frames illustrating the captured motion event. FIG. 9I, for example, shows the client device 504 displaying an editing user interface (UI) for event category B in response to detecting selection of the entry 924B in FIG. 9H. In FIG. 9I, the editing user interface for event category B includes two distinct regions: a first region 935; and a second region 937. The first region 935 of the editing UI includes representations 936 (sometimes also herein called "sprites") of motion events assigned to event category B. In some implementations, each of the representations 936 is a series of frames or a video clip of a respective motion event assigned to event category B. For example, in FIG. 9I, each of the representations 936 corresponds to a motion event of a bird flying from left to right across the field of view of the respective camera (e.g., a west to northeast direction).

In some implementations, the editing user interface further includes (1314) a second region with a representation of a video feed from a camera located remotely from the client device. In FIG. 9I, the second region 937 of the editing UI includes a representation of the video feed from the respective camera with a linear motion vector 942 representing the typical path of motion for motion events assigned event category B. In some implementations, the representation is a live video feed from the respective camera. In some implementations, the representation is a static image corresponding to a recently captured frame from video feed of the respective camera.

In some implementations, the representation in the second region includes (1316) a linear motion vector overlaid on the video feed, where the linear motion vector corresponds to a typical motion path for the plurality of previously captured motion events assigned to the respective event category. In FIG. 9I, for example, a linear motion vector 942 representing the typical path of motion for motion events assigned event category B is overlaid on the representation of the video feed in the second region 937 of the editing UI.

In some implementations, the first region of the editing user interface further includes (1318) an affordance for disabling and enabling notifications corresponding to subsequent motion events of the respective event category. In FIG. 9I, for example, the first region 935 of the editing UI further includes a notifications indicator 940 for enabling/disabling notifications sent in response to detection of motion events assigned to event category B.

In some implementations, the first region of the editing user interface further includes (1320) a text box for entering a label for the respective event category. In FIG. 9I, for example, the first region 935 of the editing UI further includes a label text entry box 939 for renaming the label for the event category from the default name ("event category B") to a custom name. FIG. 9J, for example, shows the label for the event category as "Birds in Flight" in the label text entry box 939 as opposed to the default label—"event category B"—in FIG. 9I.

In some implementations, the electronic device detects (1322) one or more subsequent user inputs selecting one or more animated representations in the first region of the editing user interface and, in response to detecting the one or more subsequent user inputs, sends a message to a server indicating the one or more selected animated representations, where a set of previously captured motion events corresponding to the one or more selected animated representations are disassociated with the respective event category. In some implementations, the user of the client device 504 removes animated representations for motion events that are erroneously assigned to the event category. In some implementations, the client device 504 sends a message to the video server system 508 indicating the removed motion events, and, subsequently, the video server system 508 or a component thereof (e.g., event categorization module 622, FIG. 6) re-computes a model or algorithm for the event category based on the removed motion events.

In FIG. 9I, for example, each of the representations 936 is associated with a checkbox 941. In some implementations, when a respective checkbox 941 is unchecked (e.g., with a tap gesture) the motion event corresponding to the respective checkbox 941 is removed from the event category B and, in some circumstances, the event category B is re-computed based on the removed motion event. For example, the checkboxes 941 enable the user of the client device 504 to remove motion events incorrectly assigned to an event category so that similar motion events are not assigned to the event category in the future. FIG. 9I, for example, shows the client device 504 detecting a contact 943 (e.g., a tap gesture) at a location corresponding to the checkbox 941C on the touch screen 906 and contact 944 (e.g., a tap gesture) at a location corresponding to the checkbox 941E on the touch screen 906. For example, the user of the client device 504 intends to remove the motion events corresponding to the representation 936C and the representation 936E as they do not show a bird flying in a west to northeast direction. FIG. 9J, for example, shows the checkbox 941C corresponding to the motion event correlated with the event indicator 922L and the checkbox 941E corresponding to the motion event correlated with the event indicator 922J as unchecked in response to detecting the contact 943 and the contact 944, respectively, in FIG. 9I.

It should be understood that the particular order in which the operations in FIGS. 13A-13B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., the process 1000, and the methods 1200, 1400, 1500, and 1600) are also applicable in an analogous manner to the method 1300 described above with respect to FIGS. 13A-13B.

FIGS. 14A-14B illustrate a flowchart diagram of a method of automatically categorizing a detected motion event in accordance with some implementations. In some implementations, the method 1400 is performed by a computing system (e.g., the client device 504, FIGS. 5 and 7; the video server system 508, FIGS. 5-6; or a combination thereof) with one or more processors and memory. In some implementations, the method 1400 is governed by instructions that are stored in a non-transitory computer readable storage medium (e.g., the memory 606, 706, or 806) and the instructions are executed by one or more processors of the computing system (e.g., the CPUs 512, 702, or 802). Optional operations are indicated by dashed lines (e.g., boxes with dashed-line borders).

In some implementations, control and access to the smart home environment 100 is implemented in the operating environment 500 (FIG. 5) with a video server system 508 (FIGS. 5-6) and a client-side module 502 (FIGS. 5 and 7) (e.g., an application for monitoring and controlling the smart home environment 100) is executed on one or more client devices 504 (FIGS. 5 and 7). In some implementations, the video server system 508 manages, operates, and controls access to the smart home environment 100. In some implementations, a respective client-side module 502 is associated with a user account registered with the video server system 508 that corresponds to a user of the client device 504.

The computing system displays (1402) a video monitoring user interface on the display including a video feed from a camera located remotely from the client device in a first region of the video monitoring user interface and an event timeline in a second region of the video monitoring user interface, where the event timeline includes one or more event indicators corresponding to one or more motion events previously detected by the camera. In some implementations, the client device 504 or a component thereof (e.g., event review interface module 734, FIG. 7) displays the video monitoring user interface (UI) on the display. FIG. 9C, for example, shows a video monitoring UI displayed by the client device 504 with three distinct regions: a first region 903, a second region 905, and a third region 907. In FIG. 9C, the first region 903 of the video monitoring UI includes a video feed from a respective camera among the one or more camera 118 associated with the smart home environment 100. In some implementations, the video feed is a live feed or playback of the recorded video feed from a previously selected start point. In FIG. 9C, the second region 905 of the video monitoring UI includes an event timeline 910 and a current video feed indicator 909 indicating the temporal position of the video feed displayed in the first region 903 (i.e., the point of playback for the video feed displayed in the first region 903). FIG. 9C, for example, shows event indicators 922A, 922B, 922C, 922D, 922E, and 922F corresponding to detected motion events on the event timeline 910. In some implementations, the video server system 508 receives the video feed from the respective camera and detects the motion events. In some implementations, the client device 504 receives the video feed either relayed through from the video server system 508 or directly from the respective camera and detects the motion events. FIG. 9N, for example, shows the third region 907 of the video monitoring UI with a list of categories for recognized event categories and created zones of interest. In FIG. 9N, the list of categories in the third region 907 includes an entry 924A for a first recognized event category labeled as "event category A," an entry 924B for a second recognized event category labeled as "Birds in Flight," and an entry 924C for a created zone of interest labeled as "zone A." In some implementations, the list of categories in the third region 907 also includes an entry for uncategorized motion events.

The computing system detects (1404) a motion event. In some implementations, the client device 504 (FIGS. 5 and 7) receives the video feed either relayed through the video server system 508 or directly from the respective camera, and the client device 504 detects the respective motion event. In some implementations, the video server system 508 (FIGS. 5-6) receives the video feed from the respective camera, and the video server system 508 or a component thereof (e.g., event detection module 620, FIG. 6) detects a respective motion event present in the video feed. Subsequently, the video server system 508 sends an indication of the motion event along with a corresponding metadata, such as a timestamp for the detected motion event and categorization information, to the client device 504 along with the relayed video feed from the respective camera. Continuing with this example, the client device 504 detects the motion event in response to receiving the indication from the video server system 508.

The computing system determines (1406) one or more characteristics for the motion event. For example, the one or more characteristics include the motion direction, linear motion vector for the motion event, the time of the motion event, the area in the field-of-view of the respective in which the motion event is detected, a face or item recognized in the captured motion event, and/or the like.

In accordance with a determination that the one or more determined characteristics for the motion event satisfy one or more criteria for a respective category, the computing system (1408): assigns the motion event to the respective category; and displays an indicator for the detected motion event on the event timeline with a display characteristic corresponding to the respective category. In some implementations, the one or more criteria for the respective event category include a set of event characteristics (e.g., motion vector, event time, model/cluster similarity, etc.), whereby the motion event is assigned to the event category if its determined characteristics match a certain number of event characteristics for the category. In some implementations, the client device 504 (FIGS. 5 and 7), the video server system 508 (FIGS. 5-6) or a component thereof (e.g., event categorization module 622, FIG. 6), or a combination thereof assigns the detected motion event to an event category. In some implementations, the event category is a recognized event category or a previously created zone of interest. In some implementations, the client device 504 or a component thereof (e.g., event review interface module 734, FIG. 7) displays an indicator for the detected motion event on the event timeline 910 with a display characteristic corresponding to the respective category. In FIG. 9E, for example, the client device 504 detects a respective motion event and assigns the respective motion event to event category B. Continuing with this example, in FIG. 9E, the client device 504 displays event indicator 922L corresponding to the respective motion event with a display characteristic for event category B (e.g., the diagonal shading pattern).

In some implementations, the respective category corresponds to (1410) a recognized event category. In some implementations, the client device 504, the video server system 508 (FIGS. 5-6) or a component thereof (e.g., event categorization module 622, FIG. 6), or a combination thereof assigns the detected motion event with motion characteristics matching a respective event category to the respective event category.

In some implementations, the respective category corresponds to (1412) a previously created zone of interest. In some implementations, the client device 504, the video server system 508 (FIGS. 5-6) or a component thereof (e.g., event categorization module 622, FIG. 6), or a combination thereof determines that the detected motion event touches or overlaps at least part of a previously created zone of interest.

In some implementations, in accordance with a determination that the one or more determined characteristics for the motion event satisfy the one or more criteria for the respective category, the computing system or a component thereof (e.g., the notification module 738, FIG. 7) displays (1414) a notification indicating that the detected motion event has been assigned to the respective category. FIG. 9E, for example, shows client device 504 displaying a notification 928 for a newly detected respective motion event corresponding to event indicator 922L. For example, as the respective motion event is detected and assigned to event category B, event indicator 922L is displayed on the event timeline 910 with the display characteristic for event category B (e.g., the diagonal shading pattern). Continuing with this example, after or as the event indicator 922L is displayed on the event timeline 910, notification 928 pops-up from the event indicator 922L. In FIG. 9E, the notification 928 notifies the user of the client device 504 that the motion event detected at 12:32:52 pm was assigned to event category B.

In some implementations, the notification pops-up (1416) from the indicator for the detected motion event. In FIG. 9E, for example, the notification 928 pops-up from the event indicator 922L after or as the event indicator 922L is displayed on the event timeline 910.

In some implementations, the notification is overlaid (1418) on the video in the first region of the video monitoring user interface. In some implementations, for example, the notification 928 in FIG. 9E is at least partially overlaid on the video feed displayed in the first region 903.

In some implementations, the notification is (1420) a banner notification displayed in a location corresponding to the top of the video monitoring user interface. In some implementations, for example, the notification 928 in FIG. 9E pops-up from the event timeline 910 and is displayed at a location near the top of the first region 903 (e.g., as a banner notification). In some implementations, for example, the notification 928 in FIG. 9E pops-up from the event timeline 910 and is displayed in the center of the first region 903 (e.g., overlaid on the video feed).

In some implementations, the notification includes (1422) one or more affordances for providing feedback as to whether the detected motion event is properly assigned to the respective category. In some implementations, for example, the notification 928 in FIG. 9E includes one or more affordances (e.g., a thumbs up affordance and a thumbs down affordance, or a properly categorized affordance and an improperly categorized affordance) for providing feedback as to whether the motion event correlated with event indicator 922L was properly assigned to event category B.

It should be understood that the particular order in which the operations in FIGS. 14A-14B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., the process 1000, and the methods 1200, 1300, 1500, and 1600) are also applicable in an analogous manner to the method 1400 described above with respect to FIGS. 14A-14B.

FIGS. 15A-15C illustrate a flowchart diagram of a method of generating a smart time-lapse video clip in accordance with some implementations. In some implementations, the method 1500 is performed by an electronic device with one or more processors, memory, and a display. For example, in some implementations, the method 1500 is performed by client device 504 (FIGS. 5 and 7) or a component thereof (e.g., the client-side module 502, FIGS. 5 and 7). In some implementations, the method 1500 is governed by instructions that are stored in a non-transitory computer readable storage medium (e.g., the memory 606, 706, or 806) and the instructions are executed by one or more processors of the electronic device (e.g., the CPUs 512, 702, or 802). Optional operations are indicated by dashed lines (e.g., boxes with dashed-line borders).

In some implementations, control and access to the smart home environment 100 is implemented in the operating environment 500 (FIG. 5) with a video server system 508 (FIGS. 5-6) and a client-side module 502 (FIGS. 5 and 7) (e.g., an application for monitoring and controlling the smart home environment 100) is executed on one or more client devices 504 (FIGS. 5 and 7). In some implementations, the video server system 508 manages, operates, and controls access to the smart home environment 100. In some implementations, a respective client-side module 502 is associated with a user account registered with the video server system 508 that corresponds to a user of the client device 504.

The electronic device displays (1502) a video monitoring user interface on the display including a video feed from a camera located remotely from the client device in a first region of the video monitoring user interface and an event timeline in a second region of the video monitoring user interface, where the event timeline includes a plurality of event indicators for a plurality of motion events previously detected by the camera. In some implementations, the electronic device (i.e., electronic device 166, FIG. 1, or client device 504, FIGS. 5 and 7) is a mobile phone, tablet, laptop, desktop computer, or the like, which executes a video monitoring application or program corresponding to the video monitoring user interface. In some implementations, the client device 504 or a component thereof (e.g., event review interface module 734, FIG. 7) displays the video monitoring user interface (UI) on the display. FIG. 9C, for example, shows a video monitoring UI displayed by the client device 504 with three distinct regions: a first region 903, a second region 905, and a third region 907. In FIG. 9C, the first region 903 of the video monitoring UI includes a video feed from a respective camera among the one or more camera 118 associated with the smart home environment 100. In some implementations, the video feed is a live feed or playback of the recorded video feed from a previously selected start point. In FIG. 9C, the second region 905 of the video monitoring UI includes an event timeline 910 and a current video feed indicator 909 indicating the temporal position of the video feed displayed in the first region 903 (i.e., the point of playback for the video feed displayed in the first region 903). FIG. 9C, for example, shows event indicators 922A, 922B, 922C, 922D, 922E, and 922F corresponding to detected motion events on the event timeline 910. In some implementations, the video server system 508 receives the video feed from the respective camera and detects the motion events. In some implementations, the client device 504 receives the video feed either relayed through from the video server system 508 or directly from the respective camera and detects the motion events. FIG. 9N, for example, shows the third region 907 of the video monitoring UI with a list of categories for recognized event categories and created zones of interest. In FIG. 9N, the list of categories in the third region 907 includes an entry 924A for a first recognized event category labeled as "event category A," an entry 924B for a second recognized event category labeled as "Birds in Flight," and an entry 924C for a created zone of interest labeled as "zone A." In some implementations, the list of categories in the third region 907 also includes an entry for uncategorized motion events.

The electronic device detects (1504) a first user input selecting a portion of the event timeline, where the selected portion of the event timeline includes a subset of the plurality of event indicators on the event timeline. For example, the user of the client device selects the portion of the event timeline by inputting a start and end time or using a sliding, adjustable window overlaid on the timeline. In FIG. 9O, for example, the second region 905 of the video monitoring UI includes a start time entry box 956A for entering/changing a start time of the time-lapse video clip to be generated and an end time entry box 956B for entering/changing an end time of the time-lapse video clip to be generated. In FIG. 9O, the second region 905 of the video monitoring UI also includes a start time indicator 957A and an end time indicator 957B on the event timeline 910, which indicates the start and end times of the time-lapse video clip to be generated. In some implementations, for example, the locations of the start time indicator 957A and the end time indicator 957B in FIG. 9O may be moved on the event timeline 910 via pulling/dragging gestures.

In response to the first user input, the electronic device causes (1506) generation of a time-lapse video clip of the selected portion of the event timeline. In some implementations, after selecting the portion of the event timeline, the client device 504 causes generation of the time-lapse video clip corresponding to the selected portion by the client device 504, the video server system 508 or a component thereof (e.g., event post-processing module 634, FIG. 6), or a combination thereof. In some implementations, the motion events within the selected portion of the event timeline are played at a slower speed than the balance of the selected portion of the event timeline. In some implementations, the motion events assigned to enabled event categories and motion events that touch or overlap enabled zones are played at a slower speed than the balance of the selected portion of the event timeline including motion events assigned to disabled event categories and motion events that touch or overlap disabled zones.

In some implementations, prior to detecting the first user input selecting the portion of the event timeline, the electronic device (1508): detects a third user input selecting a time-lapse affordance within the video monitoring user interface; and, in response to detecting the third user input, displays at least one of (A) an adjustable window overlaid on the event timeline for selecting the portion of the event timeline and (B) one or more text entry boxes for entering times for a beginning and an end of the portion of the event timeline. In some implementations, the first user input corresponds to the adjustable window or the one or more text entry boxes. In FIG. 9N, for example, the second region 905 includes "Make Time-Lapse" affordance 915, which, when activated (e.g., via a tap gesture), enables the user of the client device 504 to select a portion of the event timeline 910 for generation of a time-lapse video clip (as shown in FIGS. 9N-9Q). FIG. 9N, for example, shows the client device 504 detecting a contact 954 (e.g., a tap gesture) at a location corresponding to the "Make Time-Lapse" affordance 915 on the touch screen 906. For example, the contact 954 is the third user input. FIG. 9O, for example, shows the client device 504 displaying controls for generating a time-lapse video clip in response to detecting selection of the "Make Time-Lapse" affordance 915 in FIG. 9N. In FIG. 9O, the second region 905 of the video monitoring UI includes a start time entry box 956A for entering/changing a start time of the time-lapse video clip to be generated and an end time entry box 956B for entering/changing an end time of the time-lapse video clip to be generated. In FIG. 9O, the second region 905 also includes a start time indicator 957A and an end time indicator 957B on the event timeline 910, which indicates the start and end times of an adjustable window on the event timeline 910 corresponding to the time-lapse video clip to be generated. In some implementations, for example, the locations of the start time indicator 957A and the end time indicator 957B in FIG. 9O may be moved on the event timeline 910 via dragging gestures.

In some implementations, causing generation of the time-lapse video clip further comprises (1510) sending an indication of the selected portion of the event timeline to a server so as to generate the time-lapse video clip of the selected portion of the event timeline. In some implementations, after detecting the first user input selecting the portion of the event timeline, the client device 504 causes the time-lapse video clip to be generated by sending an indication of the start time (e.g., 12:20:00 pm according to the start time entry box 956A in FIG. 9O) and the end time (e.g., 12:42:30 pm according to the end time entry box 956B in FIG. 9O) of the selected portion to the video server system 508. Subsequently, in some implementations, the video server system 508 or a component thereof (e.g., event post-processing module 643, FIG. 6) generates the time-lapse video clip according to the indication of the start time and the end time and detected motion events that fall between the start time and the end time.

In some implementations, causing generation of the time-lapse video clip further comprises (1512) generating the time-lapse video clip from stored video footage based on the selected portion of the event timeline and timing of the motion events corresponding to the subset of the plurality of event indicators within the selected portion of the event timeline. In some implementations, after detecting the first user input selecting the portion of the event timeline, the client device 504 generates the time-lapse video clip from stored footage according to the start time (e.g., 12:20:00 pm according to the start time entry box 956A in FIG. 9O) and the end time (e.g., 12:42:30 pm according to the end time entry box 956B in FIG. 9O) indicated by the user of the client device 504 and detected motion events that fall between the start time and the end time. In some implementations, the client device generates the time-lapse video clip by modifying the playback speed of the stored footage based on the timing of motion events instead of generating a new video clip from the stored footage.

In some implementations, causing generation of the time-lapse video clip further comprises (1514) detecting a third user input selecting a temporal length for the time-lapse video clip. In some implementations, prior to generation of the time-lapse video clip and after selecting the portion of the event timeline, the client device 504 displays a dialog box or menu pane that enables the user of the client device 504 to select a length of the time-lapse video clip (e.g., 30, 60, 90, etc. seconds). For example, the user selects a two hour portion of the event timeline for the time-lapse video clip and then selects a 60 second length for the time-lapse video clip which causes the selected 2 hour portion of the event timeline to be compressed to 60 seconds in length.

In some implementations, after causing generation of the time-lapse video clip, the electronic device displays (1516) a first notification within the video monitoring user interface indicating processing of the time-lapse video clip. For example, the first notification is a banner notification indicating the time left in generating/processing of the time-lapse video clip. FIG. 9P, for example, shows client device 504 displaying a notification 961 overlaid on the first region 903 (e.g., a banner notification). In FIG. 9P, the notification 961 indicates that the time-lapse video clip is being processed and also includes an exit affordance 962, which, when activated (e.g., with a tap gesture), causes the client device 504 the client device 504 to dismiss the notification 961.

The electronic device displays (1518) the time-lapse video clip of the selected portion of the event timeline, where motion events corresponding to the subset of the plurality of event indicators are played at a slower speed than the remainder of the selected portion of the event timeline. For example, during playback of the time-lapse video clip, motion events are displayed at 2x or 4x speed and other portions of the video feed within the selection portion are displayed at 16x or 32x speed.

In some implementations, prior to displaying the time-lapse video clip, the electronic device (1520): displays a second notification within the video monitoring user interface indicating completion of generation for the time-lapse video clip; and detects a fourth user input selecting the second notification. In some implementations, displaying the time-lapse video clip further comprises displaying the time-lapse video clip in response to detecting the fourth input. For example, the second notification is a banner notification indicating that generation of the time-lapse video clip is complete. At a time subsequent to FIG. 9P, the notification 961 in FIG. 9Q indicates that processing of the time-lapse video clip is complete and includes a "Play Time-Lapse" affordance 963, which, when activated (e.g., with a tap gesture), causes the client device 504 to play the time-lapse video clip.

In some implementations, prior to displaying the time-lapse video clip, the electronic device detects (1522) selection of the time-lapse video clip from a collection of saved video clips. In some implementations, displaying the time-lapse video clip further comprises displaying the time-lapse video clip in response to detecting selection of the time-lapse video clip. In some implementations, the server video server system 508 stores a collection of saved video clips (e.g., in the video storage database 516, FIGS. 5-6) including time-lapse video clips and non-time-lapse videos clips. In some implementations, the user of the client device 504 is able to access and view the saved clips at any time.

In some implementations, the electronic device detects (1524) one or more second user inputs selecting one or more categories associated with the plurality of motion events. In some implementations, causing generation of the time-lapse video clip further comprises causing generation of the time-lapse video clip of the selected portion of the event timeline based on the one or more selected categories, and displaying the time-lapse video clip further comprises displaying the time-lapse video clip of the selected portion of the event timeline, where motion events corresponding to the subset of the plurality of event indicators assigned to the one or more selected categories are played at a slower speed than the remainder of the selected portion of the event timeline. In some implementations, the one or more selected categories include (1526) at least one of a recognized event category or a previously created zone of interest. In some implementations, the user of the client device 504 is able to enable/disable zones and/or event categories prior to generating the time-lapse video clip. For example, the motion events assigned to enabled event categories and motion events that touch or overlap enabled zones are played at a slower speed during the time-lapse than the balance of the selected portion of the event timeline including motion events assigned to disabled event categories and motion events that touch or overlap disabled zones.

In FIG. 9O, for example, the list of categories in the third region 907 of the video monitoring UI includes entries for three categories: a first entry 924A corresponding to event category A; a second entry 924B corresponding to the "Birds in Flight" event category; and a third entry 924C corresponding to zone A (e.g., created in FIGS. 9L-9M). Each of the entries 924 includes an indicator filter 926 for enabling/disabling motion events assigned to the corresponding category. In FIG. 9O, for example, indicator filter 924A in the entry 924A corresponding to event category A is disabled, indicator filter 924B in the entry 924B corresponding to the "Birds in Flight" event category is enabled, and indicator filter 924C in the entry 924C corresponding to zone A is enabled. Thus, for example, after detecting a contact 955 at a location corresponding to the "Create Time-Lapse" affordance 958 on the touch screen 906 in FIG. 9O, the client device 504 causes generation of a time-lapse video clip according to the selected portion of the event timeline 910 (i.e., the portion corresponding to the start and end times displayed by the start time entry box 956A and the end time entry box 956B) and the enabled categories. For example, motion events assigned to the "Birds in Flight" event category and motion events overlapping or touching zone A will be played at 2× or 4× speed and the balance of the selected portion (including motion events assigned to event category A) will be displayed at 16× or 32× speed during playback of the time-lapse video clip.

It should be understood that the particular order in which the operations in FIGS. 15A-15C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., the process 1000, and the methods 1200, 1300, 1400, and 1600) are also applicable in an analogous manner to the method 1500 described above with respect to FIGS. 15A-15C.

FIGS. 16A-16B illustrate a flowchart diagram of a method of performing client-side zooming of a remote video feed in accordance with some implementations. In some implementations, the method 1600 is performed by an electronic device with one or more processors, memory, and a display. For example, in some implementations, the method 1600 is performed by client device 504 (FIGS. 5 and 7) or a component thereof (e.g., the client-side module 502, FIGS. 5 and 7). In some implementations, the method 1600 is governed by instructions that are stored in a non-transitory computer readable storage medium (e.g., the memory 606, 706, or 806) and the instructions are executed by one or more processors of the electronic device (e.g., the CPUs 512, 702, or 802). Optional operations are indicated by dashed lines (e.g., boxes with dashed-line borders).

In some implementations, control and access to the smart home environment 100 is implemented in the operating environment 500 (FIG. 5) with a video server system 508 (FIGS. 5-6) and a client-side module 502 (FIGS. 5 and 7) (e.g., an application for monitoring and controlling the smart home environment 100) is executed on one or more client devices 504 (FIGS. 5 and 7). In some implementations, the video server system 508 manages, operates, and controls access to the smart home environment 100. In some implementations, a respective client-side module 502 is associated with a user account registered with the video server system 508 that corresponds to a user of the client device 504.

The electronic device receives (1602) a first video feed from a camera located remotely from the client device with a first field of view. In some implementations, the electronic device (i.e., electronic device 166, FIG. 1, or client device 504, FIGS. 5 and 7) is a mobile phone, tablet, laptop, desktop computer, or the like, which executes a video monitoring application or program corresponding to the video monitoring user interface. In some implementations, the video feed from the respective camera is relayed to the client device 504 by the video server system 508. In some implementations, the client device 504 directly receives the video feed from the respective camera.

The electronic device displays (1604), on the display, the first video feed in a video monitoring user interface. In some implementations, the client device 504 or a component thereof (e.g., event review interface module 734, FIG. 7) displays the video monitoring user interface (UI) on the display. FIG. 9C, for example, shows a video monitoring UI displayed by the client device 504 with three distinct regions: a first region 903, a second region 905, and a third region 907. In FIG. 9C, the first region 903 of the video monitoring UI includes a video feed from a respective camera among the one or more camera 118 associated with the smart home environment 100. In some implementations, the video feed is a live feed or playback of the recorded video feed from a previously selected start point. In FIG. 9C, for example, an indicator 912 indicates that the video feed being displayed in the first region 903 is a live video feed.

The electronic device detects (1606) a first user input to zoom in on a respective portion of the first video feed. In some implementations, the first user input is a mouse scroll wheel, keyboard shortcuts, or selection of a zoom-in affordance (e.g., elevator bar or other widget) in a web browser accompanied by a dragging gesture to pane the zoomed region. For example, the user of the client device 504 is able to drag the handle 919 of the elevator bar in FIG. 9B to zoom-in on the video feed. Subsequently, the user of the client device 504 may perform a dragging gesture inside of the first region 903 to pane up, down, left, right, or a combination thereof.

In some implementations, the display is (1608) a touch-screen display, and where the first user input is a pinch-in gesture performed on the first video feed within the video monitoring user interface. In some implementations, the first user input is a pinch-in gesture on a touch screen of the electronic device. FIG. 9R, for example, shows the client device 504 detecting a pinch-in gesture with contacts 965A and 965B relative to a respective portion of the video feed in the first region 903 on the touch screen 906. In this example, the first user input is the pinch-in gesture with contacts 965A and 965B.

In response to detecting the first user input, the electronic device performs (1610) a software zoom function on the respective portion of the first video feed to display the respective portion of the first video feed in a first resolution. In some implementations, the first user input determines a zoom magnification for the software zoom function. For example, the width between contacts of a pinch gesture determines the zoom magnification. In another example, the length of a dragging gesture on an elevator bar associated with zooming determines the zoom magnification. FIG. 9S, for example, shows the client device 504 displaying a zoomed-in portion of the video feed in response to detecting the pinch-in gesture on the touch screen 906 in FIG. 9R. In some implementations, the zoomed-in portion of the video feed corresponds to a software-based zoom performed locally by the client device 504 on the respective portion of the video feed corresponding to the pinch-in gesture in FIG. 9R.

In some implementations, in response to detecting the first user input, the electronic device displays (1612) a perspective window within the video monitoring user interface indicating a location of the respective portion relative to the first video feed. In some implementations, after performing the software zoom, a perspective window is displayed in the video monitoring UI which shows the zoomed region's location relative to the first video feed (e.g., picture-in-picture window). FIG. 9S, for example, shows the client device 504 displaying a perspective box 969 in the first region 903, which indicates the zoomed-in portion 970 relative to the full field of view of the respective camera.

In some implementations, prior to the determining and the sending, the electronic device detects (1614) a second user input within the video monitoring user interface selecting a video enhancement affordance. In some implementations, the determining operation 1618 and the sending operation 1620 are performed in response to detecting the second user input. In FIG. 9S, for example, the video controls in the first region 903 of the video monitoring UI further includes an enhancement affordance 968 in response to detecting the pinch-in gesture in FIG. 9R. When activated (e.g., with a tap gesture), the enhancement affordance 968 causes the client device 504 to send a zoom command to the respective camera. In some implementations, the enhancement affordance is only displayed to users with administrative privileges because it changes the field of view of the respective camera and consequently the recorded video footage. FIG. 9S, for example, shows the client device 504 detecting a contact 967 at a location corresponding to the enhancement affordance 968 on the touch screen 906.

In some implementations, in response to detecting the second user input and prior to performing the sending operation 1620, the electronic device displays (1616) a warning message indicating that saved video footage will be limited to the respective portion. In some implementations, after selecting the enhancement affordance to hardware zoom in on the respective portion, only footage from the respective portion (i.e., the cropped region) will be saved by the video server system 508. Prior to selecting the enhancement affordance, the video server system 508 saved the entire field of view of the respective camera shown in the first video feed, not the software zoomed version. FIG. 9T, for example, shows the client device 504 displaying a dialog box 971 in response to detecting selection of the enhancement affordance 968 in FIG. 9S. In FIG. 9T, the dialog box 971 warns the user of the client device 504 that enhancement of the video feed will cause changes to the recorded video footage and also any created zones of interest. In FIG. 9T, the dialog box 971 includes: a cancel affordance 972, which, when activated (e.g., with a tap gesture) causes the client device 504 to cancel of the enhancement operation and consequently cancel sending of the zoom command; and an enhance affordance 973, when activated (e.g., with a tap gesture) causes the client device 504 to send the zoom command to the respective camera.

The electronic device determines (1618) a current zoom magnification of the software zoom function and coordinates of the respective portion of the first video feed. In some implementations, the client device 504 or a component thereof (e.g., camera control module 732, FIG. 7) determines the current zoom magnification of the software zoom function and coordinates of the respective portion of the first video feed. For example, the coordinates are an offset from the center of the original video feed to the center of the respective portion.

The electronic device sends (1620) a command to the camera to perform a hardware zoom function on the respective portion according to the current zoom magnification and the coordinates of the respective portion of the first video feed. In some implementations, the client device 504 or a component thereof (e.g., camera control module 732, FIG. 7) causes the command to be sent to the respective camera, where the command includes the current zoom magnification of the software zoom function and coordinates of the respective portion of the first video feed. In some implementations, the command is typically relayed through the video server system 508 to the respective camera. In some implementations, however, the client device 504 sends the command directly to the respective camera. In some implementations, the command also changes the exposure of the respective camera and the focus point of directional microphones of the respective camera. In some implementations, the video server system 508 stores video settings for the respective camera (e.g., tilt, pan, and zoom settings) and the coordinates of the respective portion (i.e., the cropped region).

The electronic device receives (1622) a second video feed from the camera with a second field of view different from the first field of view, where the second field of view corresponds to the respective portion. For example, the second video feed is a cropped version of the first video feed that only includes the respective portion in its field-of-view, but with higher resolution than the local software zoomed version of the respective portion.

The electronic device displays (1624), on the display, the second video feed in the video monitoring user interface, where the second video feed is displayed in a second resolution that is higher than the first resolution. FIG. 9U, for example, shows the client device 504 displaying the zoomed-in portion of the video feed at a higher resolution as compared to FIG. 9S in response to detecting selection of the enhance affordance 973 in FIG. 9T. In some implementations, a scene change detector associated with the application resets the local, software zoom when the total pixel color difference between a frame from the second video feed and a previous frame from the first video feed exceeds a predefined threshold. In some implementations, the user may perform a second software zoom and enhancement zoom operation. In some implementations, the video monitoring user interface indicates the current zoom magnification of the software and/or hardware zoom. For example, the video monitoring UI in FIG. 9S further indicates the current zoom magnification in text (e.g., overlaid on the first region 903). In some implementations, the total combined zoom magnification may be limited to a predetermined zoom magnification (e.g., 8×). In some implementations, the user may zoom & enhance multiple different regions of the first video feed for concurrent display in the video monitoring interface. For example, each of the regions is displayed in its own sub-region in the first region 903 of the video monitoring interface while the live video feed from the respective camera is displayed in the first region 903.

In some implementations, the video monitoring user interface includes (1626) an affordance for resetting the camera to display the first video feed after displaying the second video feed. In some implementations, after performing the hardware zoom, the user of the client device 504 is able to reset the zoom configuration to the original video feed. In FIG. 9U, for example, the video controls in the first region 903 of the video monitoring UI further include a zoom reset affordance 975, which, when activated (e.g., with a tap gesture) causes the client device 504 reset the zoom magnification of the video feed to its original setting (e.g., as in FIG. 9R prior to the pinch-in gesture).

It should be understood that the particular order in which the operations in FIGS. 16A-16B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., the process 1000, and the methods 1200, 1300, and 1500) are also applicable in an analogous manner to the method 1600 described above with respect to FIGS. 16A-16B.

FIGS. 17A-17D illustrate a flowchart diagram of a method 1700 of processing data for video monitoring on a computing system (e.g., the camera 118, FIGS. 5 and 8; a controller device; the video server system 508, FIGS. 5-6; or a combination thereof) in accordance with some implementations. FIGS. 17A-17D correspond to instructions stored in a computer memory or computer readable storage medium (e.g., the memory 606, 706, or 806).

In this representative method, the start of a motion event candidate is detected in a live video stream, which then triggers the subsequent processing (e.g., motion track and motion vector generation) and categorization of the motion event candidate. A simple spatial motion vector, such as a linear motion vector is optionally used to represent the motion event candidate in the event categorization process to improve processing efficiency (e.g., speed and data compactness).

Figure 17A:
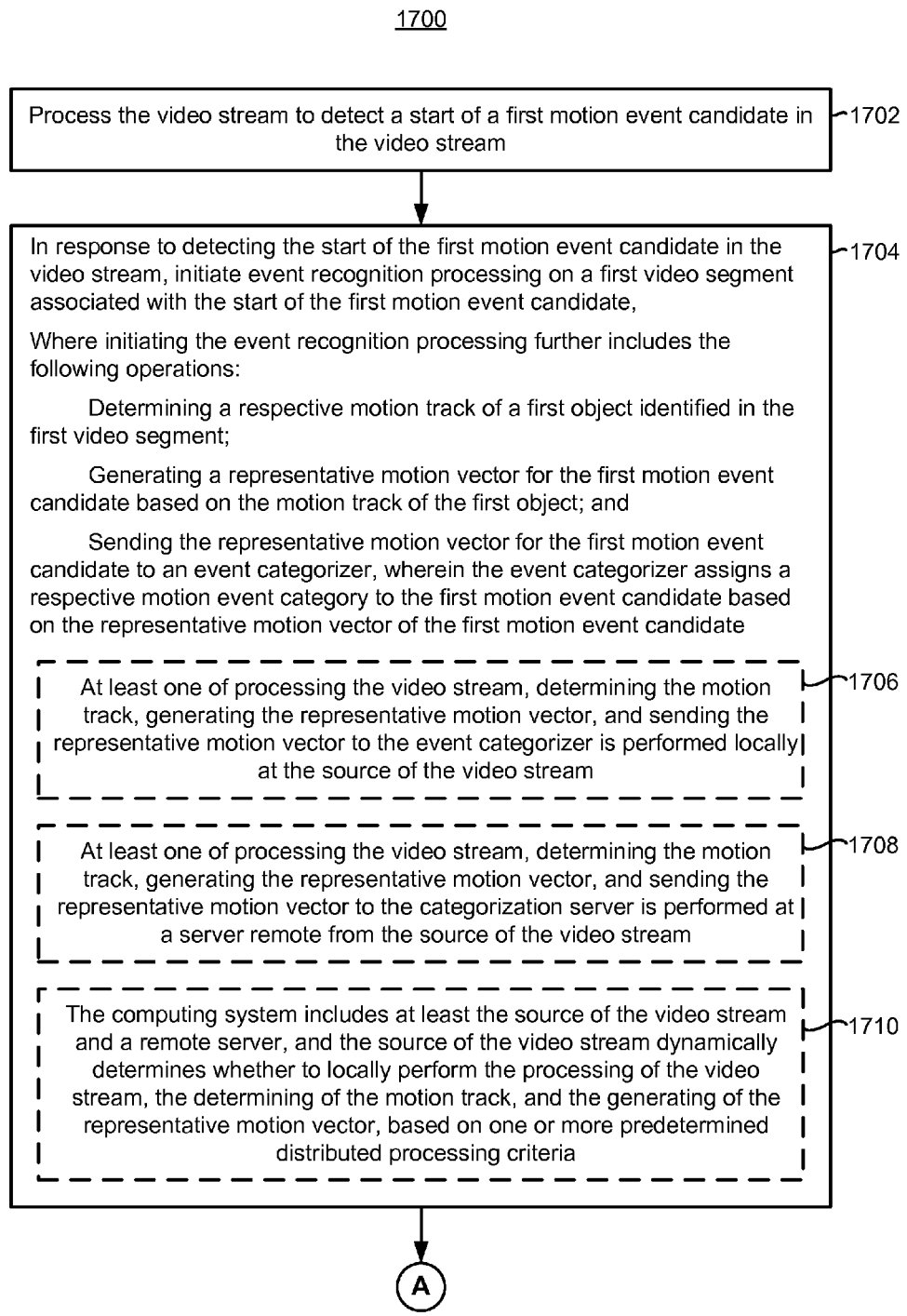
FIGS. 17A-17D illustrate a flowchart diagram of a method of processing a video stream for video monitoring in accordance with some implementations.
Figure 17B:
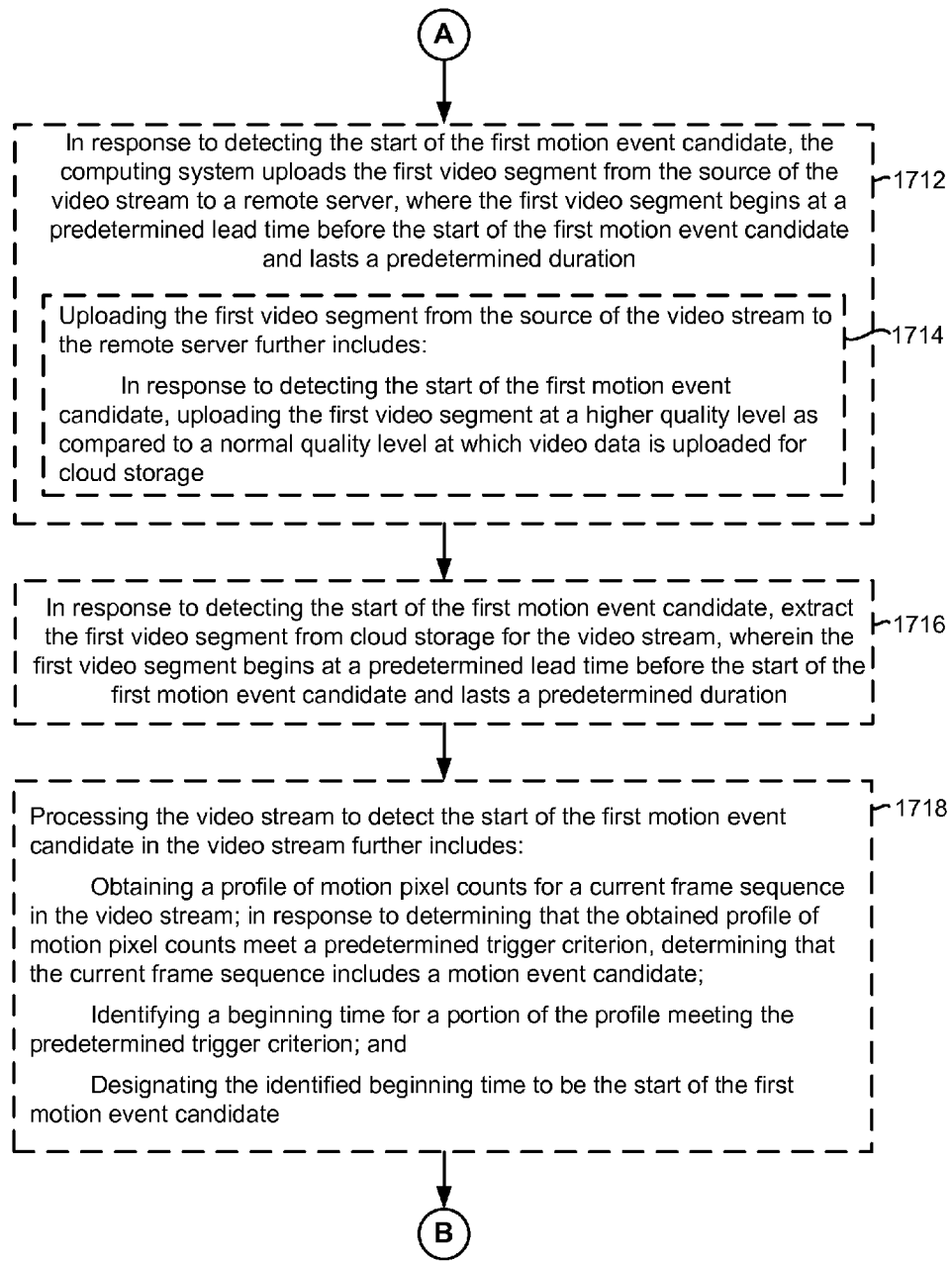
Figure 17C:
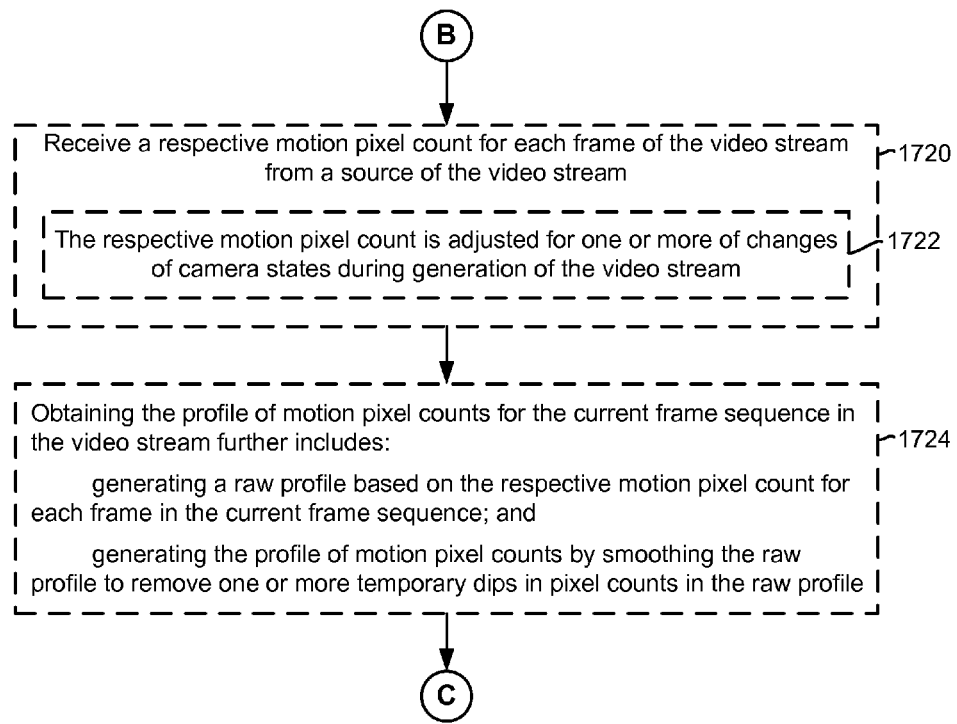
Figure 17D:
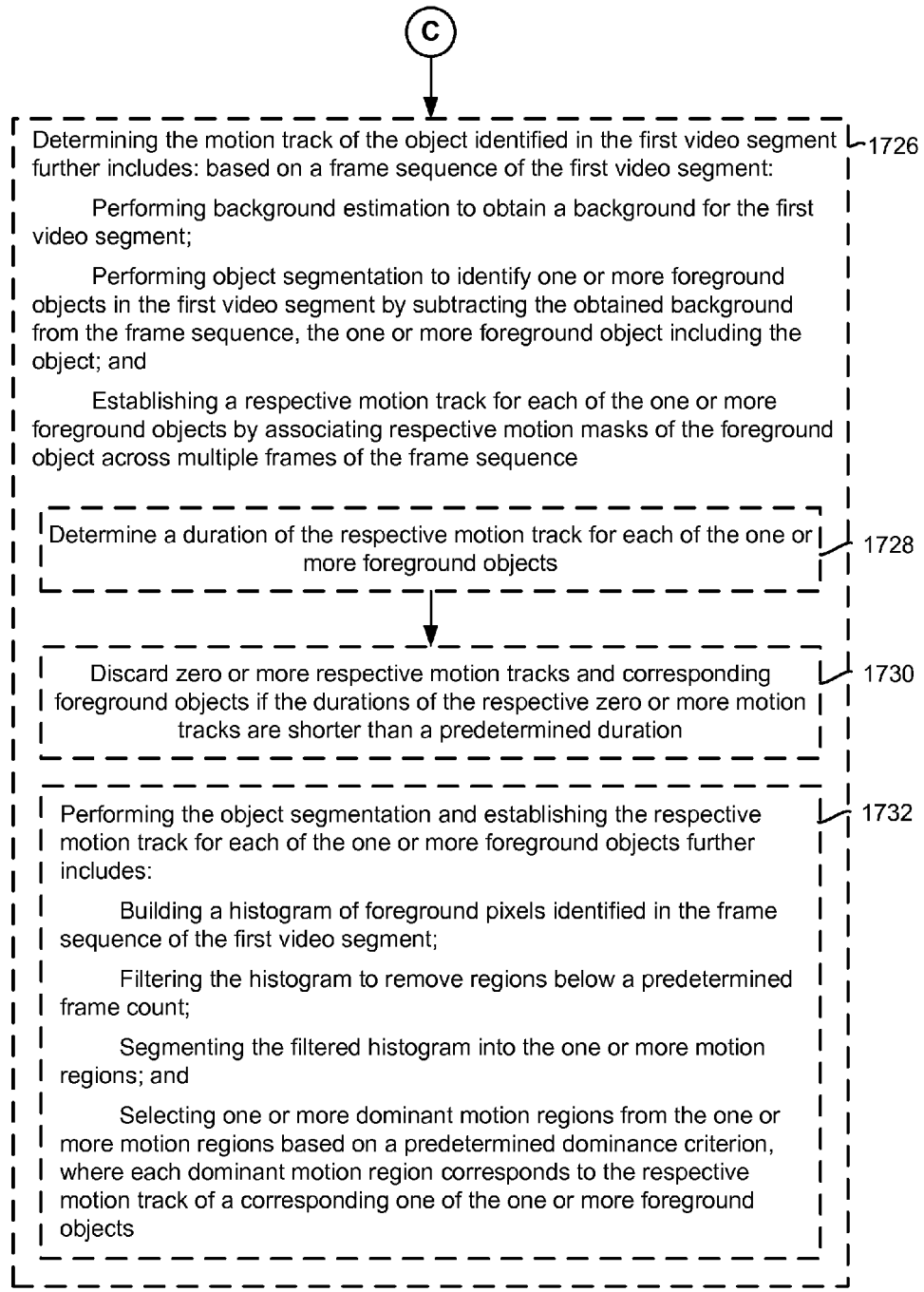

As shown in FIG. 17A, the method is performed at a computing system having one or more processors and memory. In some implementations, the computing system may be the camera 118, the controller device, the combination of the camera 118 and the controller device, the combination of video source 522 (FIG. 5) and the event preparer of the video server system 508, or the combination of the video source 522 and the video server system 508. The implementation optionally varies depending on the capabilities of the various sub-systems involved in the data processing pipeline as shown in FIG. 11A.

The computing system processes (1702) the video stream to detect a start of a first motion event candidate in the video stream. In response to detecting the start of the first motion event candidate in the video stream, the computing system initiates (1704) event recognition processing on a first video segment associated with the start of the first motion event candidate, where initiating the event recognition processing further includes the following operations: determining a motion track of a first object identified in the first video segment; generating a representative motion vector for the first motion event candidate based on the respective motion track of the first object; and sending the representative motion vector for the first motion event candidate to an event categorizer, where the event categorizer assigns a respective motion event category to the first motion event candidate based on the representative motion vector of the first motion event candidate.

In some implementations, at least one of processing the video stream, determining the motion track, generating the representative motion vector, and sending the representative motion vector to the event categorizer is (1706) performed locally at the source of the video stream. For example, in some implementations, the camera 118 may perform one or more of the initial tasks locally before sending the rest of the tasks to the cloud for the server to complete. In some implementations, all of the above tasks are performed locally at the camera 118 or the video source 522 comprising the camera 118 and a controller device.

In some implementations, at least one of processing the video stream, determining the motion track, generating the representative motion vector, and sending the representative motion vector to the categorization server is (1708) performed at a server (e.g., the video server system 508) remote from the source of the video stream (e.g., video source 522). In some implementations, all of the above tasks are performed at the server, and the video source is only responsible for streaming the video to the server over the one or more networks 162 (e.g., the Internet).

In some implementations, the computing system includes (1710) at least the source of the video stream (e.g., the video source 522) and a remote server (e.g., the video server system 508), and the source of the video stream dynamically determines whether to locally perform the processing of the video stream, the determining of the motion track, and the generating of the representative motion vector, based on one or more predetermined distributed processing criteria. For example, in some implementations, the camera dynamically determines how to divide up the above tasks based on the current network conditions, the local processing power, the number and frequency of motion events that are occurring right now or on average, the current load on the server, the time of day, etc.

In some implementations, in response to detecting the start of the first motion event candidate, the computing system (e.g., the video source 522) uploads (1712) the first video segment from the source of the video stream to a remote server (e.g., the video server system 508), where the first video segment begins at a predetermined lead time (e.g., 5 seconds) before the start of the first motion event candidate and lasts a predetermined duration (e.g., 30 seconds). In some implementations, the uploading of the first video segment is in addition to the regular video stream uploaded to the video server system 508.

In some implementations, when uploading the first video segment from the source of the video stream to the remote server: the computing system (e.g., the video source 522), in response to detecting the start of the first motion event candidate, uploads (1714) the first video segment at a higher quality level as compared to a normal quality level at which video data is uploaded for cloud storage. For example, in some implementations, a high resolution video segment is uploaded for motion event candidates detected in the video stream, so that the video segment can be processed in various ways (e.g., zoomed, analyzed, filtered by zones, filtered by object types, etc.) in the future. Similarly, in some implementations, the frame rate of the video segment for detected event candidate is higher that the video data uploaded for cloud storage.

In some implementations, in response to detecting the start of the first motion event candidate, the computing system (e.g., the event preparer of the video server system 508) extracts (1716) the first video segment from cloud storage (e.g., video data database 1106, FIG. 11A) for the video stream, where the first video segment begins at a predetermined lead time (e.g., 5 seconds) before the start of the first motion event candidate and lasts a predetermined duration (e.g., 30 seconds).

In some implementations, to process the video stream to detect the start of the first motion event candidate in the video stream: the computing system performs (1718) the following operations: obtaining a profile of motion pixel counts for a current frame sequence in the video stream; in response to determining that the obtained profile of motion pixel counts meet a predetermined trigger criterion (e.g., total motion pixel count exceeds a predetermined threshold), determining that the current frame sequence includes a motion event candidate; identifying a beginning time for a portion of the profile meeting the predetermined trigger criterion; and designating the identified beginning time to be the start of the first motion event candidate. This is part of the processing pipeline 1104 (FIG. 11A) for detecting a cue point, which may be performed locally at the video source 522 (e.g., by the camera 118). In some implementations, the profile is a histogram of motion pixel count at each pixel location in the scene depicted in the video stream. More details of cue point detection are provided earlier in FIG. 11A and accompanying descriptions.

In some implementations, the computing system receives (1720) a respective motion pixel count for each frame of the video stream from a source of the video stream. In some implementations, the respective motion pixel count is adjusted (1722) for one or more of changes of camera states during generation of the video stream. For example, in some implementations, the adjustment based on camera change (e.g., suppressing the motion event candidate altogether if the cue point overlaps with a camera state change) is part of the false positive suppression process performed by the video source. The changes in camera states include camera events such as IR mode change or AE change, and/or camera system reset.

In some implementations, to obtain the profile of motion pixel counts for the current frame sequence in the video stream, the computing system performs (1724) the following operations: generating a raw profile based on the respective motion pixel count for each frame in the current frame sequence; and generating the profile of motion pixel counts by smoothing the raw profile to remove one or more temporary dips in pixel counts in the raw profile. This is illustrated in FIG. 11B-(b) and accompanying descriptions.

In some implementations, to determine the motion track of the object identified in the first video segment, the computing system performs (1726) the following operations: based on a frame sequence of the first video segment: (1) performing background estimation to obtain a background for the first video segment; (2) performing object segmentation to identify one or more foreground objects in the first video segment by subtracting the obtained background from the frame sequence, the one or more foreground object including the object; and (3) establishing a respective motion track for each of the one or more foreground objects by associating respective motion masks of the foreground object across multiple frames of the frame sequence. The motion track generation is described in more detail in FIG. 11A and accompanying descriptions.

In some implementations, the computing system determines (1728) a duration of the respective motion track for each of the one or more foreground objects, discards (1730) zero or more respective motion tracks and corresponding foreground objects if the durations of the respective zero or more motion tracks are shorter than a predetermined duration (e.g., 8 frames). This is optionally included as part of the false positive suppression process. Suppression of super short tracks helps to prune off movements such as leaves in a tree, etc.

In some implementations, to perform the object segmentation to identify one or more foreground objects and establish the respective motion track for each of the one or more foreground objects, the computing system performs (1732) the following operations: building a histogram of foreground pixels identified in the frame sequence of the first video segment, where the histogram specifies a frame count for each pixel location in a scene of the first video segment; filtering the histogram to remove regions below a predetermined frame count; segmenting the filtered histogram into the one or more motion regions; and selecting one or more dominant motion regions from the one or more motion regions based on a predetermined dominance criterion (e.g., regions containing at least a threshold of frame count/total motion pixel count), where each dominant motion region corresponds to the respective motion track of a corresponding one of the one or more foreground objects.

In some implementations, the computing system generates a respective event mask for the foreground object corresponding to a first dominant motion region of the one or more dominant regions based on the first dominant motion region. The event mask for each object in motion is stored and optionally used to filter the motion event including the object in motion at a later time.

It should be understood that the particular order in which the operations in FIGS. 17A-17D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method 1700 described above with respect to FIGS. 17A-17D.

FIGS. 18A-18D illustrate a flowchart diagram of a method 1800 of performing activity recognition for video monitoring on a video server system (e.g., the video server system 508, FIG. 5-6) in accordance with some implementations. FIGS. 18A-18D correspond to instructions stored in a computer memory or computer readable storage medium (e.g., the memory 606).

In this method 1800, mathematical processing of motion vectors (e.g., linear motion vectors) is performed, including clustering and rejection of false positives. Although the method 1800 occurs on the server, the generation of the motion vector may occur locally at the camera or at the server. The motion vectors are generated in real-time based on live motion events detected in a live video stream captured by a camera.

In some implementations, a clustering algorithm (e.g., DBscan) is used in the process. This clustering algorithm allows the growth of clusters into any shapes. A cluster is promoted as a dense cluster based on its cluster weight, which is in turn based at least partially on the number of motion vectors contained in it. Only dense clusters are recognized as categories of recognized events. A user or the server can give a category name to each category of recognized events. A cluster is updated when a new vector falls within the range of the cluster. If a cluster has not been updated for a long time, the cluster and its associated event category is optionally deleted (e.g., via a decay factor applied to the cluster weight). In some implementations, if a cluster remains sparse for a long time, the cluster is optionally deleted as noise.

Figure 18A:
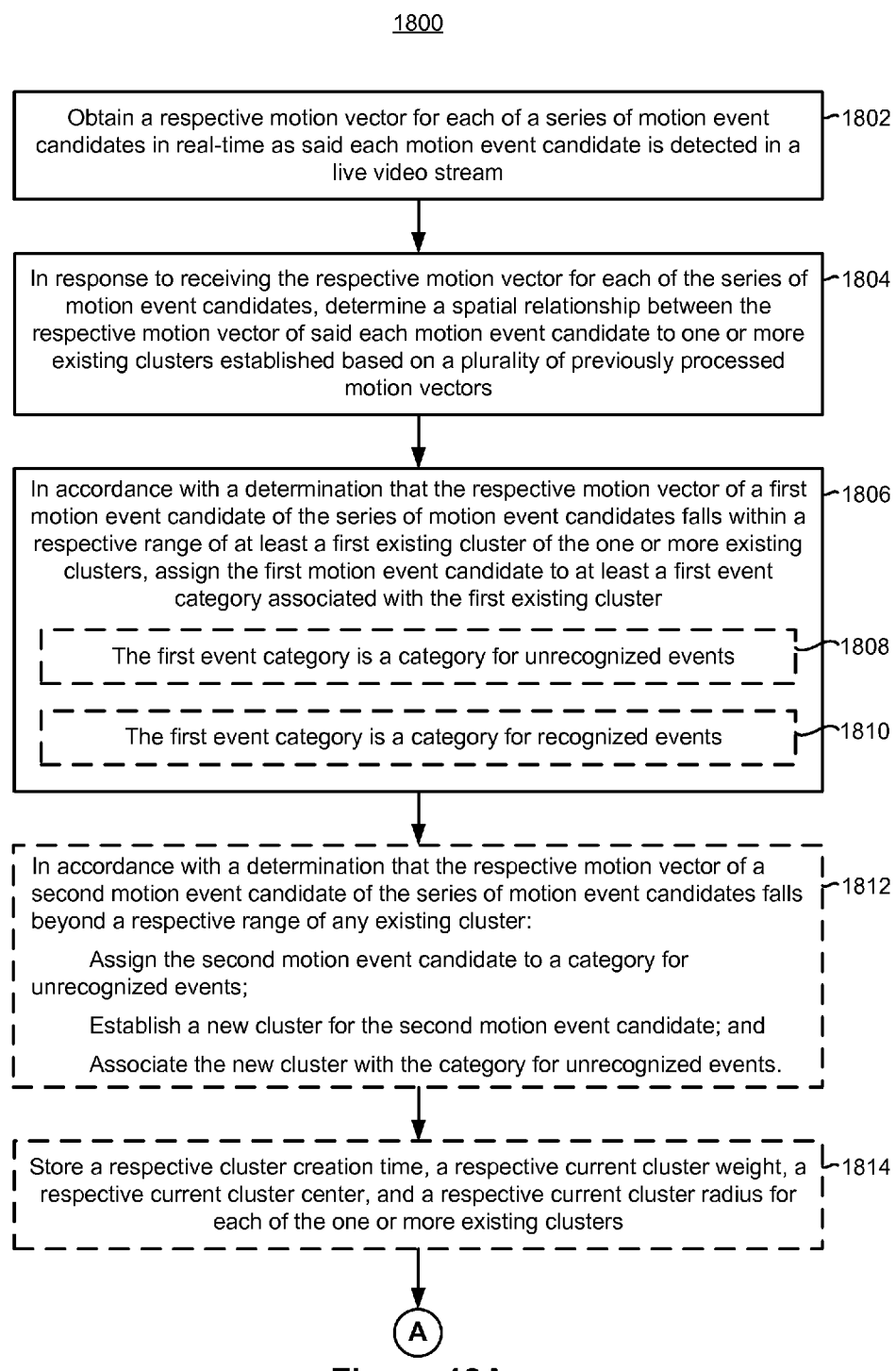
FIGS. 18A-18D illustrate a flowchart diagram of a method of performing activity recognition for video monitoring in accordance with some implementations.
Figure 18B:
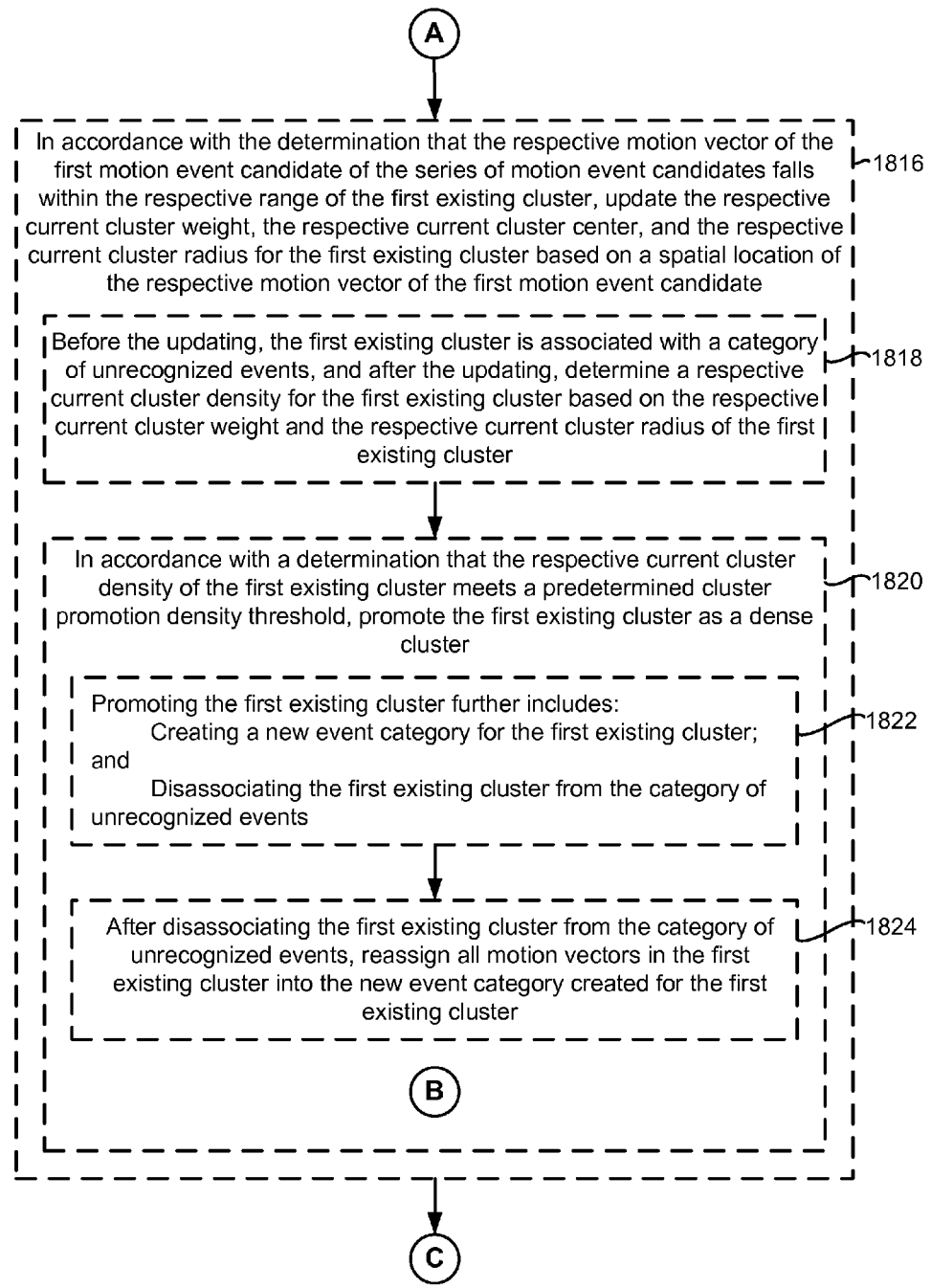
Figure 18C:
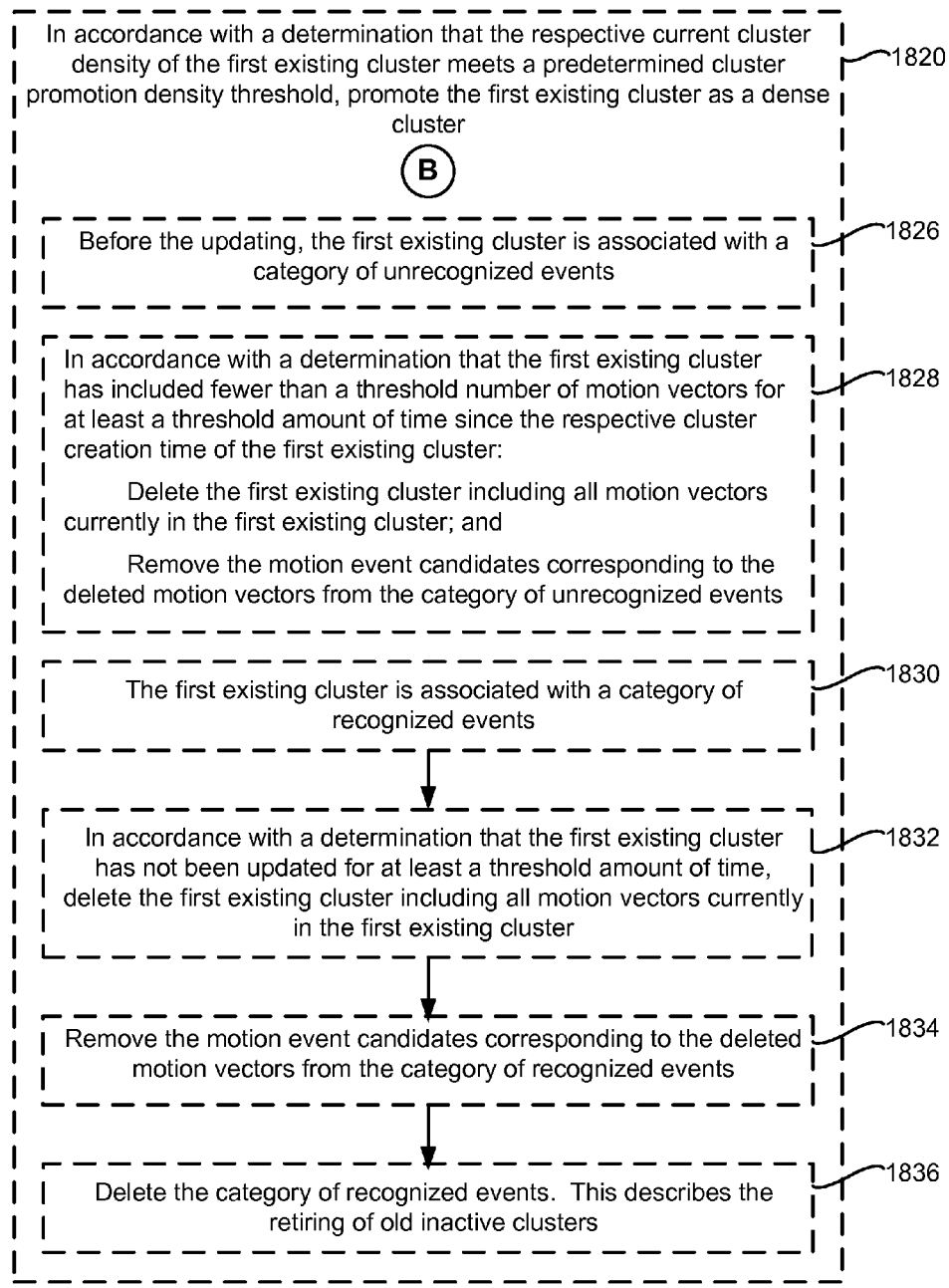
Figure 18D:
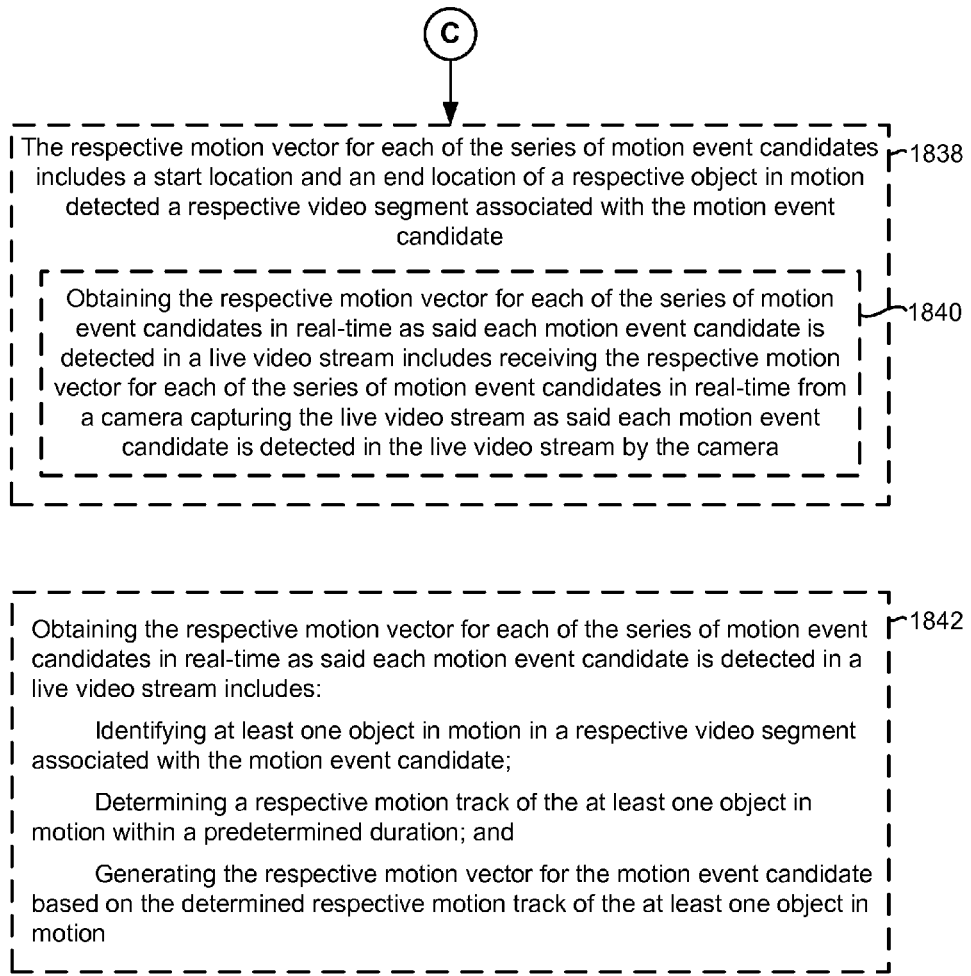

As shown in FIG. 18A, at a server (e.g., video server system 508 or the event categorizer module of the video server system 508) having one or more processors and memory, the server obtains (1802) a respective motion vector for each of a series of motion event candidates in real-time as said each motion event candidate is detected in a live video stream. The motion vector may be received from the camera directly, or from an event preparer module of the server. In some implementations, the server processes a video segment associated with a detected motion event candidate and generates the motion vector.

In response to receiving the respective motion vector for each of the series of motion event candidates, the server determines (1804) a spatial relationship between the respective motion vector of said each motion event candidate to one or more existing clusters established based on a plurality of previously processed motion vectors. This is illustrated in FIGS. 11D-(a)-11D-(e). The existing cluster(s) do not need to be a dense cluster or have corresponding recognized event category associated with it at this point. When a cluster is not a dense cluster, the motion event candidate is associated with a category of unrecognized events.

In accordance with a determination that the respective motion vector of a first motion event candidate of the series of motion event candidates falls within a respective range of at least a first existing cluster of the one or more existing clusters, the server assigns (1806) the first motion event candidate to at least a first event category associated with the first existing cluster.

In some implementations, the first event category is (1808) a category for unrecognized events. This occurs when the first event category has not yet been promoted as a dense cluster and given its own category.

In some implementations, the first event category is (1810) a category for recognized events. This occurs when the first event category has already been promoted as a dense cluster and given its own category.

In some implementations, in accordance with a determination that the respective motion vector of a second motion event candidate of the series of motion event candidates falls beyond a respective range of any existing cluster, the server performs (1812) the following operations: assigning the second motion event candidate to a category for unrecognized events; establishing a new cluster for the second motion event candidate; and associating the new cluster with the category for unrecognized events. This describes a scenario where a new motion vector does not fall within any existing cluster in the event space, and the new motion vector forms its own cluster in the event space. The corresponding motion event of the new motion vector is assigned to the category for unrecognized events.

In some implementations, the server stores (1814) a respective cluster creation time, a respective current cluster weight, a respective current cluster center, and a respective current cluster radius for each of the one or more existing clusters. In accordance with the determination that the respective motion vector of the first motion event candidate of the series of motion event candidates falls within the respective range of the first existing cluster, the server updates (1816) the respective current cluster weight, the respective current cluster center, and the respective current cluster radius for the first existing cluster based on a spatial location of the respective motion vector of the first motion event candidate.

In some implementations, before the updating, the first existing cluster is associated with a category of unrecognized events, and after the updating, the server determines (1818) a respective current cluster density for the first existing cluster based on the respective current cluster weight and the respective current cluster radius of the first existing cluster. In accordance with a determination that the respective current cluster density of the first existing cluster meets a predetermined cluster promotion density threshold, the server promotes (1820) the first existing cluster as a dense cluster. In some implementations, promoting the first existing cluster further includes (1822) the following operations: creating a new event category for the first existing cluster; and disassociating the first existing cluster from the category of unrecognized events.

In some implementations, after disassociating the first existing cluster from the category of unrecognized events, the server reassigns (1824) all motion vectors in the first existing cluster into the new event category created for the first existing cluster. This describes the retroactive updating of event categories for past motion events, when new categories are created.

In some implementations, before the updating, the first existing cluster is (1826) associated with a category of unrecognized events, and in accordance with a determination that the first existing cluster has included fewer than a threshold number of motion vectors for at least a threshold amount of time since the respective cluster creation time of the first existing cluster, the server performs (1828) the following operations: deleting the first existing cluster including all motion vectors currently in the first existing cluster; and removing the motion event candidates corresponding to the deleted motion vectors from the category of unrecognized events. This describes the pruning of sparse clusters, and motion event candidates in the sparse clusters, for example, as shown in FIG. 11D-(f). In some implementations, the motion events are not deleted from the timeline, and are assigned to a category of rare events.

In some implementations, the first existing cluster is (1830) associated with a category of recognized events, and in accordance with a determination that the first existing cluster has not been updated for at least a threshold amount of time, the server deletes (1832) the first existing cluster including all motion vectors currently in the first existing cluster. In some implementations, the server further removes (1834) the motion event candidates corresponding to the deleted motion vectors from the category of recognized events, and deletes (1836) the category of recognized events. This describes the retiring of old inactive clusters. For example, if the camera has been moved to a new location, over time, old event categories associated with the previous location are automatically eliminated without manual intervention.

In some implementations, the respective motion vector for each of the series of motion event candidates includes (1838) a start location and an end location of a respective object in motion detected a respective video segment associated with the motion event candidate. The motion vector of this form is extremely compact, reducing processing and transmission overhead.

In some implementations, to obtain the respective motion vector for each of the series of motion event candidates in real-time as said each motion event candidate is detected in a live video stream, the server receives (1840) the respective motion vector for each of the series of motion event candidates in real-time from a camera capturing the live video stream as said each motion event candidate is detected in the live video stream by the camera. In some implementations, the representative motion vector is a small piece of data received from the camera, where the camera has processed the captured video data in real-time and identified motion event candidate. The camera sends the motion vector and the corresponding video segment to the server for more sophisticated processing, e.g., event categorization, creating the event mask, etc.

In some implementations, to obtain the respective motion vector for each of the series of motion event candidates in real-time as said each motion event candidate is detected in a live video stream, the server performs (1842) the following operations: identifying at least one object in motion in a respective video segment associated with the motion event candidate; determining a respective motion track of the at least one object in motion within a predetermined duration; and generating the respective motion vector for the motion event candidate based on the determined respective motion track of the at least one object in motion.

It should be understood that the particular order in which the operations in FIGS. 18A-18D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method 1800 described above with respect to FIGS. 18A-18D.

Figure 19A:
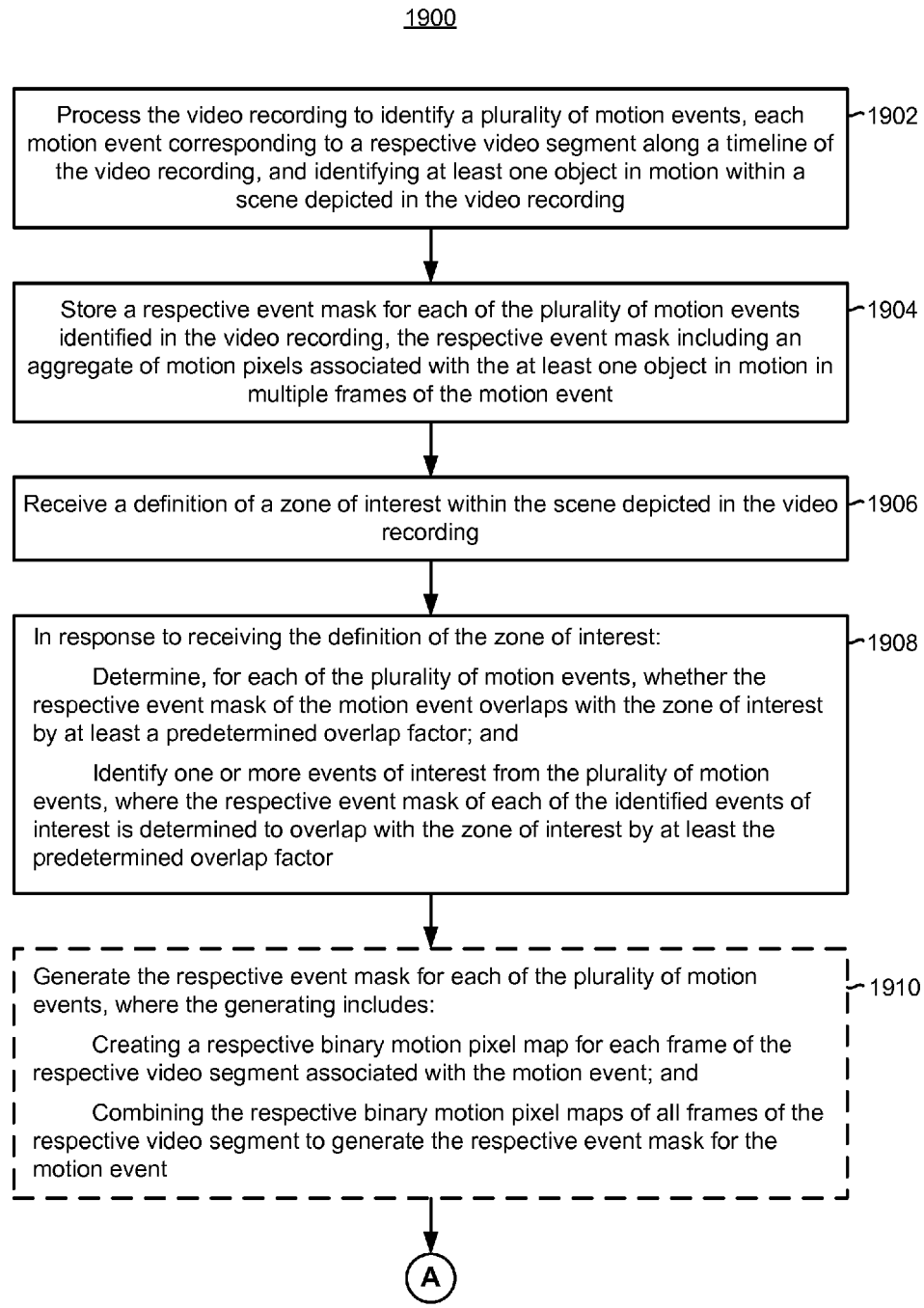
FIGS. 19A-19C illustrate a flowchart diagram of a method of facilitating review of a video recording in accordance with some implementations.
Figure 19B:
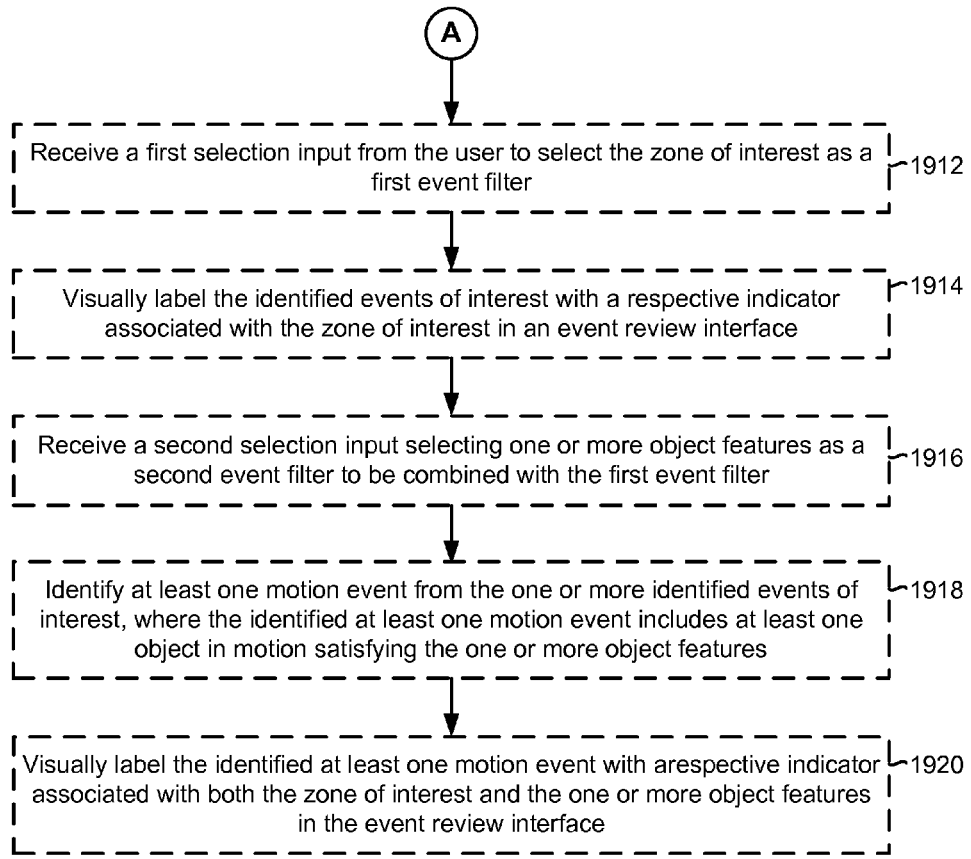
Figure 19C:
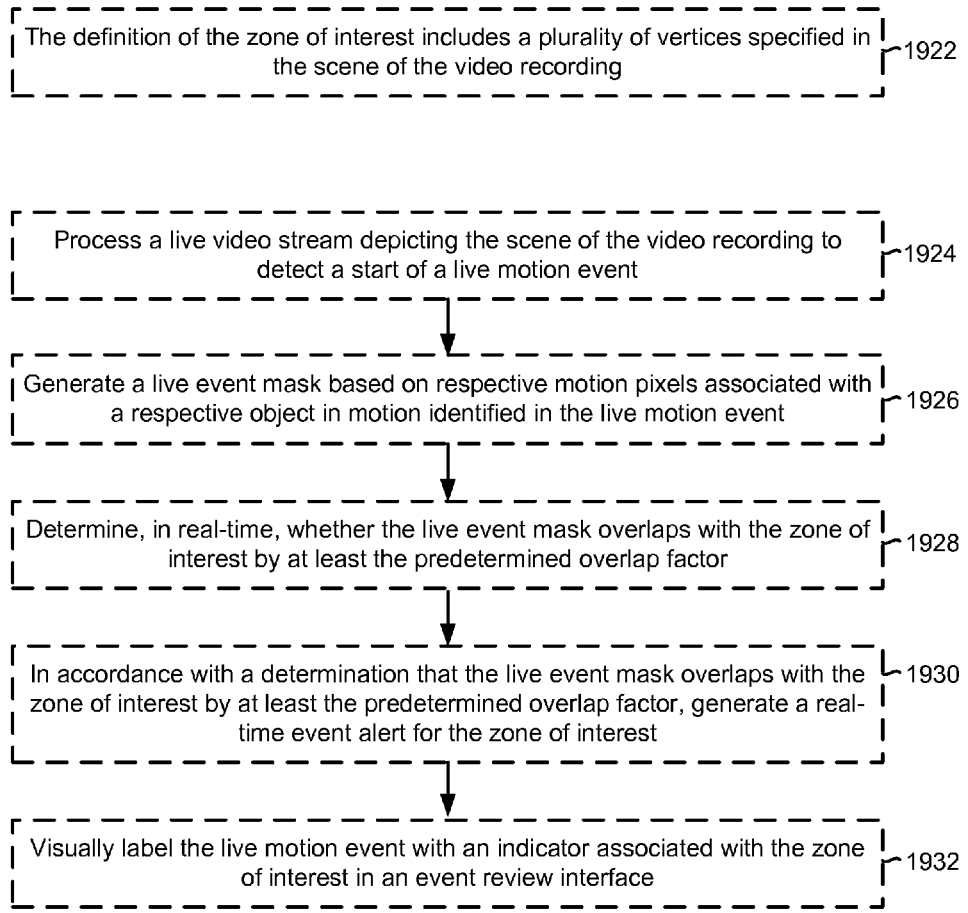

FIGS. 19A-19C illustrate a flowchart diagram of a method 1900 of facilitating review of a video recording (e.g., performing a retrospective event search based on a newly created zone of interest) on a video server system (e.g., video server system 508, FIGS. 5-6) in accordance with some implementations. FIGS. 19A-19C correspond to instructions stored in a computer memory or computer readable storage medium (e.g., the memory 606).

In some implementations, the non-causal (or retrospective) zone search based on newly created zones of interest is based on event masks of the past motion events that have been stored at the server. The event filtering based on selected zones of interest can be applied to past motion events, and to motion events that are currently being detected in the live video stream.

As shown in FIG. 19A, the method of facilitating review of a video recording (e.g., performing a retrospective event search based on a newly created zone of interest) is performed by a server (e.g., the video server system 508). The server identifies (1902) a plurality of motion events from a video recording, wherein each of the motion events corresponds to a respective video segment along a timeline of the video recording and identifies at least one object in motion within a scene depicted in the video recording.

The server stores (1904) a respective event mask for each of the plurality of motion events identified in the video recording, the respective event mask including an aggregate of motion pixels associated with the at least one object in motion over multiple frames of the motion event. For example, in some implementations, each event includes one object in motion, and corresponds to one event mask. Each scene may have multiple motion events occurring at the same time, and have multiple objects in motion in it.

The server receives (1906) a definition of a zone of interest within the scene depicted in the video recording. In some implementations, the definition of the zone of interest is provided by a user or is a default zone defined by the server. Receiving the definition of the zone can also happen when a reviewer is reviewing past events, and has selected a particular zone that is already defined as an event filter.

In response to receiving the definition of the zone of interest, the server performs (1908) the following operations: determining, for each of the plurality of motion events, whether the respective event mask of the motion event overlaps with the zone of interest by at least a predetermined overlap factor (e.g., a threshold number of overlapping pixels between the respective event mask and the zone of interest); and identifying one or more events of interest from the plurality of motion events, where the respective event mask of each of the identified events of interest is determined to overlap with the zone of interest by at least the predetermined overlap factor. In some implementations, motion events that touched or entered the zone of interest are identified as events of interest. The events of interest may be given a colored label or other visual characteristics associated with the zone of interest, and presented to the reviewer as a group. It is worth noting that the zone of interest is created after the events have already occurred and been identified. The fact that the event masks are stored at the time that the motion events were detected and categorized provides an easy way to go back in time and identify motion events that intersect with the newly created zone of interest.

In some implementations, the server generates (1910) the respective event mask for each of the plurality of motion events, where the generating includes: creating a respective binary motion pixel map for each frame of the respective video segment associated with the motion event; and combining the respective binary motion pixel maps of all frames of the respective video segment to generate the respective event mask for the motion event. As a result, the event mask is a binary map that is active (e.g., 1) at all pixel locations where the object in motion has reached in at least one frame of the video segment. In some implementations, some other variations of event mask are optionally used, e.g., giving higher weight to pixel locations that the object in motion has reached in multiple frames, such that this information may be taken into account when determining the degree of overlap between the event mask and the zone of interest. More details of the generation of the event mask are provided in FIGS. 11C and 11E and accompanying descriptions.

In some implementations, the server receives (1912) a first selection input from the user to select the zone of interest as a first event filter, and visually labels (1914) the identified events of interest with a respective indicator associated with the zone of interest in an event review interface. This is illustrated in FIGS. 9L-9N, where Zone A 924C is selected by the user, and a past event 922V is identified as an event of interest for Zone A, and the event indicator of the past event 922V is visually labeled by an indicator (e.g., a cross mark) associated with Zone A.

In some implementations, the server receives (1916) a second selection input selecting one or more object features as a second event filter to be combined with the first event filter. The server identifies (1918) at least one motion event from the one or more identified events of interest, where the identified at least one motion event includes at least one object in motion satisfying the one or more object features. The server visually labels (1920) the identified at least one motion event with a respective indicator associated with both the zone of interest and the one or more object features in the event review interface. In some implementations, the one or more object features include features representing a human being, for example, aspect ratio of the object in motion, movement speed of the object in motion, size of the object in motion, shape of the object in motion, etc. The user may select to see all events in which a human being entered a particular zone by selecting the zone and the features associated with a human being in an event reviewing interface. The user may also create combinations of different filters (e.g., zones and/or object features) to create new event filter types.

In some implementations, the definition of the zone of interest includes (1922) a plurality of vertices specified in the scene of the video recording. In some embodiments, the user is allowed to create zones of any shapes and sizes by dragging the vertices (e.g., with the dragging gesture in FIGS. 9L-9M). The user may also add or delete one or more vertices from the set of vertices currently shown in the zone definition interface.

In some implementations, the server processes (1924) a live video stream depicting the scene of the video recording to detect a start of a live motion event, generates (1926) a live event mask based on respective motion pixels associated with a respective object in motion identified in the live motion event; and determines (1928), in real-time, whether the live event mask overlaps with the zone of interest by at least the predetermined overlap factor. In accordance with a determination that the live event mask overlaps with the zone of interest by at least the predetermined overlap factor, the server generates (1930) a real-time event alert for the zone of interest.

In some implementations, the live event mask is generated based on all past frames in the live motion event that has just been detected. The live event mask is updated as each new frame is received. As soon as an overlap factor determined based on an overlap between the live event mask and the zone of interest exceeds a predetermined threshold, a real-time alert for the event of interest can be generated and sent to the user. In a review interface, the visual indicator, for example, a color, associated with the zone of interest can be applied to the event indicator for the live motion event. For example, a colored boarder may be applied to the event indicator on the timeline, and/or the pop-up notification containing a sprite of the motion event. In some embodiments, the server visually labels (1932) the live motion event with a respective indicator associated with the zone of interest in an event review interface.

It should be understood that the particular order in which the operations in FIGS. 19A-19C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method 1900 described above with respect to FIGS. 19A-19C.

Figure 20A:
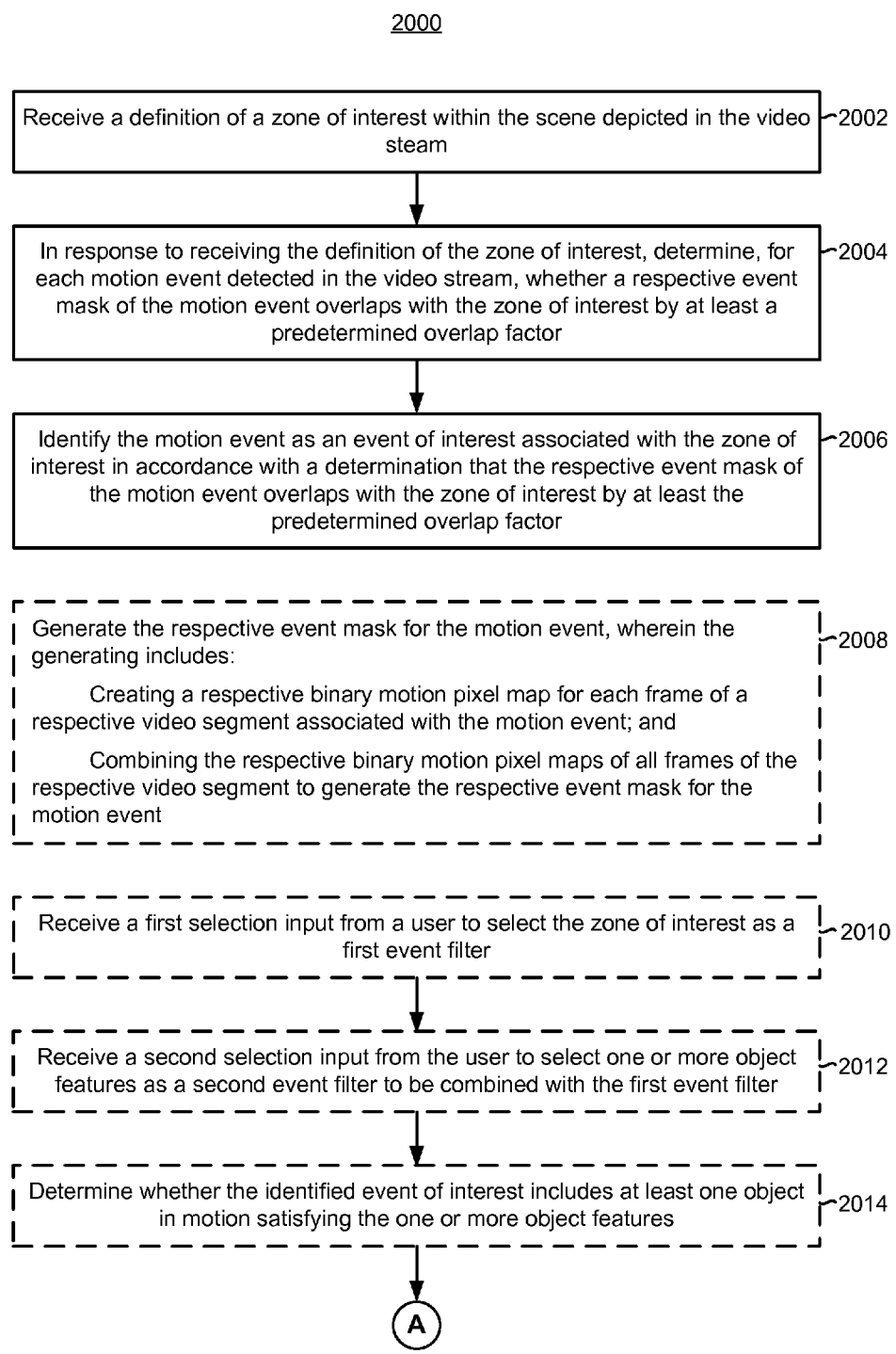
FIGS. 20A-20B illustrate a flowchart diagram of a method of providing context-aware zone monitoring on a video server system in accordance with some implementations.
Figure 20B:
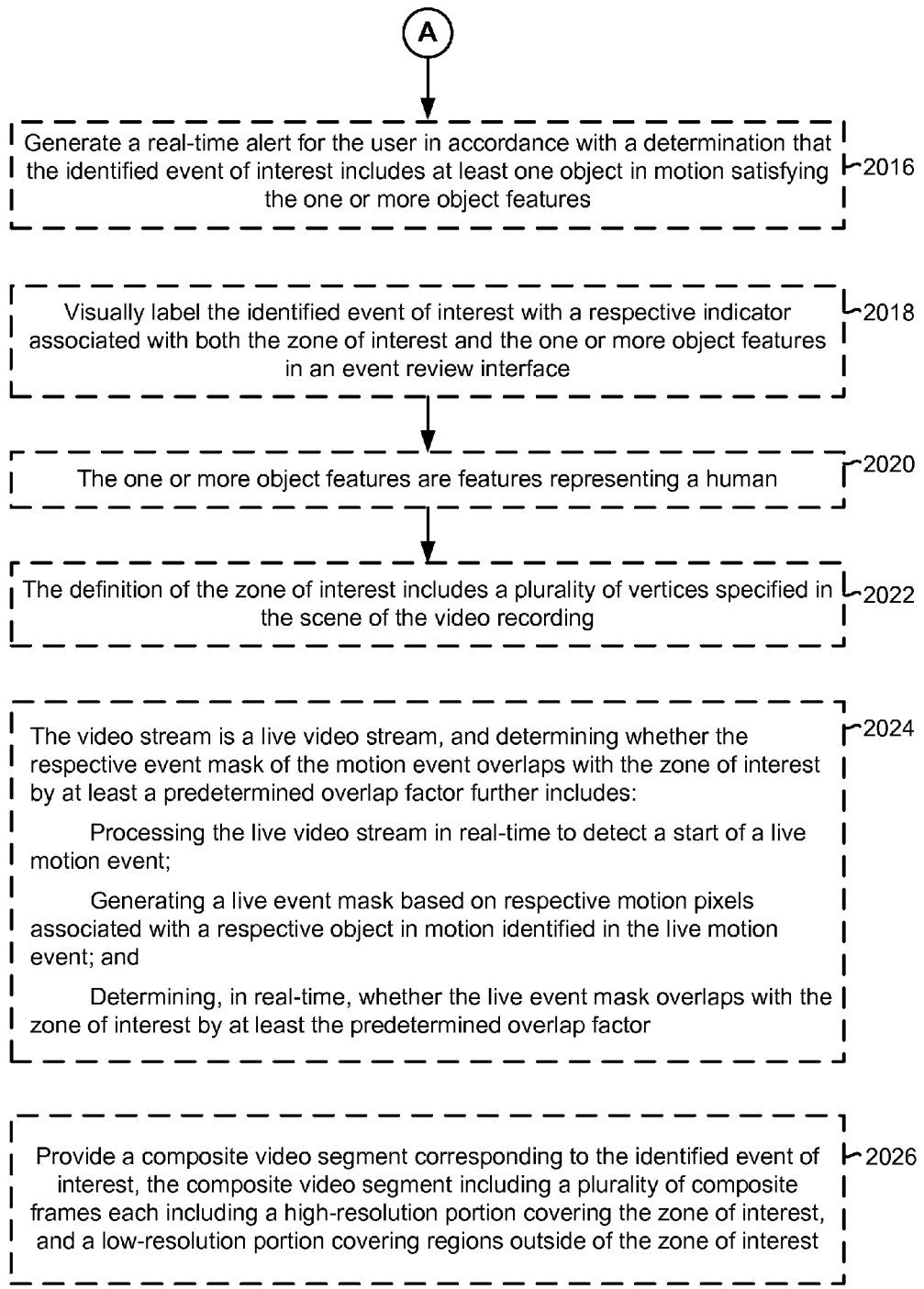

FIGS. 20A-20B illustrate a flowchart diagram of a method 2000 of providing context-aware zone monitoring on a video server system (e.g., video server system 508, FIGS. 5-6) in accordance with some implementations. FIGS. 20A-20B correspond to instructions stored in a computer memory or computer readable storage medium (e.g., the memory 606).

Conventionally, when monitoring a zone of interest within a field of view of a video surveillance system, the system determines whether an object has entered the zone of interest based on the image information within the zone of interest. This is ineffective sometimes when the entire zone of interest is obscured by a moving object, and the details of the motion (e.g., the trajectory and speed of a moving object) are not apparent from merely the image within the zone of interest. For example, such prior art systems are not be able to distinguish a global lighting change from a object moving in front of the camera and consequently obscuring the entire view field of the camera. The technique described herein detects motion events without being constrained by the zones (i.e., boundaries) that have been defined, and then determines if a detected event is of interest based on an overlap factor between the zones and the detected motion events. This allows for more meaningful zone monitoring with context information collected outside of the zones of interest.

As shown in FIG. 20A, the method 2000 of monitoring selected zones in a scene depicted in a video stream is performed by a server (e.g., the video server system 508). The server receives (2002) a definition of a zone of interest within the scene depicted in the video steam. In response to receiving the definition of the zone of interest, the server determines (2004), for each motion event detected in the video stream, whether a respective event mask of the motion event overlaps with the zone of interest by at least a predetermined overlap factor (e.g., a threshold number of pixels), and identifies (2006) the motion event as an event of interest associated with the zone of interest in accordance with a determination that the respective event mask of the motion event overlaps with the zone of interest by at least the predetermined overlap factor. In other words, the identification of motion events is based on image information of the whole scene, and then it is determined whether the detected motion event is an event of interest based on an overlap factor between the zone of interest and the event mask of the motion event.

In some embodiments, the server generates (2008) the respective event mask for the motion event, where the generating includes: creating a respective binary motion pixel map for each frame of a respective video segment associated with the motion event; and combining the respective binary motion pixel maps of all frames of the respective video segment to generate the respective event mask for the motion event. Other methods of generating the event mask are described with respect to FIGS. 11C and 11E and accompanying descriptions.

In some embodiments, the server receives (2010) a first selection input from a user to select the zone of interest as a first event filter. The server receives (2012) a second selection input from the user to select one or more object features as a second event filter to be combined with the first event filter. The server determines (2014) whether the identified event of interest includes at least one object in motion satisfying the one or more object features. The server or a component thereof (e.g., the real-time motion event presentation module 632, FIG. 6) generates (2016) a real-time alert for the user in accordance with a determination that the identified event of interest includes at least one object in motion satisfying the one or more object features. For example, a real-time alert can be generated when an object of interest enters the zone of interest, where the object of interest can be a person matching the specified object features associated with a human being. In some embodiments, a sub-module (e.g., the person identification module 626) of the server provides the object features associated with a human being and determines whether the object that entered the zone of interest is a human being.

In some implementations, the server visually labels (2018) the identified event of interest with an indicator associated with both the zone of interest and the one or more object features in an event review interface. In some embodiments, the one or more object features are (2020) features representing a human. In some embodiments, the definition of the zone of interest includes (2022) a plurality of vertices specified in the scene of the video recording.

In some embodiments, the video stream is (2024) a live video stream, and determining whether the respective event mask of the motion event overlaps with the zone of interest by at least a predetermined overlap factor further includes: processing the live video stream in real-time to detect a start of a live motion event; generating a live event mask based on respective motion pixels associated with a respective object in motion identified in the live motion event; and determining, in real-time, whether the live event mask overlaps with the zone of interest by at least the predetermined overlap factor.

In some embodiments, the server provides (2026) a composite video segment corresponding to the identified event of interest, the composite video segment including a plurality of composite frames each including a high-resolution portion covering the zone of interest, and a low-resolution portion covering regions outside of the zone of interest. For example, the high resolution portion can be cropped from the original video stored in the cloud, and the low resolution region can be a stylized abstraction or down-sampled from the original video.

It should be understood that the particular order in which the operations in FIGS. 20A-20B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method 2000 described above with respect to FIGS. 20A-20B.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of categorizing and providing user feedback regarding a detected event, the method comprising:
    receiving a selection of a plurality of event zones within a field of view of a single video camera;
    displaying a video monitoring user interface on a display of a client device located remotely from the video camera, the video monitoring user interface including a first region for displaying a live video feed and/or a recorded video feed from the video camera and a second region for displaying a single event timeline, the single event timeline including a plurality of equally spaced time indicators each indicating a specific time and a current video feed indicator indicating the temporal position of the video feed displayed in the first region, the temporal position including a past time corresponding to the previously recorded video feed from the video camera and a current time corresponding to the live video feed from the video camera, wherein the current video feed indicator is movable relative to the equally spaced time indicators to facilitate a change in the temporal position of the video feed displayed in the first region;
    displaying the single event timeline on the second region of the video monitoring user interface according to a user-selected scale;
    displaying on the single event timeline a plurality of event indicators corresponding to one or more events previously detected from the live video feed during a period of time associated with the user-selected scale of the single event timeline, wherein:
        each of the one or more events is assigned to at least one of the plurality of event zones;
        each event is represented by a respective event indicator having a graphic display characteristic associated with a corresponding event zone to which the event is assigned; and
        the graphic display characteristic is a visually unique color fill for each event zone; and
    displaying, for at least one of the plurality of event indicators, a corresponding static image from the live video feed, the static image being representative of the event associated with the event indicator; and
    in response to a detection of a new event in one of the event zones for the live video feed, displaying a new event indicator for the detected new event on the single event timeline, the new event indicator being displayed with the graphic display characteristic corresponding to the event zone in which the new motion event was detected.

2. The method of claim 1, further comprising:
    in accordance with a determination that one or more characteristics for the new event satisfy one or more criteria for the event zone, displaying a notification indicating that the detected new event has been detected in the event zone.

3. The method of claim 2, wherein the notification pops-up from the new event indicator for the detected new event.

4. The method of claim 2, wherein the notification is overlaid on the video in the first region of the video monitoring user interface.

5. The method of claim 2, wherein the notification is a banner notification displayed in a location corresponding to the top of the video monitoring user interface.

6. The method of claim 2, wherein the notification includes one or more affordances for providing feedback as to whether the detected new event is properly detected in the event zone.

7. The method of claim 1, wherein the event zone corresponds to a recognized event zone.

8. The method of claim 1, wherein the event zone corresponds to a previously created event.

9. The method of claim 8, further comprising:
    training a categorization model based on a training data set containing motion vectors corresponding to the event category, wherein common characteristics of the event category are extracted through the training to set forth the one or more categorization criteria and distinguish events associated with the event category from events associated with other event categories.

10. The method of claim 1, wherein the one or more events previously detected by the camera include a subset of events, further comprising:
    identifying a first event category associated with the subset of events; and
    retroactively modifying on the video monitoring user interface a display characteristic of a subset of event indicators corresponding to the subset of the events.

11. The method of claim 1, further comprising:
    detecting selection of a first event indicator of the one or more event indicators, the first event indicator corresponding to a first event of the one or more events; and
    displaying a dialog box for the first event corresponding to the first event indicator, wherein the dialog box includes at least one of a time the first event was detected and a preview of the first event.

12. The method of claim 1, further comprising:
    displaying one or more affordances in response to detection of a contact on the video monitoring user interface; and
    in accordance with an activation of the one or more affordances, enabling control of the camera including at least one of a zoom command and a microphone enabling/disabling command.

13. A computing system, comprising:
    one or more processors; and
    memory storing one or more programs to be executed by the one or more processors, the one or more programs comprising instructions for:
        receiving a selection of a plurality of event zones within a field of view of a single video camera;
        displaying a video monitoring user interface on a display of a client device located remotely from the video camera, the video monitoring user interface including a first region for displaying a live video feed and/or a recorded video feed from the video camera and a second region for displaying a single event timeline, the single event timeline including a plurality of equally spaced time indicators each indicating a specific time and a current video feed indicator indicating the temporal position of the video feed displayed in the first region, the temporal position including a past time corresponding to the previously recorded video feed from the video camera and a current time corresponding to the live video feed from the video camera, wherein the current video feed indicator is movable relative to the equally spaced time indicators to facilitate a change in the temporal position of the video feed displayed in the first region;

displaying the single event timeline on the second region of the video monitoring user interface according to a user-selected scale;

displaying on the single event timeline a plurality of event indicators corresponding to one or more events previously detected from the live video feed during a period of time associated with the user-selected scale of the single event timeline, wherein:

each of the one or more events is assigned to at least one of the plurality of event zones;

each event is represented by a respective event indicator having a graphic display characteristic associated with a corresponding event zone to which the event is assigned; and the graphic display characteristic is a visually unique color fill for each event zone; and displaying, for at least one of the plurality of event indicators, a corresponding static image from the live video feed, the static image being representative of the event associated with the event indicator; and in response to a detection of a new event in one of the event zones for the live video feed, displaying a new event indicator for the detected new event on the single event timeline, the new event indicator being displayed with the graphic display characteristic corresponding to the event zone in which the new motion event was detected.

14. The computing system of claim 13, wherein the one or more programs further comprise instructions for:

displaying a notification indicating that the detected new event has been assigned to the respective event category.

15. The computing system of claim 14, wherein the notification pops-up from the indicator for the detected new event.

16. The computing system of claim 14, wherein the notification includes one or more affordances for providing feedback as to whether the detected new event is properly assigned to the respective event category.

17. The computing system of claim 13, wherein the event zone corresponds to a recognized event category.

18. The computing system of claim 13, wherein the event zone corresponds to a previously created zone of interest.

19. The computing system of claim 13, wherein the one or more events previously detected by the camera include a subset of events, wherein the one or more programs further comprise instructions for:

identifying a first event category associated with the subset of events; and retroactively modifying on the video monitoring user interface a display characteristic of a subset of event indicators corresponding to the subset of the events.

20. The computing system of claim 13, wherein the one or more programs further comprise instructions for:

detecting selection of a first event indicator of the one or more event indicators, the first event indicator corresponding to a first event of the one or more events; and displaying a dialog box for the first event corresponding to the first event indicator, wherein the dialog box includes at least one of a time the first event was detected and a preview of the first event.

21. The computing system of claim 13, wherein the one or more programs further comprise instructions for:

displaying one or more affordances in response to detection of a contact on the video monitoring user interface; and in accordance with an activation of the one or more affordances, enabling control of the camera including at least one of a zoom command and a microphone enabling/disabling command.

22. A non-transitory computer readable storage medium storing one or more programs, the one or more programs comprising instructions, which, when executed by a computing system with one or more processors, cause the computing system to perform operations comprising:

receiving a selection of a plurality of event zones within a field of view of a single video camera;

displaying a video monitoring user interface on a display of a client device located remotely from the video camera, the video monitoring user interface including a first region for displaying a live video feed and/or a recorded video feed from the video camera and a second region for displaying a single event timeline, the single event timeline including a plurality of equally spaced time indicators each indicating a specific time and a current video feed indicator indicating the temporal position of the video feed displayed in the first region, the temporal position including a past time corresponding to the previously recorded video feed from the video camera and a current time corresponding to the live video feed from the video camera, wherein the current video feed indicator is movable relative to the equally spaced time indicators to facilitate a change in the temporal position of the video feed displayed in the first region;

displaying the single event timeline on the second region of the video monitoring user interface according to a user-selected scale;

displaying on the single event timeline a plurality of event indicators corresponding to one or more events previously detected from the live video feed during a period of time associated with the user-selected scale of the single event timeline, wherein:

each of the one or more events is assigned to at least one of the plurality of event zones;

each event is represented by a respective event indicator having a graphic display characteristic associated with a corresponding event zone to which the event is assigned; and the graphic display characteristic is a visually unique color fill for each event zone; and displaying, for at least one of the plurality of event indicators, a corresponding static image from the live video feed, the static image being representative of the event associated with the event indicator; and in response to a detection of a new event in one of the event zones for the live video feed, displaying a new event indicator for the detected new event on the single event timeline, the new event indicator being displayed with the graphic display characteristic corresponding to the event zone in which the new motion event was detected.

23. The non-transitory computer readable storage medium of claim 22, wherein the instructions cause the computing system to perform operations further comprising:

displaying a notification indicating that the detected new event has been detected in the event zone.

24. The non-transitory computer readable storage medium of claim 23, wherein the notification pops-up from the new event indicator for the detected new event.

25. The non-transitory computer readable storage medium of claim 23, wherein the notification includes one or more affordances for providing feedback as to whether the detected new event is properly detected in the event zone.

26. The non-transitory computer readable storage medium of claim 22, wherein the event zone corresponds to a recognized event zone.

27. The non-transitory computer readable storage medium of claim 22, wherein the event zone corresponds to a previously created event category.

28. The non-transitory computer readable storage medium of claim 22, wherein the one or more events previously detected by the camera include a subset of events, and wherein the instructions cause the computing system to perform operations further comprising:
    identifying a first event category associated with the subset of events; and
    retroactively modifying on the video monitoring user interface a display characteristic of a subset of event indicators corresponding to the subset of the events.

29. The non-transitory computer readable storage medium of claim 22, wherein the instructions cause the computing system to perform operations further comprising:
    detecting selection of a first event indicator of the one or more event indicators, the first event indicator corresponding to a first event of the one or more events; and
    displaying a dialog box for the first event corresponding to the first event indicator, wherein the dialog box includes at least one of a time the first event was detected and a preview of the first event.

30. The non-transitory computer readable storage medium of claim 22, wherein the instructions cause the computing system to perform operations further comprising:
    displaying one or more affordances in response to detection of a contact on the video monitoring user interface; and
    in accordance with an activation of the one or more affordances, enabling control of the camera including at least one of a zoom command and a microphone enabling/disabling command.

* * * * *